US011183074B2

(12) United States Patent
McCann et al.

(10) Patent No.: US 11,183,074 B2
(45) Date of Patent: *Nov. 23, 2021

(54) DYNAMIC AIRCRAFT THREAT CONTROLLER MANAGER APPARATUSES, METHODS AND SYSTEMS

(71) Applicant: DTN, LLC, Omaha, NE (US)

(72) Inventors: Donald McCann, Overland Park, KS (US); James H. Block, Minneapolis, MN (US); Daniel W. Lennartson, Burnsville, MN (US)

(73) Assignee: DTN, LLC, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/379,293

(22) Filed: Dec. 14, 2016

(65) Prior Publication Data

US 2017/0229021 A1 Aug. 10, 2017

Related U.S. Application Data

(63) Continuation of application No. 14/758,777, filed as application No. PCT/US2013/078540 on Dec. 31, 2013, now Pat. No. 9,558,672.

(Continued)

(51) Int. Cl.
*G08G 5/00* (2006.01)
*G01W 1/00* (2006.01)

(52) U.S. Cl.
CPC .............. *G08G 5/006* (2013.01); *G01W 1/00* (2013.01); *G08G 5/0013* (2013.01);
(Continued)

(58) Field of Classification Search
CPC .... G08G 5/006; G08G 5/0013; G08G 5/0091; G08G 5/0034; G08G 5/0039; G01W 1/00
See application file for complete search history.

(56) References Cited

U.S. PATENT DOCUMENTS 4,327,286 A 4/1982 Thoma
5,028,929 A 7/1991 Sand
(Continued)

FOREIGN PATENT DOCUMENTS

EP       1826647 A1    8/2007
WO    2014106269 A1    7/2014
(Continued)

OTHER PUBLICATIONS

Final Office Action for U.S. Appl. No. 14/758,774 dated Dec. 7, 2016.
(Continued)

*Primary Examiner* — Rodney A Butler
(74) *Attorney, Agent, or Firm* — Kutak Rock LLP; Brian L. Main

(57) ABSTRACT

The DYNAMIC AIRCRAFT THREAT CONTROLLER MANAGER APPARATUSES, METHODS AND SYSTEMS ("DATCM") transforms flight profile information, terrain, weather/atmospheric data and flight parameter data via DATCM components into comprehensive hazard avoidance optimized flight plans. Comprehensive hazard avoidance includes synergistic comprehensive turbulence and airfoil-specific icing data. In one implementation, the DATCM comprises a processor and a memory disposed in communication with the processor and storing processor-issuable instructions to receive anticipated flight plan parameter data, obtain weather data based on the flight plan parameter data, obtain atmospheric data based on the flight plan parameter data, and determine a plurality of four-dimensional grid points based on the flight plan parameter data. The DATCM may then determine comprehensive hazards mappings. With (near) real-time comprehensive hazard information and/or predictive turbulence/icing forecast specific to airfoil type and/or profile parameters, the (Continued)

Example DATCM Logic Flow Diagram with PPI Calculation

DATCM may allow aircraft to avoid areas where comprehensive hazard is greater than a predetermined threshold and/or avoid areas where turbulence/icing may occur.

20 Claims, 64 Drawing Sheets

Related U.S. Application Data

(60) Provisional application No. 61/919,796, filed on Dec. 22, 2013, provisional application No. 61/773,726, filed on Mar. 6, 2013, provisional application No. 61/747,905, filed on Dec. 31, 2012, provisional application No. 61/748,046, filed on Dec. 31, 2012, provisional application No. 61/747,899, filed on Dec. 31, 2012, provisional application No. 61/747,885, filed on Dec. 31, 2012, provisional application No. 61/748,009, filed on Dec. 31, 2012.

(52) U.S. Cl.
CPC ......... *G08G 5/0034* (2013.01); *G08G 5/0039* (2013.01); *G08G 5/0091* (2013.01)

(56) References Cited

U.S. PATENT DOCUMENTS

| | | | |
|---|---|---|---|
| 5,164,731 A | 11/1992 | Borden et al. | |
| 5,265,024 A | 11/1993 | Crabill | |
| 5,488,375 A | 1/1996 | Michie | |
| 5,615,118 A | 3/1997 | Frank | |
| 6,085,147 A | 7/2000 | Myers | |
| 6,184,816 B1 | 2/2001 | Zheng et al. | |
| 6,237,405 B1 | 5/2001 | Leslie | |
| 6,289,277 B1 | 9/2001 | Feyereisen | |
| 6,304,194 B1 | 10/2001 | McKillip | |
| 6,377,202 B1 | 4/2002 | Kropfli | |
| 6,381,538 B1 | 4/2002 | Robinson | |
| 6,430,996 B1 | 8/2002 | Anderson | |
| 6,456,226 B1 | 9/2002 | Zheng et al. | |
| 6,516,652 B1 | 2/2003 | May et al. | |
| 6,643,580 B1 | 11/2003 | Naimer et al. | |
| 6,650,972 B1 | 11/2003 | Robinson | |
| 6,819,265 B2 | 11/2004 | Jamieson et al. | |
| 6,865,452 B2 | 3/2005 | Burdon | |
| 6,868,721 B2 | 3/2005 | Szilder | |
| 6,917,860 B1 | 7/2005 | Robinson | |
| 7,027,898 B1 | 4/2006 | Leger et al. | |
| 7,400,293 B2 | 7/2008 | Fleming | |
| 7,463,955 B1 | 12/2008 | Robinson | |
| 7,467,031 B2 | 12/2008 | King | |
| 7,471,995 B1 | 12/2008 | Robinson | |
| 7,546,206 B1 | 6/2009 | Miller et al. | |
| 7,598,901 B2 | 10/2009 | Tillotson et al. | |
| 7,612,688 B1 | 11/2009 | Vigeant-Langlois et al. | |
| 7,724,177 B2 | 5/2010 | Bunch et al. | |
| 7,788,035 B2 | 8/2010 | Clayson et al. | |
| 7,880,666 B2 | 2/2011 | Tillotson et al. | |
| 7,925,393 B2 | 4/2011 | Bolt, Jr. | |
| 8,130,121 B2 | 3/2012 | Smith et al. | |
| 8,135,500 B1 | 3/2012 | Robinson | |
| 8,174,431 B2 | 5/2012 | Tillotson et al. | |
| 8,332,136 B2 | 12/2012 | Baker et al. | |
| 8,504,224 B2 | 8/2013 | Marty | |
| 8,711,008 B2 | 4/2014 | Cook | |
| 8,723,686 B1 | 5/2014 | Murray | |
| 9,013,332 B2 | 4/2015 | Meis | |
| 9,234,982 B2 | 1/2016 | Ramaiah | |
| 9,243,922 B2 | 1/2016 | Watts | |
| 2002/0024652 A1 | 2/2002 | Ooga | |
| 2002/0039072 A1 | 4/2002 | Gremmert et al. | |
| 2003/0078719 A1 | 4/2003 | Zobell | |
| 2004/0044445 A1* | 3/2004 | Burdon | G01C 23/00 701/3 |
| 2004/0183695 A1 | 9/2004 | Ruokangas | |
| 2004/0189976 A1 | 9/2004 | Burns et al. | |
| 2005/0251341 A1 | 11/2005 | Nielsen | |
| 2006/0059024 A1* | 3/2006 | Bailey | G06Q 10/02 705/5 |
| 2007/0162197 A1 | 7/2007 | Fleming | |
| 2008/0208474 A1 | 8/2008 | Wilson | |
| 2008/0255714 A1 | 10/2008 | Ross | |
| 2009/0132103 A1 | 5/2009 | Marty et al. | |
| 2009/0171633 A1 | 7/2009 | Aparicio Duran et al. | |
| 2010/0057362 A1 | 3/2010 | Schilke et al. | |
| 2010/0152931 A1 | 6/2010 | Lacombe | |
| 2011/0022294 A1 | 1/2011 | Apley | |
| 2011/0054718 A1 | 3/2011 | Bailey | |
| 2011/0134412 A1 | 6/2011 | Inokuchi | |
| 2012/0085868 A1 | 4/2012 | Barnes | |
| 2012/0158280 A1 | 6/2012 | Ravenscroft | |
| 2012/0207589 A1 | 8/2012 | Fridthjof | |
| 2012/0218127 A1* | 8/2012 | Kroen | G08G 5/0034 340/945 |
| 2012/0226485 A1 | 9/2012 | Creagh et al. | |
| 2012/0259549 A1 | 10/2012 | McDonald | |
| 2013/0080043 A1 | 3/2013 | Bailin et al. | |
| 2013/0226452 A1 | 8/2013 | Watts | |
| 2014/0229097 A1 | 8/2014 | Bailey | |
| 2015/0336676 A1 | 11/2015 | McCann et al. | |
| 2016/0055752 A1 | 2/2016 | McCann et al. | |

FOREIGN PATENT DOCUMENTS

| | | |
|---|---|---|
| WO | 2014106273 A1 | 7/2014 |
| WO | 2015095890 A1 | 6/2015 |

OTHER PUBLICATIONS

Extended European Search Report for European Application No. 13867296.9 dated Feb. 7, 2017.
International Search Report for International Application No. PCT/US2013/078546 dated Apr. 15, 2014.
Written Opinion of the International Searching Authority for International Application No. PCT/US2013/078546 dated Apr. 15, 2014.
International Search Report for International Application No. PCT/US2013/078541 dated Apr. 15, 2014.
Written Opinion of the International Searching Authority for International Application No. PCT/US2013/078541 dated Apr. 15, 2014.
International Search Report for International Application No. PCT/US2013/078540 dated Apr. 29, 2014.
Written Opinion of the International Searching Authority for International Application No. PCT/US2013/078540 dated Apr. 29, 2014.
International Search Report for International Application No. PCT/US2013/071987 dated Mar. 18, 2015.
Written Opinion of the International Search Authority for International Application No. PCT/US2013/071987 dated Mar. 18, 2015.
Barry Schwartz, The Quantitative Use of PIREPs in Developing Aviation Weather Guidance Products, Weather and Forecasting, vol. 11, September.
Kumjian and Ryzhkov, Polarimetric Signatures in Supercell Thunderstorms, Journal of Applied Meteorology and Climatology, vol. 47, Jul. 2008.
Ellrod and Knox, Improvements to an Operational Clear-Air Turbulence Diagnostic Index by Addition of a Divergence Trend Term, Weather and Forecasting, vol. 25, Apr. 2010.
Mccann, A turbulent kinetic energy equation and aircraft boundary layer turbulence. National Weather Digest (vol. 23 (1-2) pp. 13-19) National Weather Association (1999).
Zhou et al., An Introduction to NCEP SREF Aviation Project, NOAA/NWS/NCEP/Environmental Modeling Center (2004).
Kumjian, M.R., and A.V. Ryzhkov, 2007: Polarimetric characteristics of tornadic and nontornadic supercell thunderstorms. Extended Abstracts, 33rd Conference on Radar Meteorology, American Meteorological Society.
Extended Operations (ETOPS and Polar Operations), U.S. Department of Transportation, Federal Aviation Administration, Date: Jun. 13, 2008.

(56) References Cited

OTHER PUBLICATIONS

Mccann, Diagnosing and forecasting aircraft turbulence with steepening mountain waves. National. Weather Digest (vol. 30 pp. 77-92) National Weather Association (2006).

Mccann, D.W., 2006: Parameterizing convective vertical motions for aircraft icing forecasts. Proc. 12th Conf. on Aviation, Range, and Aerospace Meteorology, Amer. Meteor. Soc., Boston MA.

Knox, Mccann, and Williams; Application of the Lighthill-Ford theory of spontaneous imbalance to clear-air turbulence forecasting. Journal of Atmospheric Science (vol. 65, pp. 3392-3404), American Meteorological Society (2008).

Donald W. Mccann, John A. Knox and Paul D. Williams, An improvement in clear-air turbulence forecasting based on spontaneous imbalance theory, Meteorological Applications, (vol. 19 pp. 71-78, 2012), Royal Meteorological Society.

Mccann, D.W., Large versus small droplet icing. Proc. 10th Conf. on Aviation, Range, and Aerospace Meteorology, Hyannis MA, Amer. Meteor. Soc. (2004).

Mccann, D.W. and P.R. Kennedy, Percent Power Increase—A simple way to quantify an icing hazard. 9th Conf. on Aviation, Range, and Aerospace Meteorology, Orlando FL, Amer. Meteor. Soc. (2000).

Donald W. Mccann, Convection diagnosed from numerical models. Proc. 8th Conf. on Aviation, Range, and Aerospace Meteorology, Amer. Meteor. Soc., Boston MA, pp. 120-123 (1999).

Christopher M. Stock, Intercomparison of Icing Aviation Impact Variable Forecasts Produced During Real-Time Mesoscale Numerical Weather Prediction, University of Oklahoma (1998).

Proceedings of the FAA International Conference on Aircraft Inflight Icing, vol. I, U.S. Department of Transportation Federal Aviation Administration, Aug. 1996.

Morgan, Colin, Ervin Bossanyi, and Henry Seifert. "Assessment of safety risks arising from wind turbine icing." EWEC-Conference-. Bookshop for Scientific Publications, 1997.

Romine, Glen S., Donald W. Burgess, and Robert B. Wilhelmson. "A dual-polarization-radar-based assessment of the May 8, 2003 Oklahoma City area tornadic supercell." Monthly weather review 136.8 (2008): 2849-2870.

Mccann, Donald W. "Three-dimensional computations of equivalent potential vorticity." Weather and forecasting 10.4 (1995): 798-802.

Mahoney, Jennifer Luppens, et al. "Forecaster Assessment of Turbulence Algorithms: A Summary of Results for the Winter 2002 Study." Report to the FAA. Available from JL Mahoney, FSL 325 (2000).

Sancho McCann, Meteorology Lesson 11: Thunderstorms and Icing (2007).

Mccann, Donald W. "Gravity waves, unbalanced flow, and aircraft clear air turbulence." National Weather Digest 25.1/2 (2001): 3-14.

Operations Plan for the GOES-R Proving Ground 2012 Aviation Weather Experiment, Jun. 10, 2012.

Lennartson et al., The Schneider Electric Numerical Turbulence Forecast Verification using In-situ EDR observations from Operational Commercial Aircraft, 17th Conference on Aviation, Range, and Aerospace Meteorology, Jan. 6, 2015.

Donald W. Mccann, D. W. Lennartson and J. H. Block, Aircraft-Specific In-flight Icing Forecasts, American Meteorological Society, Fourth Aviation, Range, and Aerospace Meteorology Special Symposium (2014).

Overeem, Aart. Verification of clear-air turbulence forecasts. Koninklijk Nederlands Meteorologisch Instituut, 2002.

Notice of Acceptance for Australian Patent Application No. 2013369679 dated Jun. 28, 2016 (Corresponding to U.S. Appl. No. 14/758,777).

Office Action for Australian Patent Application No. 2013369684 dated May 31, 2016.

International Search Report and Written Opinion for International Application No. PCT/US2014/071987 dated Mar. 18, 2015.

Office Action for U.S. Appl. No. 14/758,770 dated May 13, 2016.

Office Action for U.S. Appl. No. 14/758,774 dated Jun. 17, 2016.

Hui-Ya Chuang, et al.; "P815 Transitioning NCAR's Aviation Algoriths into NCEP's Operations," Environmental Modeling Center, NCEP, College Park, Maryland (2016).

Robert Sharman, "The Graphical Turbulence Guidance (GTG) system & recent high-resolution modeling studies," Aviation & Turbulence in the Free Atmosphere, Royal Meteorogical Society Meeting at Imperial College, London dated Jan. 15, 2014.

GTG—Max clear air turbulence, Aviation Weather Center, NOAA National Weather Service, retrieved from the internet on May 4, 2016, https://www.aviationweather.gov/adds/turbulence/turbnav.

Notice of Acceptance for Australian Patent Application No. 2013369684 dated Oct. 6, 2016 (Corresponding to U.S. Appl. No. 14/758,770).

Final Office Action for U.S. Appl. No. 14/758,774 dated Jun. 30, 2015.

Office Action for U.S. Appl. No. 14/758,777 dated May 26, 2016.

"Notice of Allowance received for Canada Application No. 2,896,758, dated Feb. 12, 2021,".

"Examination Report Received for Canada Application No. 2,896,758 dated Jul. 12, 2021".

\* cited by examiner

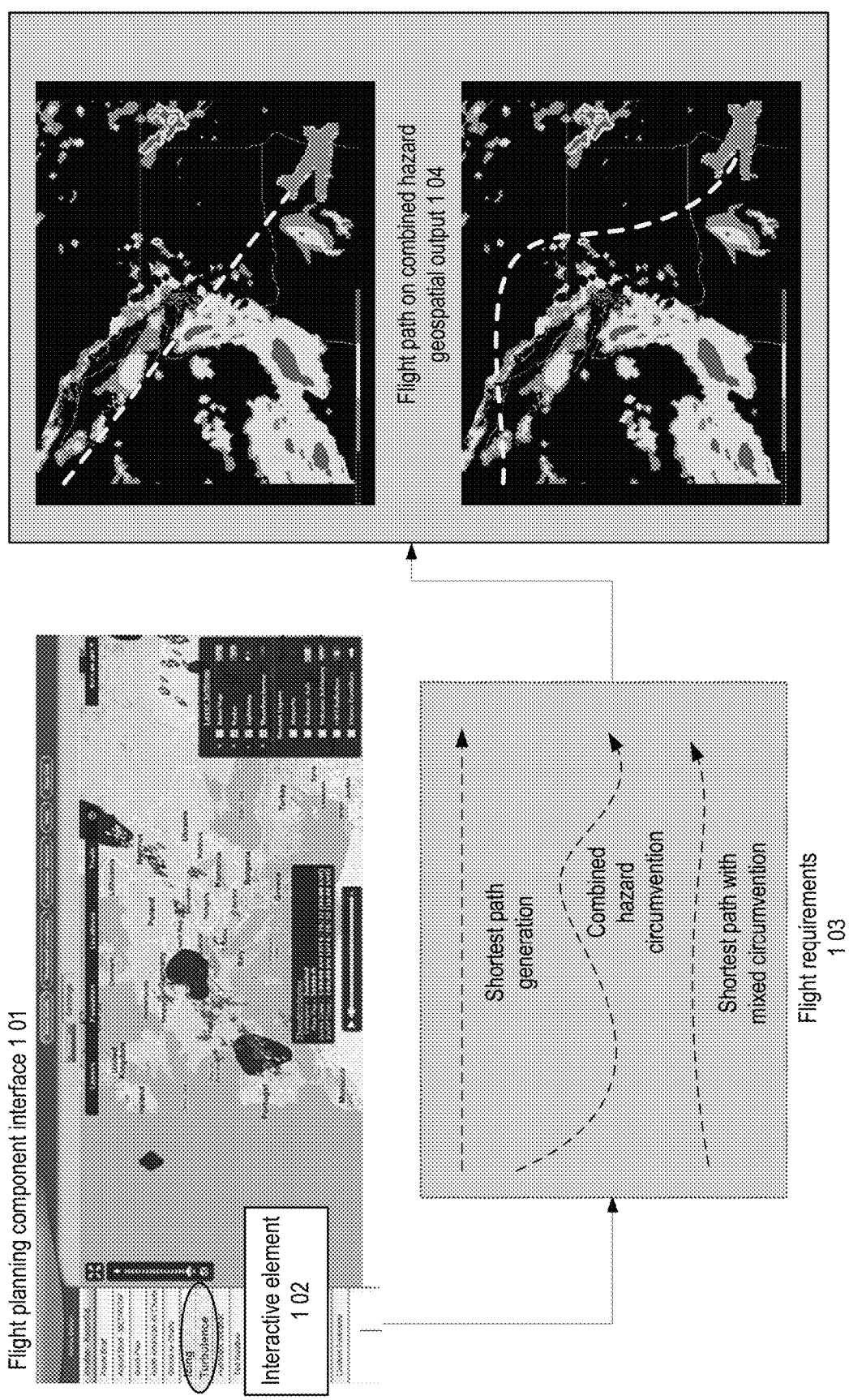
FIG 1A – Example DATCM Combined Hazard Flight Planning Implementation

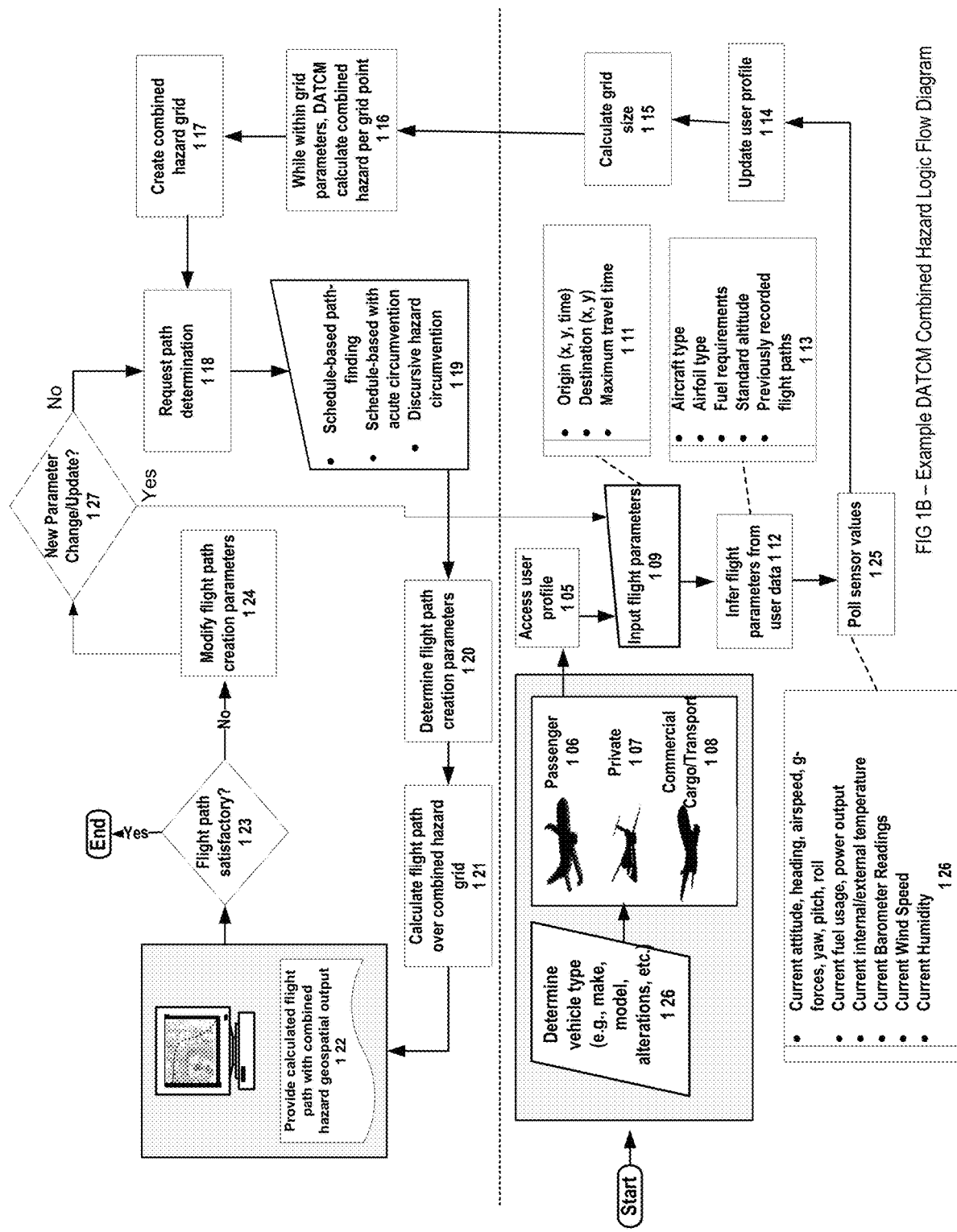
FIG 1B – Example DATCM Combined Hazard Logic Flow Diagram

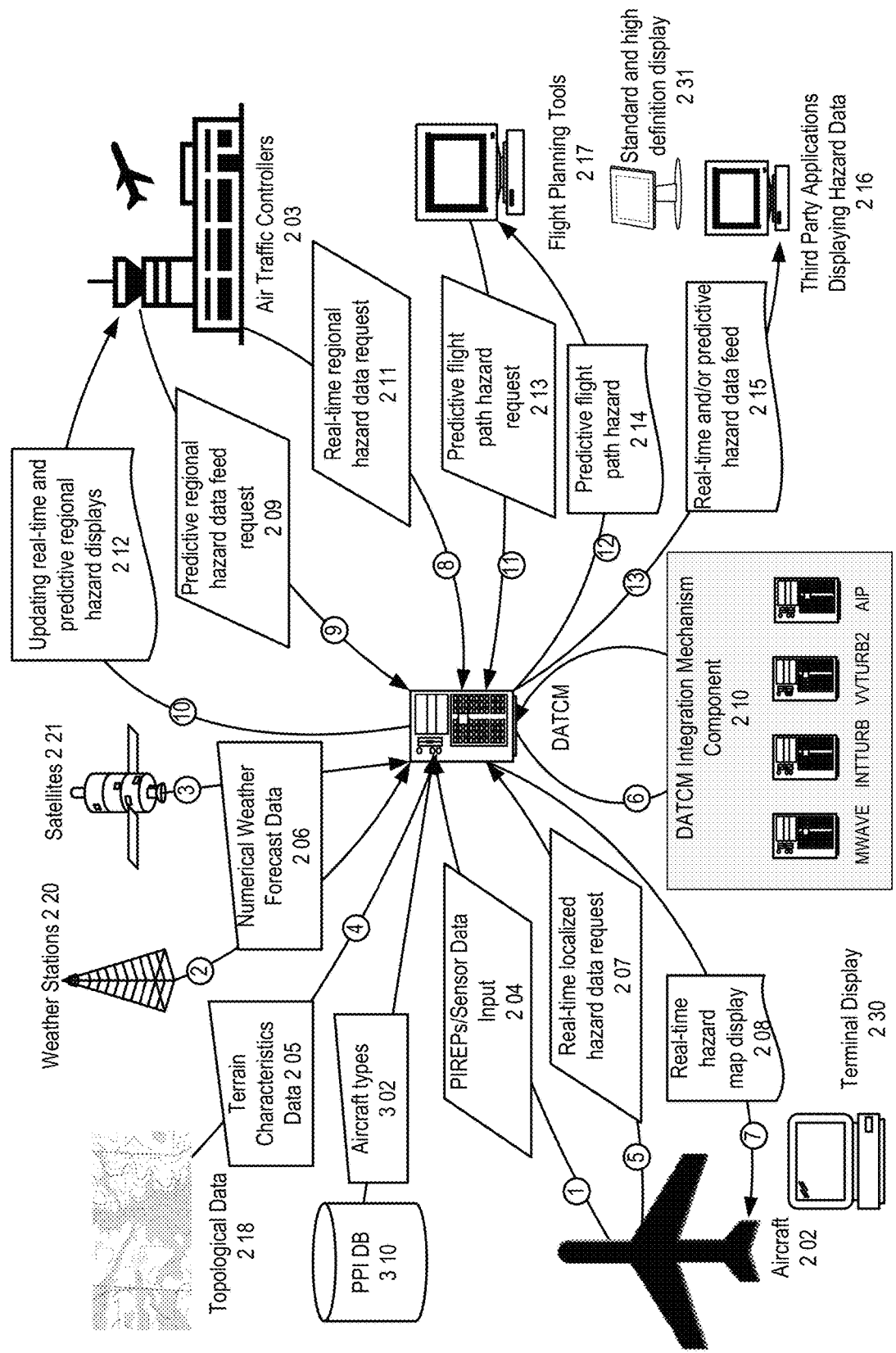
FIG 2 – Example DATCM Combined Hazard Data Flow Diagram

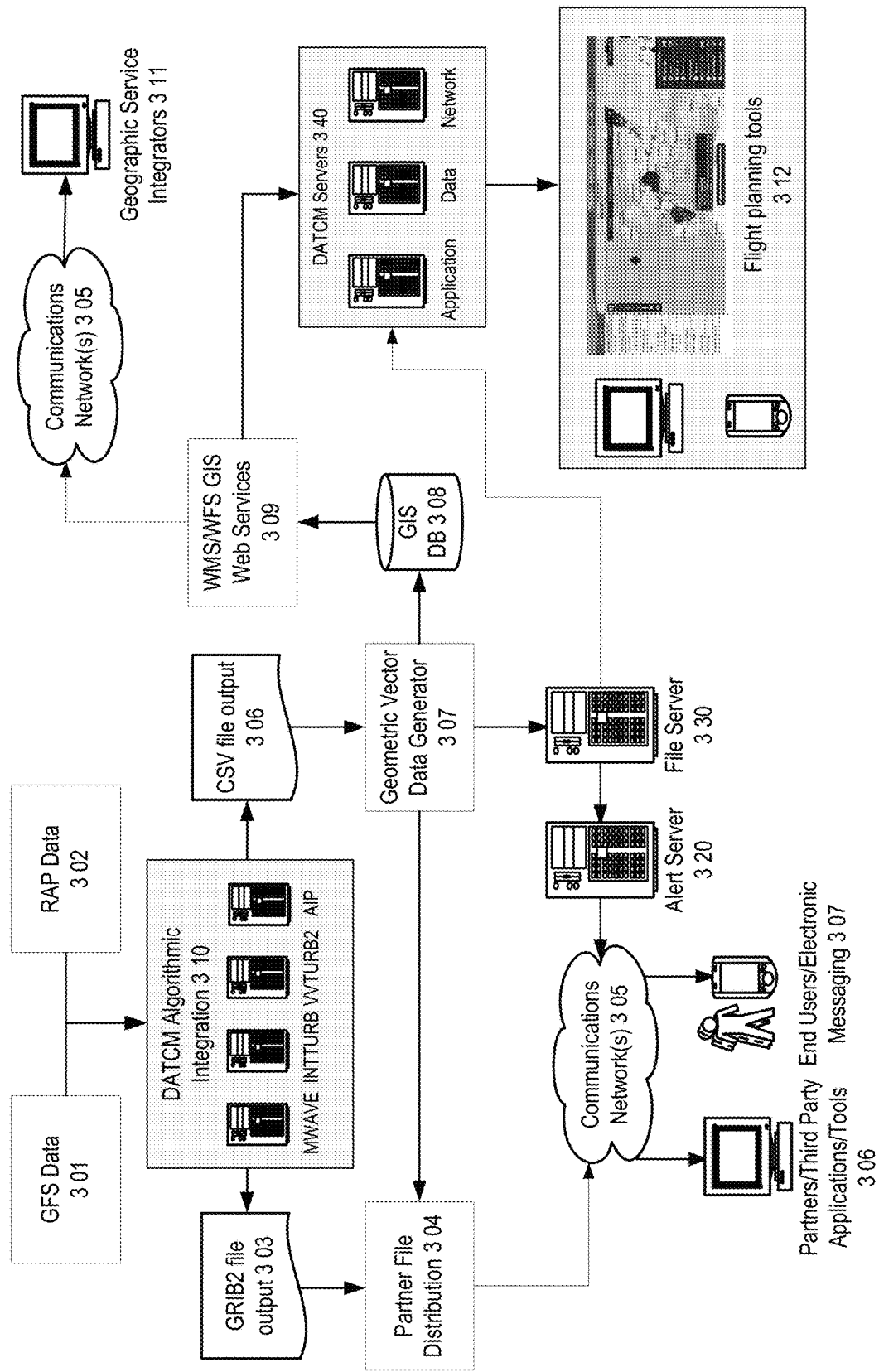
FIG 3 – Example DATCM Combined Hazard Data Flow Diagram

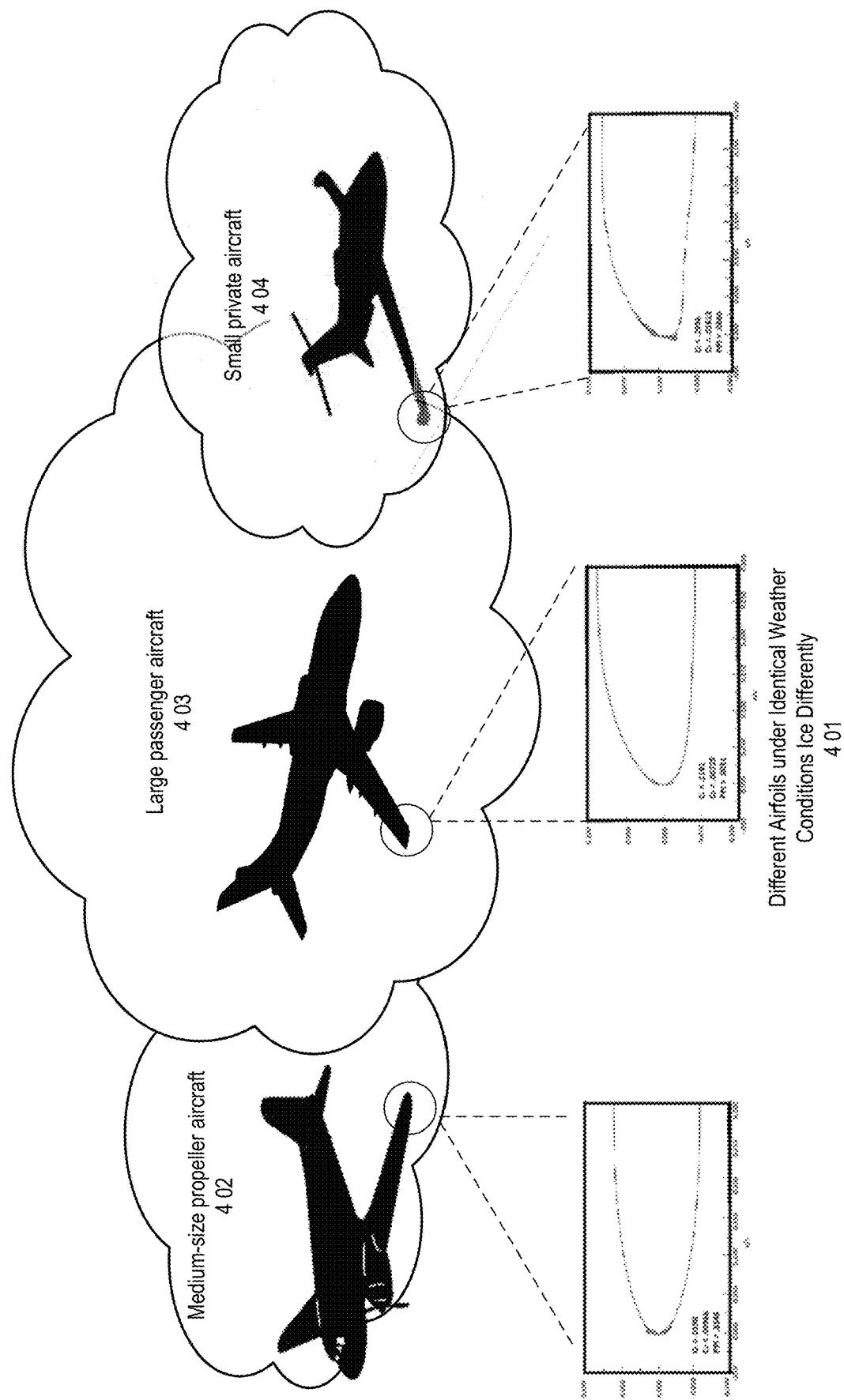
FIG 4 - Example DATCM Airfoil Icing Overview Diagram

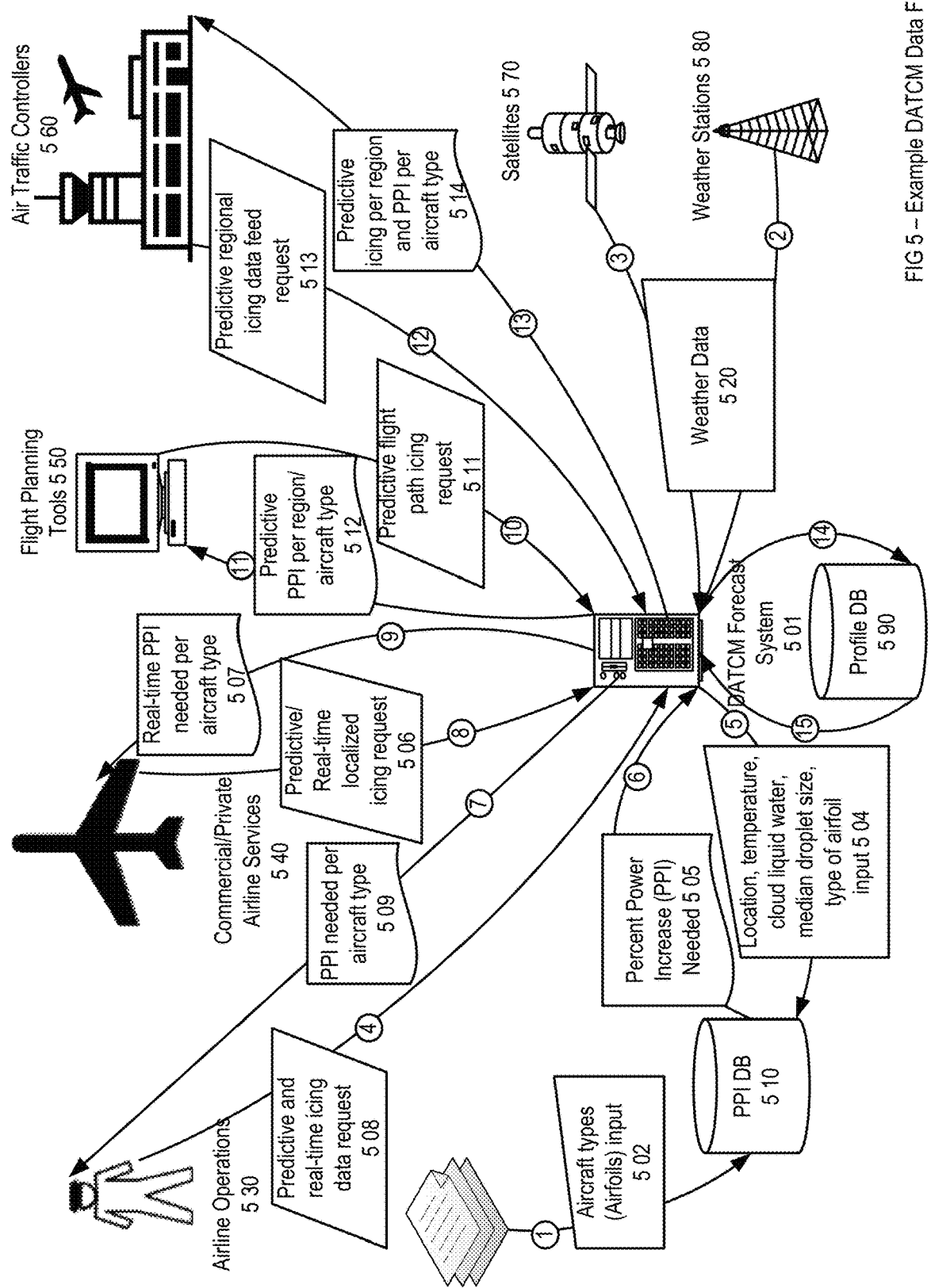
FIG 5 – Example DATCM Data Flow Diagram

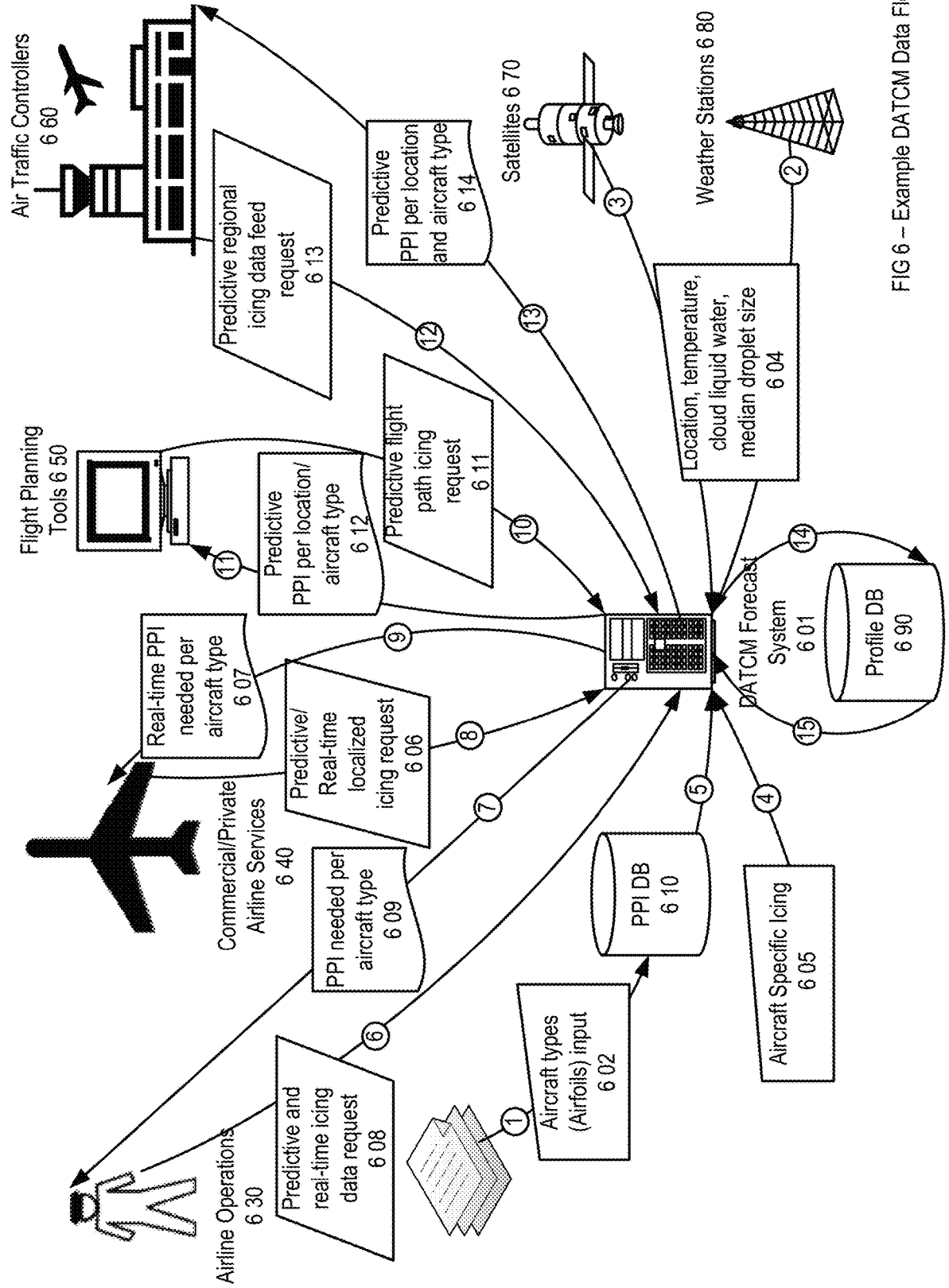
FIG 6 – Example DATCM Data Flow Diagram

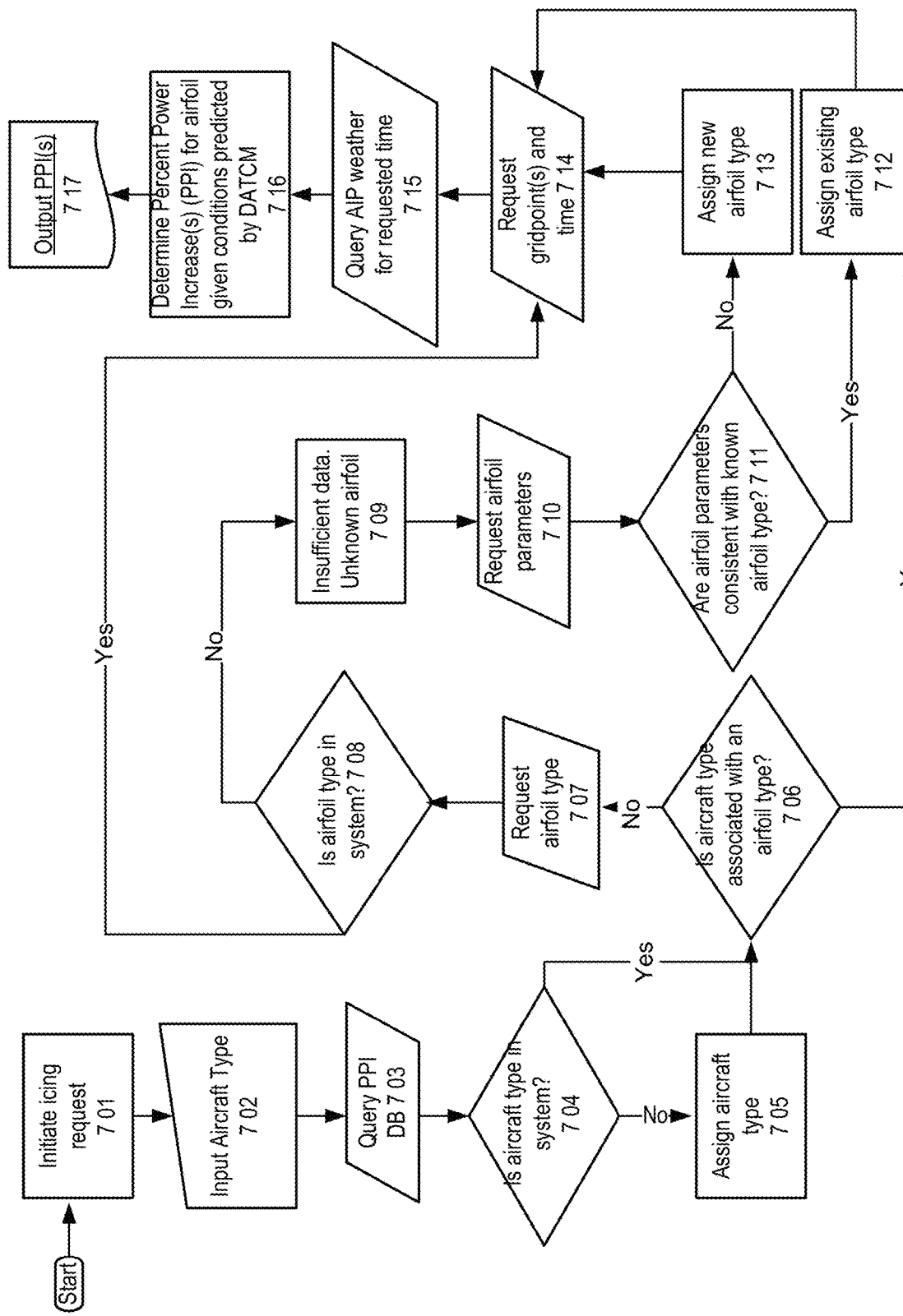
FIG 7 – Example DATCM PPI Logic Flow Diagram

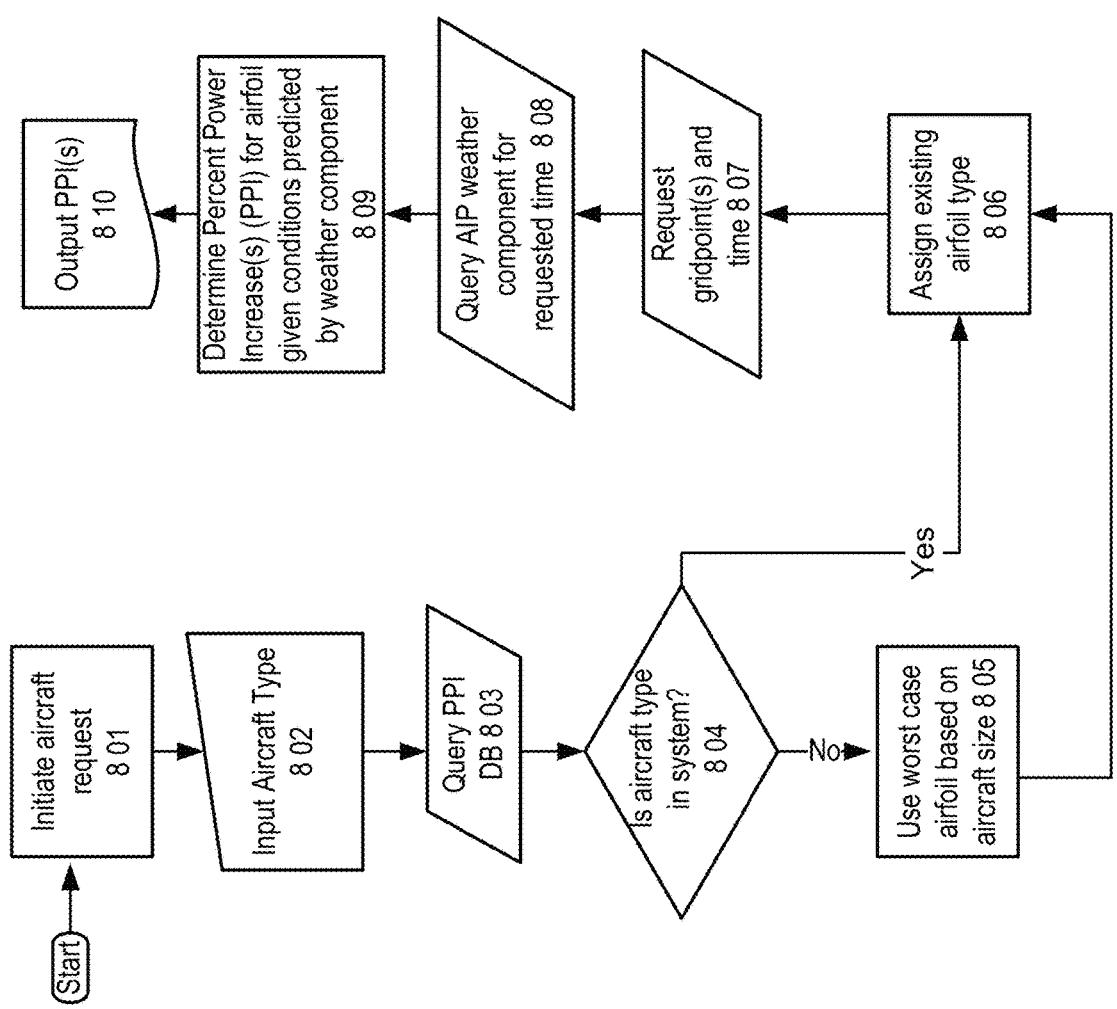
FIG 8 – Example DATCM PPI Logic Flow Diagram

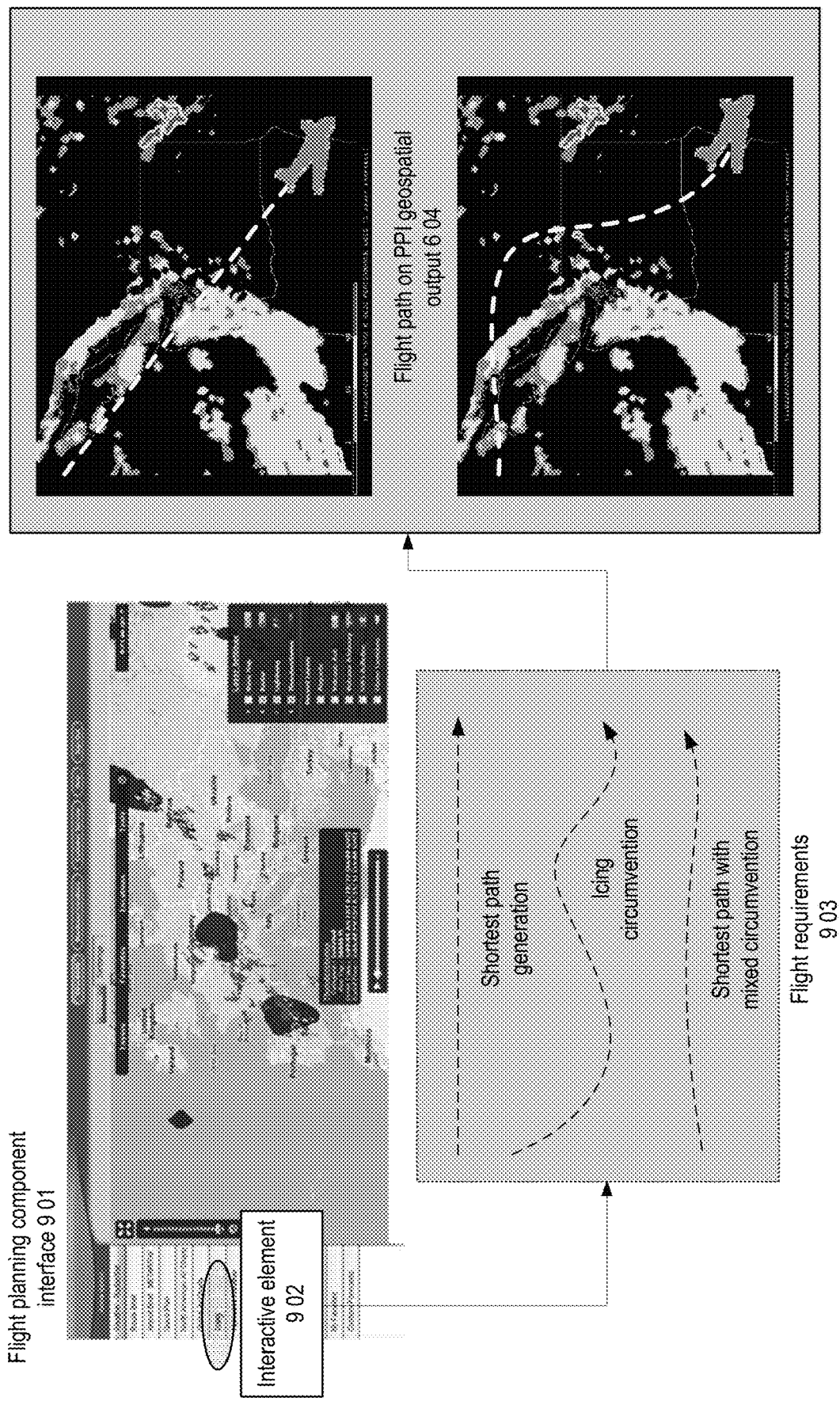
FIG 9 – Example DATCM User Interface

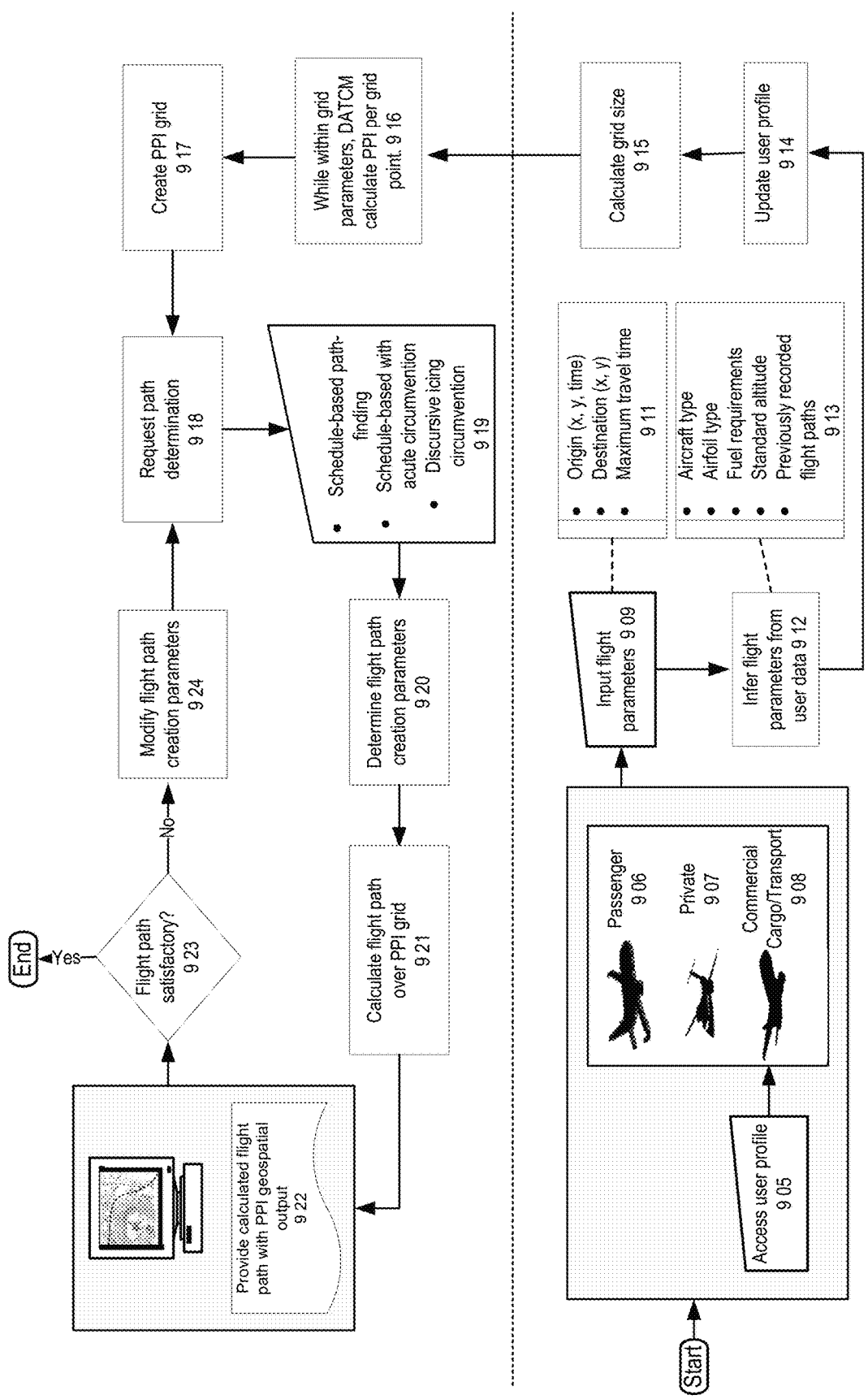
FIG 9A – Example DATCM Logic Flow Diagram with PPI Calculation

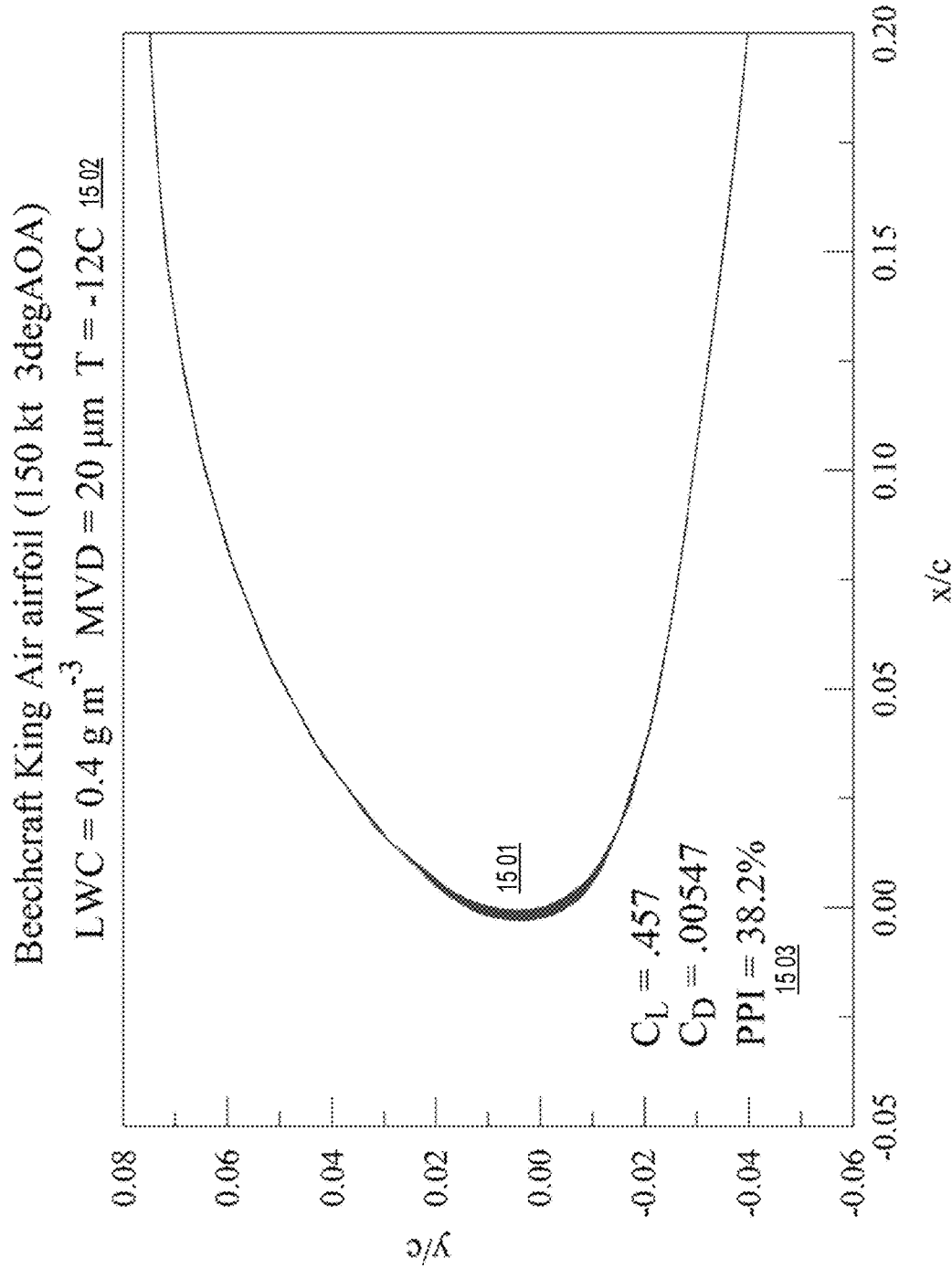
FIG 15 - Example Ice Accumulation and PPI for Beechcraft King Air Airfoil

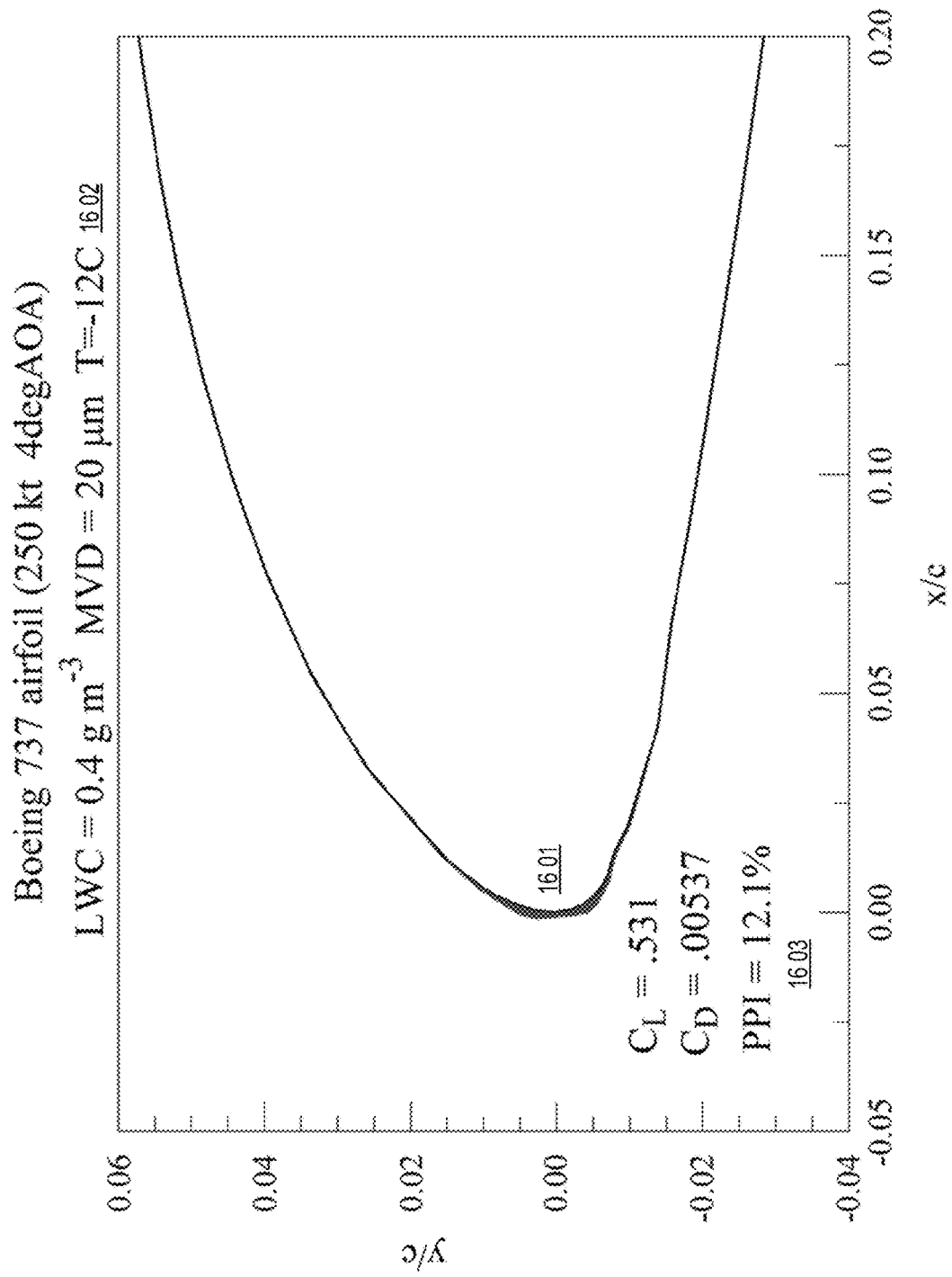
FIG 16 - Example Ice Accumulation and PPI for Boeing 737 Airfoil

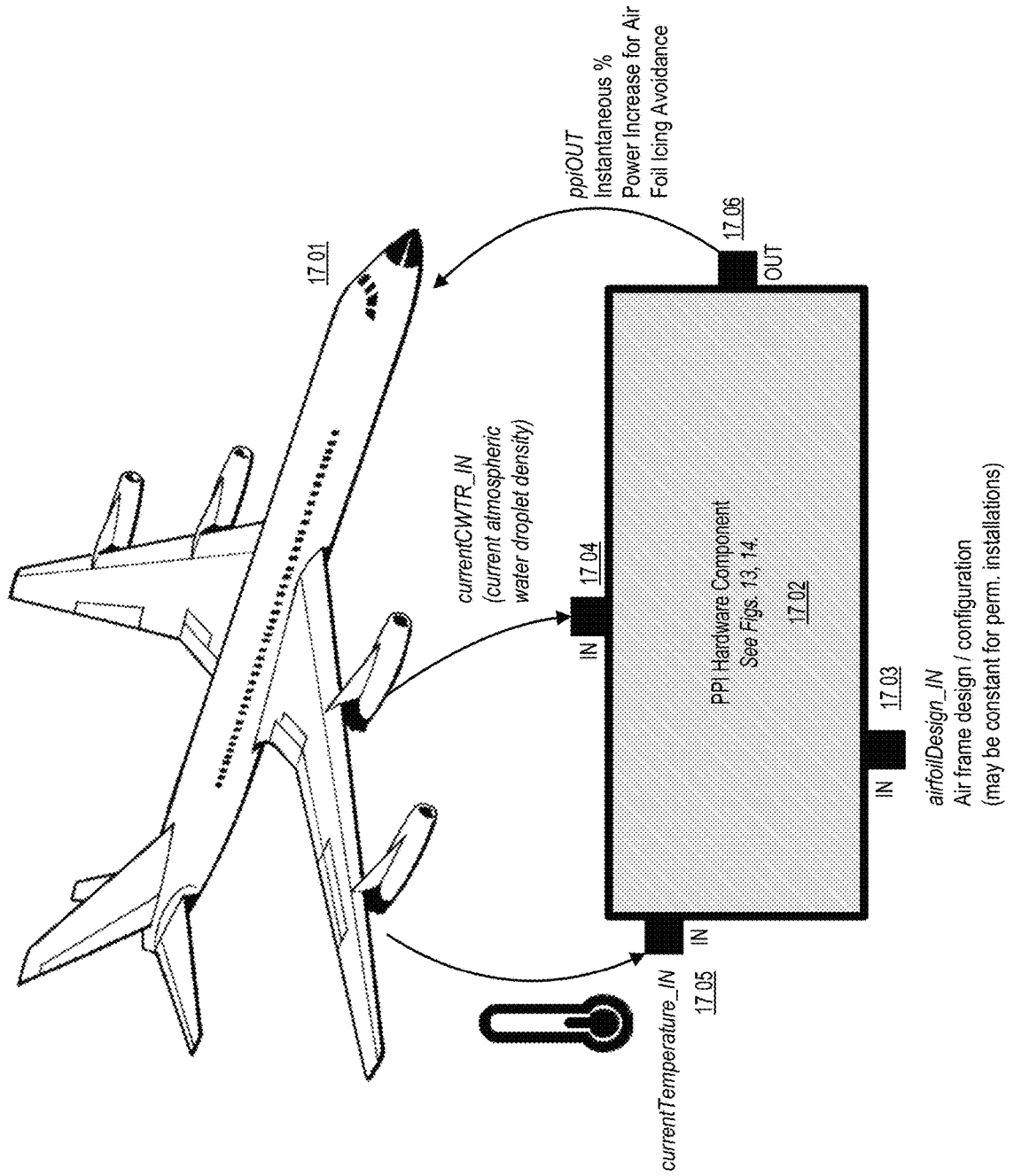
FIG 17 - Example PPI Installation

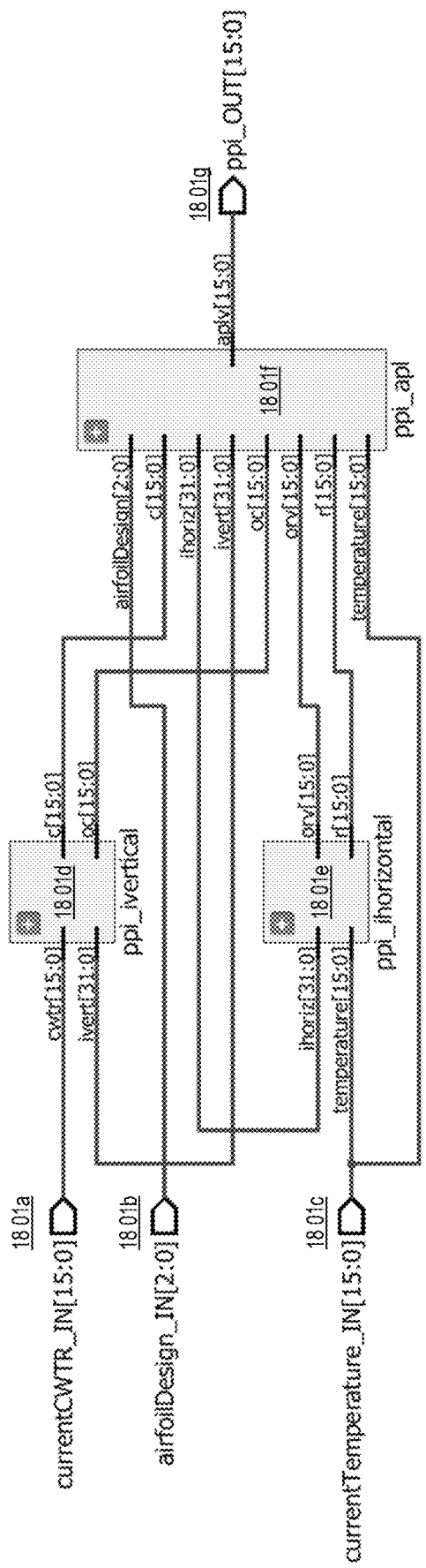
FIG 18A - Example PPI Component, Overview

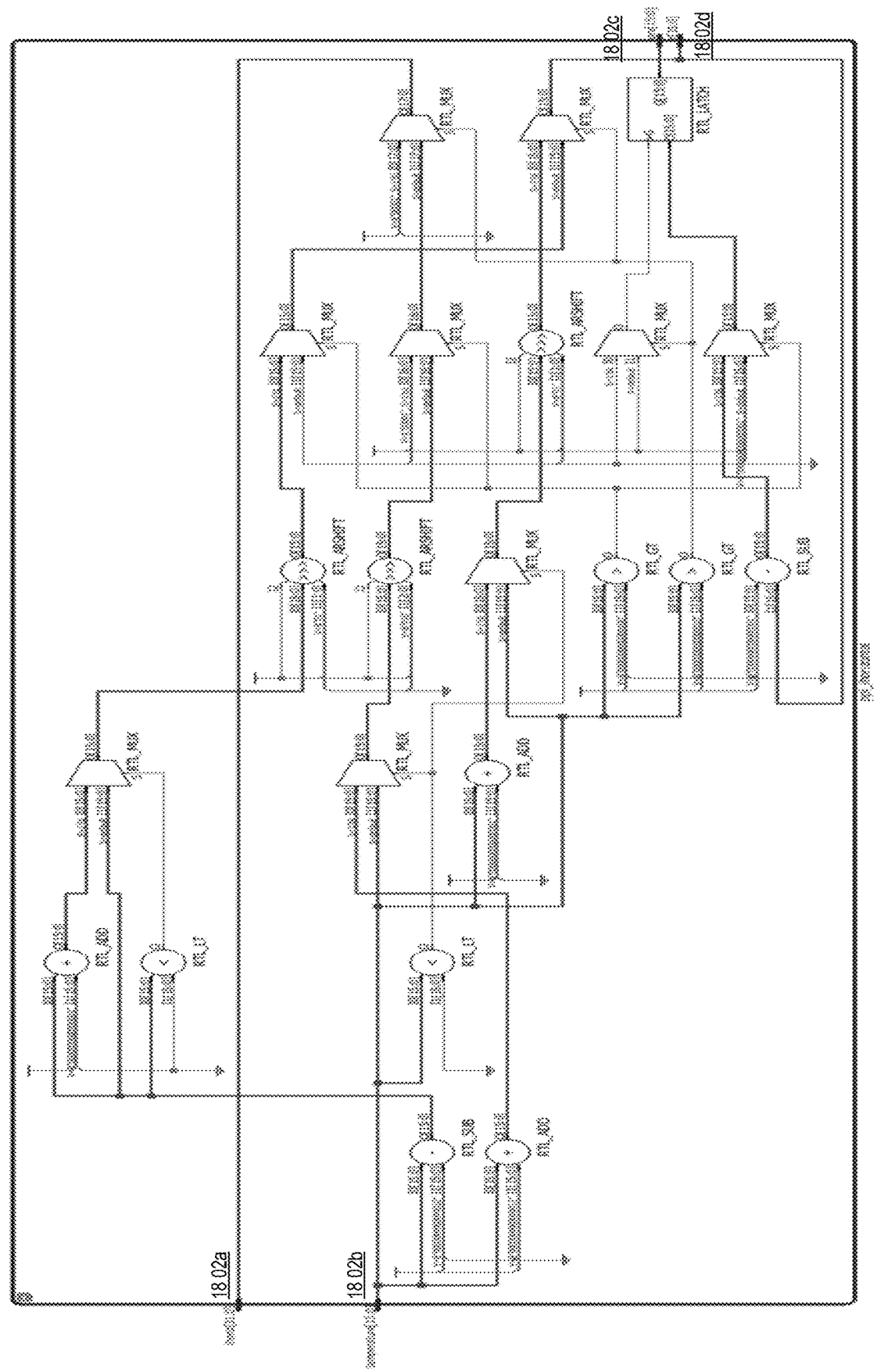
FIG 18B - Example PPI Component (sub-component view: ppi_ihorizontal)

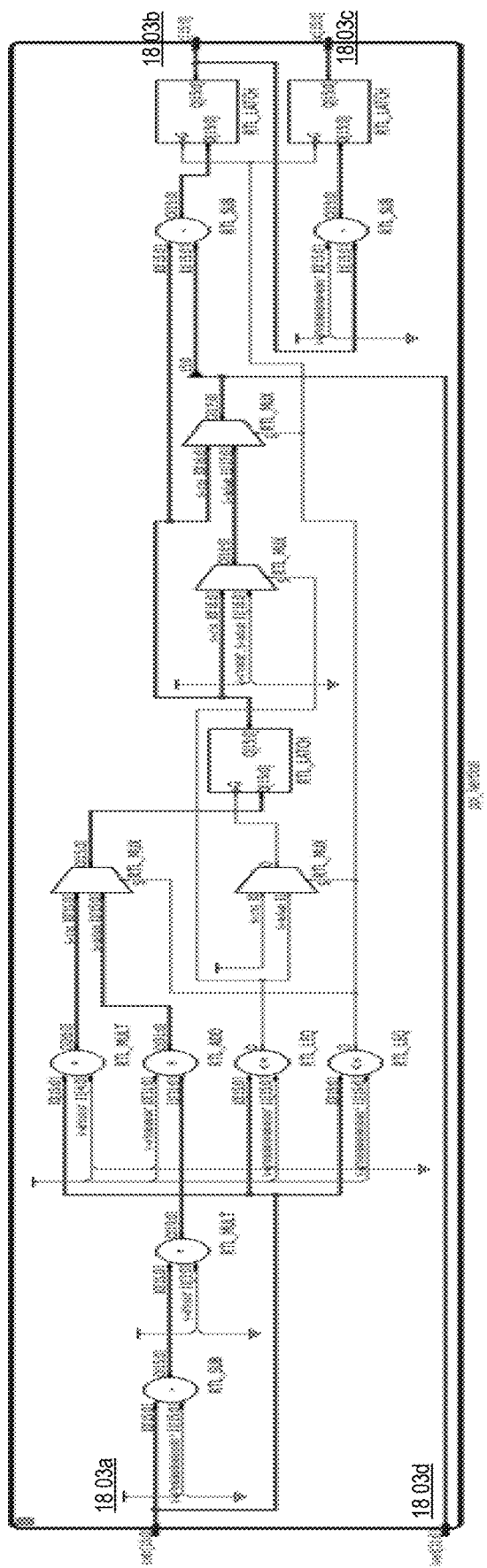
FIG 18C - Example PPI Component (sub-component view: ppi_ivertical)

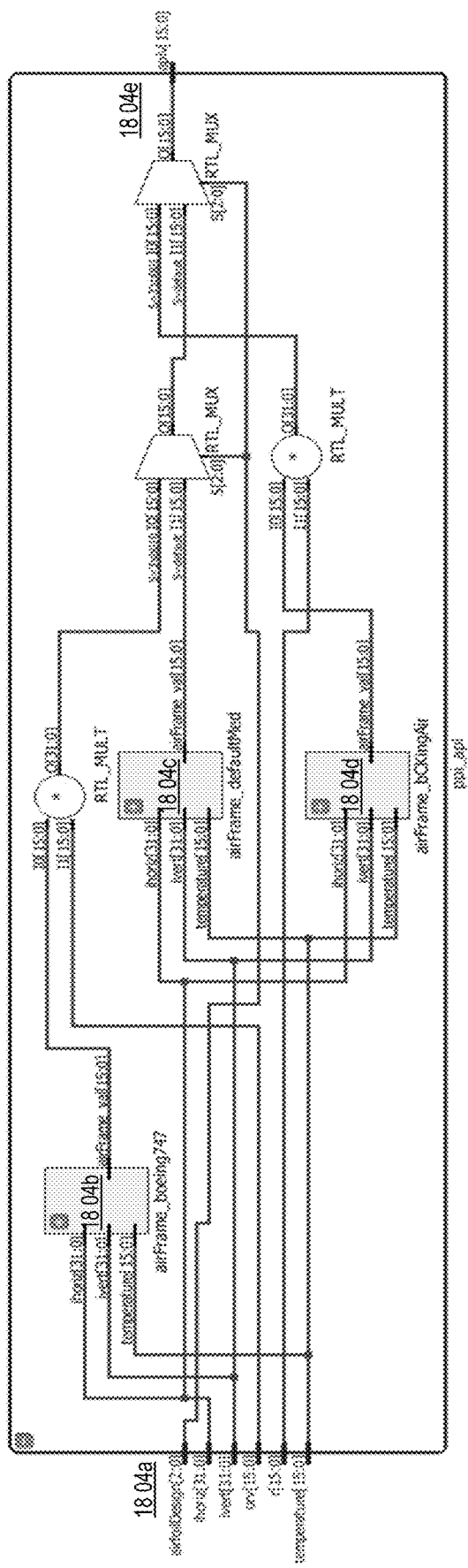
FIG 18D - Example: PPI Component (sub-component view: ppi_api)

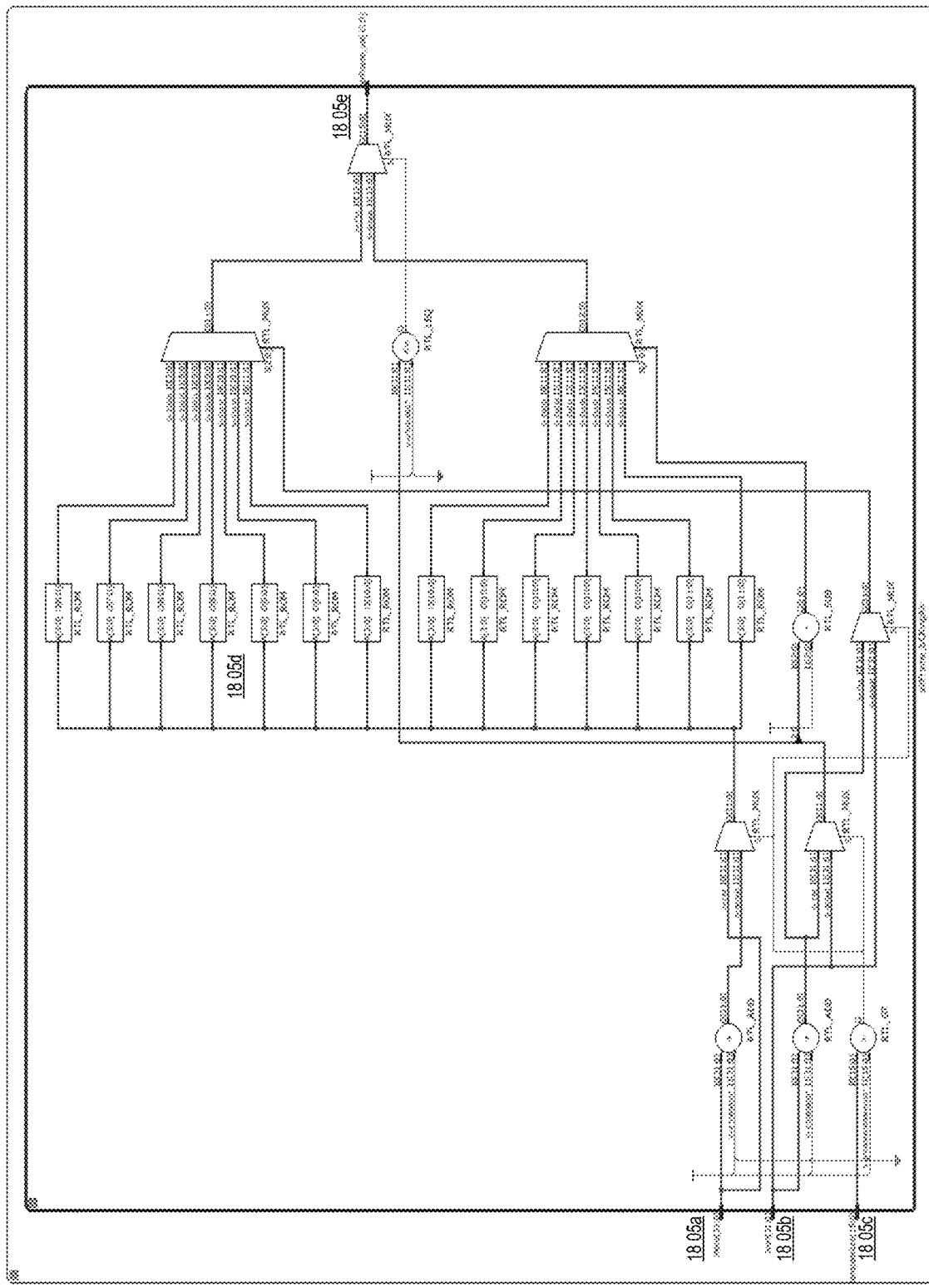
FIG 18E - Example PPI Component (sub-component sub-view: airFrame Customization Module)

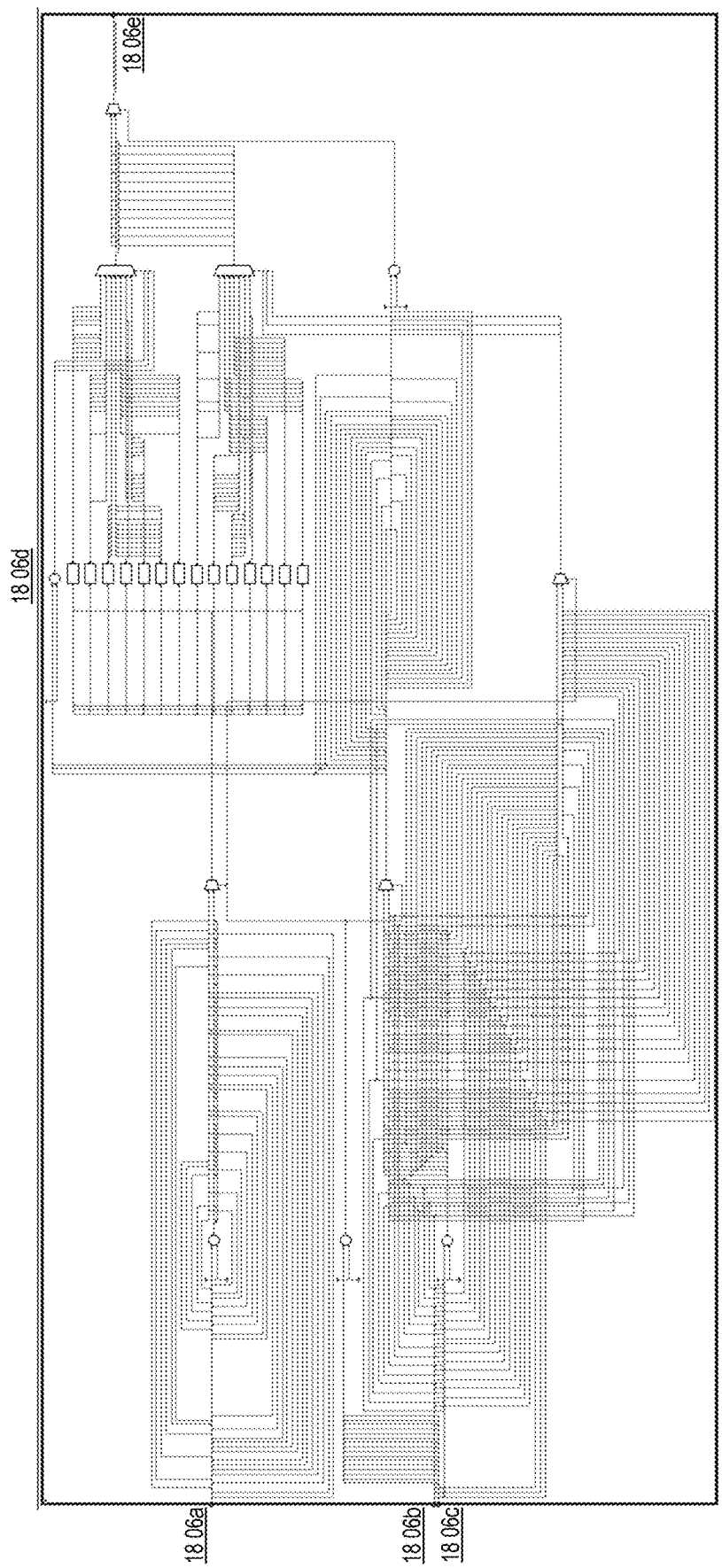
FIG 18F - Example PPI Component (sub-component sub-view: airFrame Customization Module Breakout)

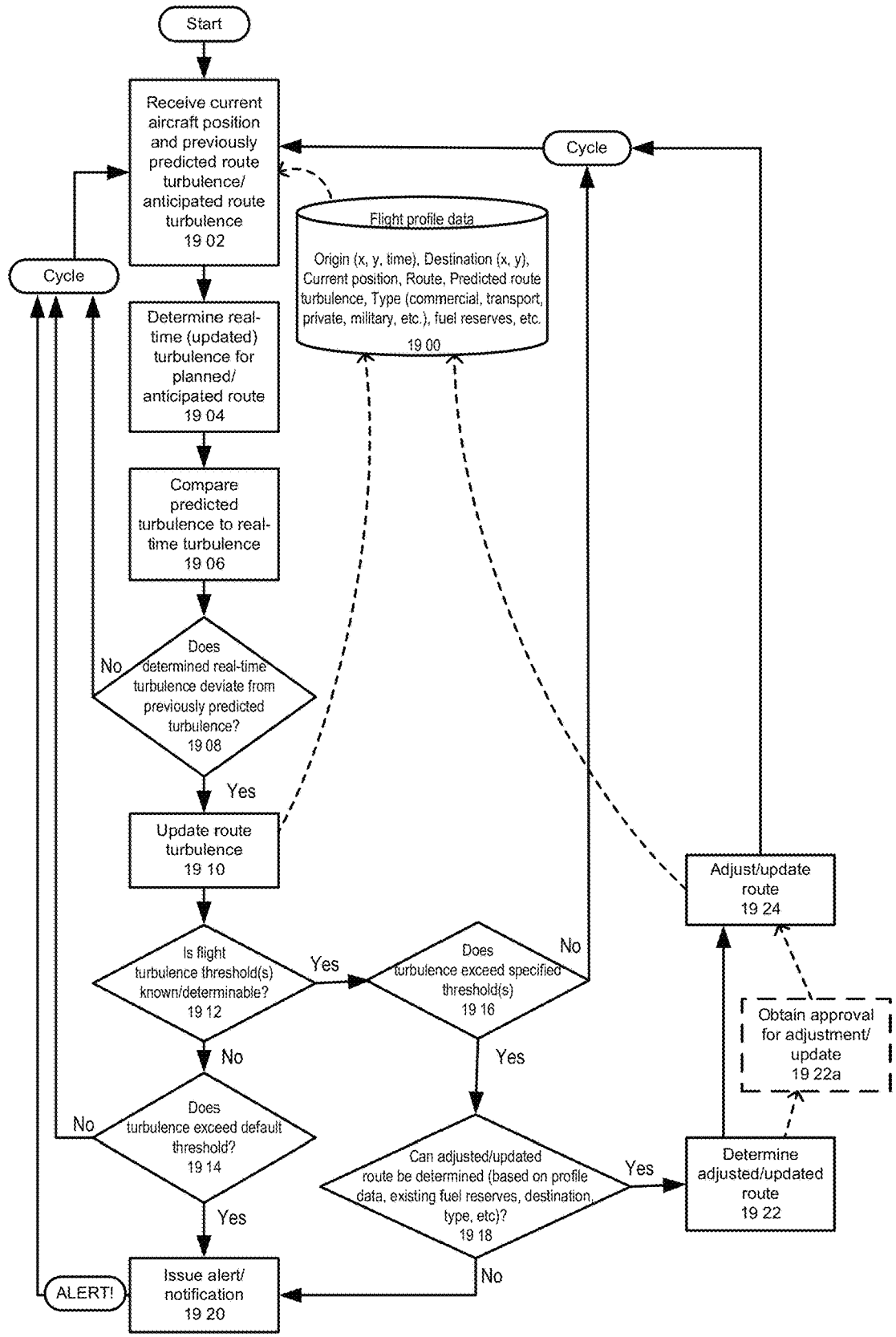
FIG 19A – Example DATCM Real-Time Flight Alerting and Planning Logic Flow

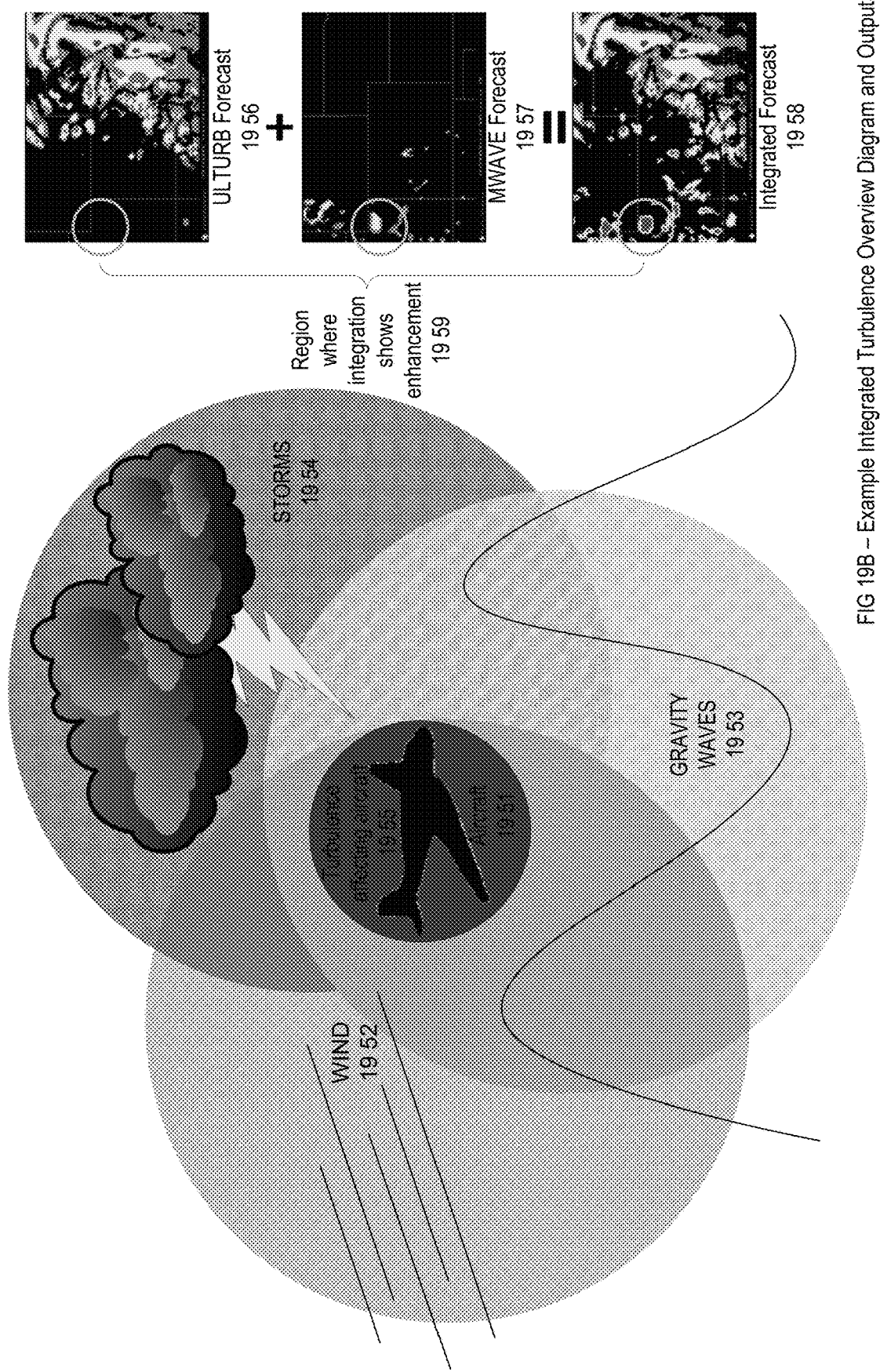
FIG 19B – Example Integrated Turbulence Overview Diagram and Outputs

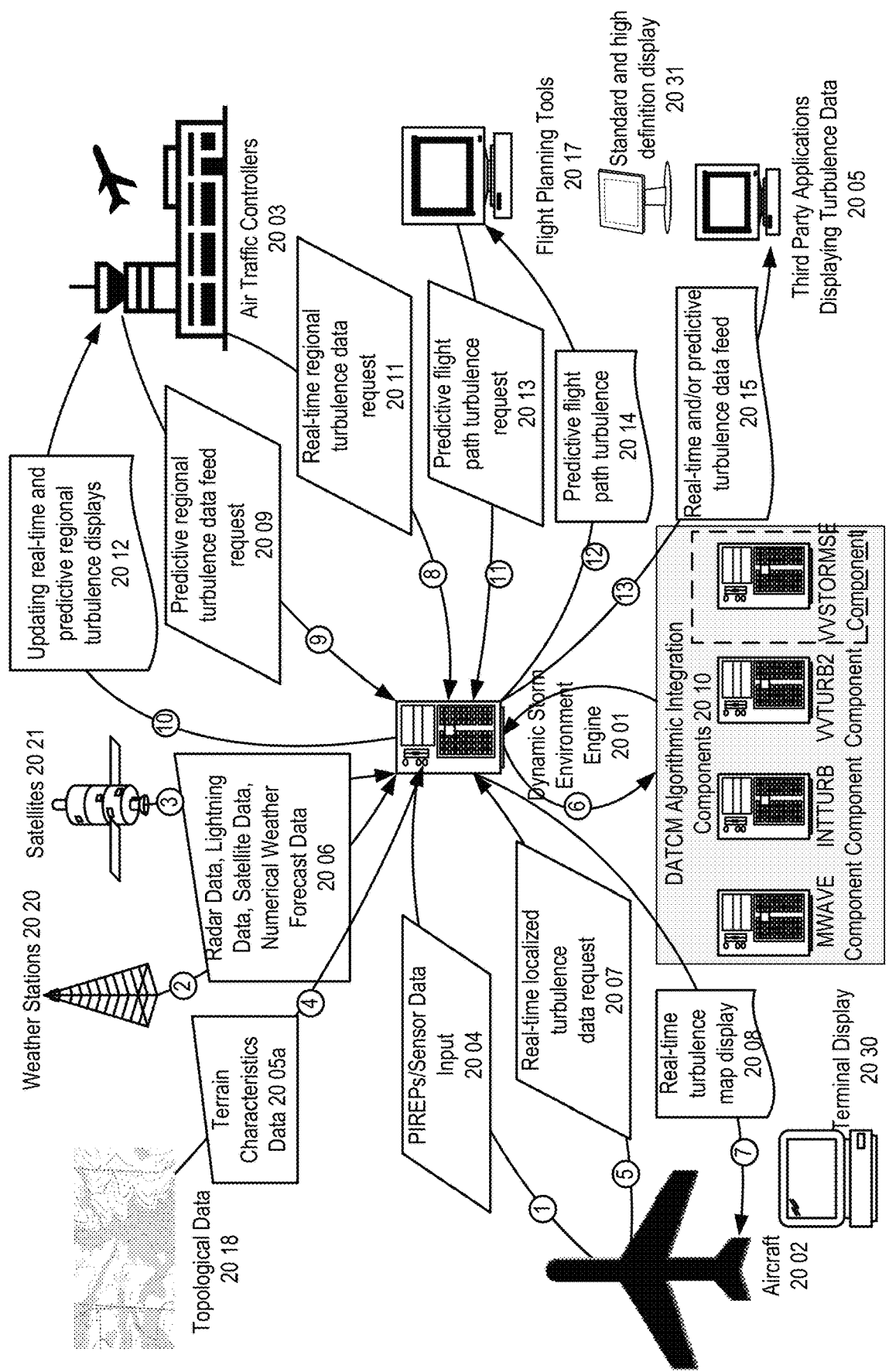
FIG 20 – Example DATCM Data Flow Diagram

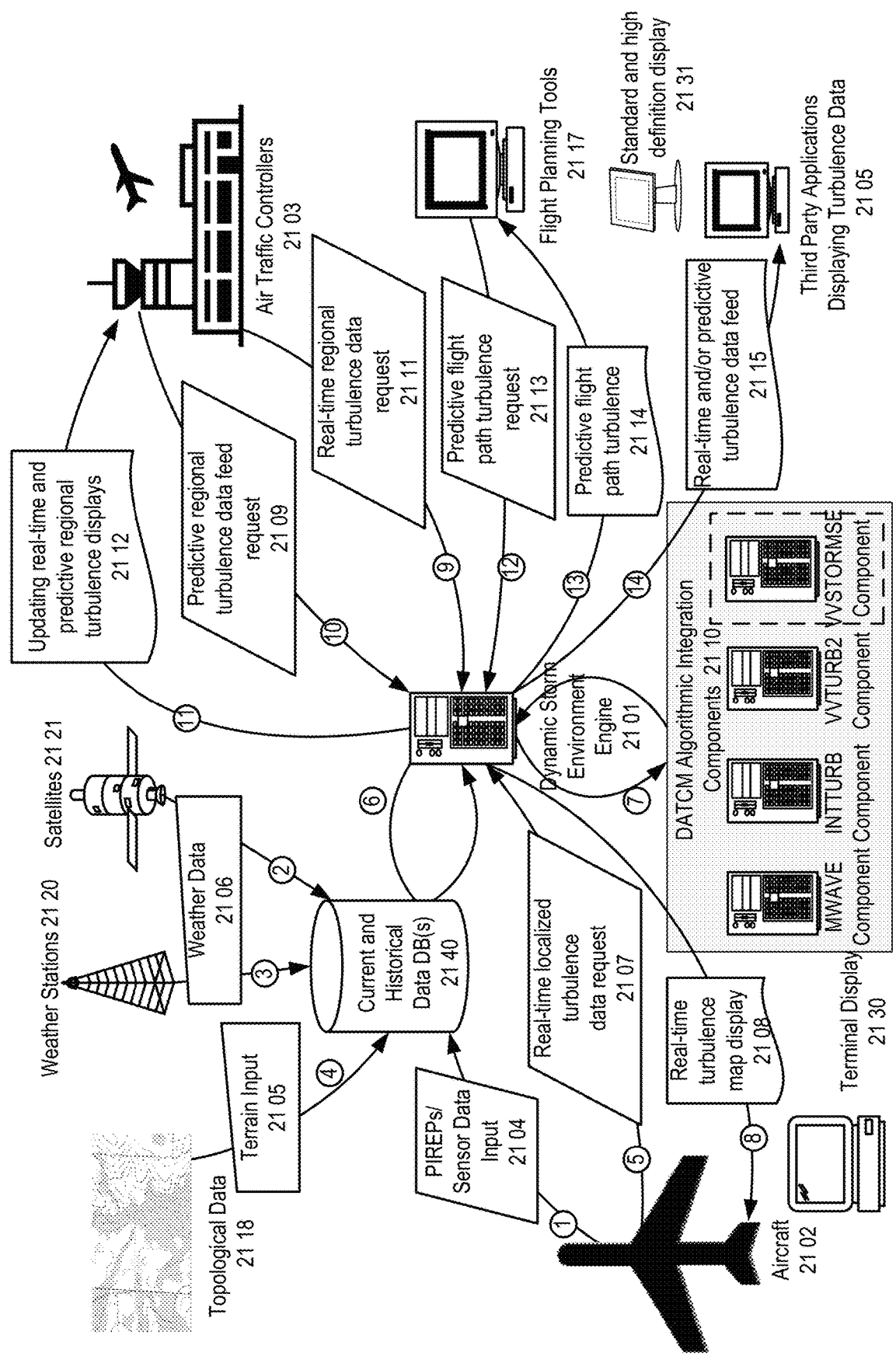
FIG 21 – Example DATCM Data Flow Diagram

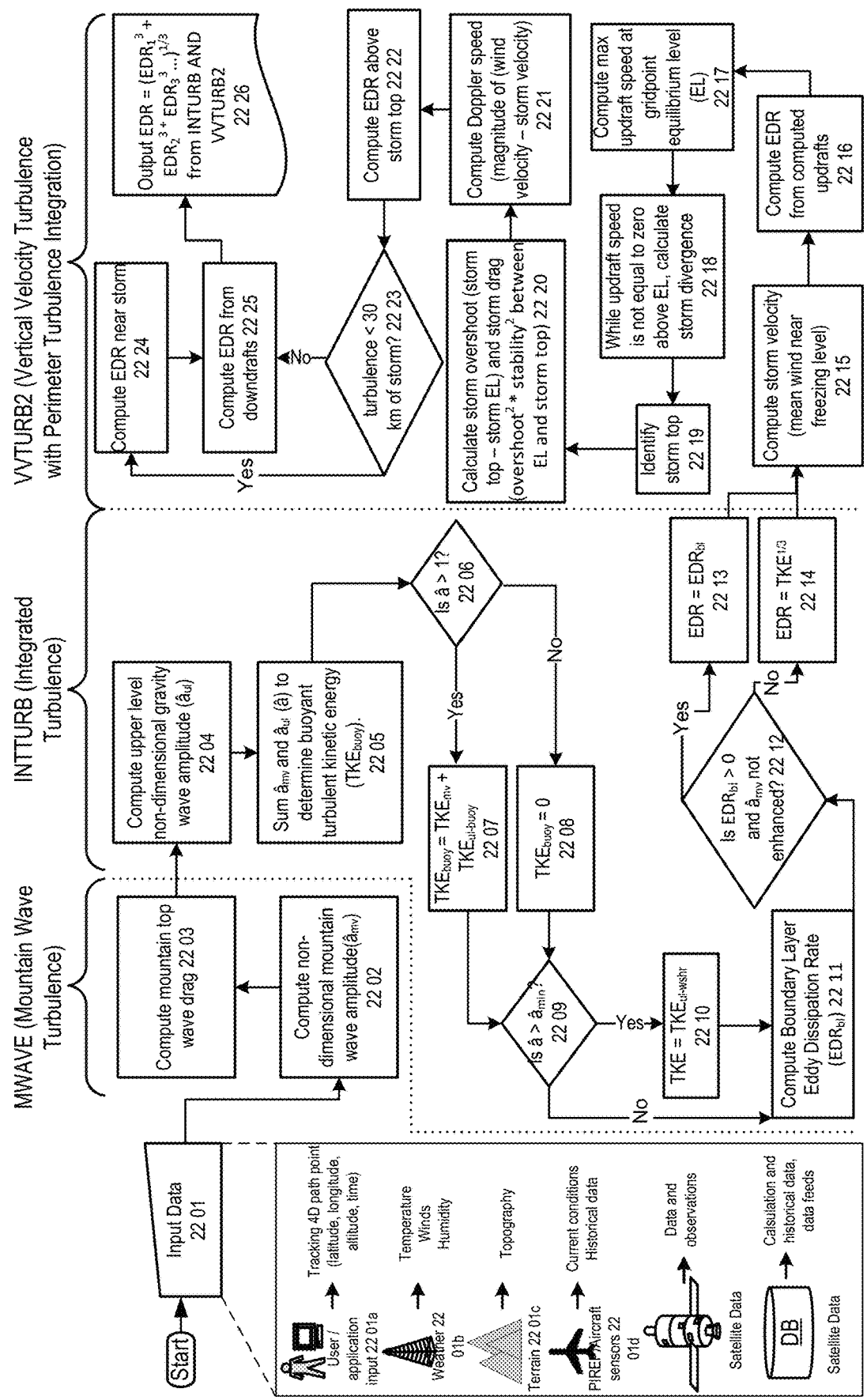
FIG 22A – Example DATCM Logic Flow Diagram

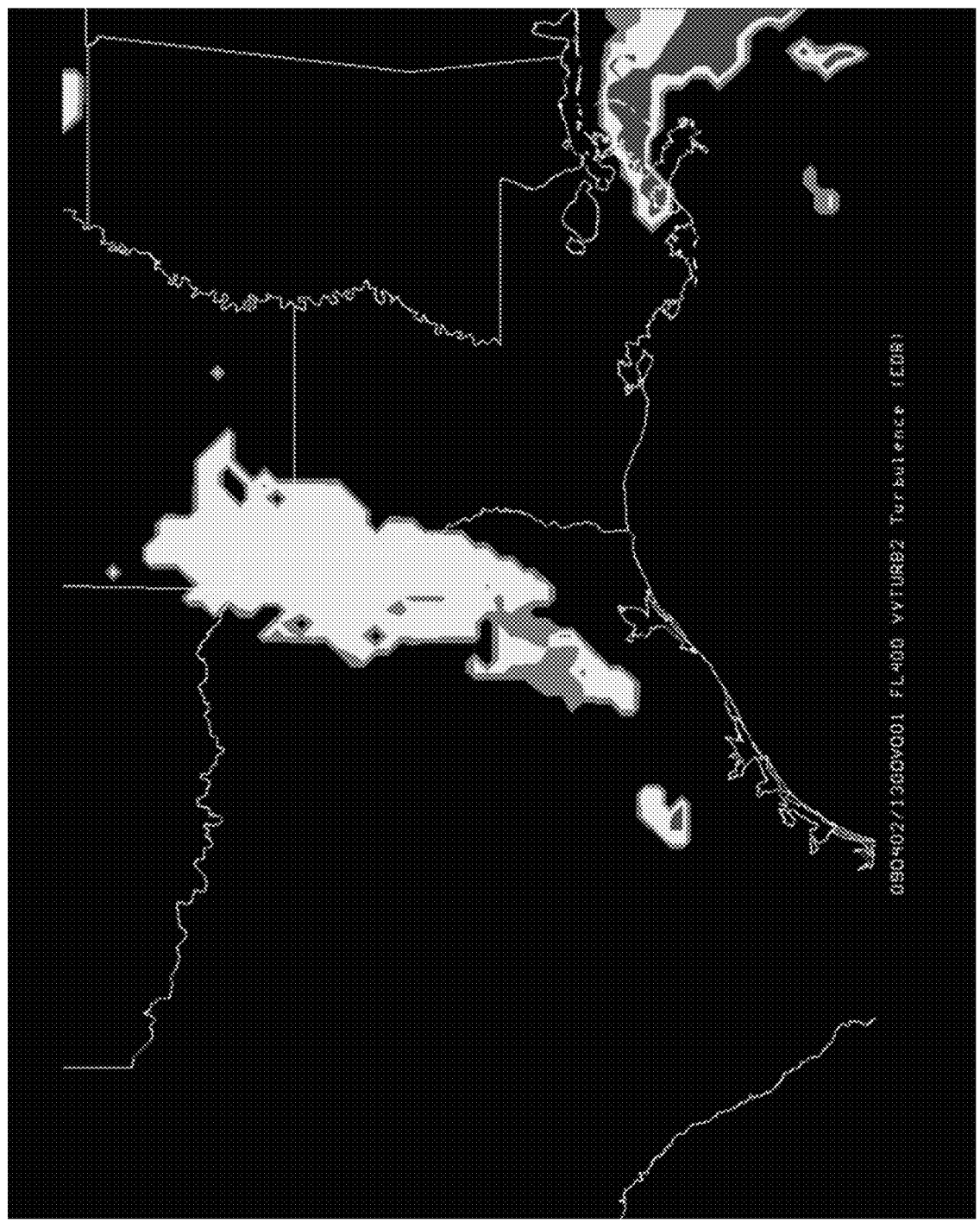
FIG. 22B - Example DATCM Above-Storm Turbulence Output

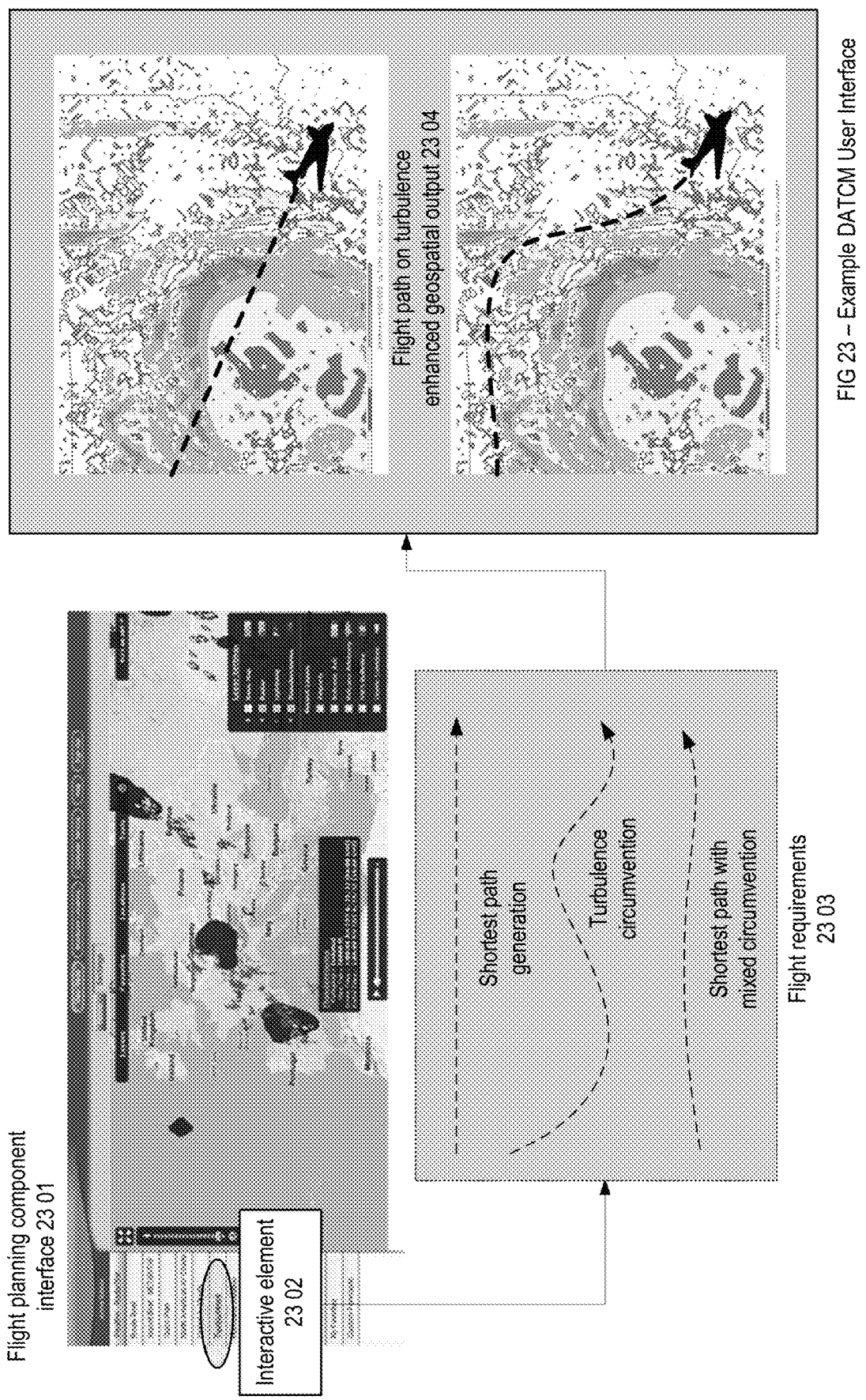
FIG 23 – Example DATCM User Interface

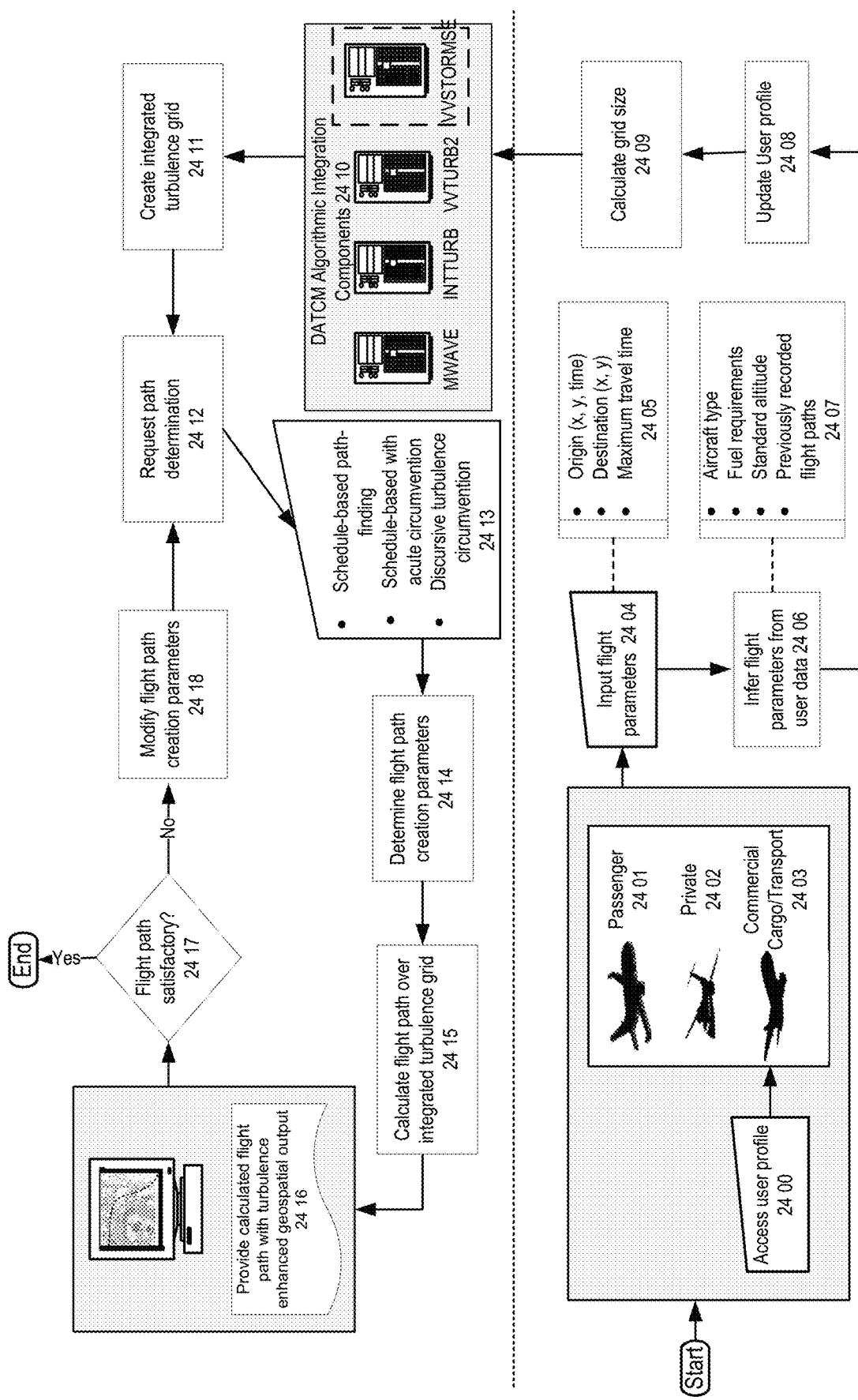
FIG 24 – Example DATCM Logic Flow Diagram with Flight Path Determination

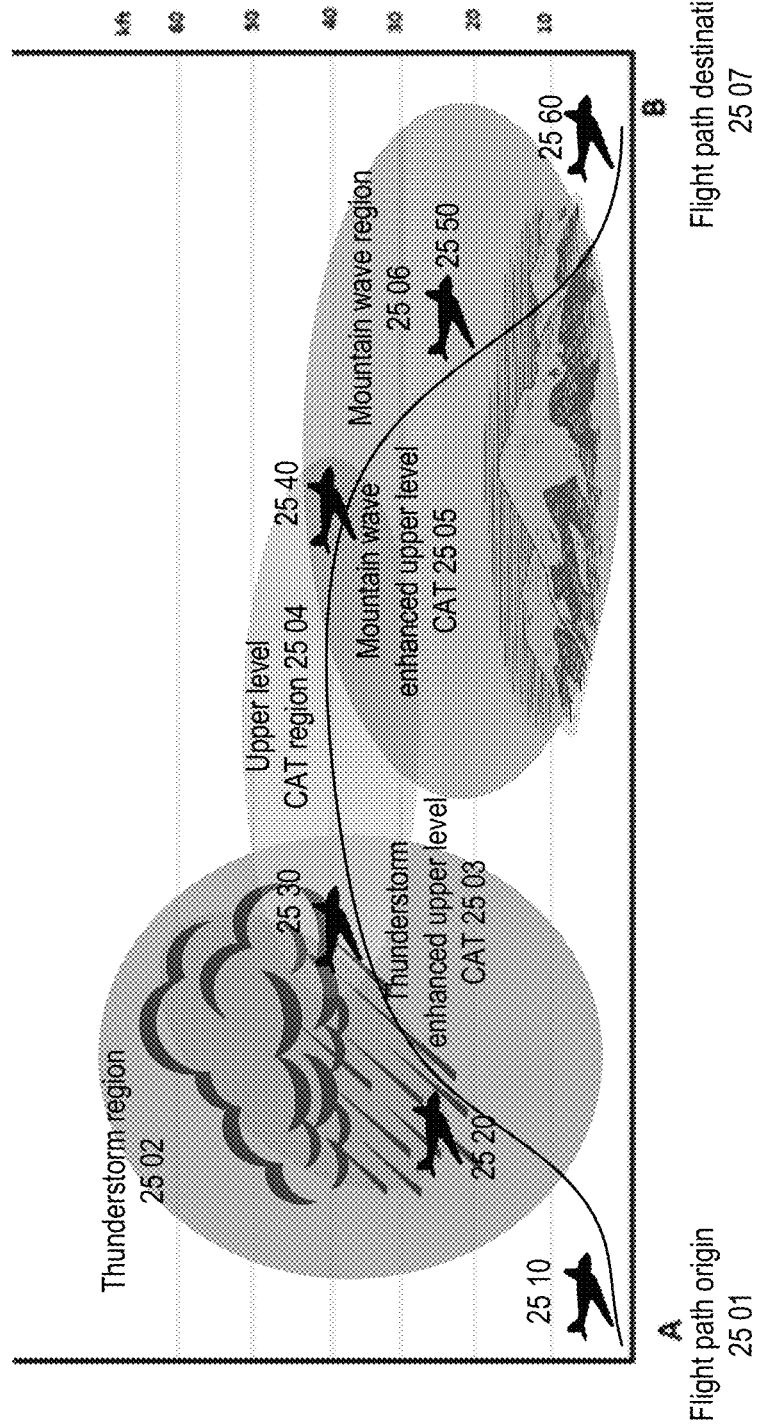
FIG 25 – Example Turbulence Overview Diagram

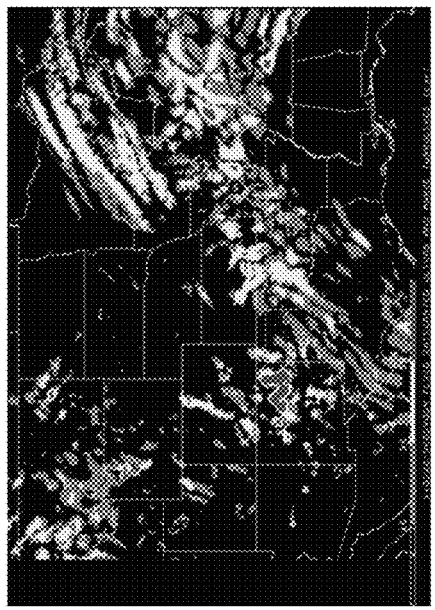
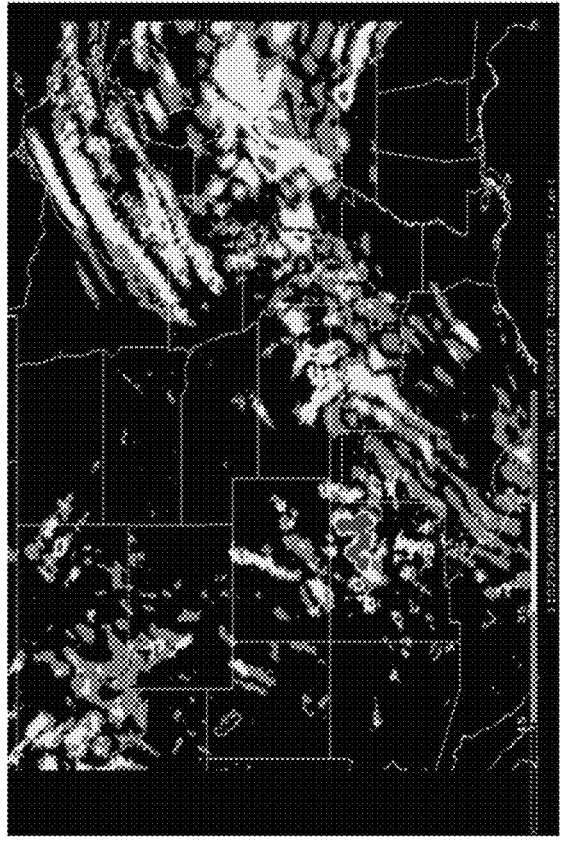
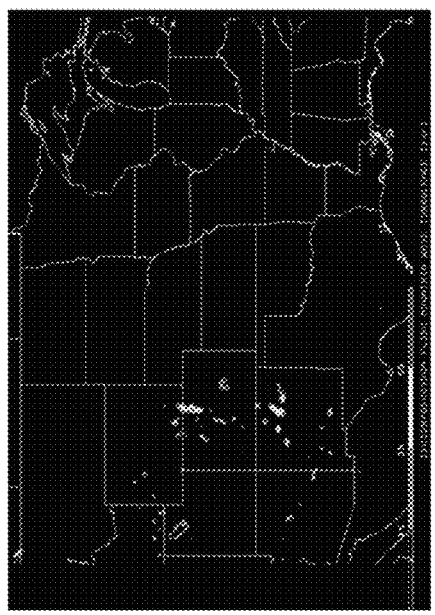
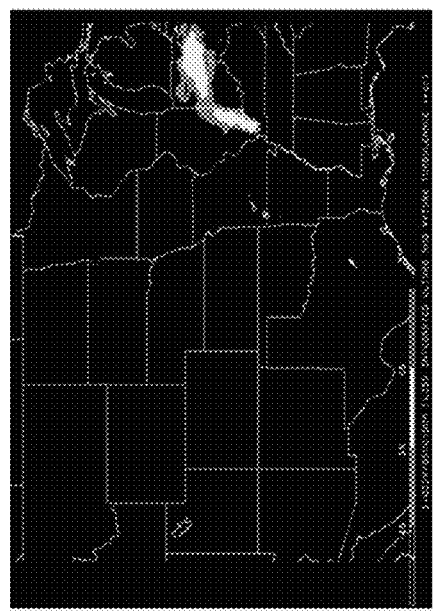
FIG 26 – Example DATCM Grid Outputs

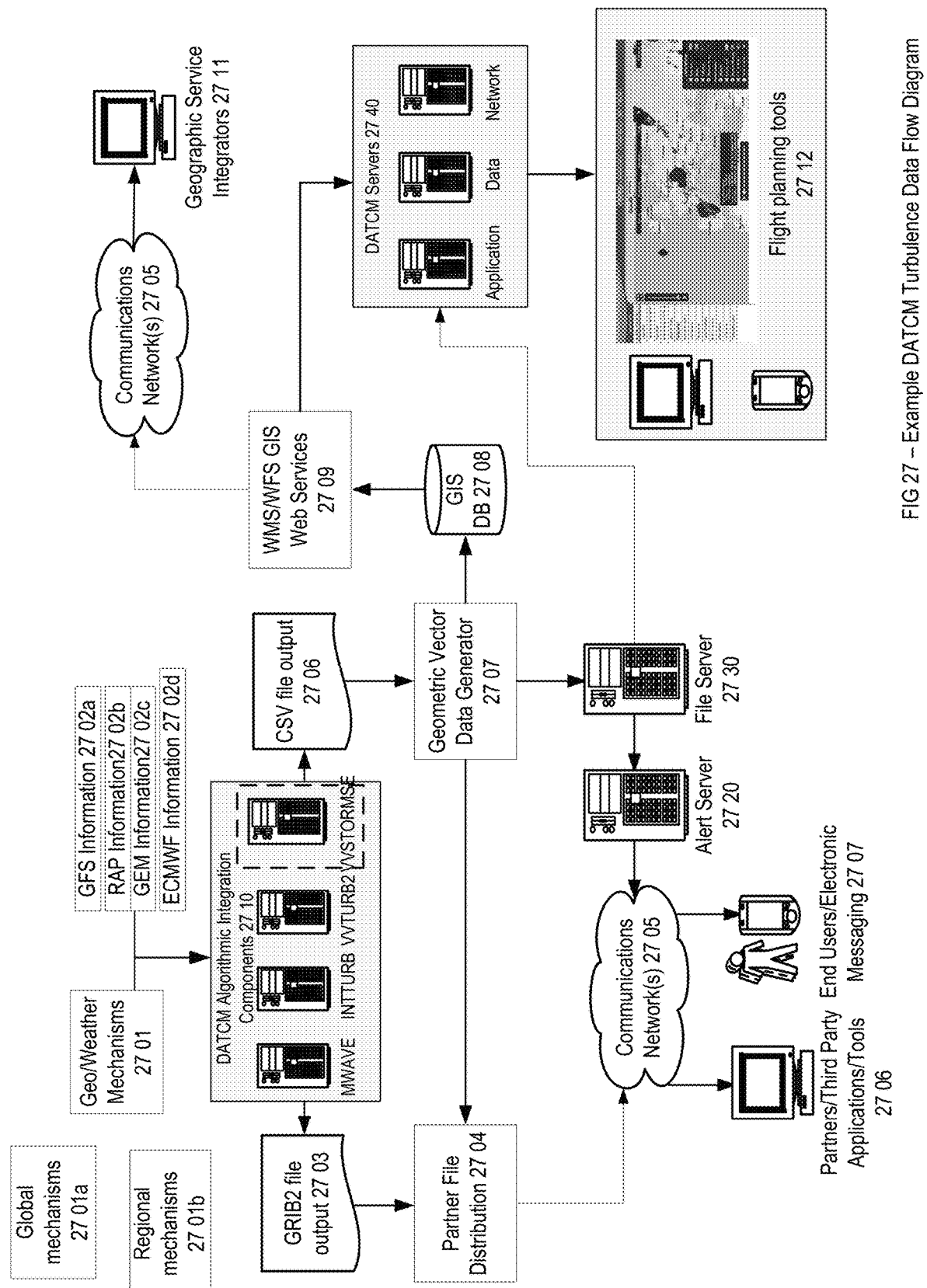
FIG 27 – Example DATCM Turbulence Data Flow Diagram

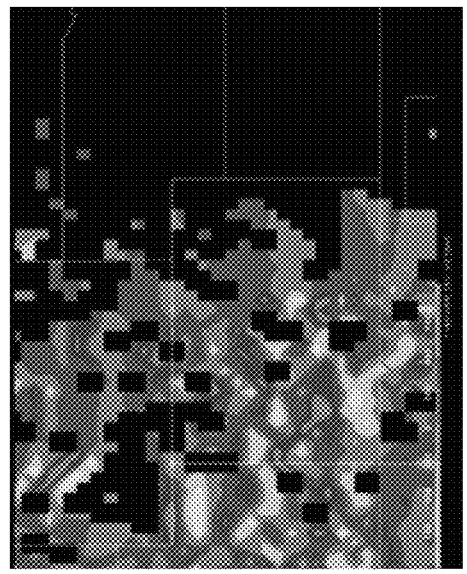
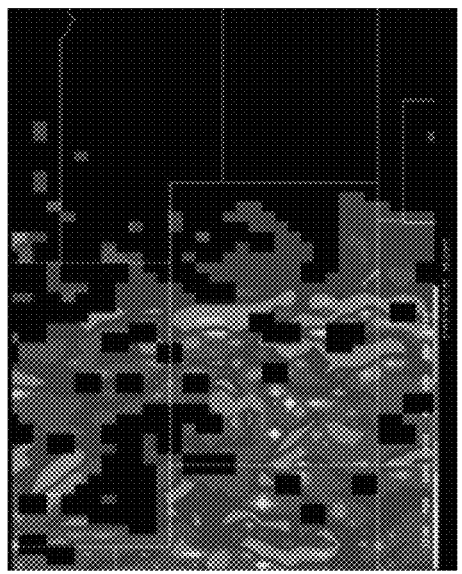
FIG 28B

RAP Forecast Streamlines over 3 hour period 29 01

Lighthill-Ford Radiation computed for RAP forecast flow 29 02

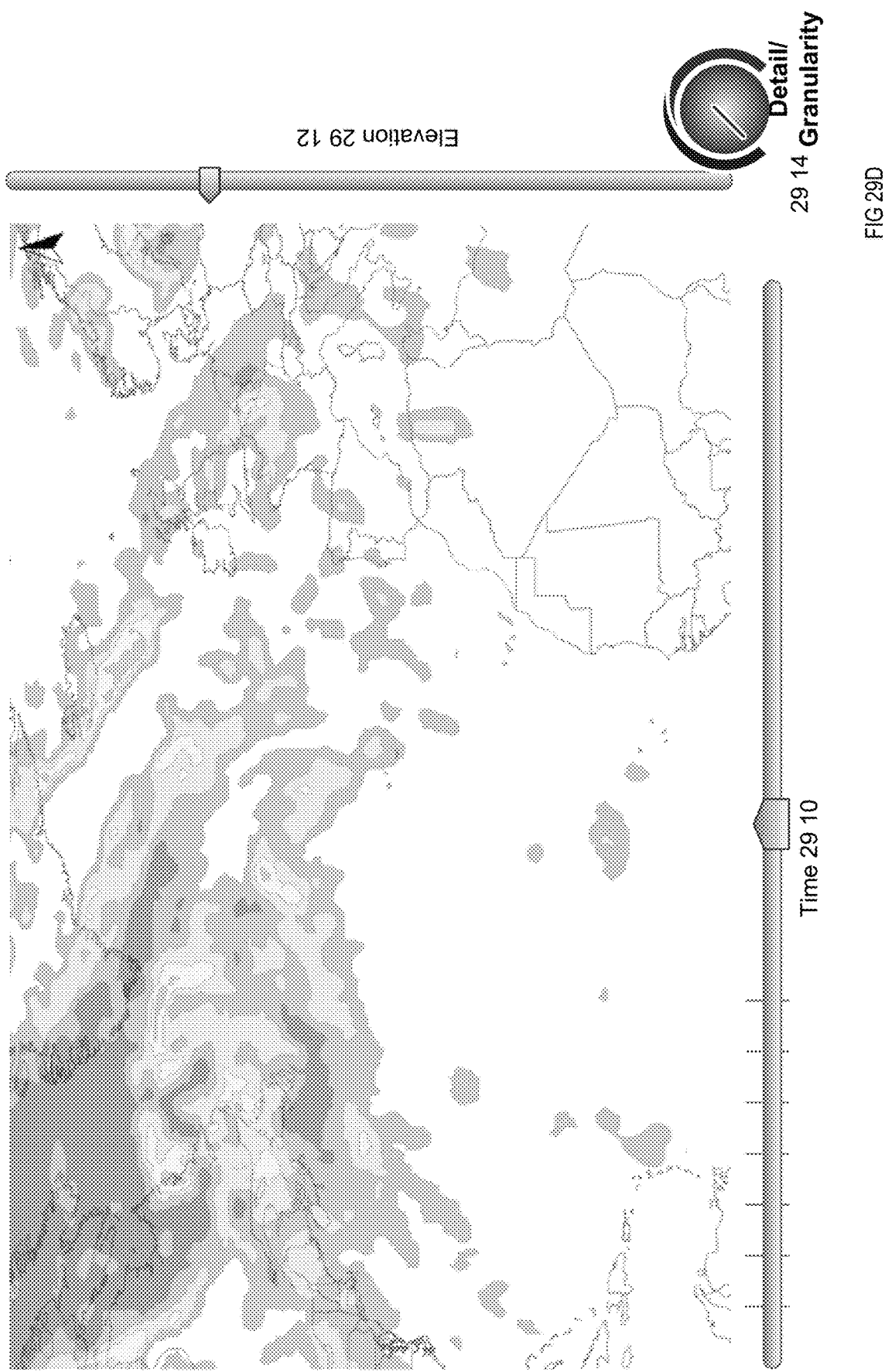

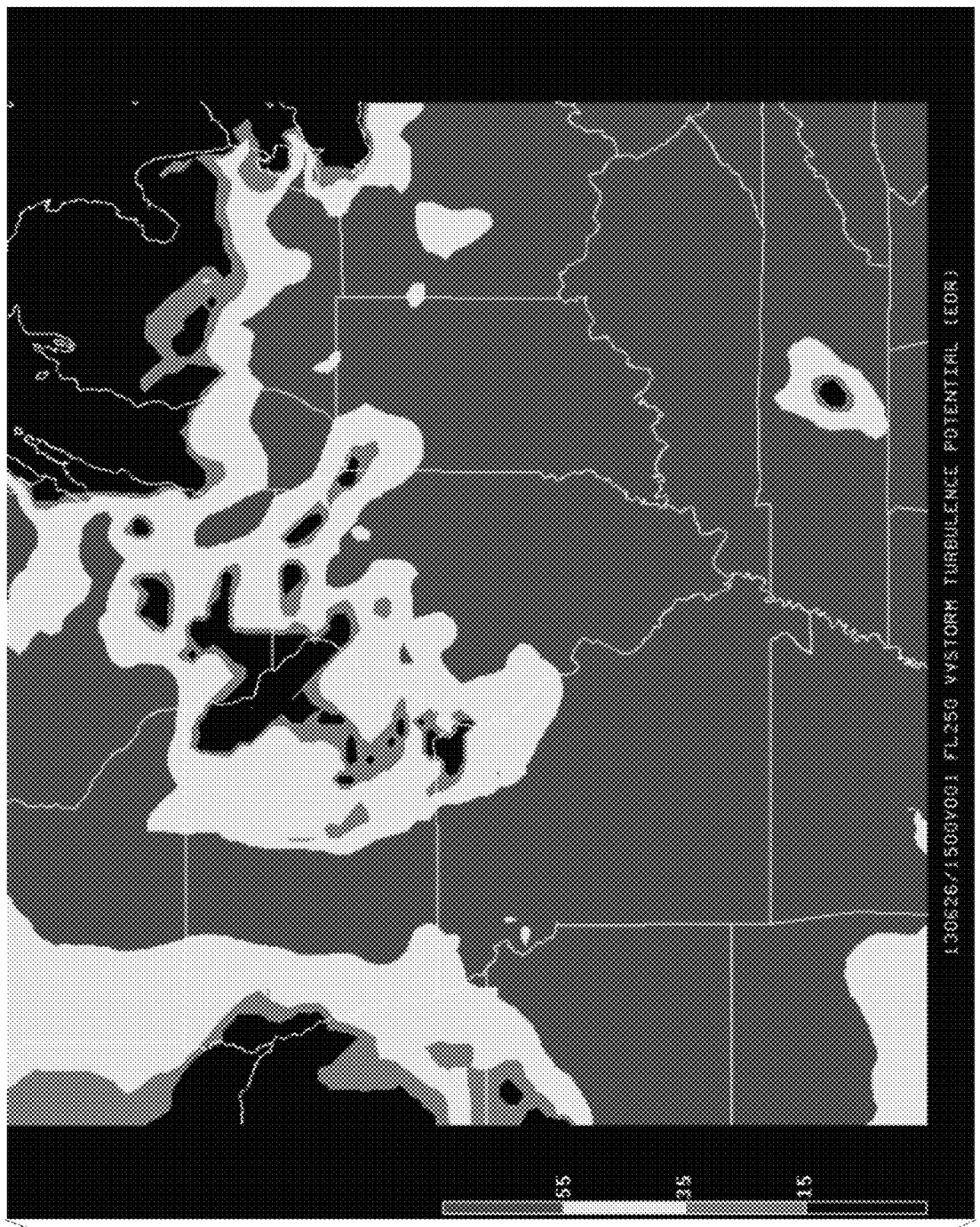
FIG. 30A - Example DATCM Data Display
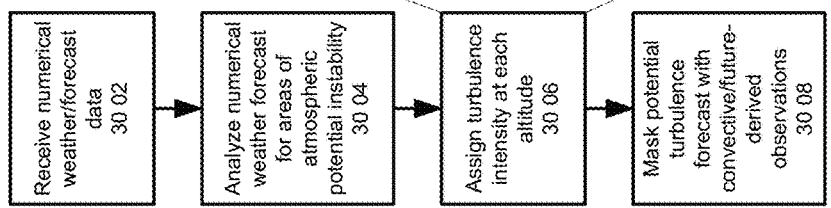
FIG. 30

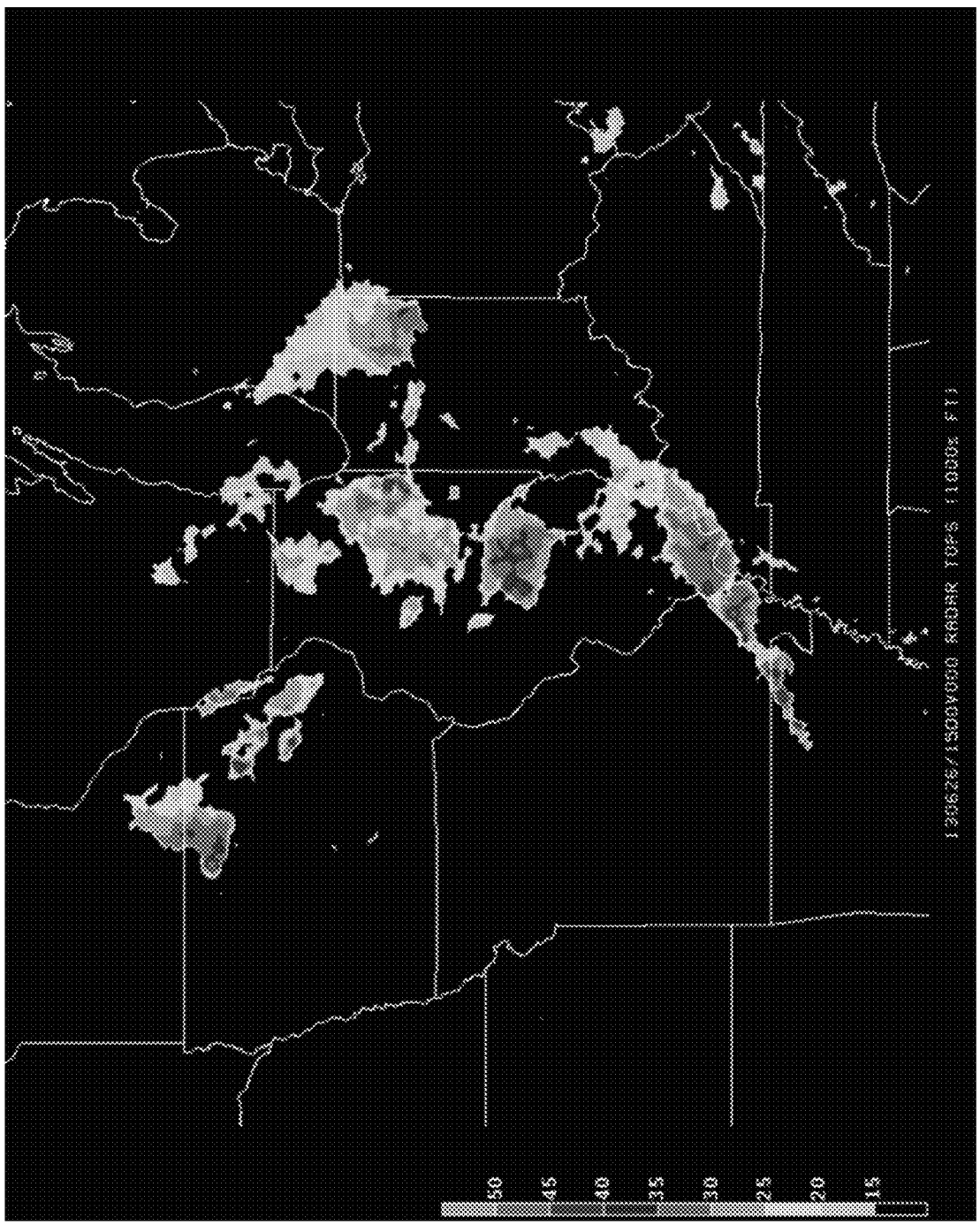
FIG. 30B - Example DATCM Data Display

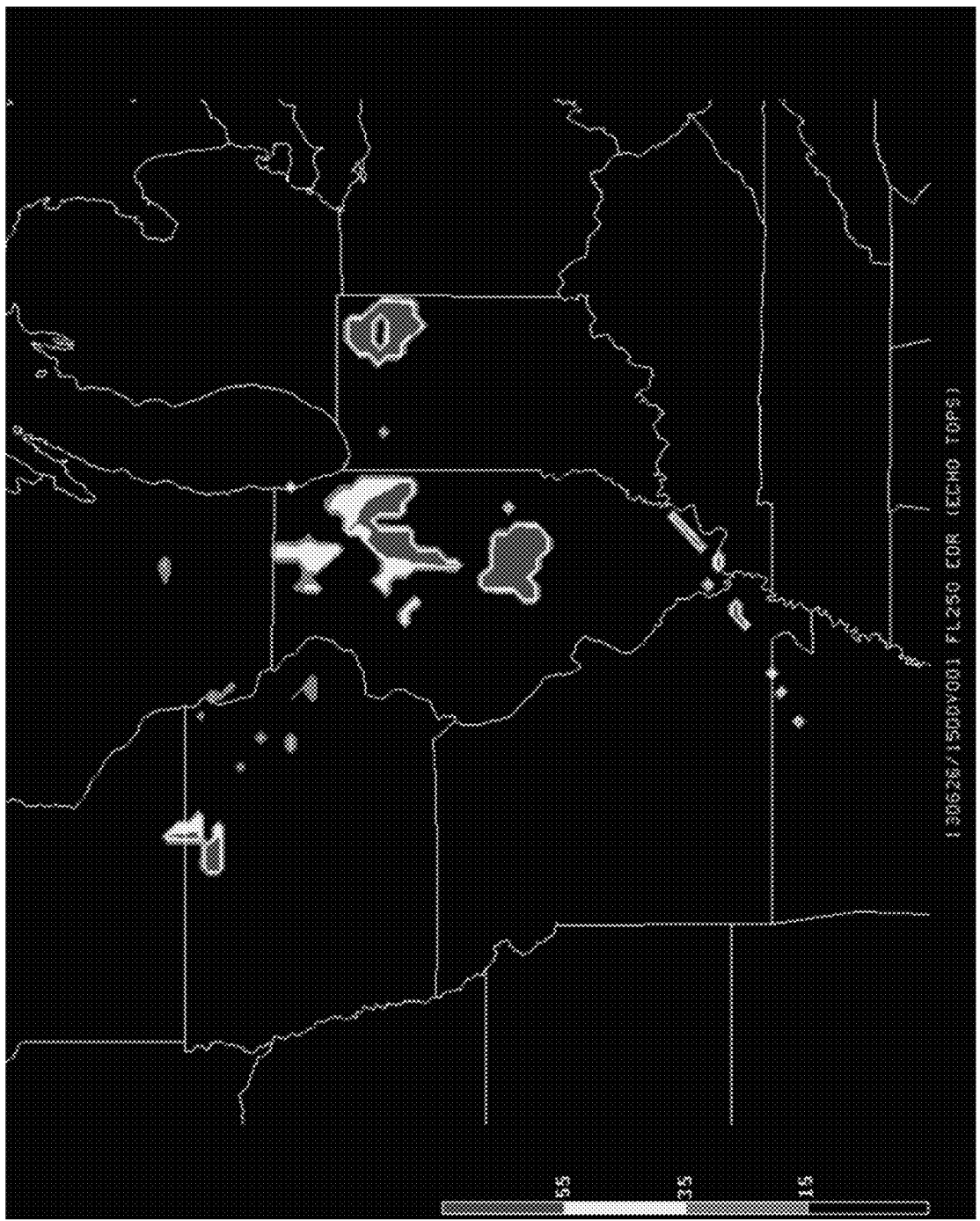
FIG. 30C - Example DATCM Data Display

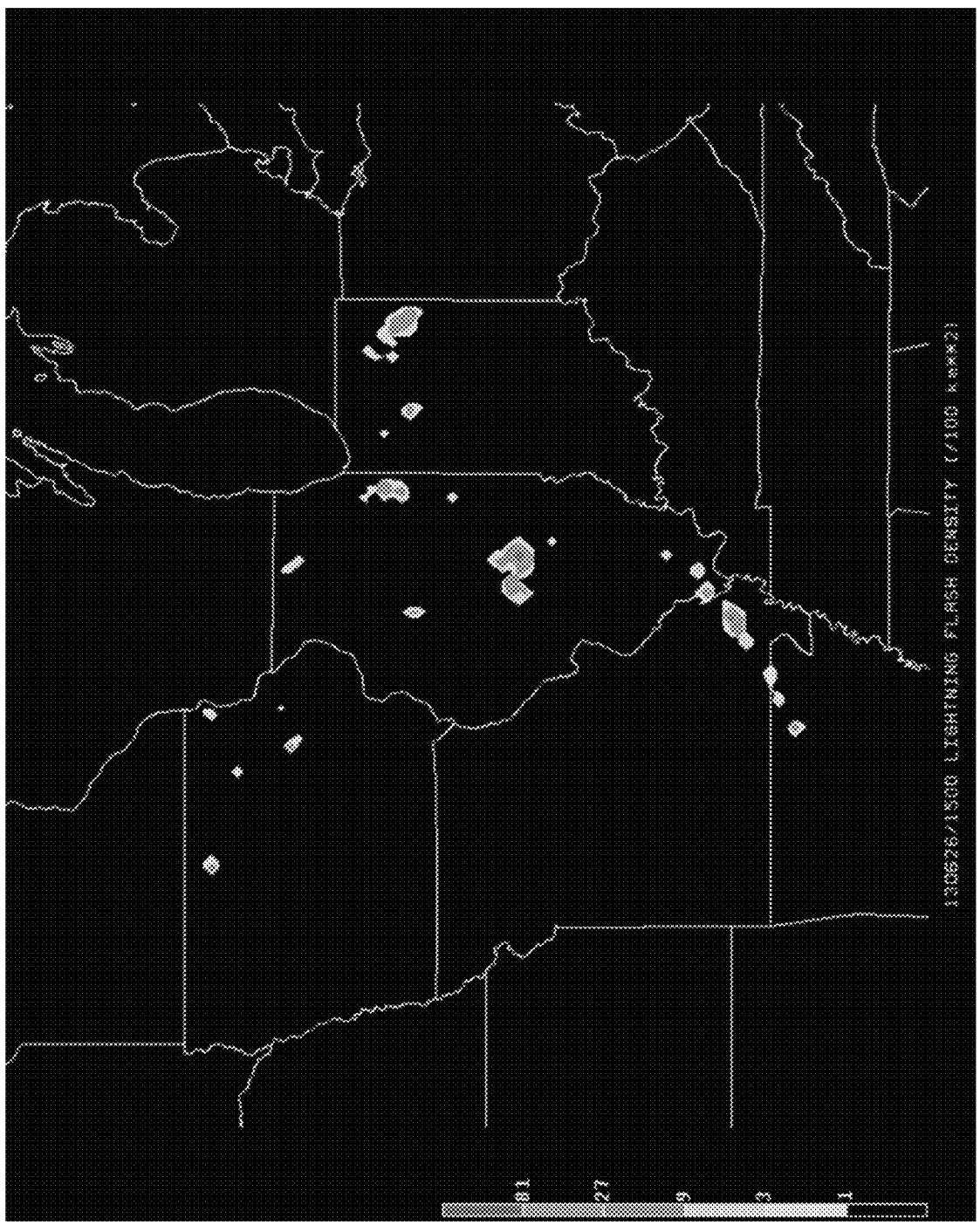
FIG. 30D - Example DATCM Data Display

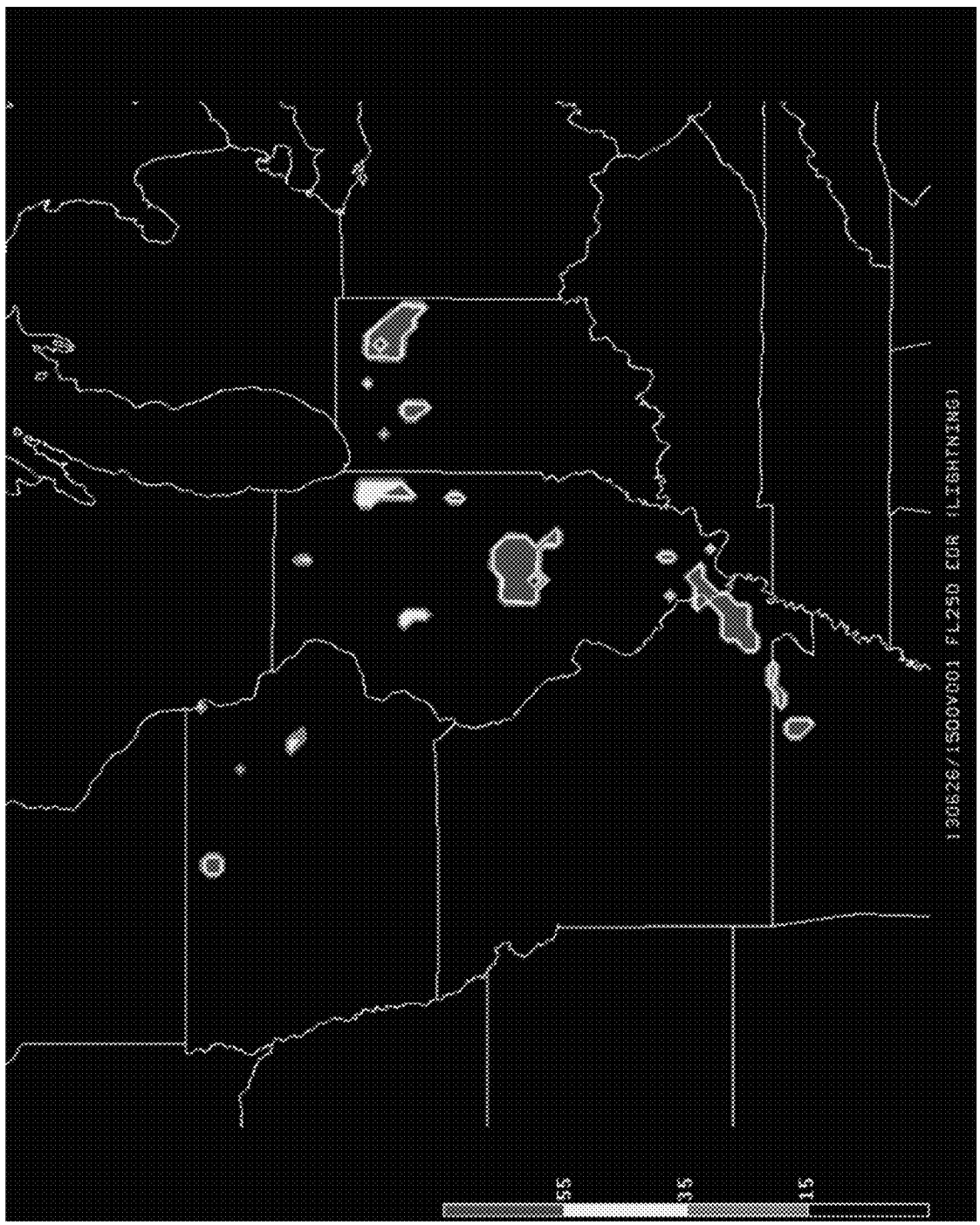
FIG. 30E - Example DATCM Data Display

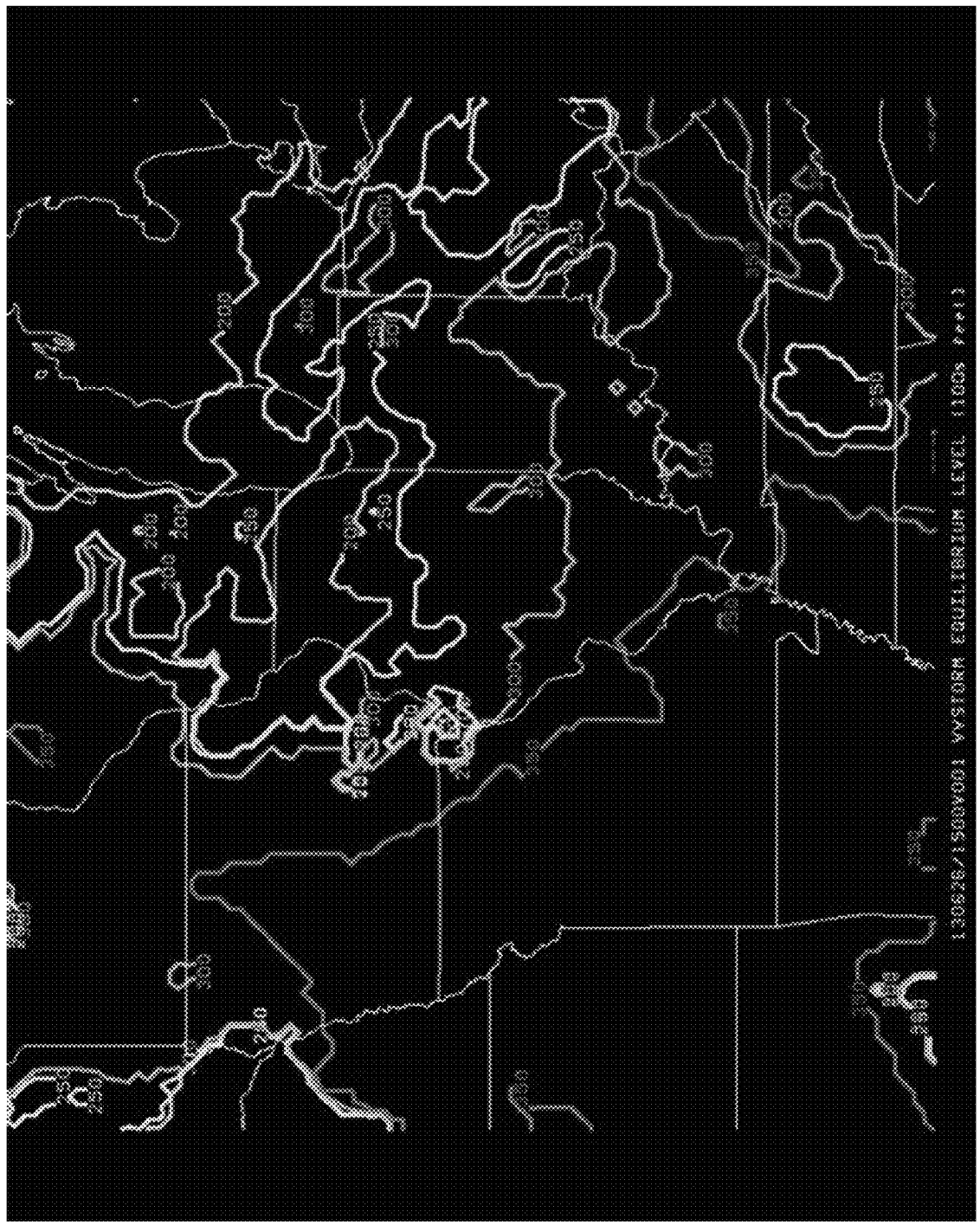
FIG. 30F - Example DATCM Data Display

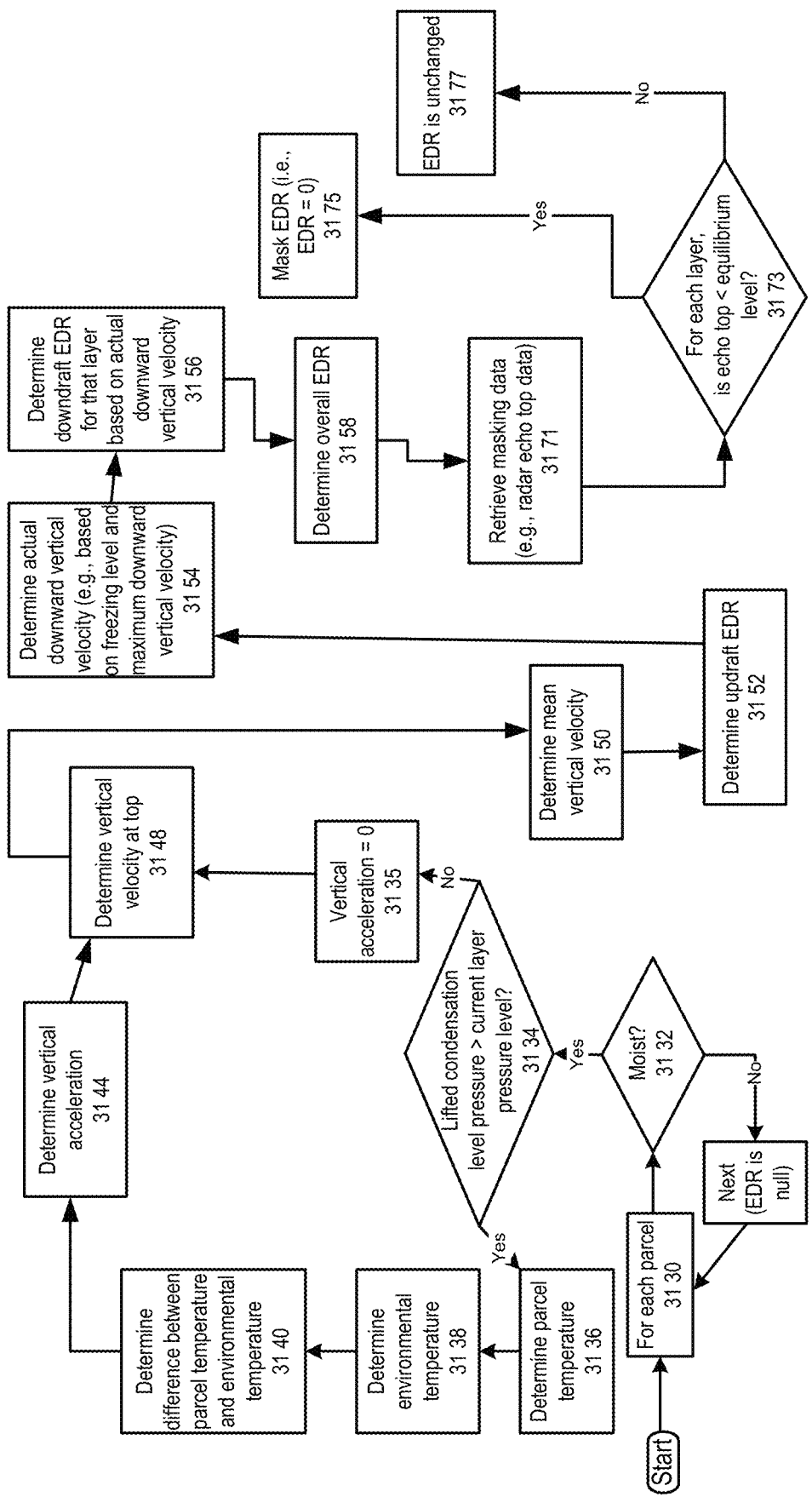
FIG. 31 - Example DATCM Logic Flow Diagram with EDR Determination

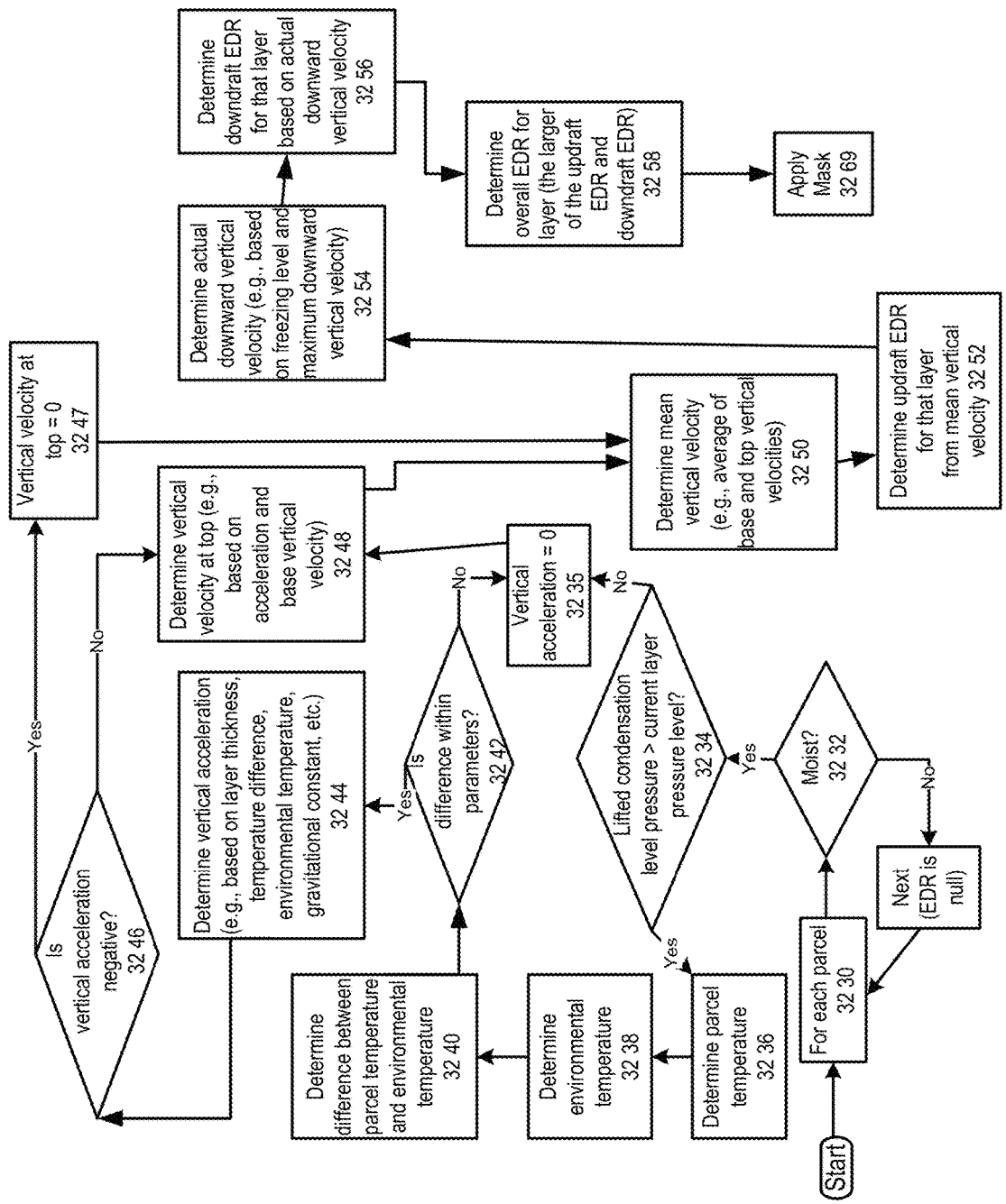
FIG. 32 - Example Logic Flow Diagram Depicting VVSTORMSE Component Operation

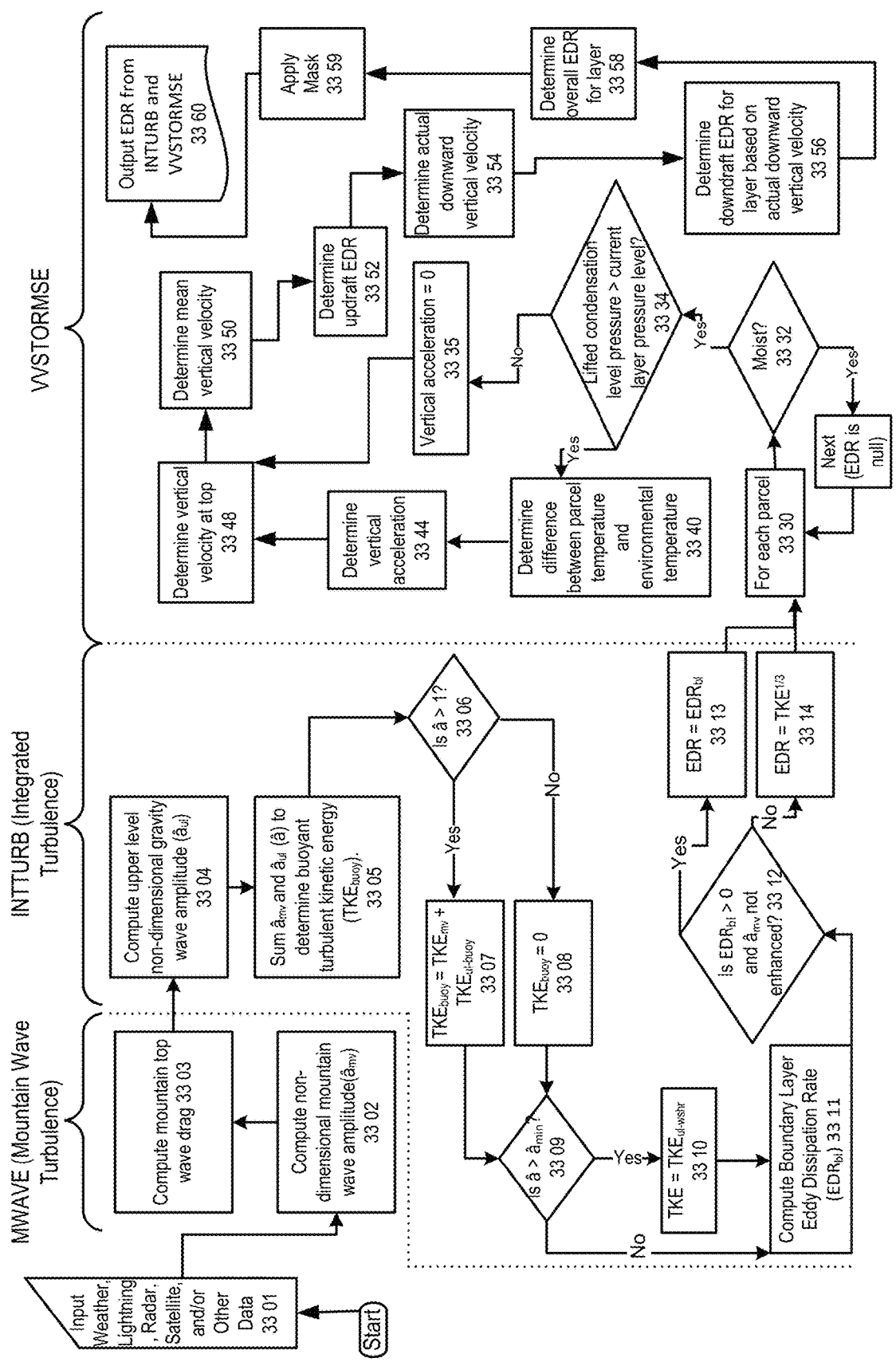
FIG. 33 - Example DATCM Logic Flow Diagram (Integration Component)

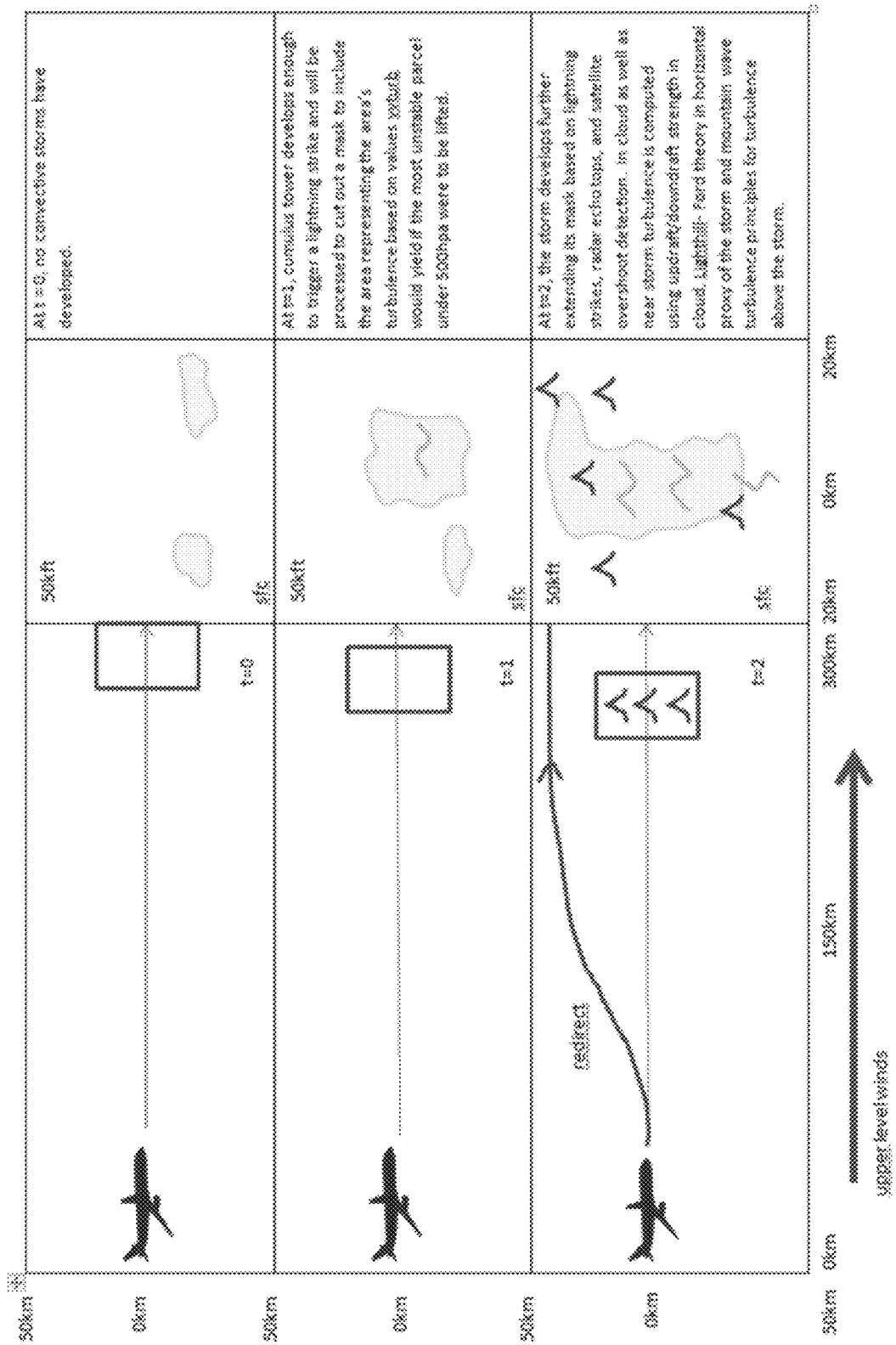
FIG. 34 - Example Overview of DATCM Implementation

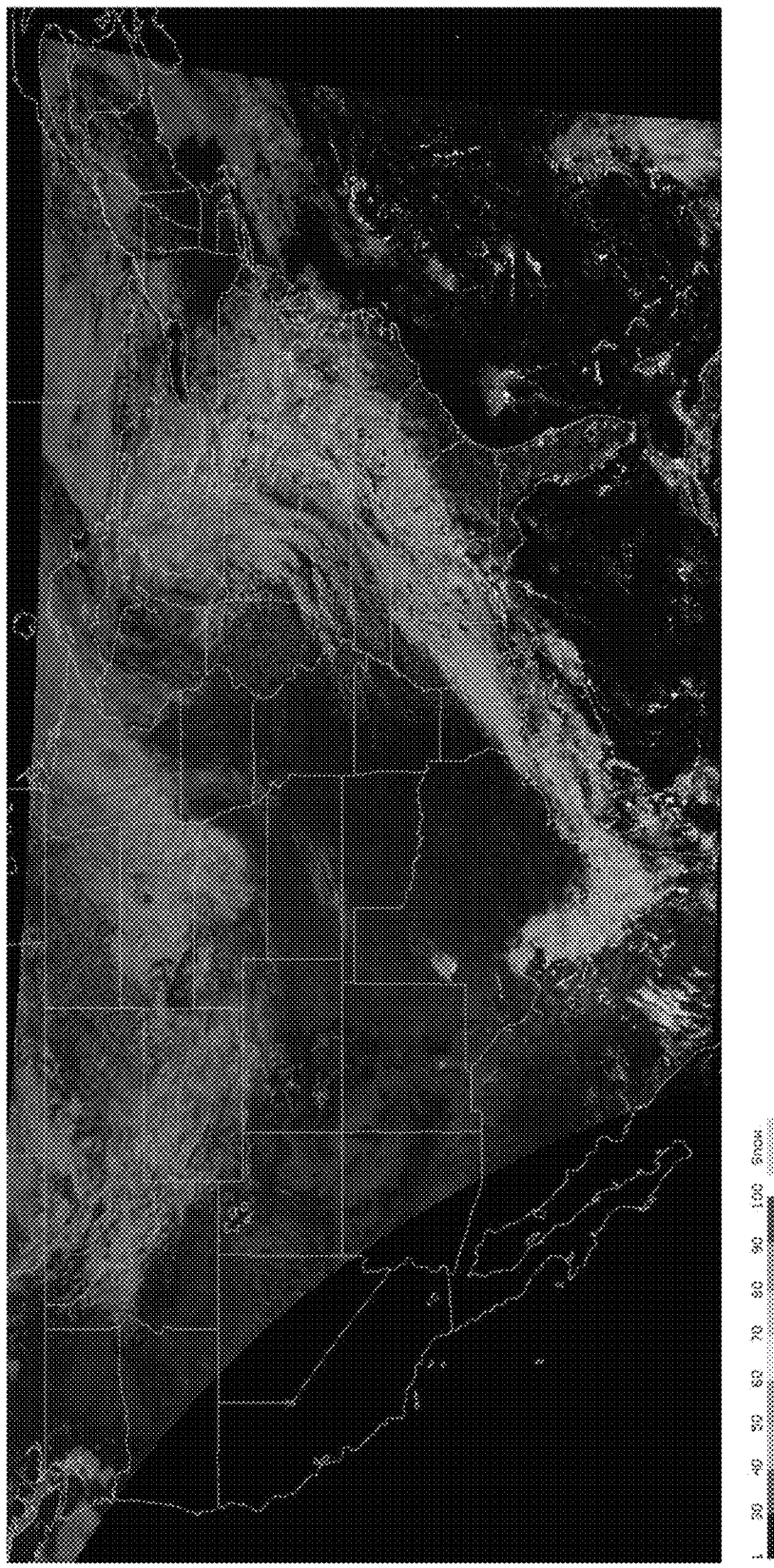
FIG. 35 - Example DATCM Geostationary Satellite Data

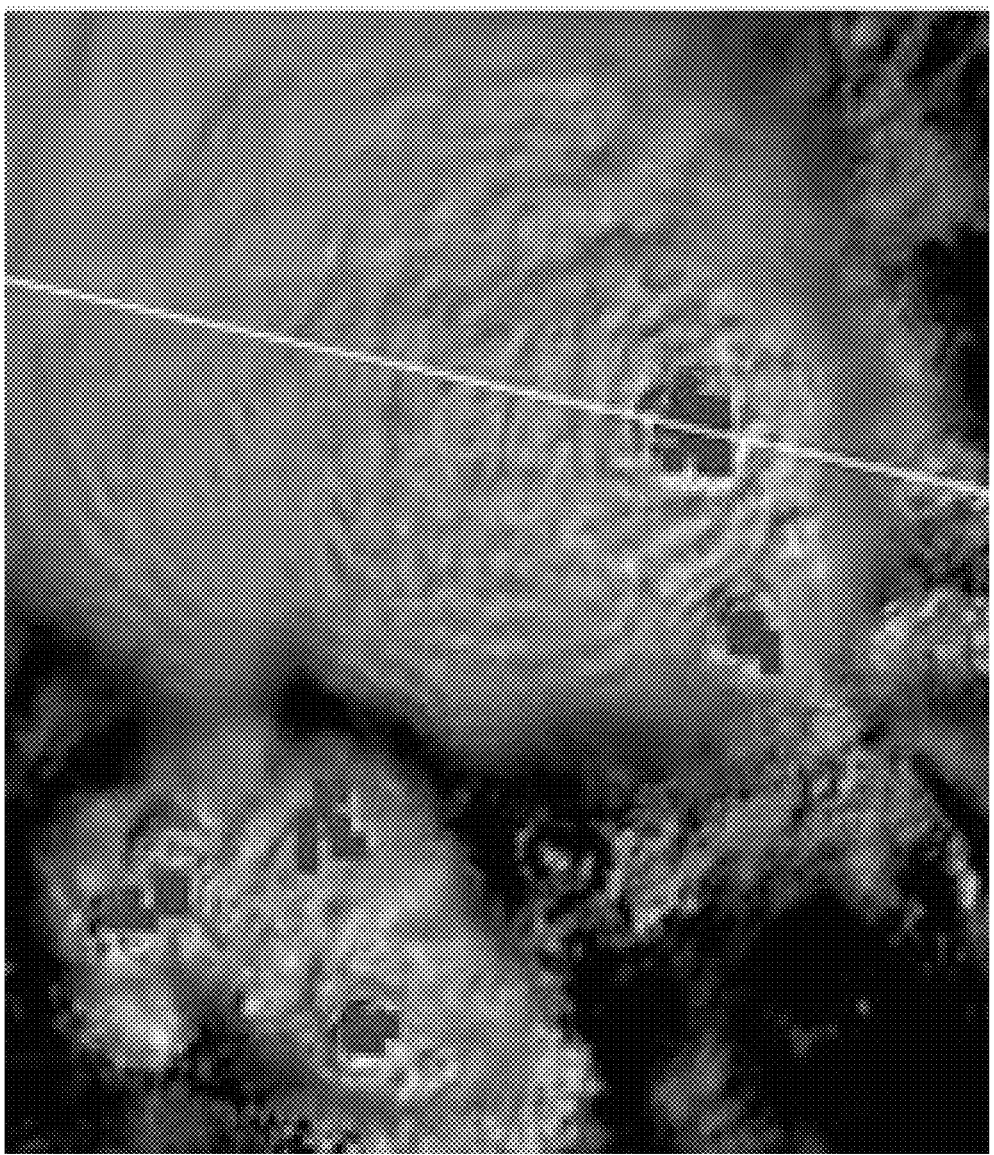
FIG. 37 - Exemplary DATCM Overshooting Top Mask Output

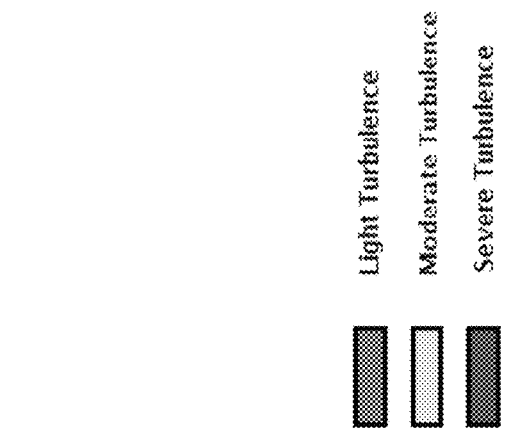
FIG 38B
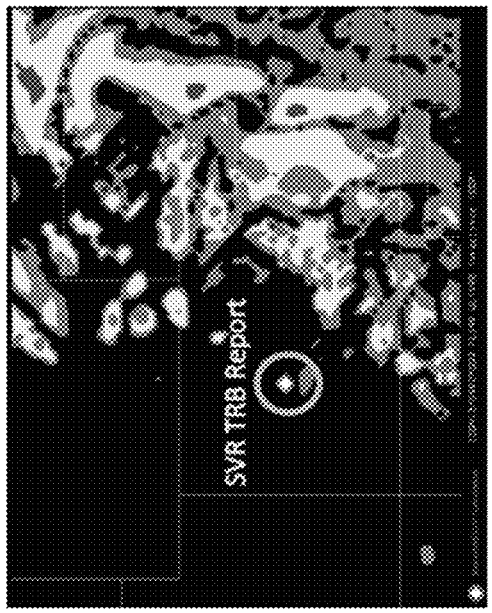
FIG 38A
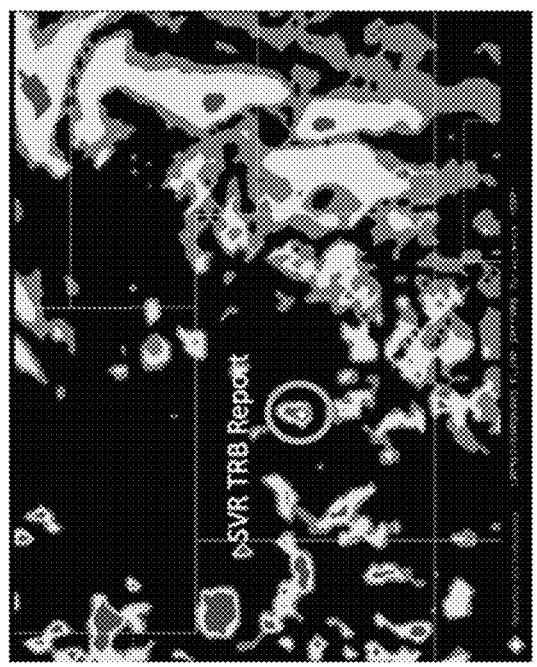
FIG 38C

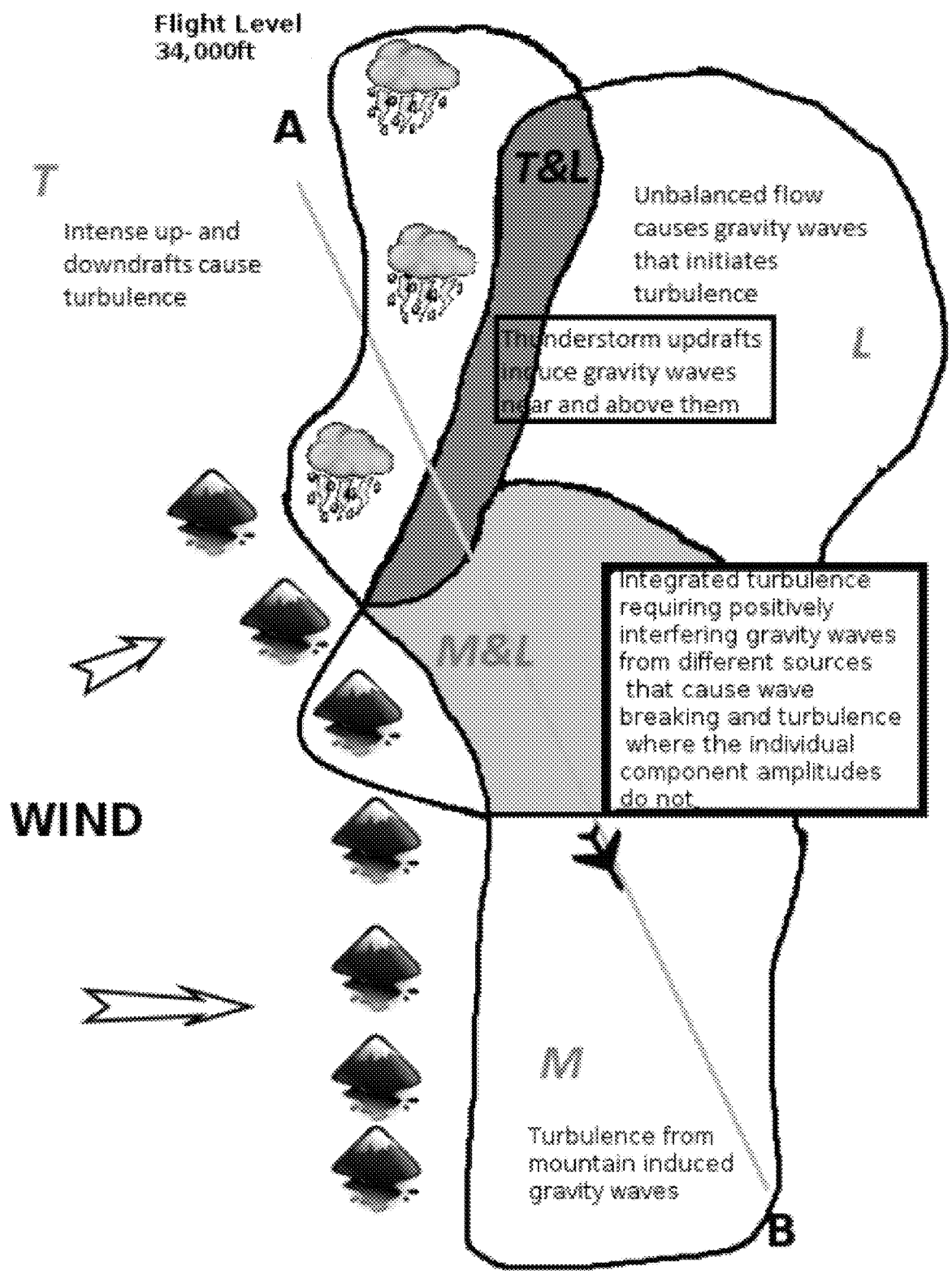
FIG. 40 – Example Schematic of Turbulence Regions

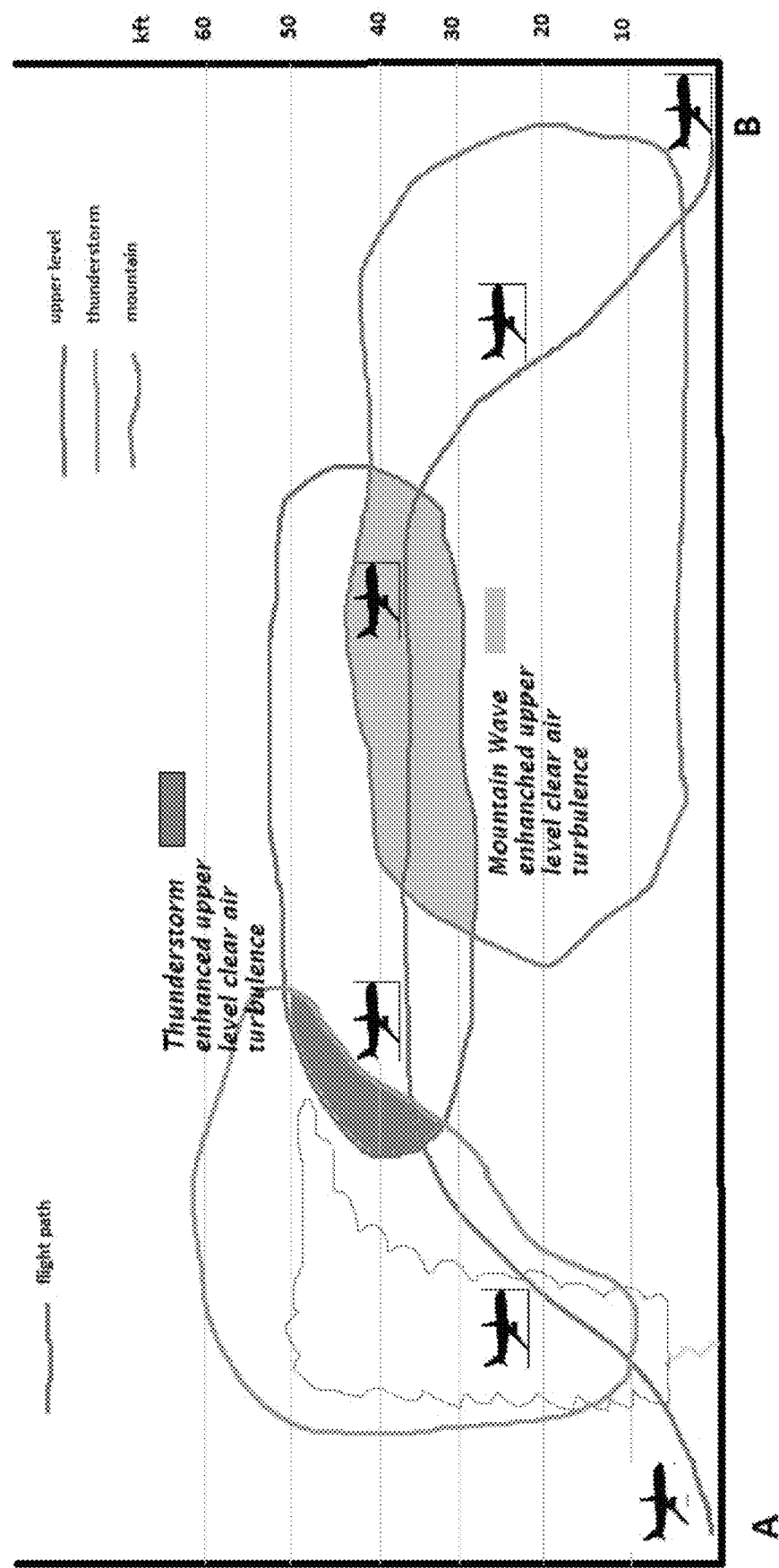
FIG. 41 – Example Cross-Sectional View of Flight Path through Turbulence Regions

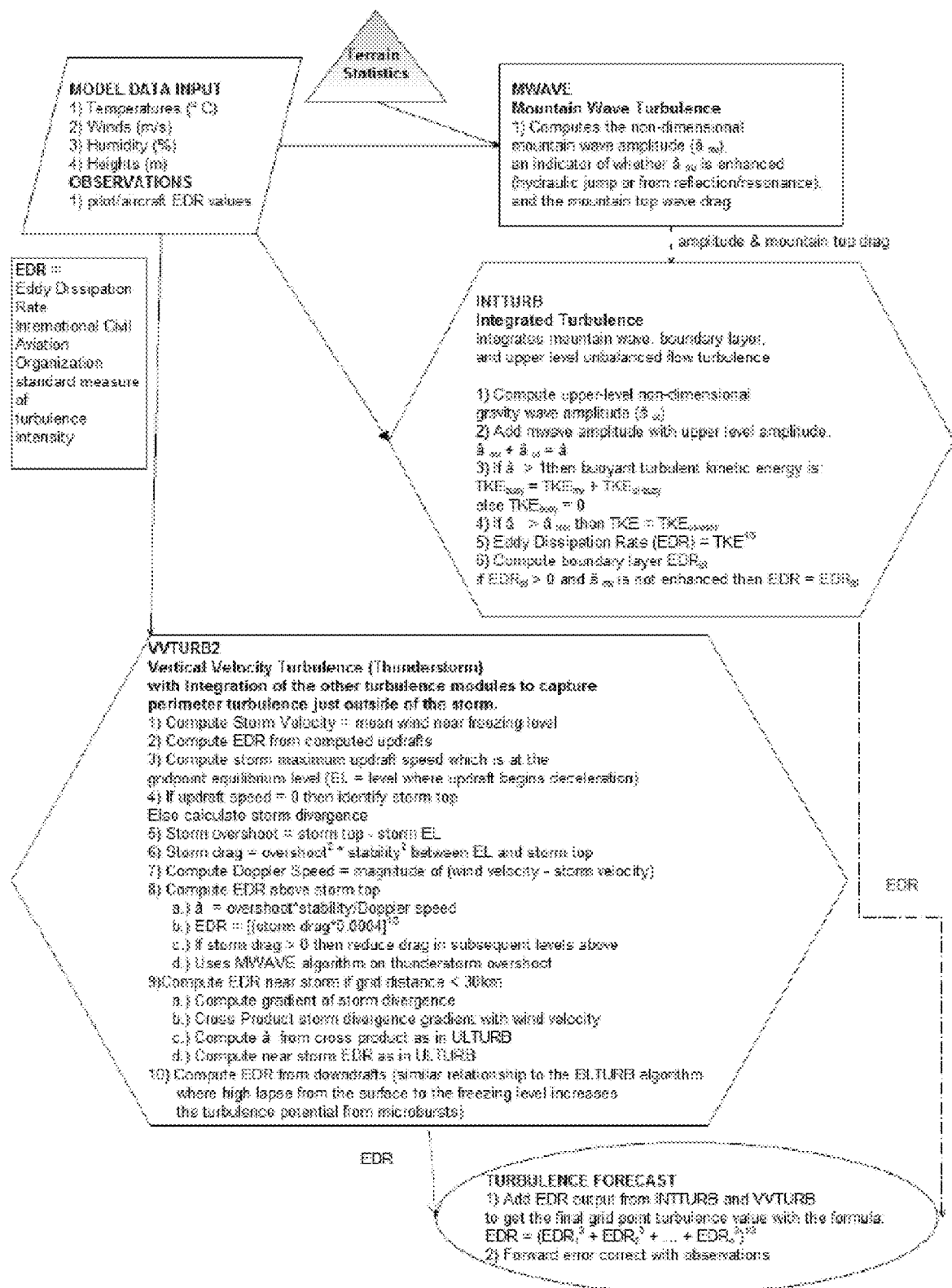
FIG. 42 – Example DATCM Integrated Turbulence Forecast Process Flow Diagram Flight PHX-MSP  Leave:0413Z  Arrive:0646Z
Turbulence Forecast (EDR*100)

| Time | Latitude | Longitude | Altitude (kft) | MWAVE | COMTURB | VVTURB | INTTURB | WINTTURB | FINAL | Explanation of differences |
|---|---|---|---|---|---|---|---|---|---|---|
| 415 | 33.5 | -111.9 | 60 | 0 | 0 | 0 | 0 | 1 | 1 | |
| 425 | 34.5 | -111.6 | 250 | 0 | 0 | 0 | 0 | 26 | 26 | Near-storm turbulence |
| 435 | 35.4 | -110.3 | 370 | 0 | 0 | 0 | 0 | 1 | 1 | |
| 445 | 36.2 | -109 | 370 | 0 | 0 | 1 | 25 | 1 | 25 | Mountain wave and free gravity wave amplitudes combine |
| 455 | 36.9 | -107.7 | 370 | 0 | 0 | 0 | 0 | 0 | 0 | |
| 505 | 37.3 | -106 | 370 | 0 | 0 | 0 | 0 | 34 | 34 | Storm top turbulence |
| 515 | 38.1 | -104.7 | 370 | 0 | 0 | 1 | 35 | 1 | 35 | Mountain wave and free gravity wave amplitudes combine |
| 525 | 38.8 | -103.6 | 370 | 0 | 0 | 1 | 0 | 1 | 1 | |
| 535 | 39.9 | -102.3 | 370 | 0 | 45 | 0 | 45 | 0 | 45 | |
| 545 | 40.9 | -101 | 370 | 0 | 0 | 1 | 0 | 1 | 1 | |
| 555 | 41.8 | -99.7 | 370 | 0 | 51 | 1 | 51 | 1 | 51 | |
| 605 | 42.8 | -98.5 | 370 | 0 | 34 | 0 | 34 | 0 | 34 | |
| 615 | 43.5 | -97 | 370 | 0 | 30 | 1 | 30 | 1 | 30 | |
| 625 | 44.4 | -95.3 | 290 | 0 | 18 | 43 | 18 | 43 | 43 | |
| 635 | 44.7 | -94 | 100 | 0 | 0 | 24 | 0 | 24 | 24 | |
| 645 | 44.8 | -93.2 | 20 | 0 | 19 | 0 | 19 | 51 | 51 | Near-storm turbulence |

FIG. 43 – Example DATCM In-Flight Time Sequence of Turbulence Forecasts

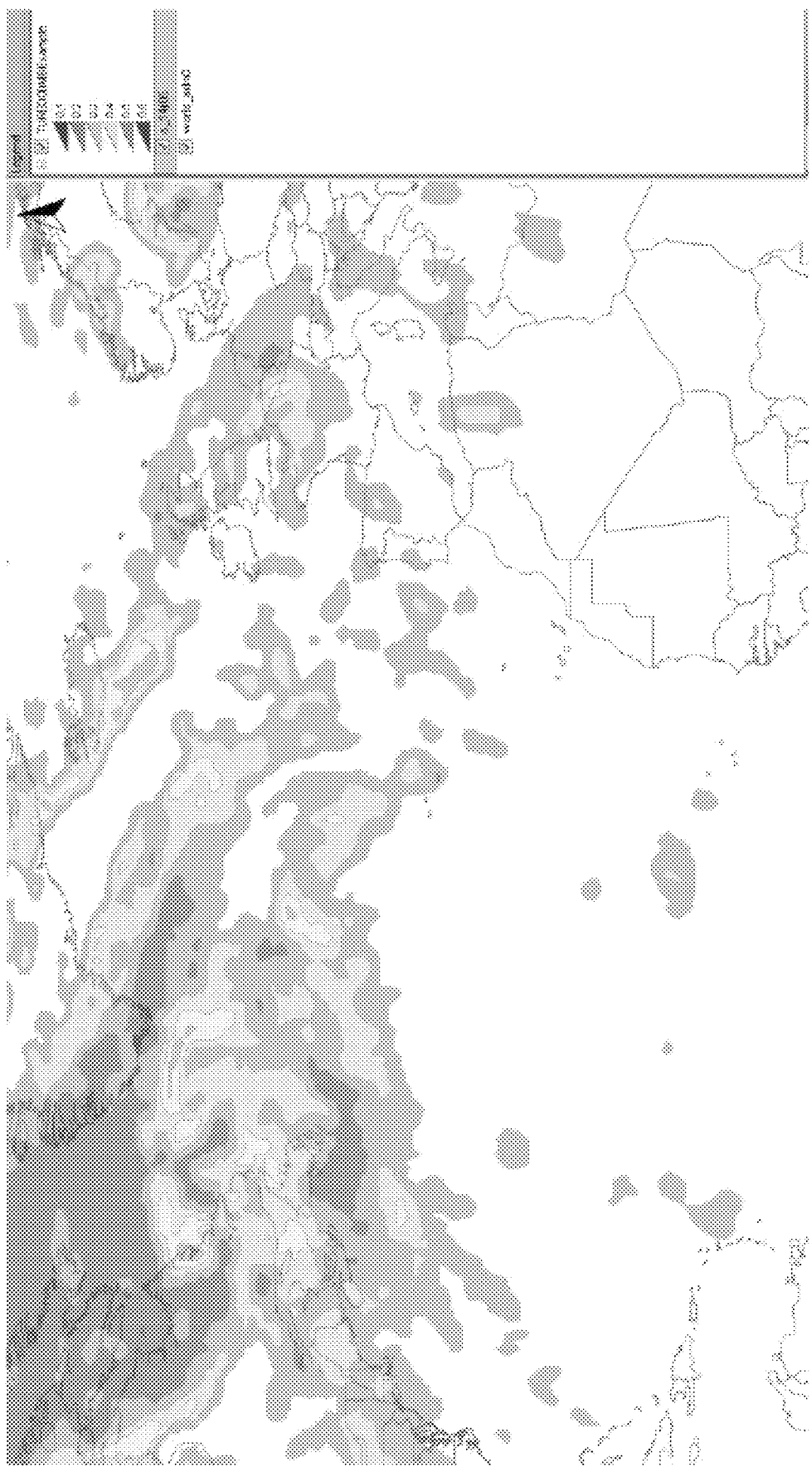
FIG. 44 – Example DATCM Shapefile Output

| FLIGHT | LAT | LON | FL | EDR |
|---|---|---|---|---|
| 1732 | 45.33 | -70.13 | 300 | 0.4121 |
| 4627 | 45.06 | -69.68 | 300 | 0.4054 |
| 2356 | 40.8 | -75.94 | 300 | 0.1733 |
| 2057 | 40.94 | -75.22 | 300 | 0.1371 |
| 1254 | 40.22 | -75.83 | 300 | 0.1696 |
| 1388 | 40.35 | -75.3 | 300 | 0.1848 |
| 7643 | 38.09 | -78.65 | 300 | 0.3372 |
| 8247 | 37.73 | -78.89 | 300 | 0.3058 |
| 5520 | 37.78 | -78.89 | 300 | 0.3217 |
| 2239 | 38.34 | -79.26 | 300 | 0.3166 |

FIG. 45B – Example DATCM Overlay of Observation Points on Forecast Plot

DYNAMIC AIRCRAFT THREAT CONTROLLER MANAGER APPARATUSES, METHODS AND SYSTEMS

PRIORITY CLAIM

This application is a Continuation of, and claims priority to and the benefit of, U.S. patent application Ser. No. 14/758,777, filed Jun. 30, 2015 and entitled "Dynamic Aircraft Threat Controller Manager Apparatuses, Methods and Systems," which in turn is a National Stage Entry of and claims priority under 35 U.S.C. §§ 365 and 371 to PCT application serial no. PCT/US2013/078540, filed Dec. 31, 2013 and entitled "DYNAMIC AIRCRAFT THREAT CONTROLLER MANAGER APPARATUSES, METHODS AND SYSTEMS," which in turn claims benefit under 35 U.S.C. § 119 to each of the following: U.S. provisional patent application Ser. No. 61/748,046, filed Dec. 31, 2012, entitled "Dynamic Airfoil Platform Manager Apparatuses, Methods and Systems"; U.S. provisional patent application Ser. No. 61/747,899, filed Dec. 31, 2012, entitled "Airfoil Icing Platform Manager Apparatuses, Methods and Systems"; U.S. provisional patent application Ser. No. 61/773,726, filed Mar. 6, 2013, entitled "Airfoil Icing Platform Manager Apparatuses, Methods and Systems"; U.S. provisional patent application Ser. No. 61/747,905, filed Dec. 31, 2012, entitled "Dynamic Turbulence Platform Apparatuses, Methods and Systems"; U.S. provisional patent application Ser. No. 61/747,885, filed Dec. 31, 2012, entitled "Dynamic Turbulence Engine Apparatuses, Methods and Systems"; U.S. provisional patent application Ser. No. 61/748,009, filed Dec. 31, 2012, entitled "Dynamic Turbulence Manager Apparatuses, Methods and Systems"; and U.S. provisional patent application Ser. No. 61/919,796, filed Dec. 22, 2013, entitled "Dynamic Storm Environment Engine Apparatuses, Methods and Systems". The entire contents of the aforementioned applications are expressly incorporated by reference herein.

This application for letters patent document discloses and describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

A variety of weather monitoring systems, including ground-based and satellite-based observations, are used to provide weather reports and forecasts, which may be utilized to arrange outings and plan for trips.

BRIEF DESCRIPTION OF THE DRAWINGS

The accompanying appendices and/or drawings illustrate various non-limiting, example, inventive aspects in accordance with the present disclosure:

FIG. 1A demonstrates an example user interface wherein comprehensive hazard prediction is integrated into an existing and/or future flight planning tool, allowing users to alter flight path creation to account for projected comprehensive hazard in some embodiments of the DATCM;

FIG. 1B shows a logic flow diagram illustrating an example of an DATCM integrating comprehensive hazard modeling into flight path creation, facilitating user preference in flight planning variation in some embodiments of the DATCM;

FIG. 2 shows a data flow diagram illustrating an example of a DATCM functionality;

FIG. 3 shows an example data flow diagram of various output media provided by the DATCM and the use of its data in multiple intermediate and end stage applications in some embodiments of the DATCM;

FIG. 4 provides an overview of an aspect of the DATCM;

FIG. 5 shows a data flow diagram illustrating an example of a DATCM accepting inputs and data requests, utilizing internal data repositories for data request execution and outputting both predictive and (near) real-time data in some embodiments of the DATCM;

FIG. 6 shows a data flow diagram illustrating an example of an DATCM initializing internal data repositories for input while accepting inputs and data requests and outputting both predictive and (near) real-time data in some embodiments of the DATCM;

FIG. 7 demonstrates a logic flow diagram illustrating example DATCM data requests, creating an aircraft profile, accepting input and outputting grid point percent power increase (PPI) in some embodiments of the DATCM;

FIG. 8 demonstrates a logic flow diagram illustrating example DATCM data requests, accessing an aircraft profile, accepting input and outputting grid point percent power increase (PPI) in some embodiments of the DATCM;

FIG. 9 demonstrates an example user interface where icing prediction is integrated into an existing and/or future flight planning tool, allowing users to alter flight path creation to account for projected icing in some embodiments of the DATCM;

FIG. 9A shows a logic flow diagram illustrating an example of an DATCM integrating icing modeling into flight path creation, facilitating user preference in flight planning variation in some embodiments of the DATCM;

FIG. 15 illustrates aspects of ice accumulation and resultant PPI values with respect to a Beechcraft King Air airfoil, in one implementation of the DATCM;

FIG. 16 illustrates aspects of ice accumulation and resultant PPI values with respect to a Boeing 737 airfoil, in one implementation of the DATCM;

FIG. 17 shows an example percent power increase ("PPI") component installation and usage scenario, in one implementation of the DATCM;

FIGS. 18A-F show an example PPI component hardware component, in one implementation of the DATCM;

FIG. 19A provides an example logic flow for an embodiment of the DATCM, illustrating aspects of a real-time flight alerting and planning component of the DATCM;

FIG. 19B provides an overview diagram illustrating example enhanced turbulence regions affecting aircraft and an example output of integrated turbulence output in some embodiments of the DATCM;

FIG. 20 shows a data flow diagram illustrating an example of a DATCM accepting inputs and data requests and outputting both predictive and (near) real-time data in some embodiments of the DATCM.

FIG. 21 shows a data flow diagram illustrating an example of a DATCM utilizing both external and internal data repositories for input while accepting inputs and data requests and outputting both predictive and (near) real-time data in some embodiments of the DATCM;

FIG. 22A demonstrates a logic flow diagram illustrating example DATCM turbulence computational integration component, accepting input and outputting grid point enhanced turbulence data in some embodiments of the DATCM;

FIG. 22B provides example output from an enhanced above-storm turbulence determination;

FIG. 23 demonstrates an example user interface where turbulence prediction is integrated into an existing and/or future flight planning tool, allowing users to alter flight path creation to account for projected turbulence in some embodiments of the DATCM;

FIG. 24 shows a logic flow diagram illustrating an example of a DATCM integrating turbulence modeling into flight path creation, facilitating user preference in flight planning variation in some embodiments of the DATCM;

FIG. 25 shows an overview diagram illustrating an example of a vertical air region and the overlay of turbulent areas affecting aircraft at various altitudes and times, where overlapping regions illustrate enhanced turbulence in some embodiments of the DATCM;

FIG. 26 shows example grid outputs of the mathematical models both pre and post integration, illustrating how enhanced turbulence is more than graphical intersection and represents both cumulative and heightened turbulence in overlay zones in some embodiments of the DATCM;

FIG. 27 shows an example data flow diagram of various output media provided by the DATCM and the use of its data in multiple intermediate and end stage applications in some embodiments of the DATCM;

FIGS. 28A-29D show various example and/or visual input/output component aspects of the DATCM;

FIG. 30 provides an exemplary flow diagram for an embodiment of a VVSTORMSE component of the DATCM;

FIGS. 30A-30F illustrate exemplary data displays for embodiments of the DATCM and/or components/subcomponents thereof;

FIG. 31 provides an exemplary logic flow diagram illustrating EDR determination and masking for an embodiment of the DATCM and/or an associated VVSTORMSE component/subcomponent;

FIG. 32 provides an exemplary logic flow diagram illustrating aspects of a VVSTORMSE component operation for an embodiment of the DATCM;

FIG. 33 provides a logic flow diagram illustrating an embodiment of an integration component;

FIG. 34 provides an illustrative overview of features of an implementation of the DATCM;

FIG. 35 provides an exemplary illustration of geostationary operational environmental satellite convective initiation data according to one embodiment;

FIG. 37 provides an exemplary output of an overshooting top mask for an embodiment;

FIGS. 38A-39D illustrate exemplary turbulence forecasts according to some embodiments;

FIG. 40 provides an exemplary schematic drawing illustrating regions of turbulence in an embodiment;

FIG. 41 provides an exemplary cross-sectional view of a flight path and regions of turbulence in an embodiment;

FIG. 42 provides an exemplary flow diagram illustrating an integrated turbulence forecast process according to some embodiments;

FIG. 43 provides a table containing an in-flight time sequence of turbulence forecasts according to some embodiments;

FIG. 44 provides an exemplary view of an output file generated by the DATCM in some embodiments;

FIGS. 45A and 45B depict an example set of observation data points and their overlay onto mapped forecast data, respectively, according to some embodiments.

Figure 10:
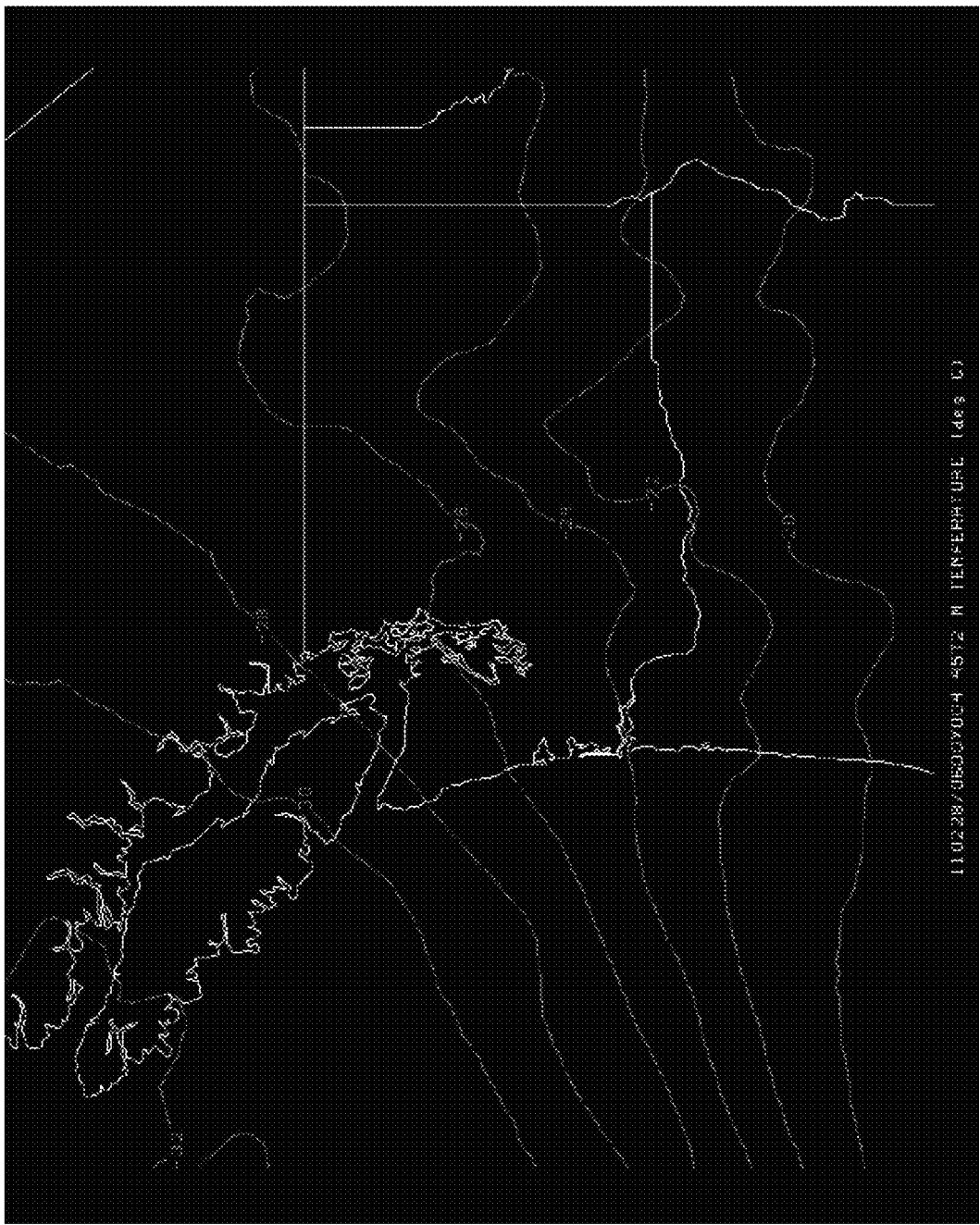
FIGS. 10-14 show various example and/or visual input/output component aspects of the DATCM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Dynamic Aircraft Threat Controller Manager (DATCM)

In some embodiments, the DYNAMIC AIRCRAFT THREAT CONTROLLER MANAGER ("DATCM") as disclosed herein transforms flight profile information, terrain, weather/atmospheric data and flight parameter data via DATCM components into comprehensive hazard avoidance optimized flight plans. Comprehensive hazard avoidance includes synergistic comprehensive turbulence and airfoil-specific icing data. In one implementation, the DATCM comprises a processor and a memory disposed in communication with the processor and storing processor-issuable instructions to receive anticipated flight plan parameter data, obtain weather data based on the flight plan parameter data, obtain atmospheric data based on the flight plan parameter data, and determine a plurality of four-dimensional grid points based on the flight plan parameter data. The DATCM may then determine comprehensive hazard mappings. With (near) real-time comprehensive hazard information and/or predictive turbulence/icing forecast specific to airfoil type and/or profile parameters, the DATCM may allow aircraft to avoid areas where the comprehensive hazard is greater than a predetermined threshold and/or avoid areas where turbulence and/or icing may occur.

FIG. 1A shows an example of how the DATCM provides and/or may be incorporated into flight planning tools, such as AviationSentry Online®. The DATCM may be included with online services, with desktop services, with mobile applications, and/or the like. In the embodiment shown in FIG. 1A, a flight planning tool has an interface 101 representative of an online flight planning service with user profile information. As an interactive element 102, the DATCM may allow users to factor comprehensive turbulence and icing ("comprehensive hazard") predictions into flight path creation. The DATCM may allow users to consider several ways of incorporating comprehensive hazard prediction into their flight path considering their flight requirements 103. In this example, the DATCM may offer shortest path generation where comprehensive hazards may not be a considering factor in flight path creation, comprehensive hazard circumvention where comprehensive hazard avoidance is a serious flight consideration, some comprehensive hazard circumvention with emphasis on shortest path generation where comprehensive hazard avoidance warrants some consideration, but may not be a primary goal and/or the like. The DATCM may then generate a regional comprehensive hazard forecast within the specified flight path region 104 and suggest flight path alterations with respect to the level of comprehensive hazard circumvention desired. The comprehensive hazard determination is made based on a variety of factors and may be tailored to the aircraft airfoil, purpose (e.g., passenger vs. cargo flights), etc. When determining comprehensive hazards, the DATCM may output a color-coded map overlay where black may represent no significant comprehensive hazard, green may represent mild comprehensive hazard, yellow may represent moderate comprehensive hazard, and red may represent severe comprehensive hazard.

FIG. 1B shows one example of an expanded logic flow diagram of flight path considerations when the DATCM is part of an integrated flight planning tool. In one embodiment of the disclosure, e.g., at 126, a vehicle type (e.g., make, model, classification, modifications, service history, and/or like information) may be determined. The vehicle type may, for example, be categorized as a Passenger aircraft 106, a Private aircraft 107, or a Commercial Cargo/Transport aircraft; it may also include model number, sub-type, and alteration information to the vehicle. The flight planning service may access/input user profile information 105 which may include such information type of aircraft and/or flight service such as passenger 106, private 107 and/or commercial cargo/transport 108, the consideration of which may influence comprehensive hazard avoidance (i.e., commercial cargo transport may prioritize shortest path with minimal evasion while passenger may emphasize discursive icing circumvention over speed or directness). The DATCM may request additional user profile information for flight path construction 109. In some embodiments of the disclosure, such information may include the origin grid point and departure time of the flight, the destination grid point, and/or the maximum travel time the flight can utilize in constructing its path 111. In some embodiments of the disclosure, the DATCM may infer user information from previously stored user profile data and/or prior flight path generation 112. In some embodiments, this information may include the aircraft type, aircraft airfoil parameters, aircraft fuel requirements, standard flying altitude, previous planned flight paths, and/or the like 113. Sensor values may then be polled, at 125 (e.g., a polling of the myriad sensors that vary according to the airframe type), providing sensor data such as attitude, altitude, heading, airspeed, g-forces, yaw, pitch, roll, fuel consumption rate, current fuel capacity/fuel remaining for the flight, number of passengers, weight, tire pressure, fire sensor, engine status, fluid levels, hours flown, barometric pressure, water content of the atmosphere and/or clouds, icing on wings, CO2, oxygen, power output, temperatures of the aircraft's interior volume and exterior surface(s), wind speed, humidity, and/or the like, for example as shown at 126. In some embodiments, user profile, polled sensor information, and flight creation information that is both input and/or inferred by the DATCM, may be used to update the user profile data for future DATCM use 114. In some embodiments of the disclosure, the DATCM may use other stored profile information where similar parameters resulted in successful flight path creation. In addition, in some embodiments, user profile data corresponding to a particular pilot may include the pilot's preference(s) with regard to fuel mixture, flight path, amount of turbulence, etc.). In some embodiments of the disclosure, the DATCM may use additional input, such as those from sources external to the flight planning tool, such as historical flight plan data and/or the like. The DATCM may then calculate the grid size of the region 115 over which the DATCM may consider flight path creation, using input such as the origin, destination, maximum flight time, polled sensor values 125, and/or facilities of the aircraft and/or type of flight. In some embodiments of the disclosure, two dimensional grid space may be considered for initial path planning purposes. In some embodiments of the disclosure, three or four dimensional grid space may be considered for path planning purposes. In some embodiments of the disclosure, two dimensional grid space may be considered for initial path planning purposes, which may then be integrated with additional dimensional information as necessary to accurately determine available grid space inside which the flight path may still meet flight path parameters.

In some embodiments of the disclosure, this initial input component may then be followed by DATCM comprehensive hazard calculation 116 of the generated geospatial grid region, some examples of which are described in later figures. The DATCM may create a comprehensive hazard overlay to the generated grid region 118 and may request additional information about the desired parameters of the flight path through this grid region 118. In some embodiments of the disclosure, these parameters may include schedule-based path-finding (shortest path immediacy), schedule-based but with circumvention of acute comprehensive hazard (shortest path avoiding high hazard icing and/or turbulence areas), discursive comprehensive hazard circumvention (navigating out of turbulent/high icing areas), and/or any combination of or intermediate stage to these parameters 119. The DATCM may then use available input as described in the input component to determine all flight path creation parameters 120. The DATCM may then create a flight path over the comprehensive hazard grid region 121, considering flight path creation parameters 119. The DATCM may then provide the user the proposed flight path as a terminal overlay, standard or high definition map overlay and/or the like 122, as is applicable to the flight planning tool. If the flight path is satisfactory 123, the user may then exit the flight path planning component of the DATCM as an incorporated flight planning tool option. The polled sensor data discussed above with respect to 125 may also be employed in the calculations at 120, 121, and 122. In some embodiments of the disclosure, the DATCM may allow the user to export the determined flight path to other media, save the flight path to the user profile, share the flight path with additional users, and/or the like. In some embodiments of the disclosure, if the proposed flight path is not satisfactory 123, the DATCM may allow the user to modify flight path creation parameters 124. At 127, the DATCM may evaluate whether a new parameter change or update is required. If so, the process may loop back to the input flight parameters step 109 before proceeding. If no new parameter changes/updates are required, the process may proceed to request a path determination at 118 and proceed as described above with regard to 119, 10, 121, 122 and 123. In some embodiments of the disclosure, the user may reenter a flight path creation component specified earlier. In some embodiments of the disclosure, users may be allowed to visually manipulate flight path options using the proposed flight path comprehensive hazard grid overlay. In some embodiments of the disclosure, the user may be able to reenter flight path creation, visually manipulate the proposed flight path and/or combine these methods in any intermediate path modification.

In some embodiments, the DATCM transforms atmospheric and terrain data, via DATCM components, into comprehensive four-dimensional comprehensive hazard displays and interfaces. In one implementation, the DATCM comprises a processor and a memory disposed in communication with the processor and storing processor-issuable instructions to determine a plurality of four-dimensional grid points for a specified temporal geographic space-time area and obtain corresponding terrain and atmospheric data. Then, for each point of the plurality of four-dimensional grid point, the DATCM determines airfoil-specific icing attributes and non-dimensional mountain wave amplitude and mountain top wave drag, upper level non-dimensional gravity wave amplitude, and a buoyant turbulent kinetic energy.

The DATCM may also determine a boundary layer eddy dissipation rate, storm velocity and eddy dissipation rate from updrafts, maximum updraft speed at grid point equilibrium level, storm divergence while the updraft speed is above the equilibrium level and identifying storm top, storm overshoot and storm drag. The DATCM determines Doppler speed, eddy dissipation rate above the storm top, eddy dissipation rate from downdrafts. Then, the DATCM determines the turbulent kinetic energy and/or the total eddy dissipation rate for each grid point and provides a four-dimensional grid map overlay with comprehensive hazard data for the specified temporal geographic space-time area.

As illustrated in FIG. 2, in some embodiments of the disclosure, the DATCM 201 may be available to aircraft 202, air traffic controllers 203, flight planning tools and software 217, third party applications 216 where comprehensive hazard feed incorporation is contributing, and the like. In some embodiments of the disclosure, PIREPS and sensor data of aircraft in real-time comprehensive hazard conditions 204 may be sent to the DATCM to be incorporated into the DATCM aggregate data analysis. In some embodiments, the sensor data may take an industry-standard format, for example according to a wireless sensor network (WSN) standard such as ZigBee, 802.15.4, or 6LoWPAN. Alternatively, the sensor data input 204 may take the following XML formatted form:

```
<sensor_data>
    <position_data>
        <time>10:03:10 UCT</time>
        <GPS_coord>00907612</GPS_coord>
        <heading>180 degrees</heading>
    </position_data>
    <airspeed>500 knots</airspeed>
    <ground_speed>575 mph<ground_speed>
    <wind_velocity>20 kts</wind_velocity>
    <nose_temperature> –100 degrees F </nose_temperature>
    <relative_humidity>65 </relative_humidity>
    <hazard_report_1>
        <GPS_coord_hazard1>00924867</GPS_coord_hazard1>
        <hazard_radius>1.4 miles</hazard_radius>
        <type>tornado</type>
        <source_xmn>UHF</source_xmn>
        <source>NOAA</source>
    </hazard_report_1>
    <hazard_report_2>
        <GPS_coord_hazard1>01124527</GPS_coord_hazard1>
        <hazard_radius>15 miles</hazard_radius>
        <type>strong turbulence above 50,000 feet</type>
        <source_xmn>vHF</source_xmn>
        <source>ATC Denver</source>
    </hazard_report_2>
    ...
</sensor_data>
```

Similarly in some embodiments of the disclosure, additional/other sources of input may be weather stations 220 and satellites 221 which may provide numerical weather forecast data 206 to the DATCM. Such weather information may be obtained from a variety of sources, including the National Weather Service, NOAA, and/or the like, and may in some embodiments be substantially in the form of a HTTP(S) POST message including XML-formatted data, is provided below:

```
POST /weather_forecast_.php HTTP/1.1
Host: www.NOAA.gov/wx
Content-Type: Application/XML
Content-Length: 484
<?XML version = "1.0" encoding = "UTF-8"?>
<local_weather_alerts_report>
    <request_ID>45DSKFSWFG5</request_ID>
    <GPS_coord_requestor>00907612</GPS_coord_requestor>
    <timestamp>yyyy-mm-dd hh:mm:ss</timestamp>
    <request_coverage_period>24 hours</request_coverage_period>
    <weather_detail_24hour>
        <humidity>64%</humidity>
        <wind_speed>W 8 mph</wind_speed>
        <barometer>30.12 in (1019.2 mb)</barometer>
        <dewpoint>20 degrees F (–7 degrees C)</dewpoint>
        <visibility>8.00 mi</visibility>
        <wind_chill>24 degrees F (–4 degrees C)</wind_chill>
        <alert_status>frost advisory</alert_status>
    </weather_detail_24hour>
</local_weather_alert_report>
```

In some embodiments of the DATCM, additional/other sources of input may be topological data 218 which may provide terrain characteristic data 205 to the DATCM. A variety of sources may be used to supply the terrain characteristic data, including GPS/satellite terrain mapping services like Terraserver, TopoZone, MapTech, Google Earth, NOAA Global Relief Images, etc. Alternatively or in addition, topographical imaging may also be conducted by the aircraft itself during the flight and transmitted to/processed by the DATCM. In some embodiments of the DATCM, the receipt of this input may occur prior to requests to the DATCM for comprehensive hazard forecasting. In some embodiments of the DATCM, the receipt of this input may be ongoing during requests to the DATCM for comprehensive hazard forecasting. In some embodiments of the DATCM, receipts of input may be both before requests to the DATCM for comprehensive hazard forecasting and ongoing during forecasting requests. In some embodiments, an aircraft 202 may request (near) real-time localized comprehensive hazard data 207, an air traffic control system 203 may request predictive regional comprehensive hazard data as an updating feed 209 and/or a (near) real-time regional comprehensive hazard data request 211, and/or a flight-planning tool or software may request predictive comprehensive hazard within a flight path region or along a flight path course 213. A hazard data feed may, in some embodiments, be substantially in the form of a HTTP(S) POST message including XML-formatted data, is provided below:

```
POST /hazards.php HTTP/1.1
Host: www.NOAA.gov/wx
Content-Type: Application/XML
Content-Length: 484
<?XML version = "1.0" encoding = "UTF-8"?>
<hazard_data_feed>
    <requestor_ID>45DSKFSWFG5</requestor_ID>
    <request_type_realtime>TRUE</request_type_relatime>
    <request_type_predictive>FALSE</request_type_predictive>
    <GPS_coord_requestor>00907612</GPS_coord_requestor>
    <heading_requestor>208.13 degrees</heading_requestor
    <timestamp>2013-12-31 16:51:22</timestamp>
    <last_updated>2013-12-31 15:51:22</last_updated>
    <hazard_display_type>map</hazard_display_type>
    <hazard_info_001>
    <coord_001>47BSKFSWFG5<coord_001>
    <turb_hazard_info_001>9</turb_hazard_info_001>
    <icing_hazard_info_001>12.1</icing_hazard_info_001>
    </hazard_info_001>
    <hazard_info_002>
    <coord_002>47LCMFSWFG5<coord_002>
    <turb_hazard_info_002>8.8</turb_hazard_info_002>
    <icing_hazard_info_002>12.0</icing_hazard_info_002>
    </hazard_info_002>
    ...
    <hazard_info_00>
    <coord_00N>47LCMFSWFG5<coord_00N>
```

-continued

```
    <turb_hazard_info_00N>4.3</turb_hazard_info_00N>
    <icing_hazard_info_00N>11.0</icing_hazard_info_00N>
    </hazard_info_00N>
</hazard_data_feed>
```

In some embodiments, the DATCM may direct such requests through a comprehensive hazard Integration Mechanism component 210 where DATCM components such as Airfoil Icing Platform (AIP) component, MWAVE component, INTTURB component, VVSTORMSE component, and VVTURB2 component process input into percentage power increase (PPI) and eddy dissipation rate (EDR) values and render them for terminal 230, standard/high-definition 231, and/or displays of the like. In some embodiments, the DATCM may return a real-time/near real-time comprehensive hazard map 208 terminal display to an aircraft, a predictive and updating regional data feed 212 (e.g., see data displays in FIGS. 30A-30F) to an air traffic controller, a predictive flight path comprehensive hazard 214 display to a flight-planning tool/software, a comprehensive hazard data feed 215 to a third party application displaying comprehensive hazard data, and/or the like.

304. In some embodiments, DATCM partners may distribute DATCM output through various communication networks 305 such as local area networks (LAN) and/or external networks such as the internet which may provide DATCM partners, third party applications/tools 306, and/or end users 307 with DATCM output. In some embodiments of the DATCM, such output may be in propagated GRIB files as provided to DATCM partners. In some embodiments of the DATCM, such output may be converted to a visual form for display on a web browser, smart phone application, software package and/or the like. In some embodiments of the DATCM, electronic messaging 307 such as email, SMS text, push notifications, and/or the like may be employed to alert end users of important data updates from the DATCM, DATCM partners, and/or other parties providing DATCM output data.

In some embodiments, the DATCM may provide a file or data stream as output, in which values of the DATCM during component production, including but not limited to EDR finalization, may be recorded or provided. One example of a DATCM CSV output file is provided below, showing an in-flight time sequence of forecasted turbulence:

| Flight PHX-MSP dd mm yyyy Leave: 0413Z Arrive: 0646Z Turbulence Forecast (EDR*100) | | | | | | | | | | |
|---|---|---|---|---|---|---|---|---|---|---|
| Time | Latitude | Longitude | Altitude (kft) | MWAVE | COMTURB | VVTURB | INTTURB | VVINTTURB | FINAL | Explanation |
| 415 | 33.5 | −111.8 | 50 | 0 | 0 | 0 | 0 | 1 | 1 | |
| 425 | 34.5 | −111.6 | 250 | 0 | 0 | 0 | 0 | 26 | 26 | Near-storm turbulence |
| 435 | 35.4 | −110.3 | 370 | 0 | 0 | 0 | 0 | 1 | 1 | |
| 445 | 36.2 | −109 | 370 | 0 | 0 | 1 | 25 | 1 | 25 | Mountain wave and free gravity wave amplitudes combine |
| 455 | 36.9 | −107.7 | 370 | 0 | 0 | 0 | 0 | 0 | 0 | |
| 505 | 37.3 | −106 | 370 | 0 | 0 | 0 | 0 | 34 | 34 | Storm top turbulence |
| 515 | 38.1 | −104.7 | 370 | 0 | 0 | 1 | 35 | 1 | 35 | Mountain wave and free gravity wave amplitudes combine |
| 525 | 38.9 | −103.6 | 370 | 0 | 0 | 1 | 0 | 1 | 1 | |
| 535 | 39.9 | −102.3 | 370 | 0 | 45 | 0 | 45 | 0 | 45 | |
| 545 | 40.9 | −101 | 370 | 0 | 0 | 1 | 0 | 1 | 1 | |
| 555 | 41.8 | −99.7 | 370 | 0 | 51 | 1 | 51 | 1 | 51 | |
| 605 | 42.6 | −98.5 | 370 | 0 | 34 | 0 | 34 | 0 | 34 | |
| 615 | 43.5 | −97 | 370 | 0 | 30 | 1 | 30 | 1 | 30 | |
| 625 | 44.4 | −95.3 | 290 | 0 | 18 | 43 | 18 | 43 | 43 | |
| 635 | 44.7 | −94 | 100 | 0 | 0 | 24 | 0 | 24 | 24 | |
| 645 | 44.8 | −93.2 | 20 | 0 | 19 | 0 | 19 | 51 | 51 | Near-storm turbulence |

FIG. 3 demonstrates one example of how DATCM Integration Mechanism component(s) may incorporate external data feeds and may provide various partners, third party software applications/tools, end users, integrators, internal and external flight planning services, and/or the like with integrated turbulence output in the form of comma-separated value (CSV), geometric vector data files, gridded binary (GRIB) format, data feeds, and/or the like. In one embodiment, the DATCM receives Global Forecast System (GFS) data 301 from the National Oceanic and Atmospheric Administration (NOAA) as input. In one embodiment, the DTP receives Rapid Refresh (RAP) 302 data from the NOAA as input. In one embodiment, the DATCM receives GFS, RAP, and/or similar information as input. In some embodiments the DATCM produces one or more GRIB2 file(s) 303 and/or record outputs that may be appended in GRIB format for use in file distribution by DATCM partners In some embodiments of the DATCM, a file or feed (e.g., a CSV file) output from the DATCM may be provided as input to a geometric vector data generator 307, which may provide additional data output options. In some embodiments of the DATCM, the geometric vector data generator may output geometric vector data files to a file server 330 which may provide the data output to an alert server 320 which may provide the output a communications networks 305 to such partners, third parties, software applications, end users and/or the like as described. In some embodiments of the DATCM, the geometric vector data generator may output geometric vector data files, such as shapefiles, for storage in GIS database(s) 308. In some embodiments of the DATCM, Web Mapping Services (WMS) and/or Web Feature Services (WFS) 309 may obtain the geometric vector data files from GIS database(s) and provide geographic service integrators 311 with DATCM output data through various communication networks 305 as described. In some embodiments of the DATCM, file server(s) 308 and/or WMS may incorporate the DATCM output data into a DATCM integrated server 340 with application, data, and/or network components. A DATCM integrated server may employ such output data from DATCM components in proprietary software tools, web services, mobile applications and/or the like. In one embodiment of the DATCM, a DATCM integrated server may employ DATCM component output for use in flight planning tools 312, such as AviationSentry Online®.

Icing forecasting methods may focus on general categories of aircraft, such as aircraft size, and real-time icing information rely primarily on pilot reports (PIREPS), other subjective/observational data, and local sensors for determining icing airspace regions. The DATCM as disclosed herein utilizes unique predictive mathematical calculation/determination components of icing per unique airfoil type and utilizes these predictive mechanisms to generate a comprehensive forecasting map display and/or overlay that is not merely a generalized icing projection for aircraft of a broad-spectrum type, but is the computational specification of icing to any airfoil known to the DATCM, providing an accurate representation of icing over a specified spatial/temporal area.

In some embodiments, DATCM transforms flight profiles, atmospheric data, and terrain data, via DATCM components, into comprehensive turbulence alerts and optimized flight path adjustments. In one implementation, the DATCM comprises a processor and a memory disposed in communication with the processor and storing processor-issuable instructions to receive a flight profile for an aircraft, the flight profile including an at least one initial route. The DATCM identifies an initial predicted comprehensive turbulence for the at least one initial route and determines a real-time comprehensive turbulence for the at least one initial route. The DATCM may then determine turbulence threshold compliance based on the real-time comprehensive turbulence and at least one of the flight profile and the initial predicted comprehensive turbulence, and may generate a turbulence exception if the real-time comprehensive turbulence exceeds threshold turbulence parameters. The turbulence exception may comprise an alert for the aircraft and/or determining an at least one adjusted route for the aircraft based on the updated/real-time comprehensive turbulence data.

Turbulence forecasting methods may focus on discrete areas of turbulence, such as clear air turbulence (CAT) or thunderstorm regions, and rely primarily on pilot reports (PIREPS) and other subjective/observational data for determining turbulent airspace regions. The DATCM as disclosed herein utilizes unique predictive mathematical components and calculations of turbulence in four-dimensional space-time and utilizes these predictive devices to generate a comprehensive forecasting and/or nowcasting map display and/or overlay that is not merely the visual combination of disparate turbulence projections and/or observation, but is the computational multi-hazard integration of enhanced turbulent regions, providing an accurate, real-time/near real-time, multi-dimensional representation of turbulence over a specified spatial/temporal area, reactive to new weather developments. In some embodiments, the DATCM identifies areas where there is lower turbulence, even though there are radar echoes. With this enhanced granularity, the DATCM enables flight following and/or path determining and real-time (and/or near real-time) response to changing weather conditions.

Thunderstorms may create some of the most intense turbulence and icing conditions. Avoidance of such conditions may be preferred, particularly for passenger aircraft. Experienced forecasters use many subjective and objective tools to attempt to forecast convection locations over large time ranges. DATCM provides for accurate, granular, and time-specific convection and turbulence forecasts.

In some embodiments, DATCM objectively analyzes numerical forecast data based on, for example, a conditionally unstable environmental lapse rate, sufficient heat and moisture for a parcel to have a level of free convection (LFC), and a process to lift that parcel to its LFC. DATCM determines weightings and/or balances each factor and combines them to determine the appropriate level for the environment and for thunderstorm generation prediction. For example, vertical velocities that may lift parcels are typically small in numerical models, and rather than merely inferring higher speeds, DATCM may inflate velocities to values observed in real storm environments. If a parcel at any grid point reaches its LFC, then DATCM continues to track the parcel's vertical velocity as it rises buoyantly.

Icing determination may rely on sensors located on an aircraft to determine when icing has occurred. This method fails to give advance warning to aircraft personnel to potential icing hazards and may not give sufficient notice for course correction to improve icing conditions. In some scenarios, an aircraft advancing into icing conditions may lose altitude and/or be forced to terminate a specific flight plan without adequate notification of impending icing conditions. Icing forecasts may rely on weather conditions alone to determine if icing may occur and may apply only a generalized aircraft type to forecasting methods, an example of which might be that a small aircraft may experience more significant icing than a larger aircraft or require a greater power increase in icing conditions. However, airfoils, generally defined as curved surface structures that provide aircraft with positive lift to drag ratios, under identical weather conditions may ice differently, without respective to other aspects of aircraft construction and/or size 401. In one example, a medium size propeller plane (e.g., see 402 in FIG. 4) may form ice encasing the endpoint of its airfoil requiring a PPI of 0.3548. In this example under duplicate weather conditions, a large passenger aircraft (e.g., 403 in FIG. 4) may experience only slight icing of its airfoil, requiring a much smaller PPI of 0.0051. Lastly, in this example, under these replicated weather conditions, a small private aircraft (e.g., 404 in FIG. 4) may experience larger ice formation on its airfoils than the passenger aircraft and require a PPI of 0.0880, which is greater than that of the passenger aircraft, but less than that of the medium-sized propeller aircraft. By way of example, the terms "small", "medium", and "large" have been employed to describe diverse aircraft generalized in FIG. 4. The AIP component of the DATCM, however, may be indeterminate of aircraft size, purpose, and/or the like. In this embodiment, the DATCM uses airfoil type to determine how, where, under what conditions, and/or the like of icing occurrence. In some embodiments, the DATCM may associate aircraft with their known airfoil types. In some embodiments, the DATCM may maintain information exclusive to airfoils. In some embodiments, the AIP may use aircraft type reciprocally with airfoil type.

In some embodiments of the disclosure, e.g., as depicted in FIG. 5, the DATCM 501 may maintain a data repository 510 of aircraft PPI. In some embodiments, the data repository may be organized by aircraft type. In some embodiments, the data repository may be organized by airfoil type.

In some embodiments, data tables of aircraft and airfoil types may be linked by information keys, associating aircraft and airfoil types. In other embodiments, the aircraft and/or airfoil parameters for use by the DATCM may be stored with respect to a PPI module, such as that disclosed with respect to FIG. 46 (e.g., PPI Component 4649; DATCM data store 4619, Weather 4619*h*, Aircraft 4619*i*, Airfoil 4619*l*; and/or the like); FIGS. 18A-F (e.g., an example PPI hardware module); and/or the like. The PPI component and/or data repository may be internally searchable to the DATCM by a database query language and/or platform. In some embodiments, the DATCM may allow external sources to query the data repository. In this embodiment, aircraft types are independently input 502 to the PPI data repository, which is maintained internally to the DATCM. Weather data and/or information obtained from sources such as the Global Forecasting System (GFS) and Rapid Refresh (RAP) may be made available to the DATCM through satellite transmission 570, weather station input 580, and/or the like. In some embodiments, the DATCM may reduce weather data to determinate icing factors. In some embodiments, the DATCM may request specific numerical weather input that is icing condition related. In some embodiments of the DATCM, weather input is continuous and/or updated at systematic intervals. In the example of FIG. 5, airline operations 530 may request both predictive and (near) real-time icing data 508 from the DATCM. In this example, the operational request contains the aircraft type(s) for which icing conditions should be predicted. In some embodiments, the DATCM may contain user profile information under which a user, having created a profile with the DATCM, may provide identifying information other than aircraft type. In some embodiments, the DATCM may store user information in a profile data repository 590 and access aircraft type(s) and/or other user information based on identifying input data. The DATCM may then submit operational data, such as airfoil type and location, localized and real-time weather data, such as temperature, cloud liquid water, and median droplet size, and/or the like 504 to the PPI data repository 510 which may then return PPI(s) 505 needed for requested aircraft and/or conditions. The DATCM may return 509 this output to the airline operations as requested. In one example, commercial and/or private airline services 540 may request predictive and/or (near) real-time localized icing information. In some embodiments, this request may contain aircraft type and other user information. In some embodiments, this request may contain identifying information to access user profile data stored in a DATCM profile data repository. The DATCM may submit the relevant operational and weather data to the PPI data repository and receive PPI(s) as described, returning output to the requestor 540. In some embodiments, in-house and/or third party flight planning tools 550 may request 511 predictive icing conditions over a region for one or more aircraft types. In some embodiments, the flight planning tools may have and/or share user profile information of a profile data repository with the AIP in making this request. In some embodiments, the DATCM may return a PPI grid overlay for the requested region 512. In some embodiments, the DATCM may return a flight path over PPI grid overlay for the requested region, according to flight path request parameters, as described in FIGS. 9-9A. In some embodiments, the DATCM may return multiple paths and/or PPI grid overlays for the requested regions. In another example, air traffic controllers 560 may request predictive localized icing data 513 for its common regional aircraft from the DATCM. As in other examples, this request may provide all necessary input data singly and/or with identifying information with which the DATCM may access stored profile information from a profile data repository. The DATCM may submit the necessary inputs and return a regional icing grid overlay 514 and/or PPI(s) for all aircraft type which may have been named in the data request or which may be part of an accessed profile. In some embodiments, the DATCM may use request data to maintain and/or update a profile data repository to assist in future data requests from sources for which a profile has been created. In some embodiments, the DATCM may use request data to create user profile data for sources for which no profile data previously existed.

FIG. 6 shows an alternate embodiment of DATCM data flow in which data requests are received from like sources 630, 640, 650, 660, such as in FIG. 5 and which aircraft/airfoil type 602, aircraft specific icing 605, location/region, weather data such as temperature, cloud liquid water, median droplet size 604, and/or the like is input to the DATCM. In this embodiment, a PPI data repository 610 may store aircraft/airfoil type in the manner(s) described in FIG. 5, and may be used as an input source to the DATCM. In this embodiment, data requests such as 606, 608, 611, and/or 613 are fulfilled through the DATCM, with data requests providing either input singly and/or with identifying user information to access profile data from a profile repository 690, as may be maintained by the DATCM as described in FIG. 5. In some embodiments of the disclosure, the data repositories storing PPI, aircraft/airfoil type, and/or user profile information may be separate from, but accessible to, the DATCM. As in FIG. 5, the DATCM may provide similar outputs 607, 609, 612, 614 to requesting parties. The DATCM may maintain/update its profile data repository with information from processed requests.

In FIG. 7, one embodiment of the DATCM's PPI calculation component is put forth. In this embodiment, an icing request is initiated to the DATCM 701. The DATCM may request the aircraft type(s) 702. In some embodiments, the DATCM may use provided identifying user information as part of a user profile maintained by the DATCM to determine aircraft type(s). In this embodiment, the DATCM maintains a PPI data repository, which may be internal or external to the DATCM, of aircraft types and/or airfoil types which may be maintained in separate tables or repository with information keys linking types. In all subsequent aspects of the diagram, reference aircraft and/or airfoil may be singular or plural, i.e. the DATCM may be considered to process multiple types in each request or the DATCM may process a single type in a request. The DATCM may query the PPI data repository 703 to determine if the aircraft type is already known to the system. If the aircraft type is not stored in the PPI 704, the DATCM may assign an aircraft type 705 by creating a new or finding an existing matching record in the PPI that conforms to the aircraft specifications. If the aircraft is not associated with a known airfoil type 706, the DATCM may request that an airfoil type be associated with the aircraft 707 and request an airfoil identification. If the airfoil type identified is not in system 708, the DATCM may issue an insufficient data notice 709 and request the parameters of the airfoil type 710. If the input parameters of the airfoil match a known airfoil type, the input airfoil is recorded as the existing airfoil type 712. If the input parameters of the airfoil do not match an existing type, the DATCM may create a new record in the PPI data repository with the input airfoil parameters 713. If the aircraft type is known and/or the airfoil type is known, and/or the DATCM has input new aircraft/airfoil types in the PPI, the DATCM may request gridpoints and time to calculate icing data 714.

The DATCM may execute a query on its icing component for the requested points and time 715. The DATCM may then determine, e.g., at 716, the PPI necessary for input aircraft under the defined conditions, as predicted by the DATCM. The following non-discursive PPI calculation/ determination embodiment, presented substantially in the form of a Fortran code fragment, shows one embodiment of a methodology for such processing:

```
C
C* Get grid file user input.
C
      WRITE ( 6, 1002 )
      READ ( 5, 999 ) gdfile
      WRITE ( 6, 1003 )
      READ ( 5, 999 ) gdout
      WRITE ( 6, 1004 )
      READ ( 5, 999 ) fhour
      WRITE ( 6, 1005 )
      READ ( 5, 999 ) acft
C
C* Fill aircraft performance loss table depending on aircraft type.
C
      IF ( acft .eq. 'be20 ' ) THEN
         DO m = 1,14
            DO n = 1,10
               apltbl (m,n) = be20(m,n)
            END DO
         END DO
      ELSE
         DO m = 1,14
            DO n = 1,10
               apltbl (m,n) = be20(m,n)
            END DO
         END DO
      END IF
C
C* Get grid file user input.
C
      WRITE ( 6, 1002 )
      READ ( 5, 999 ) gdfile
      WRITE ( 6, 1003 )
      READ ( 5, 999 ) gdout
      WRITE ( 6, 1004 )
      READ ( 5, 999 ) fhour
      WRITE ( 6, 1005 )
C
C* Find levels.
C
      CALL DG_GLEV ( 1, time, ivcord, LLMXLV,
     +    iflev, nlev, iret )
      DO j = 1, nlev
         rlevel (j) = FLOAT ( iflev (1,j) )
      END DO
      CALL LV_SORT ( ivcord, nlev, rlevel, iret )
C
      DO j = 1, nlev
         CALL ST_INCH ( INT(rlevel(j)), glevel, iret )
C
C* Read icing parameter grids.
C
      gvcord = 'HGHT'
      gfunc = 'TMPC'
      CALL DG_GRID ( timfnd, glevel, gvcord, gfunc, pfunc, t,
     +    igx, igy, time, level, ivcord, parm, iret )
      gfunc = 'CWTR'
      CALL DG_GRID ( timfnd, glevel, gvcord, gfunc, pfunc, cwtr,
     +    igx, igy, time, level, ivcord, parm, iret )
      gfunc = 'MVD'
      CALL DG_GRID ( timfnd, glevel, gvcord, gfunc, pfunc, mvd,
     +    igx, igy, time, level, ivcord, parm, iret )
         maxpts = igx*igy
C
C* Compute aircraft performance loss.
C
      DO i = 1, maxpts
         IF ( t(i) .eq. RMISSD .or. cwtr(i) .eq. RMISSD ) THEN
            apl(i) = RMISSD
         ELSE IF ( (t(i) .ge. 0.0) .or. (t(i) .le. -40.0) .or.
         + (cwtr(i) .le. 0.0) ) THEN
            apl(i) = 0.0
         ELSE
C
C* Bi-linearly interpolate aircraft icing values.
C
            IF ( cwtr(i) .le. .001 ) THEN
               rcol = cwtr(i)/.0001
               icol = rcol
               c = rcol - FLOAT(icol)
               oc = 1. - c
            ELSE IF ( cwtr(i) .le. .002 ) THEN
               rcol = 10. + (cwtr(i)- .001)/.00025
               icol = rcol
               c = rcol - FLOAT(icol)
               oc = 1.0 - c
            ELSE
               icol = 14
            END IF
            IF ( t(i) .gt. -2.0 ) THEN
               r = -t(i)/2.0
               apl(i) = apltbl(1,icol)*r*oc +
                        apltbl(1,icol+1)*r*c
            ELSE IF ( t(i) .gt. -4.0 ) THEN
               irow = 1
               r = (-t(i) - 2.0)/2.0
               or = 1. - r
               IF ( icol .eq. 14 ) THEN
                  apl(i) = apltbl(1,14)*or +
                           apltbl(2,14)*r
               ELSE
                  apl(i) = apltbl(irow,icol)*oc*or
               +         + apltbl(irow,icol+1)*c*or
               +         + apltbl(irow+1,icol)*oc*r
               +         + apltbl(irow+1,icol+1)*c*r
               END IF
            ELSE
               rrow = (-t(i)/4.0) + 1.0
               irow = rrow
               r = rrow - FLOAT (irow)
               or = 1.0 - r
               IF ( icol .eq. 14 ) THEN
                  apl(i) = apltbl(irow,14)*or +
                           apltbl(irow+1,14)*r
               ELSE
                  apl(i) = apltbl(irow,icol)*oc*or
               +         + apltbl(irow,icol+1)*c*or
               +         + apltbl(irow+1,icol)*oc*r
               +         + apltbl(irow+1,icol+1)*c*r
               END IF
            END IF
         END IF
      END DO
C
C* Output PPI
C
      ifl(1) = INT(rlevel(j))
      ifl(2) = -1
      parm = 'apl'
      CALL DG_NWDT ( apl, time, ifl, ivcord, parm, ighdr,
     +    gpack, .true., iret )
      IF ( iret .eq. 0 ) write (6,*) time(1), parm, ' at ',
     +    ifl(1), ' grid write successful'
      END DO
      CALL DG_NTIM ( .false., .false., time, nxttm, ier )
```

FIG. 8 shows an alternate embodiment of DATCM's PPI determination component. In all subsequent aspects of the diagram, reference aircraft and/or airfoil may be singular or plural, i.e. the DATCM may be considered process multiple types in each request or the DATCM may process a single type in a request. As in FIG. 7, the component processes the initial request 801 and aircraft type 802 and queries a PPI data repository 803. In this embodiment, if the requested aircraft type is not known to the DATCM, the DATCM may use an airfoil based on the aircraft size in which the largest PPI may eventually be generated 805. In this embodiment, the DATCM may assign this airfoil, e.g., at 806, to the aircraft for icing calculation purposes. The PPI calculation proceeds through requesting gridpoints and time 807, querying the AIP weather component 808, and determining the PPI for the given airfoil 809, as shown in FIG. 7. The requested PPI(s) are then output to the initiator of the request.

FIG. 9 shows an example of how the DATCM may be incorporated into existing and/or prospective flight planning tools, such as AviationSentry Online®. The DATCM may be included with online services, with desktop services, with mobile applications, and/or the like. In this embodiment of the disclosure, a flight planning tool has an interface 901 representative of an online flight planning service with user profile information. As an interactive element 602, the DATCM may allow users to factor icing prediction into flight path creation. The DATCM may allow users to consider several ways of incorporating icing prediction into their flight path considering their flight requirements 903. In this example, the DATCM may offer shortest path generation where icing may not be a considering factor in flight path creation, icing circumvention where icing avoidance is a serious flight consideration, some icing circumvention with emphasis on shortest path generation where icing avoidance warrants some consideration, but may not be a primary goal and/or the like. The DATCM may then generate a regional icing forecast within the specified flight path region 904 and suggest flight path alterations with respect to the level of icing circumvention desired. In this embodiment, the DATCM outputs a color-coded map overlay where black may represent no necessary PPI, green may represent mild PPI, yellow may represent moderate necessary PPI, and red may represent severe necessary PPI.

FIG. 9A shows one example of an expanded logic flow diagram of flight path considerations when the DATCM is part of an integrated flight planning tool. In one embodiment of the disclosure, the flight planning service may access/input user profile information 905 which may include such information as the type of aircraft and/or flight service such as passenger 906, private 907 and/or commercial cargo/transport 908, the consideration of which may influence icing avoidance (i.e. commercial cargo transport may prioritize shortest path with minimal evasion while passenger may emphasize discursive icing circumvention over speed or directness). The DATCM may request additional user profile information for flight path construction 909. In some embodiments of the disclosure, such information may include the origin grid point and departure time of the flight, the destination grid point, and/or the maximum travel time the flight can utilize in constructing its path 911. In some embodiments of the disclosure, the DATCM may infer user information from previously stored user profile data and/or prior flight path generation 912. In some embodiments, this information may include the aircraft type, its fuel requirements, its standard flying altitude, previous planned flight paths, and/or the like 913. In some embodiments, user profile and flight creation information that is both input and/or inferred by the DATCM may be used to update the user profile data for future DATCM use 914. In some embodiments of the disclosure, the DATCM may use other stored profile information where similar parameters resulted in successful flight path creation. In some embodiments of the disclosure, the DATCM may use additional input, such as those from sources external to the flight planning tool, such as historical flight plan data and/or the like. The DATCM may then calculate the grid size of the region 915 over which the DATCM may consider flight path creation, using input such as the origin, destination, maximum flight time, and/or facilities of the aircraft and/or type of flight. In some embodiments of the disclosure, two dimensional grid space may be considered for initial path planning purposes. In some embodiments of the disclosure, three dimensional grid space may be considered for path planning purposes. In some embodiments of the disclosure, two dimensional grid space may be considered for initial path planning purposes, which may then be integrated with additional dimensional information as necessary to accurately determine available grid space inside which the flight path may still meet flight path parameters.

In some embodiments of the disclosure, this initial input component may then be followed by DATCM PPI calculation 916 of the generated geospatial grid region, some examples of which have been described in FIGS. 2, 3, 4 and 5. The DATCM may create a PPI overlay to the generated grid region 918 and may request additional information about the desired parameters of the flight path through this grid region 918. In some embodiments of the disclosure, these parameters may include schedule-based path-finding (shortest path immediacy), schedule-based but with circumvention of acute icing (shortest path avoiding high hazard icing areas), discursive icing circumvention (navigating out of icing areas), and/or any combination of or intermediate stage to these parameters 919. The DATCM may then use available input as described in the input component to determine all flight path creation parameters 920. The DATCM may then create a flight path over the PPI grid region 921, considering flight path creation parameters 919. The DATCM may then provide the user the proposed flight path as a terminal overlay, standard or high definition map overlay and/or the like 922, as is applicable to the flight planning tool. If the flight path is satisfactory 923, the user may then exit the flight path planning component of the DATCM as an incorporated flight planning tool option. In some embodiments of the disclosure, the DATCM may allow the user to export the determined flight path to other media, save the flight path to the user profile, share the flight path with additional users, and/or the like. In some embodiments of the disclosure, if the proposed flight path is not satisfactory 923, the DATCM may allow the user to modify flight path creation parameters 924. In some embodiments of the disclosure, the user may re-enter a flight path creation component as specified earlier. In some embodiments of the disclosure, users may be allowed to visually manipulate flight path options using the proposed flight path PPI grid overlay. In some embodiments of the disclosure, the user may be able to reenter flight path creation, visually manipulate the proposed flight path and/or combine these methods in any intermediate path modification.

FIG. 10 shows an example four-hour Rapid Refresh data (RUC2 format) numerical temperature forecast at 4572 m (FL150) over the Washington state region, which the DATCM may use an an input for PPI calculation.

Figure 11:
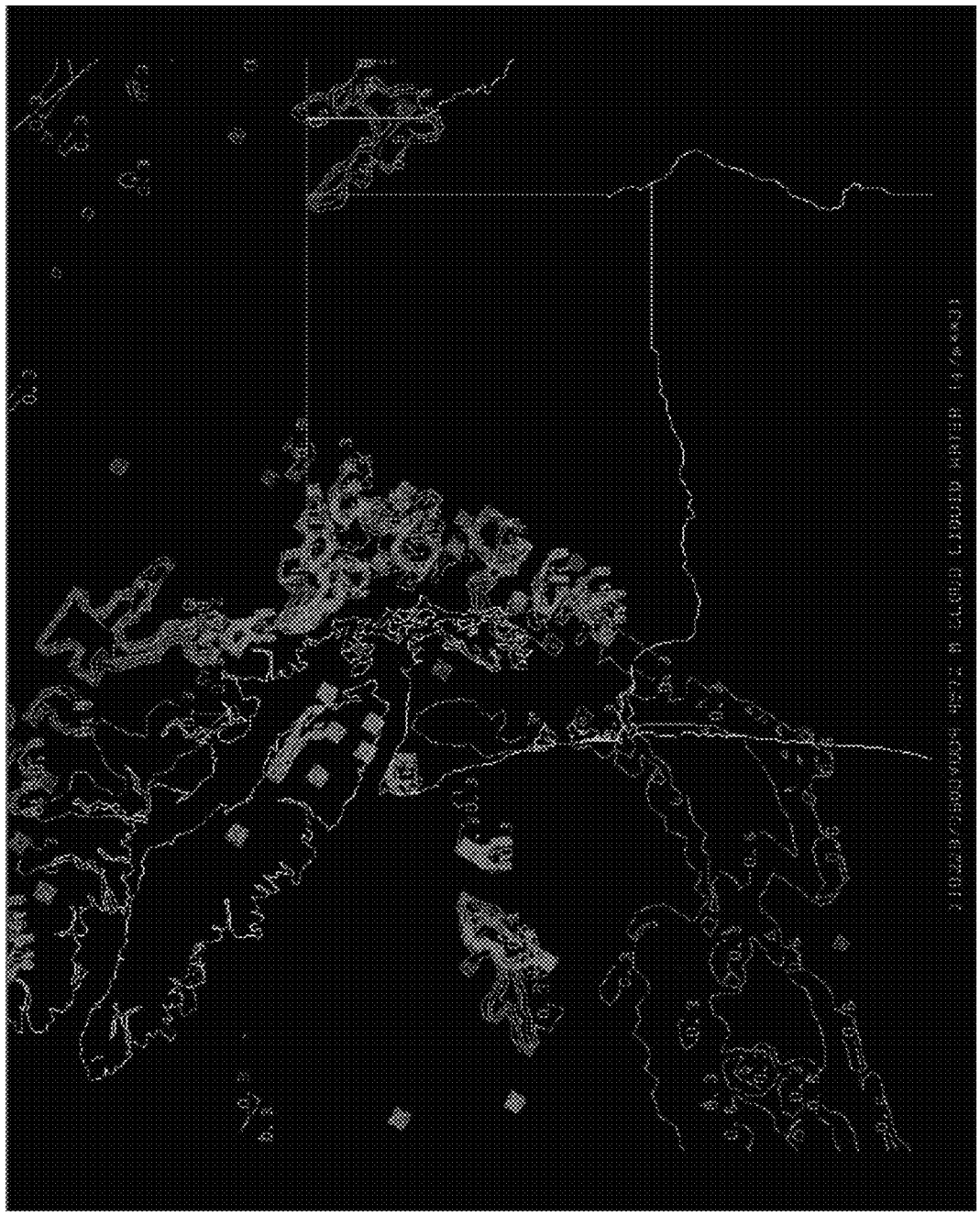

FIG. 11 shows one example of cloud liquid water forecast 801 at FL150, as computed by the DATCM using the data of FIG. 10.

Figure 12:
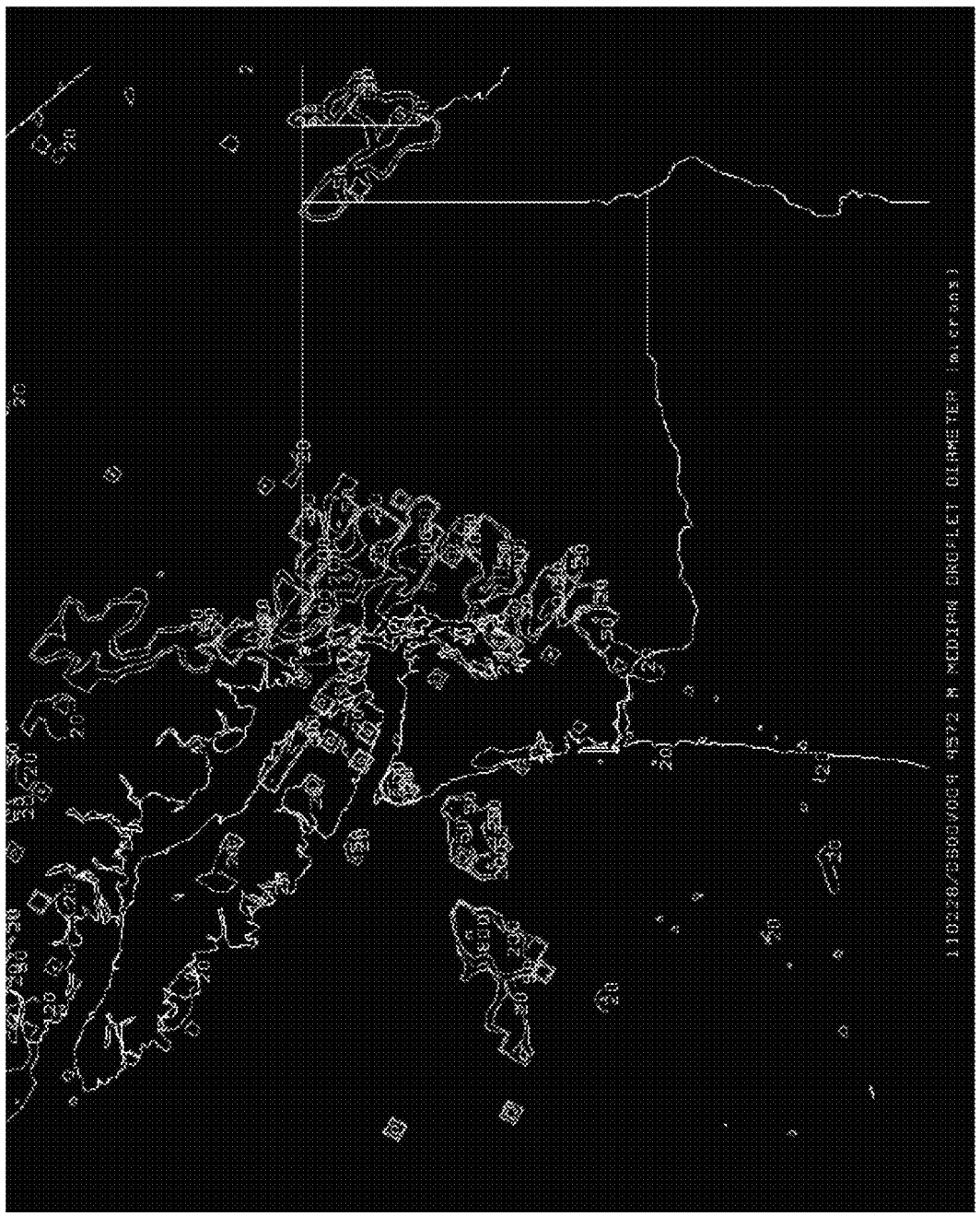

FIG. 12 shows one example of a median droplet diameter forecast 901 at FL150, as computed by the DATCM using the data of FIG. 10.

Figure 13:
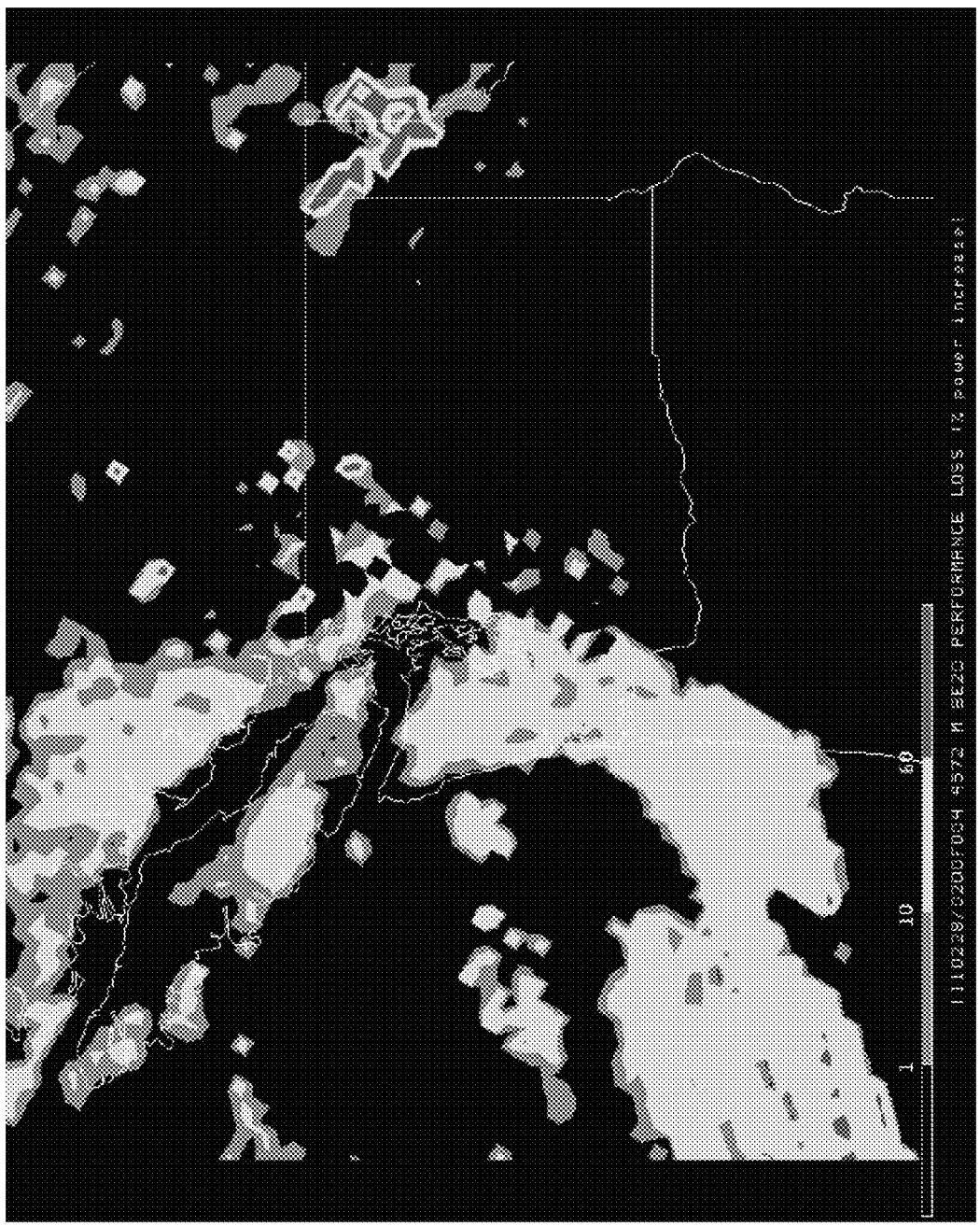

FIG. 13 shows one example of a color-coded PPI map grid overlay 1301 as calculated and generated by the DATCM for the Beechcraft Super King 200 aircraft, if it were to fly in the icing conditions described in FIGS. 10-12. In this example, PPI is the percent power increase necessary to overcome performance loss after five minutes exposure to the shown icing conditions, where black indicates less than 1% PPI, green indicates less than 10% PPI, yellow indicates less than 60% PPI, and red indicates greater than 60% PPI.

Figure 14:
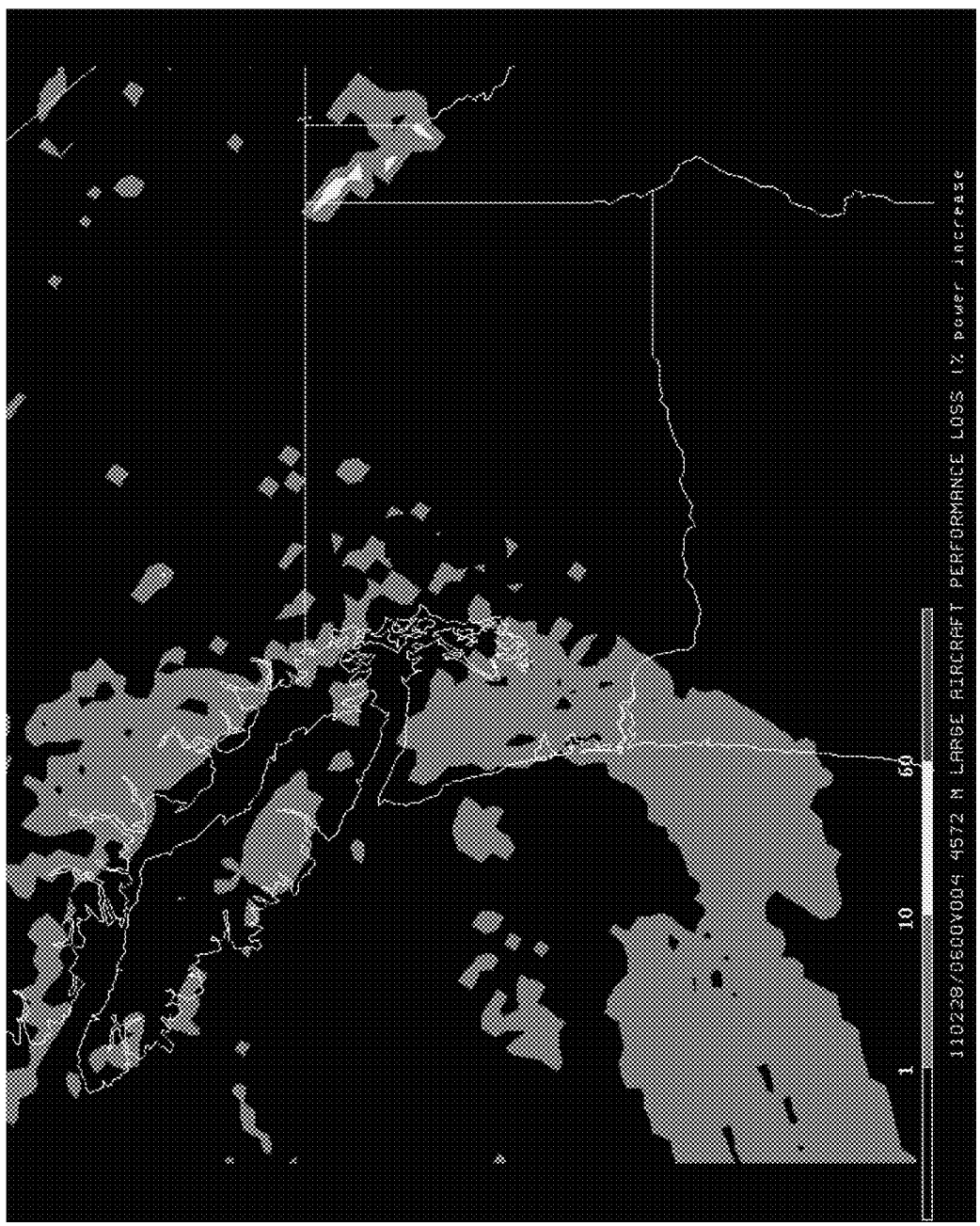

FIG. 14 shows one example of a color-coded PPI map grid overlay 1401 as calculated and generated by the DATCM for a larger aircraft than was shown in FIG. 13, if it were to fly in the icing conditions described in FIGS. 10-12. In this example, PPI is the percent power increase necessary to overcome performance loss after five minutes exposure to the shown icing conditions, where black indicates less than 1% PPI, green indicates less than 10% PPI, yellow indicates less than 60% PPI, and red indicates greater than 60% PPI.

In some embodiments, the DATCM server may issue PHP/SQL commands to query a database table (such as FIG. 46, Profile 4619c) for profile data. An example profile data query, substantially in the form of PHP/SQL commands, is provided below:

```
<?PHP
header('Content-Type: text/plain');
// access database server
mysql_connect("254.93.179.112",$DBserver,$password);
// select database table to search
mysql_select_db("DATCM_DB.SQL");
//create query
$query = "SELECT field1 field2 field3 FROM ProfileTable WHERE user
    LIKE '%' $prof";
// perform the search query
$result = mysql_query($query);
// close database access
mysql_close("DATCM_DB.SQL");
?>
```

The DATCM server may store the profile data in a DATCM database. For example, the DATCM server may issue PHP/SQL commands to store the data to a database table (such as FIG. 46, Profile 4619c). An example profile data store command, substantially in the form of PHP/SQL commands, is provided below:

```
<?PHP
header('Content-Type: text/plain');
// access database server
mysql_connect("254.92.185.103",$DBserver,$password);
// select database to append
mysql_select("DATCM_DB.SQL");
// add data to table in database
mysql_query("INSERT INTO ProfileTable
    (fieldname1, fieldname2, fieldname3)
    VALUES ($fieldvar1, $fieldvar2, $fieldvar3)");
// close connection to database
mysql_close("DATCM_DB.SQL");
?>
```

Various embodiments of the DATCM may be used to provide real-time, pre-flight and/or in-flight icing reporting, planning and response. The integrated, unified icing system provided by the DATCM may be used in flight equipment and/or ground equipment. The DATCM may provide weather/aviation decision support (e.g., via graphical displays) and/or provide alerts/triggers. Although it is discussed in terms of re-routing in time of increased icing, in some embodiments, the DATCM may identify more efficient paths based on real-time updates where there is decreased icing over a shorter physical distance, and may update a flight plan accordingly. The DATCM identifies 4D areas for flight hazards, and a user may choose or set their profile based on particular hazards (e.g., a passenger airline would have a different hazard/icing profile than an air freight company, and a large airliner would have a different profile from a small plane or helicopter). Various cost calculations and risk calculations may also be used in determining alerts and/or flight paths. In some embodiments, real-time feedback may come from plane-mounted instrument sensors and provide updates to predicted icing. Such information may be used to refine mechanisms for icing determination. Although examples were discussed in the context of jet airliners, it is to be understood that the DATCM may be utilized for low-level services, such as helicopters, unmanned aerial vehicles, as well as high speed and/or military aircraft, and may even have potential ground applications, especially in mountainous terrain. The DATCM may work with air traffic control, particularly in management of routing. In some embodiments, the DATCM may receive input from and render output directly to avionics systems to guide planes.

Many pilots view aircraft icing as one of the most dangerous in-flight hazards. Prior to the DATCM, icing forecasts have been one-size-fits-all. Different aircraft accumulate ice differently even in the same meteorological environment, and thus a generic icing forecast may not be useful to a pilot. The DATCM addresses this situation by providing a universal and objective quantitative metric for aircraft performance loss and applying it to ice accumulation for specific airfoils. In some embodiments, an icing component, module or program, such as NASA LEWICE, may be used to generate the accumulations and a computational fluid dynamics (CFD) component, module or program to analyze the resulting performance losses, and the DATCM generates aircraft-specific icing forecasts.

In some embodiments, ice accumulation on aircraft surfaces may depend on many aerodynamic (e.g., body shape, body size, angle attack, exposure time, and flight speed) and meteorological variables (e.g., air temperature, liquid water content (LWC), and median volume droplet (MVD) size). In some embodiments, the DATCM, utilizing one or more various thermodynamic analysis (TdA) components, modules, and/or programs (e.g., LEWICE 3.2.2 software) may evaluate the thermodynamics of supercooled droplets as they impinge on a body given aerodynamic, flight, and atmospheric inputs and compute the resulting ice shape(s). Using computation fluid dynamics (CFD) component(s), the DATCM may analyze aerodynamic performance changes. In some embodiments, a CFD component may solve equations of motion for the resulting airflow. In some embodiments, the Percent Power Increase (PPI) metric may be determined and/or computed from CFD results, providing an elegant way to quantify the post-icing performance change. For additional detail, see McCann, D. W. and P. R. Kennedy, 2000: Percent power increase. Proc. $9^{th}$ Conf. on Aviation, Range, and Aerospace Meteorology, Amer. Meteor. Soc., Boston Mass., 266-269, the entirety of which is hereby incorporated by reference.

For example, in some implementations, lift and drag are functions of the aircraft's speed (V)

$$\text{Lift} = C_L A \frac{\rho V^2}{2}$$

$$\text{Drag} = C_D A \frac{\rho V^2}{2}$$

where $\rho$ is the air density, A is the aircraft component's cross sectional area, and $C_L$ and $C_D$ are coefficients of lift and drag respectively. In this example, in order to maintain speed and altitude, the new thrust (power) is $$Thrust_{iced} = Thrust_{clean} \frac{C_{L:\ clean}}{C_{L:\ iced}} \frac{C_{D:\ iced}}{C_{D:\ clean}}$$

where the subscripts clean and iced indicate conditions before and after ice accumulation. Thus $$PPI \times 0.1 = \frac{Thrust_{iced}}{Thrust_{clean}} - 1 = \frac{C_{L:\ clean}}{C_{L:\ iced}} \frac{C_{D:\ iced}}{C_{D:\ clean}} - 1$$

In some implementations of the DATCM, this elegant relationship may be utilized to determine performance loss with ice accumulation on any airfoil. For example, FIGS. 15 and 16 show ice accumulation and resulting PPI values on a Beechcraft King Air airfoil and a Boeing 737 airfoil, respectively. FIG. 15 shows ice (red) accumulation, e.g., 1501, on a Beechcraft King Air airfoil using the inputs, e.g., 1502, in the figure. The resulting performance change is also shown, e.g., 1503. FIG. 16 shows ice (red) accumulation, e.g., 1601, on a Boeing 737 airfoil using the inputs, e.g., 1602, in the figure. The resulting performance change is also shown, e.g., 1603.

In some embodiments of the DATCM, aircraft-specific icing forecasting may be a two element process. The DATCM creates numerous ice accumulation simulations modifying the meteorological variables for each aerodynamic configuration. The combinations of air temperature, LWC, and MVD are may be limited by choosing representative values for each variable. For example, supercooled liquid water exists only in a finite range of air temperatures (0 C to −40 C). With temperatures less than about −20 C ice shapes are similar because supercooled drops freeze quickly. Similarly, cloud liquid water amounts rarely exceed 2 g m$^{-3}$. While most icing occurs with small droplet sizes, supercooled large drops pose a significant icing threat, so the DATCM may test ice shapes over a fairly large droplet size range. Properly implementated parameters provide significant ranges of variables to analyze. The DATCM may select/receive representative values to ensure sufficient granularity yet limit the time necessary to create a PPI profile or determine a PPI value given a particular input set. A TdA component may create an ice shape for the chosen meteorological and aerodynamic configuration. In some implementations, a CFD component may analyze the resulting ice shape for the airfoil's performance. Various implementations may do hundreds or thousands of iterations to converge on a suitable solution. The DATCM may be configured to create PPI profiles for as many aircraft as desired, or even for every available aircraft. Initially, PPI profiles may be generated for popular aircraft, both in terms of ownership and in terms of airfoil shapes and sizes used by manufacturers.

In some embodiments, aircraft-specific icing forecasts can be implemented with any forecast of air temperature, LWC, and MVD. Forecast air temperature may be determined or computed by numerical weather forecast (NWF) components or mechanisms. For example, a VVICE module may be utilized that post-processes any numerical mechanism for the LWC and MVD. The VVICE module parameterizes vertical motions then uses straight-forward cloud physics relationships to create the cloud parameters (additional detail may be found in McCann, D. W., 2006: Parameterizing convective vertical motions for aircraft icing forecasts. Proc. 12$^{th}$ Conf. on Aviation, Range, and Aerospace Meteorology, Amer. Meteor. Soc., Boston Mass., the entirety of which is hereby incorporated by reference).

In some embodiments, to produce an aircraft-specific forecast, the DATCM makes a three-dimensional lookup table for every aircraft type for which a PPI profile was created. A user may specify an aircraft type, and the DATCM interpolates the appropriate PPI profile table at every grid point, horizontally, vertically, and in time. If the selected aircraft type is not in the DATCM database, the DATCM may be configured with relatively more flexible tables based on aircraft size. Thus, the DATCM can create horizontal maps at the user's requested altitude, cross sections along the user's requested flight path, and/or other useful displays.

By providing aircraft-specific icing forecasts, the DATCM may remove much of the ambiguity inherent in previous one-size-fits-all icing forecasts. In particular, there may be a unique situation in which a particular aircraft may be more vulnerable to icing than a traditional forecast indicates. By providing icing hazards in quantitative terms, the DATCM forecasts give more detail than previously available and pilots may utilize to the Percent Power Increase metric directly since increasing power is one of the ways a pilot can combat the effects of icing.

Moreover, by being aircraft-specific, the DATCM forecasts may create goodwill with users. Knowing the icing forecasts are tailored to their aircraft type, users can better utilize and rely on forecasts as meaningful to them. This also creates less doubt about how to interpret the forecasts.

FIG. 17 illustrates an example PPI component installation. In one embodiment, an aircraft 1701 may have installed a DATCM containing a PPI component 1702 for the determination of an instantaneous percent-power-increase value for a given input set. The PPI component may be configured, as in the current example, as an integrated hardware component containing one or more hardware logic circuits for determining a PPI value. In alternative embodiments, portions (or, in some cases, substantially all) of the PPI value determination may be performed by the DATCM utilizing software commands substituted for one or more of the PPI component integrated hardware logic circuits. An example PPI component and configuration is disclosed herein and particularly with respect to FIG. 7, FIG. 8 and FIGS. 18A-F.

In one configuration, airplane 1701 may provide an electrical signal to airfoilDesign_IN terminal 1703 representing the aircraft or airfoil design on which the PPI value determination is to be made. For example, if the current aircraft in which the PPI component is installed is a Boeing 737, the aircraft flight control software may signal a value of "101" on airfoilDesign_IN, that value representing the current aircraft type. The value "101" may be expressed as three electrical voltages ("high-low-high") across three airfoilDesign_IN hardware input pins. By utilizing three input pins, the airfoilDesign_IN input may be used to represent at least 7 different aircraft configurations (e.g., "000", "001", "010", "100", "110", "101", "111"). By way of further examples, in one embodiment "110" may represent a Beechcraft Super King 200 aircraft, "111" may represent a default medium-body airframe, etc. In alternative embodiments, additional hardware input pins or other serial communication input may be utilized to allow the PPI component to determine instantaneous PPI values for a limitless number of aircraft and/or airfoil designs.

In one embodiment, aircraft 1701 may provide the PPI component 1702 with input, using currentCWTR_IN terminal 1704, representing the current atmospheric water droplet density. The value provided may be electrical signals representing an integer value. For example, if the aircraft water density sensor determines that the current water density about the aircraft is 0.002, the aircraft may signal the integer value of "2" (representing 0.002*1000) to currentCWTR_IN. In one embodiment, the value "2" may be represented as a 16-bit value (e.g., "0000 0000 0000 0010") signaled as 16 high-or-low voltages across an equivalent number of hardware input pins. Additionally, airplane 1701 may similarly signal a current ambient temperature value for the temperature about the plane to PPI input currentTemperature_IN terminal 1705.

As disclosed herein, the PPI component configuration discussed with respect to FIG. 17 may be utilized to determine an instantaneous PPI value for a current airframe and ambient condition inputs. However, other PPI component configurations may be utilized in association with the other embodiments of the DATCM discussed herein. For example, if the PPI component is configured to provide a PPI value for a point in space an aircraft will encounter after 10-minutes of further flight time (e.g., a future point/time), then the values provided to currentCWTR_IN and currentTemperature_IN may be estimated values for that time/location. In further embodiments, the discrete PPI value determinations by the PPI component may be utilized to perform an optimized flight-path determination. For example, the PPI component may be repeatedly utilized to determine PPI values for all points in a 3-D space. In an alternate embodiment, the PPI component may have multiple input/output terminals and/or accept an array of inputs and provide an array of outputs on one or more input/output terminals. As such, the PPI component embodiment described herein may be utilized with the other components of the DATCM to perform any or all of the embodiments of the DATCM described herein.

Additionally, it should be noted that the signal inputs/outputs disclosed herein are representative of example PPI component inputs/outputs. For example, a PPI input for aircraft type may be represented as a single aircraft designator, an airfoil designator, an aircraft airfoil configuration (e.g., a representation of airfoil geometry such as, for example, a height and angle of curvature), a default designator (e.g., "medium aircraft"), and/or the like. Further, the percent-power-increase output value determination may be made by the PPI component on the basis of inputs other than those illustrated herein without departing from the disclosure. For example, the PPI component may utilize the instantaneous or expected aircraft altitude in lieu of temperature, may utilize a cloud density forecast in lieu of water droplet density, and/or the like.

FIG. 18A shows an example PPI hardware component. In one embodiment, an aircraft flight planning system and/or the like may provide electrical inputs to the PPI component. Thereafter, the one or more electrical inputs may be processed by the logic circuits (for example, integrated ASIC's, FPGA's, and/or the like) to produce a percent-power-increase value representing the PPI for the given aircraft and input parameters. In one embodiment, the flight planning system may provide an atmospheric water droplet density value currentCWTR_IN 1801*a*, an airfoil or aircraft design or state value airfoilDesign_IN 1801*b*, a temperature value currentTemperature_IN 1801*c*, and/or the like and receive as output electrical signals representing a determined PPI value, e.g., ppi_OUT 1801*g*.

In one embodiment, the atmospheric water droplet density is provided to a ppi_ivertical PPI sub-component 1801*d*, which is described herein with respect to FIG. 18C and the temperature value is provided to a ppi_ihorizontal PPI sub-component 1801*e*, which is described herein with respect to FIG. 18B. In one embodiment, the output from both the ppi_ivertical and ppi_ihorizontal PPI sub-components as well as one or more of the original input signals are provided to a ppi_apl PPI sub-component 1801*f*, which is described herein with respect to FIG. 18D. In one embodiment, the ppi_apl PPI sub-component may provide a calculated PPI value to the PPI component, which may be output on ppi_OUT terminal 1801*g*.

In one embodiment, a PPI hardware component, represented substantially in the form of VHDL hardware description statements suitable for configuring an FPGA to operate as an integrated hardware logic circuit performing the features described herein, is:

```
library IEEE;
use IEEE.STD_LOGIC_1164.ALL;
use IEEE.NUMERIC_STD.ALL;
entity PPI_Component is
    Port (  airfoilDesign_IN : in STD_LOGIC_VECTOR(2 downto 0);
            currentCWTR_IN : in STD_LOGIC_VECTOR(15 downto 0);
            currentTemperature_IN : in STD_LOGIC_VECTOR(15 downto 0);
            ppi_OUT : out STD_LOGIC_VECTOR(15 downto 0)
        );
end PPI_Component;
architecture PPI of PPI_Component is
--sub-component to determine vertical (icol) offset
--assumes cwtr values are multiplied by 1,000 (so .001 is input as "1")
component ppi_ivertical is
    port(cwtr : in signed;
                ivert : inout integer;
                c : inout signed;
                oc : inout signed
        );
end component;
signal ivert : integer;
signal c, oc : signed(15 downto 0);
--sub-component to determine horizontal (irow) offset
--assumes temp is inverse of value input
--(so −32deg is input as "32")
component ppi_ihorizontal is
    port(temperature : in signed;
                ihoriz : inout integer;
                r : inout signed;
                orv : inout signed
        );
end component;
```

```
signal ihoriz : integer;
signal r, orv : signed(15 downto 0);
--sub-component to determine customized airframe PPI
component ppi_apl is
      port (     temperature : in signed;
                 airfoilDesign : in signed;
                 ihoriz : integer;
                 ivert : integer;
                 c : in signed;
                 oc : in signed;
                 r : in signed;
                 orv : in signed;
                 aplv : inout signed
      );
end component;
signal aplv : signed(15 downto 0);
begin
   --sub-components
   CPNT_ppi_ivertical : ppi_ivertical port
       map (signed(currentCWTR_IN),ivert,c,oc);
   CPNT_ppi_ihorizontal : ppi_ihorizontal port
       map (signed(currentTemperature_IN),ihoriz,r,orv);
   CPNT_ppi_apl : ppi_apl_port
       map (signed(currentTemperature_IN),
       signed(airfoilDesign_IN),ihoriz,ivert,c,oc,r,orv,aplv);
   --output PPI
   process(airfoilDesign_IN)
   begin
      ppi_OUT <= std_logic_vector(aplv);
   end process;
end PPI;
```

FIG. 18B represents a ppi_ihorizontal PPI sub-component. The sub-component takes input temperature 1802b and outputs a horizontal offset value for PPI determination, e.g., 1802a and one or more coefficient values for use by the ppi_apl PPI sub-component, e.g., 1802c, 1802d. Within the ppi_ihorizontal sub-component, the input value signal crosses a plurality of logic gates as represented herein and described below. In one embodiment, a ppi_ihorizontal PPI sub-component, represented substantially in the form of VHDL hardware description statements suitable for configuring an FPGA to operate as an integrated hardware logic circuit performing the features described herein, is:

```
library IEEE;
use IEEE.STD_LOGIC_1164.ALL;
use IEEE.NUMERIC_STD.ALL;
entity ppi_ihorizontal is
    Port ( temperature : in signed;
           ihoriz : inout integer;
           r : inout signed;
           orv : inout signed
         );
end ppi_ihorizontal;
architecture Behavioral of ppi_ihorizontal is
begin
   process(temperature)
   begin
      if (temperature > to_signed(2,16)) then
         ihoriz <= 1;
         r <= resize(temperature / to_signed(2,16),16);
      else
         if (temperature > to_signed(4,16)) then
            ihoriz <= 1;
            r <= resize((temperature −
                to_signed(2,16)) / to_signed(2,16),16);
            orv <= to_signed(1,16) − r;
         else
            ihoriz <= to_integer((signed(temperature) / to_signed(4,16)));
            r <= to_signed(0,16);
            orv <= to_signed(1,16);
         end if;
```

```
      end if;
   end process;
end Behavioral;
```

FIG. 18C represents a ppi_ivertical PPI sub-component. The sub-component takes input atmospheric water droplet density 1803a and outputs a vertical offset value for PPI determination, e.g., 1803d and one or more coefficient values for use by the ppi_apl PPI sub-component, e.g., 1803b, 1803c. Within the ppi_ivertical sub-component, the input value signal crosses a plurality of logic gates as represented herein and described below. In one embodiment, a ppi_ivertical PPI sub-component, represented substantially in the form of VHDL hardware description statements suitable for configuring an FPGA to operate as an integrated hardware logic circuit performing the features described herein, is:

```
library IEEE;
use IEEE.STD_LOGIC_1164.ALL;
use IEEE.NUMERIC_STD.ALL;
entity ppi_ivertical is
    Port ( cwtr : in signed;
           ivert : inout integer;
           c : inout signed;
           oc : inout signed
         );
end ppi_ivertical;
architecture Behavioral of ppi_ivertical is
signal rcol : signed(15 downto 0);
begin
   process(cwtr)
   begin
      if (cwtr <= to_signed(1,16)) then
         rcol <= resize(cwtr * to_signed(10,16),16);
         ivert <= to_integer(rcol);
         c <= rcol − ivert;
         oc <= to_signed(1,16) − c;
```

```
        else
            if (cwtr <= to_signed(2,16)) then
                rcol <= resize(to_signed(10,16) +
                    ((cwtr - to_signed(1,16)) * to_signed(4,16)),16);
                ivert <= to_integer(rcol);
            else
                ivert <= 14;
            end if;
        end if;
    end process;
end Behavioral;
```

FIG. 18D represents a ppi_apl PPI sub-component. The sub-component takes inputs airfoil design, temperature, and the output from ppi_ihorizontal and ppi_ivertical, e.g., 1804a, and provides output representing an instantaneous PPI value, e.g., 1804e. Within the ppi_apl sub-component, the input value signal crosses a plurality of logic gates as represented herein and described below and which may route the inputs to one or more of a plurality of airframe specific customization modules, e.g., airFrame_boeing747 1804b, airFrame_defaultMed 1804c, airframe_bCKingAir 1804d. An example airframe specific customization module is described herein with respect to FIGS. 18E-F. Although three airframe customization modules have been illustrated herein, other embodiments may contain only one airframe customization module (e.g., in the case of a "hard" installation that will only be used with respect to one airframe). Furthermore, in other embodiments the airframe customization modules may be provided as a "snap in" module that may be connected to the PPI component after manufacture. In still other embodiments, the airframe customization module's capabilities may be performed by a local data/logic store (such as, for example, that disclosed with respect to FIG. 46), a remote data/logic store (for example, by transmitting an in-flight wireless signal to a remote airframe customization module configured to respond to remote queries), or via a specially configured general purpose computing platform (such as, for example, that disclosed herein and particularly with respect to FIG. 4 and FIG. 5, which describe alternate PPI component configurations). In one embodiment, a ppi_apl PPI sub-component, represented substantially in the form of VHDL hardware description statements suitable for configuring an FPGA to operate as an integrated hardware logic circuit performing the features described herein, is:

```
library IEEE;
use IEEE.STD_LOGIC_1164.ALL;
use IEEE.NUMERIC_STD.ALL;
entity ppi_apl is
    Port (  temperature : in signed;
            airfoilDesign : in signed;
            ihoriz : in integer;
            ivert : in integer;
            c : in signed;
            oc : in signed;
            r : in signed;
            orv : in signed;
            aplv : inout signed
        );
end ppi_apl;
architecture Behavioral of ppi_apl is
component airFrame_bCKingAir is
    port(   temperature : in signed;
            ihoriz : in integer;
            ivert : in integer;
            airFrame_val : inout signed
        );
end component;
signal airFrame_bCKingAir_val : signed(15 downto 0);
component airFrame_boeing747 is
    port(   temperature : in signed;
            ihoriz : in integer;
            ivert : in integer;
            airFrame_val : inout signed
        );
end component;
signal airFrame_boeing747_val : signed(15 downto 0);
component airFrame_defaultMed is
    port(   temperature : in signed;
            ihoriz : in integer;
            ivert : in integer;
            airFrame_val : inout signed
        );
end component;
signal airFrame_defaultMed_val : signed(15 downto 0);
begin
    --airframe customization modules
    CPNT_airFrame_bCKingAir : airFrame_bCKingAir port
        map (temperature,ihoriz,ivert,airFrame_bCKingAir_val);
    CPNT_airFrame_boeing747 : airFrame_boeing747 port
        map (temperature,ihoriz,ivert,airFrame_boeing747_val);
    CPNT_airFrame_defaultMed : airFrame_defaultMed port
        map (temperature,ihoriz,ivert,airFrame_defaultMed_val);
    process(ihoriz, ivert, c, oc, r, orv)
    begin
        if (airfoilDesign = 1) then
            aplv <= resize(airFrame_bCKingAir_val * r,16);
        else
            if (airfoilDesign = 2) then
                aplv <= resize(airFrame_boeing747_val * orv,16);
            else
                aplv <= resize(airFrame_defaultMed_val,16);
            end if;
        end if;
    end process;
end Behavioral;
```

FIG. 18E represents a PPI sub-component aircraft customization module. The aircraft customization module takes as input horizontal/vertical offset values, e.g., 1805a, 1805b, and temperature 1805c and outputs an airframe customization value 1805e for use in determining airframe specific PPI. Within the sub-component, the input value signal crosses a plurality of logic gates as represented herein and described below. Furthermore, the aircraft customization module may contain non-volatile memory such as ROMs 1805d for storing airframe specific customization parameters. The aircraft customization module represented herein is for a Beechcraft Super King 200 aircraft. However, similarly configured customization modules may be used for other aircraft or airframes. In one embodiment, a PPI sub-component aircraft customization module, represented substantially in the form of VHDL hardware description statements suitable for configuring an FPGA to operate as an integrated hardware logic circuit performing the features described herein, is:

```
library IEEE;
use IEEE.STD_LOGIC_1164.ALL;
use IEEE.NUMERIC_STD.ALL;
entity airFrame_bCKingAir is
    Port ( temperature : in signed;
            ihoriz : in integer;
            ivert : in integer;
            airFrame_val : inout signed
        );
end airFrame_bCKingAir;
architecture Behavioral of airFrame_bCKingAir is
--airfoil customization params
```

-continued

```
type airfoilDesignParams is array (1 to 10, 1 to 7) of integer;
shared variable airfoil_p1: airfoilDesignParams :=(
    (0,0,0,0,0,0,0),
    (62,110,160,164,172,176,184),
    (31,62,157,228,369,440,448),
    (21,42,83,117,289,376,548),
    (16,31,62,78,156,250,438),
    (12,25,50,62,88,100,297),
    (10,21,42,52,73,83,141),
    (8,18,36,45,62,71,89),
    (8,16,31,39,55,62,78),
    (7,14,28,35,49,56,69)
);
shared variable airfoil_p2: airfoilDesignParams :=(
    (0,0,0,0,0,0,0),
    (188,196,200,208,212,220,224),
    (452,460,464,472,476,484,488),
    (634,724,728,736,740,748,752),
    (531,719,812,1000,1004,1012,1016),
    (395,592,690,887,985,1182,1280),
    (242,445,546,749,851,1053,1154),
    (98,286,390,597,701,908,1011),
    (86,121,226,437,542,752,850),
    (76,90,97,270,377,590,696)
);
signal INT_ihoriz, INT_ivert : integer :=0;
begin
  process(ihoriz, ivert)
  begin
    --determine horiz and vert offset values
    if (temperature > to_signed(2,16)) then
       INT_ihoriz <= ihoriz;
       INT_ivert <= ivert + 1;
    else
       INT_ihoriz <= ihoriz + 1;
       INT_ivert <= ivert;
    end if;
    --return correct offset value
    if (INT_ivert <= 7) then
       airFrame_val <= to_signed(airfoil_p1(INT_ihoriz,
           INT_ivert),16);
    else
       airFrame_val <= to_signed(airfoil_p2(INT_ihoriz,
           INT_ivert-7),16);
    end if;
  end process;
end Behavioral;
```

FIG. 18F is an alternate representation of the Beechcraft Super King 200 airframe customization module described with respect to FIG. 18E. However, in this representation each of the internal input wires carrying component signals representing the input values have been broken out to further the reader's understanding. For example, the input for temperature has been represented herein as 16 wires each capable of providing a single "1" or "0" (e.g., high/low voltage) input. The aircraft customization module takes as input horizontal/vertical offset values, e.g., 1806a, 1806b, and temperature 1806c, utilizes the described logic gates and ROMs 1806d, and outputs an airframe customization value 1806e for use in determining airframe specific PPI, as further described herein and particularly above with respect to FIG. 18E.

FIG. 19A provides an example logic flow for aspects of a real-time flight alerting and planning component for one embodiment of the DATCM. As discussed in greater detail below, the DATCM may provide a variety of flight planning and/or flight following tools. Additionally or alternatively, the DATCM may provide flight plan adjustments/modifications and/or alerts if weather/turbulence determinations change, for example, if an airplane were on a particular course that, based on real-time turbulence determinations, had become potentially dangerous. The DATCM can also provide enhanced granularity for all flight-level altitudes in order to identify the optimal path for avoiding hazards, and/or choosing the least dangerous hazard to encounter.

As shown in FIG. 19A, the DATCM alerting component receives (and/or retrieves via response to a database query) current aircraft position 1902 (e.g., flight profile data 1900 from a flight profile database), and may also receive the previously predicted turbulence for that route (or for an anticipated route if the actual flight plan is not provided). The DATCM then determines real-time turbulence for the planned route 1904 and compares the predicted turbulence to the real-time turbulence 1906. If the newly determined real-time turbulence does not deviate notably 1908 from the previously predicted/anticipated turbulence, then the process cycles, e.g., for a certain period (1 min, 2 min, 5 min, 10 min, etc.) or for some other measure such as location of one or more aircraft, weather events, and/or the like. If the newly determined real-time turbulence is a notable deviation or significant difference from the previously predicted turbulence 1908, then the turbulence is updated 1910 and the process continues. Note that the threshold difference or deviation may be set by the DATCM or DATCM user/subscriber, and in some embodiments may be any numerical change, while in other embodiments may be a change or certain magnitude or percentage.

When the turbulence is updated, the DATCM determines if there is a known or determinable turbulence threshold 1912 for the flight/aircraft. For example, a commercial passenger aircraft that subscribes to the DATCM may have set a particular turbulence threshold in the profile, reflecting that passenger aircraft may wish to avoid significant turbulence for safety and comfort reasons, while a cargo aircraft may have a much higher threshold and be willing to undertake more turbulence to save time and/or money. The threshold may also be predicted/determined based on the airframe and/or airfoil type, the user, the flight plan, fuel resources, alternative routes, etc. For flights/aircraft that the turbulence threshold either is not known or is not determinable 1912, the DATCM may have a default (i.e., safety) threshold 1914, and if that default threshold is exceeded 1914, may issue an alert or notification 1920 to the aircraft (and/or ground control).

If the flight turbulence threshold is known 1912 (i.e., the flight has a subscription or is otherwise registered with the DATCM), the DATCM determines whether the turbulence exceeds the specified threshold 1916, and if so, determines if the flight's route can be adjusted or updated 1918 by the DATCM (e.g., using the flight path component discussed in greater detail later with regard to FIG. 20 and FIG. 21) to find the optimal path based on the desired turbulence profile/threshold and various flight parameters, such as fuel reserves, destination, aircraft type, etc. If the DATCM is unable or not configured to provide an alternative or adjusted flight plan 1918, an alert or notification 1920 is generated/issued. If the DATCM can adjust or update the flight's route 1918, the adjusted/modified route is determined 1922 and the flight plan is adjusted accordingly 1924, and updated 1900. Note that, in some embodiments, an adjusted or modified flight plan (or a selection of plans) may be provided for approval or selection 1922a.

The term "turbulence" as a haphazard secondary motion caused by the eddies of a fluid system has often been treated as a singular event in casual connotation, caused by passage through an entropic weather system or by proximity to shifting air flow patterns. This definition is commonly perpetuated by many turbulence forecast platforms that focus on a specific type of turbulence, such as CAT, without accounting for additional turbulence factors, nor how multi-hazards conflagrate into not just a series of turbulence events, but an enhanced system which continues to flux. In FIG. 19B, wind 1952, thunderstorms 1954, and gravity waves 1953 (the interaction of media, such as the ocean and the atmosphere caused by energy transfer, on which gravity acts as a restoring force) can all be turbulence contributors to a region of three-dimensional space over a specified time. An aircraft 1951 traveling through this region may experience multiple turbulence hazards 1955. A turbulence forecast display that indicates only CAT with gravity wave interference may display a low hazard area into which an aircraft may be moving. Similarly a weather prediction display may also fail to factor in the additional risk of CAT. In one embodiment of the disclosed DATCM, a CAT calculation component producing color-coded terminal display of turbulence hazard over a specified area (where clear may indicate no turbulence, green may indicate low turbulence hazard, yellow may indicate medium turbulence hazard, and red may indicate high turbulence hazard) 1956 may be integrated mathematically with a mountain wave forecasting component which produces a similar color-coded terminal display 1957, resulting in an integrated display where the resulting hazard matrix 1958 may not be an overlay of the individual turbulence predictions, but an enhanced turbulence forecast where individual areas of low or no hazard turbulence may now indicated high hazard turbulence 1959. In some embodiments, multiple turbulence overlay displays may be available showing individuated turbulence forecasts without enhancement. In some embodiments of the disclosure, only enhanced turbulence forecast displays may be available. In some embodiments of the disclosure, users may be able to switch between individuated turbulence forecasts and enhanced turbulence forecasts.

In some embodiments, the DATCM transforms atmospheric and terrain data, via DATCM components, into comprehensive four-dimensional turbulence displays and interfaces. In one implementation, the DATCM comprises a processor and a memory disposed in communication with the processor and storing processor-issuable instructions to determine a plurality of four-dimensional grid points for a specified temporal geographic space-time area and obtain corresponding terrain and atmospheric data. Then, for each point of the plurality of four-dimensional grid point, the DATCM determines a non-dimensional mountain wave amplitude and mountain top wave drag, an upper level non-dimensional gravity wave amplitude, and a buoyant turbulent kinetic energy. The DATCM may also determine a boundary layer eddy dissipation rate, storm velocity and eddy dissipation rate from updrafts, maximum updraft speed at grid point equilibrium level, storm divergence while the updraft speed is above the equilibrium level and identifying storm top, storm overshoot and storm drag. The DATCM determines Doppler speed, eddy dissipation rate above the storm top, eddy dissipation rate from downdrafts. Then, the DATCM determines the turbulent kinetic energy and/or the total eddy dissipation rate for each grid point and provides a four-dimensional grid map overlay with comprehensive turbulence data for the specified temporal geographic space-time area.

In some embodiments of the disclosure, the DATCM 2001 may be available to aircraft 2002, air traffic controllers 2003, flight planning tools and software 2017, third party applications 2005 where turbulence feed incorporation is contributing, and the like. FIG. 20 illustrates that in some embodiments of the disclosure, PIREPS and sensor data of aircraft in real-time turbulence conditions 2004 may send data to the DATCM to be incorporated into the DATCM aggregate data analysis. Similarly, in some embodiments of the disclosure, additional/other sources of input may be weather stations 2020, satellites 2021 and/or other sources/sensors, which may provide radar data, lightning data, satellite data, and/or numerical weather forecast data 2006 to the DATCM. In some embodiments of the DATCM, additional/other sources of input may be topological data 2018 which may provide terrain characteristic data 2005a to the DATCM. In some embodiments of the DATCM, the receipt of this input may occur prior to requests to the DATCM for turbulence forecasting. In some embodiments of the DATCM, the receipt of this input may be ongoing during requests to the DATCM for dynamic turbulence forecasting and/or nowcasting. In some embodiments of the DATCM, receipts of input may be both before requests to the DATCM for turbulence forecasting and ongoing during forecasting requests and nowcasting. In some embodiments, an aircraft 2002 may request (near) real-time localized turbulence data 2007, an air traffic control system 2003 may request predictive regional turbulence data as an updating feed 2009 and/or a (near) real-time regional turbulence data request 2011, a flight-planning tool or software may request predictive turbulence within a flight path region or along a flight path course 2013. In some embodiments, the DATCM may direct such requests through a turbulence Integration Mechanism component 2010 where DATCM components such as Airfoil Icing Platform (AIP) component, MWAVE component, INTTURB component, and VVTURB2 component process input into eddy dissipation rate (EDR) values and render them for terminal 2030, standard/high-definition 2031, and/or displays of the like. In some embodiments, the Integration Mechanism component 2010 may also include or utilize a VVSTORMSE component, which may be utilized in flight planning, flight following, and/or the like. In some implementations, a VVSTORMSE component may subsume and/or replace a VVTURB2 component. In some embodiments, the DATCM may return a real-time/near real-time turbulence map 2008 terminal display to an aircraft, a predictive and updating regional data feed 2012 to an air traffic controller, a predictive flight path turbulence 2014 display to a flight-planning tool/software, a turbulence data feed 2015 to a third party application displaying turbulence data, and/or the like.

FIG. 21 shows an alternate embodiment of DATCM data flow in which input is gathered through like sources 2104, 2120, 2121, 2108, such as in FIG. 20 and these inputs may be stored in various current and historical databases systems 2140 which in some embodiments of the disclosure may be integrated with the DATCM. In some embodiments of the disclosure, the database systems storing turbulence input may be separate from, but accessible to, the DATCM. Similarly, in some embodiments of the disclosure, additional/other sources of input may be weather stations 2120, satellites 2121 and/or other sources/sensors, which may provide radar data, lightning data, satellite data, and/or numerical weather forecast data 2106 stored in various current and historical databases systems 2140 and/or the DATCM. Similar parties 2102, 2103, 2104, to those discussed above with reference to FIG. 20 may request data from the DATCM which may access the database systems for input values in addition to directing the requests through its Integration Mechanism component 2110. In some embodiments, such data is provided via data streams and/or data feeds. In some embodiments, the Integration Mechanism component 2110 may also include or utilize a VVSTORMSE component, which may be utilized in flight planning, flight following, and/or the like. As in FIG. 20, the DATCM may return these requests with turbulence forecasts in a variety of formats to requesting parties.

In FIG. 22A, one embodiment of the DATCM's integration component is put forth. Beginning with turbulence data input 2201 as derived from such sources as user application input 2201a, weather 2201b, terrain 2201c, PIREPs/aircraft sensors 2201d, and/or the like, which may provide the DATCM with four-dimensional grid points (three-dimensional space plus time), temperature, winds, humidity, topography, current turbulent conditions, historical conditions, and/or the like, the DATCM may first process the input through a mountain wave turbulence calculation component (MWAVE). The system computes the non-dimensional mountain wave amplitude (amv) 2202 and computes the mountain top wave drag 2203. The following code fragment shows one embodiment of a methodology for such processing:

```
C
C* a is the non-dimensional wave amplitude (at mountain top)
C
      a (i,m,n) = stab0*h(m,n)/spd0
      h0 (m,n) = a(i,m,n)
C
C* ddrct is the wind and mountain top wind direction difference
C
      ddrct = ABS(drct-drct0(m,n))
      IF ( (ddrct .lt. 90.0) .or. (ddrct .gt. 270.0) ) THEN
C* a above the mountain top is adjusted for stability, wind,
C* and density changes.
C
         a (i,m,n) = stab*h(m,n)/spd/COS(ddrct*DTR)*
       + SQRT(pnu0(m,n)/(pmodel*stab*spd))
      ELSE
         a (i,m,n) = 0.0
      END IF
C
C* maximum a is 2.5
C
      IF ( a(i,m,n) .gt. 2.5 ) a(i,m,n) = 2.5
C
C* Find max 'a' below h0max.
C
      IF (ll .lt. nlyrs) THEN
         amax0 = a(ll,m,n) - (zsdg(ll,m,n)-h0max)/
       + (zsdg(ll,m,n)-zsdg(ll+1,m,n))*
       + (a(ll,m,n)-a(ll+1,m,n))
         lll = ll
         DO i = ll,1,-1
            IF ( (a (i,m,n) .ne. RMISSD) and.
       +    (a(i,m,n) .gt. amax0) ) THEN
               lll = i-1
               amax0 = a(i,m,n)
            END IF
         END DO
C
C* 'a' is increased at all levels below max 'a'.
C
         DO i = lll,1,-1
            IF (a (i,m,n) .ne. RMISSD) THEN
               a (i,m,n) = amax0
               enhc (i,m,n) = 1.0
            END IF
         END DO
      END IF
C
C* Find .75 vertical wavelength (and 1.75, 2.75, 3.75).
C
      zrefl = (nn + .75)*lambda(m,n) + elv(m,n)
      ll = 1
      DO i = 1,nlyrs
         IF ( zsdg(i,m,n) .lt. zrefl ) ll = i
      END DO
      IF (ll .lt. nlyrs) THEN
         ar = a(ll,m,n) - (zsdg(ll,m,n)-zrefl)/
       + (zsdg(ll,m,n)-zsdg(ll+1,m,n))*
       + (a(ll,m,n)-a(ll+1,m,n))
C
C* Find .50 vertical wavelength (and 1.50, 2.50, 3.75).
C
         zhalf = (nn + .50)*lambda(m,n) + elv(m,n)
         lll = 1
         DO i = 1,ll
            IF ( zsdg(i,m,n) .lt. zhalf ) lll = i
         END DO
         ahalf = a(lll,m,n) - (zsdg(lll,m,n)-zhalf)/
       + (zsdg(lll,m,n)-zsdg(lll+1,m,n))*
       + (a(lll,m,n)-a(lll+1,m,n))
C
C* 'a' is increased by reflected 'a' if layered
C* favorably.
C
         IF ( ( ahalf .lt. ar ).and.( ahalf .lt. 0.85 ) )THEN
            rcoeff = (ar-ahalf)**2/(ar+ahalf)**2
            refl = rcoeff*ar
            havrfl = .true.
            DO i = ll,1,-1
               IF ( (a(i,m,n) .ne. RMISSD) .and.
       +       (havrfl) ) THEN
                  arfl = a(i,m,n) + refl
                  a (i,m,n) = arfl
                  IF ( a(i,m,n) .gt. 2.5 ) a(i,m,n) = 2.5
                  enhc (i,m,n) = 1.0
               END IF
            END DO
C
C* Compute mountain top wave drag
C
            drag (m,n) = PI/4.0*h(m,n)*pnu0(m,n)
```

In some embodiments of the DATCM, output obtained from the MWAVE calculation component may then be directed into an integrated turbulence calculation component (INTTURB), which will compute upper level non-dimensional gravity wave amplitude (âul) 2204, and sum âmv and âul into (â) to determine buoyant turbulent kinetic energy (TKEbuoy) 2205. If â is greater than 1 2206, then TKEbuoy=TKEmv+TKEul-buoy 2207. Otherwise, TKEbuoy=0 2208. If â greater than âmin 2209, then TKE=TKEul-wshr 2210. The boundary layer eddy dissipation rate (EDR) is computed 2211 and if EDRbl is greater than zero and âmv is not enhanced 2212, then the EDR=EDRbl 2213, else the EDR is the TKE1/3 2214.

The following code fragment shows one embodiment of a methodology for processing of the INTTURB calculation:

```
C* Non-dimensional L-F amplitude is square root of L-F radiation
C* divided by constant. Constant is for 20km resolution grids
C* and is proportionally scaled to resolution of current grid.
C
      ahatlf = SQRT(ABS(lfrad)/cc*gdd/20000.)
C
C* ahat is sum of lf and mw ahats
C
      ahat = ahatlf + ahatmw(i)
C
C* Maximum ahat = 2.5
C
      IF ( ahat .gt. 2.5 ) ahat = 2.5
      IF ( ahat .gt. 1.0 ) THEN
C
C* mountain wave tke is proportional to drag.
C
         tkemw = drag(i)*.0004
C
C* Reduce mw drag above this level
```

```
C
      IF ( nhnc(i) .eq. 0.0 )
         + drag(i) = drag(i)*((2.5-ahat)/1.5)
           tkebuoy = kh*(ahat-1.0)*bvsq(i) + km*wshrsq(i)
         + + tkemw
      IF (ahat .lt. 1.0) THEN tkebuoy = 0.0
      tke = km*wshrsq(i)*(1.0 + SQRT(rich)*ahat)**2
         + -kh*bvsq(i)
C
C* Compute layer stability and wind shear
C
      thtamn = ( thta + sfcthta )/2.0
      bvsq = GRAVTY*thtadf/zdf/thtamn
      udf = u - sfcu
      vdf = v - sfcv
      wshrsq = ( udf*udf + vdf*vdf )/zdf/zdf
C
C* Compute tke with equation
C
      tke = km*wshrsq - kh*bvsq
C
C* If the < 0, we've reach top of boundary layer. Set topbl = T
C
      IF ( tke .lt. 0.0 ) THEN
         edrbl = 0.0
         topbl = .true.
      ELSE
         edrbl = tke**.333
      END IF
```

In some embodiments of the DATCM, output obtained from the MWAVE and INTTURB calculation components may then be processed through a vertical velocity turbulence with perimeter turbulence integration calculation component (VVTURB2). The storm velocity is computed 2215, as is the EDR from computed updrafts 2216. The maximum updraft speed at the grid point equilibrium level (EL) is computed 2217. While the updraft speed is above the EL, the storm's divergence is calculated 2218, after which the storm top is identified 2219. Storm overshoot (the storm top minus the storm EL) and storm drag (the overshoot squared multiplied by the stability between the EL and storm up squared) are calculated 2220. The magnitude of the wind velocity minus the storm velocity is calculated (known as the Doppler speed) 2221. The EDR above the storm top is computed 2222. If there is turbulence within a set distance or radius, by way of example thirty kilometers, of the storm 2223, then the EDR near the storm is also computed 2224. Otherwise, only the EDR from downdrafts is additionally computed 2225. Finally, all EDRs computed from INTURB and VVTURB2 calculation components are summed and converted to turbulent kinetic energy (TKE) 2226.

The following code fragment shows one embodiment of a methodology for processing of the VVTURB2 calculation:

```
C
C* Compute mean wind near freezing level (estimate of
C* storm velocity)
C
      nlyrs = nlev - 1
      DO j = 1, nlyrs
         CALL ST_INCH ( INT(rlevel(j)), clvl1, iret )
         CALL ST_INCH ( INT(rlevel(j+1)), clvl2, iret )
         pbar = (rlevel(j) + rlevel(j+1))/2.0
         IF ( pbar .gt. 400. ) THEN
            glevel = clvl2//':'//clvl1
            gvcord = 'PRES'
            gfunc = 'LAV(TMPC)'
            CALL DG_GRID ( timfnd, glevel, gvcord, gfunc, pfunc, t,
            + igx, igy, time, level, ivcord, parm, iret )
            gvcord = 'PRES'
            gfunc = 'UR(VLAV(WIND))'
            CALL DG_GRID ( timfnd, glevel, gvcord, gfunc, pfunc, u,
            + igx, igy, time, level, ivcord, parm, iret )
            ierr = iret + ierr
            gvcord = 'PRES'
            gfunc = 'VR(VLAV(WIND))'
            CALL DG_GRID ( timfnd, glevel, gvcord, gfunc, pfunc, v,
            + igx, igy, time, level, ivcord, parm, iret )
C
C* Find weighted average of winds in all layers in which
C* -5C < t < 5C, weighting layer closer to 0C the highest.
C
            DO i = 1, maxpts
               tabs = ABS(t(i))
               IF ( tabs .lt. 5.0 ) THEN
                  ufrzl(i) = ufrzl(i) + (5.0 - tabs)*u(i)
                  vfrzl(i) = vfrzl(i) + (5.0 - tabs)*v(i)
                  tsum(i) = tsum(i) + (5.0 - tabs )
               END IF
            END DO
         END IF
      END DO
C* Compute edr from mean vertical velocity
C
      IF ( wmean .gt. 10.0 ) THEN
         edr (i) = (.035+.0016*(wmean-10.0))**.333
      ELSE
         edr (i) = (.0035*wmean)**.333
      END IF
      ELSE
         edr (i) = 0.0
      END IF
      IF (wwnd(i) .gt. maxvv(i)) THEN
         havtop(i) = .false.
         maxvv(i) = wwnd(i)
         el(i) = z(i)
         iii = 0
C
C* Divergence above EL is deceleration of the updraft divided by
C* thickness.
C
      ELSE IF ( .not. havtop(i) ) THEN
         divhi(i) = (vvbase(i)-wwnd(i))/tkns(i)
         bvsqtop(i) = bvsqtop(i) + bvsq(i)
         iii = iii + 1
      ELSE
         divhi(i) = 0.0
      END IF
C
C* Define storm top
C
      IF ( (maxvv(i) .gt. 1.0) .and. (wwnd(i) .lt. .1)
      + .and. (.not. havtop(i)) ) THEN
         havtop(i) = .true.
         stmtop(i) = z(i) - tkns(i)/2.0
         + - tkns(i)*vvbase(i)*vvbase(i)/wsq
         ovshoot (i) = stmtop(i) - el (i)
         IF ( iii .ne. 0 ) THEN
            bvsqtop(i) = bvsqtop(i)/iii
         ELSE
            bvsqtop(i) = 0.0
         END IF
C
C* Compute storm overshooting drag and storm top relative wind
C* (relative to freezing level wind)
C
         drag (i) = ovshoot(i)*ovshoot(i)*bvsqtop(i)
         dopu = u(i) - ufrzl(i)
         dopv = v(i) - vfrzl(i)
         dopspd = SQRT(dopu*dopu + dopv*dopv)
         pmu0(i) = dden(i)*SQRT(bvsq(i))*dopspd
         IF ( (wsq .le. 0.0) .and. havtop(i) ) THEN
            stab = SQRT(bvsq(i))
            dopu = u(i) - ufrzl(i)
            dopv = v(i) - vfrzl(i)
            dopspd = SQRT(dopu*dopu + dopv*dopv)
C
C* Compute EDR above storm top as a function of drag
C
```

```
            IF (ahat .ge. 1.0) THEN
                edrtop = (drag(i)*.0004)**.333
                edr(i) = MAX(edr(i), edrtop)
                drag(i) = drag(i)*((2.5-ahat)/1.5)
            END IF
C
C* Compute turbulence near storms if grid distance low enough.
C
        DO i = 1,maxpts
            IF (edr(i) .ne. RMISSD) THEN
                gdd = (gdx(i)+gdy(i))/2.0
                IF ( gdd .lt. 30000. .and. .not.havtop(i)) THEN
C
C* Compute tke near storm using Term 2C of L-F radiation
C* using same method as in ULTURB.
C
                    IF ( MOD(i,igx) .eq. 1 ) THEN
                        ddivdx = (divhi(i+1)-divhi(i))/gdx(i)
                    ELSE IF ( MOD(i,igx) .eq. 0 ) THEN
                        ddivdx = (divhi(i)-divhi(i-1))/gdx(i)
                    ELSE
                        ddivdx = (divhi(i+1)-divhi(i-1))/2.0/gdx(i)
                    END IF
                    IF ( i .le. igx ) THEN
                        ddivdy = (divhi(i+igx)-divhi(i))/gdy(i)
                    ELSE IF ( i .gt. (maxpts-igx) ) THEN
                        ddivdy = (divhi(i)-divhi(i-igx))/gdy(i)
                    ELSE
                        ddivdy = (divhi(i+igx)-divhi(i-igx))/2.0/gdy(i)
                    END IF
                    crsdiv = -ff(i)*(u(i)*ddivdy - v(i)*ddivdx)
                    ahat = SQRT(ABS(crsdiv)/cc)
                    IF ( ahat .gt. 2.5 ) ahat = 2.5
                    rich = bvsq(i)/wshrsq(i)
                    IF ( rich .lt. 0.0 ) rich = 0.0
                    IF ( rich .lt. 0.25 ) THEN
                        amin = 0.0
                    ELSE
                        amin = 2.0 - 1.0/SQRT(rich)
                    END IF
                    IF ( ahat .gt. 1.0 ) THEN
                        tkebuoy = kh*(ahat-1.0)*bvsq(i) + km*wshrsq(i)
                    ELSE
                        tkebuoy = 0.0
                    END IF
                    IF ( amin .ge. ahat ) THEN
                        tke = tkebuoy
                    ELSE
                        tke = km*wshrsq(i)*(1.0 + SQRT(rich)*ahat)**2
                    +        - kh*bvsq(i)
                    END IF
                    IF ( tke .lt. 0.0 ) tke = 0.0
                    edrnear = tke**.333
                    edr(i) = MAX(edr(i),edrnear)
                END IF
            END IF
        END DO
C
C* Compute downdraft velocities (a function of the windex
C and how far below the freezing level) and downdraft edr
C
        fl = 304.8
        DO WHILE ( fl .le. 6097. )
            CALL ST_INCH ( INT(fl), glevel, iret )
            gvcord = 'HGHT'
            gfunc = 'EDR+2'
            CALL DG_GRID ( timfnd, glevel, gvcord, gfunc, pfunc, edr,
        +        igx, igy, time, klevel, kvcord, parm, iret )
            DO i = 1, maxpts
                IF ( maxvv(i) .gt. 10. ) THEN
                    IF ( fl .gt. sfcz(i) ) THEN
                        wdown = windex(i)*(frzlz(i)-fl)/frzlz(i)
                        IF ( wdown .gt. 10.0 ) THEN
                            edrdown =
                                (.035+.0016*(wdown-10.0))**.333
                        ELSE IF ( wdown .gt. 0.0 ) THEN
                            edrdown = (.0035*wdown)**.333
                        ELSE
                            edrdown = 0.0
                        END IF
                        edr (i) = MAX (edr(i), edrdown)
                    END IF
                END IF
            END DO
```

The following code fragment shows an additional or alternative embodiment of enhanced code to address above-storm turbulence for some embodiments, an example image resulting for which is shown in FIG. 22B:

```
C* Compute turbulence above storm top.
C
        IF ( (wsq .le. 0.0) .and. havtop(i) ) THEN
            stab = SQRT(bvsq(i))
            dopu = u(i) - ufrzl(i)
            dopv = v(i) - vfrzl(i)
            dopspd = SQRT(dopu*dopu + dopv*dopv)
            pnu = dden(i)*stab*dopspd
            IF ( dopspd .eq. 0.0 ) THEN
                ahat = 2.5
            ELSE
                ahat = ovshoot(i)*stab/dopspd*SQRT(pnu0(i)/pnu)
            END IF
            IF (ahat .gt. 2.5) ahat = 2.5
            IF (ahat .ge. 1.0) THEN
                edrtop = (drag(i)*.0004)**.333
                edr(i) = MAX(edr(i), edrtop)
                drag(i) = drag(i)*((2.5-ahat)/1.5)
            END IF
        END IF
    END DO
C
```

FIG. 23 shows an example of how the DATCM may be incorporated into existing and/or prospect flight planning tools. The DATCM may be included with online services, with desktop services, with mobile applications, and/or the like. In this embodiment of the disclosure, a flight planning tool has an interface 2301 representative of an online flight planning service with user profile information. As an interactive element 2302, the DATCM may allow users to factor integrated turbulence prediction into flight path creation. The DATCM may allow users to consider several ways of incorporating turbulence prediction into their flight path considering their flight requirements 2303. In this example, the DATCM may offer shortest path generation where turbulence may not be a considering factor in flight path creation, turbulence circumvention where turbulence avoidance is a serious flight consideration, some turbulence circumvention with emphasis on shortest path generation where turbulence avoidance warrants some consideration, but may not be a primary goal and/or the like. The DATCM may then generate an enhanced, integrated turbulence forecast within the specified flight path region 2304 and suggest flight path alterations with respect to the level of turbulence circumvention desired.

FIG. 24 shows one example of an expanded logic flow diagram of flight path considerations when the DATCM is part of an integrated flight planning tool. In one embodiment of the disclosure, the flight planning service may access/input user profile information 2400 which may include such information type of aircraft and/or flight service such as passenger 2401, private 2402 and/or commercial cargo/transport 2403, the consideration of which may influence turbulence avoidance (i.e. commercial cargo transport may prioritize shortest path with minimal evasion while passenger may emphasize turbulence circumvention over speed or directness). The DATCM may request additional user profile information for flight path construction 2404. In some embodiments of the disclosure, such information may include the origin grid point and departure time of the flight, the destination grid point, and/or the maximum travel time the flight can utilize in constructing its path 2405. In some embodiments of the disclosure, the DATCM may infer user information from previously stored user profile data and/or prior flight path generation 2406. In some embodiments, this information may include the aircraft type, its fuel requirements, its standard flying altitude, previous planned flight paths, and/or the like 2408. In some embodiments, user profile and flight creation information that is both input and/or inferred by the DATCM may be used to update the user profile data for future DATCM use 2408. In some embodiments of the disclosure, the DATCM may use other stored profile information where similar parameters resulted in successful flight path creation. In some embodiments of the disclosure, the DATCM may use additional input, such as those from sources external to the flight planning tool, such as historical flight plan data and/or the like. The DATCM may then calculate the grid size of the region 2409 over which the DATCM may consider flight path creation, using input such as the origin, destination, maximum flight time, and/or facilities of the aircraft and/or type of flight. In some embodiments of the disclosure, two dimensional grid space may be considered for initial path planning purposes. In some embodiments of the disclosure, three dimensional grid space may be considered for path planning purposes. In some embodiments of the disclosure, two dimensional grid space may be considered for initial path planning purposes, which may then be integrated with additional dimensional information as necessary to accurately determine available grid space inside which the flight path may still meet flight path parameters.

In some embodiments of the disclosure, this initial input component may then be followed by DATCM computational turbulence integration 2410 of the generated geospatial grid region, some examples of which have been described in FIGS. 2, 3, and 4. The DATCM may create an overlay to the generated grid region 2411 and may request additional information about the desired parameters of the flight path through this grid region 2412. In some embodiments of the disclosure, these parameters may include schedule-based path-finding (shortest path immediacy), schedule-based but with circumvention of acute turbulence (shortest path avoiding high hazard turbulence areas), turbulence circumvention (navigating out of turbulence areas), and/or any combination of or intermediate stage to these parameters. The DATCM may then use available input as described in the input component to determine all flight path creation parameters 2414. The DATCM may then create a flight path over the integrated turbulence grid region 2415, considering flight path creation parameters 2413. The DATCM may then display the proposed flight path to the user as a terminal overlay, standard or high definition map overlay and/or the like 2416, as is applicable to the flight planning tool. If the flight path is satisfactory 2417, the user may then exit the flight path planning component of the DATCM as an incorporated flight planning tool option, In some embodiments of the disclosure, the DATCM may allow the user to export the determined flight path to other media, save the flight path to the user profile, share the flight path with additional users, and/or the like. In some embodiments of the disclosure, if the proposed flight path is not satisfactory 2417, the DATCM may allow the user to modify flight path creation parameters 2418. In some embodiments of the disclosure, the user may reenter a flight path creation component as specified earlier 2412. In some embodiments of the disclosure, users may be allowed to visually manipulate flight path options using the proposed flight path turbulence grid overlay. In some embodiments of the disclosure, the user may be able to reenter flight path creation, visually manipulate the proposed flight path and/or combine these methods in any intermediate path modification.

FIG. 25 shows an example of a vertical slice dissection of a proposed flight path through which an aircraft may pass through multiple turbulence types and where an aircraft may experience enhanced turbulence integration as calculated by the DATCM. In this example, the aircraft experiences no turbulence at either origin A 2501 or destination B 2507, but as the aircraft rises through the atmosphere along the projected flight path, it may begin to encounter turbulence regions. In this example, between 20 and 30 kilofeet (kft), the aircraft at position 2520 has encountered a thunderstorm region 2502. As the aircraft moves directionally forward along its flight path, it reaches the upper level 2504 where CAT may be pronounced. In this example, the aircraft at position 2530 is in an enhanced thunderstorm and upper level CAT region where integrated turbulence as calculated by the DATCM may show greater turbulence hazard than either turbulence regions, separately or combined in a conventional summation. In this example, at position 2540 the aircraft has moved into an enhanced upper level and mountain wave turbulence region 2505 which, as calculated by the DATCM, may show greater turbulence hazard than either turbulence regions, separately or combined in a conventional summation. At position 2550, the aircraft descends in a mountain turbulence region where mountain and gravity wave turbulence may be pronounced. At position 2560, the aircraft has arrived at its destination, having experienced multi-hazard turbulence events in both singular and overlap turbulence regions.

FIG. 26 shows an example grid output of one embodiment of the DATCM, where computational integration components may produce staged map overlays of each component of the DATCM turbulence calculation process. In some embodiments of the DATCM, the DATCM may show an initial MWAVE grid output 2601, incorporating MWAVE turbulence calculations into a singular, non-enhanced turbulence map overlay. In one embodiment of the DATCM, the map overlay may be color-coded to indicate areas of turbulence hazard where clear represents no turbulence, green represents light turbulence hazard, yellow represents moderate turbulence hazard, and red represents severe turbulence hazard. In some embodiments of the disclosure, the DATCM may output a forecast as a four-dimensional grid of EDR values in multiple file formats, such as GRIB2 and/or geometric vector data such as Geographic Information System (GIS) shapefiles, for use in any GIS display, software, integrator, and/or the like. In one embodiment of the disclosure, the DATCM may display the results of the integration of its MWAVE and INTTURB components 2602, with enhanced turbulence regions. In some embodiments of the DATCM, the output may be a color-coded map overlay, export files for use in geospatial display systems, and/or the like. In one embodiment of the disclosure, the DATCM may then display the integration of its INTTURB component with its VVTURB2 component 2603. In some embodiments of the DATCM, the output may be a color-coded map overlay, export files for use in geospatial display systems, and/or the like. In one embodiment of the disclosure, the DATCM may display a finalized output of full computational turbulence integration component 2604, as described in FIGS. 2, 3, and 4. In some embodiments of the DATCM, the output may be a color-coded map overlay, export files for use in geospatial display systems, and/or the like. In some embodiments of the disclosure, these outputs may be available as separate data feeds, software/tool options, export files and/or the like. In some embodiments of the disclosure, these outputs may be available internally to the DATCM and only integrated outputs available externally in the form of data feeds, software/tool options, export files, and/or the like.

FIG. 27 demonstrates, in a manner similar to that depicted in FIG. 3, a further example of how DATCM Integration Mechanism component(s) may incorporate external data feeds and may provide various partners, third party software applications/tools, end users, integrators, internal and external flight planning services, and/or the like with integrated turbulence output in the form of comma-separated value (CSV), geometric vector data files, gridded binary (GRIB) format, data feeds, and/or the like. In one embodiment, the DATCM receives and/or requests global calculation data for a variety of weather and/or geographic mechanisms 2701, including but not limited to global mechanisms 2701*a* and/or regional mechanisms 2701*b*. In some embodiments, Global Forecast System (GFS) information 2702*a* from the National Oceanic and Atmospheric Administration (NOAA) is utilized as input. In some embodiments, the DATCM receives Rapid Refresh (RAP) 2702*b* information from the NOAA as input. In some embodiments, the DATCM receives GEM 2702*c* (Global Environmental Multiscale Model) as input. In some embodiments, the DATCM receives ECMWF 2702*d* information as input. In one embodiment, the DATCM receives GFS, RAP, GEM, ECMWF, and/or similar information as input. Some embodiments of the DATCM are model agnostic. In some embodiments the DATCM produces one or more GRIB2 file(s) 2703 and/or record outputs that may be appended in GRIB format for use in file distribution by DATCM partners 2704. In some embodiments, DATCM partners may distribute DATCM output through various communication networks 2705 such as local area networks (LAN) and/or external networks such as the internet which may provide DATCM partners, third party applications/tools 2706, and/or end users 2707 with DATCM output. In some embodiments of the DATCM, such output may be in propagated GRIB files as provided to DATCM partners. In some embodiments of the DATCM, such output may be converted to a visual form for display on a web browser, smart phone application, software package and/or the like. In some embodiments of the DATCM, electronic messaging 2707 such as email, SMS text, push notifications, and/or the like may be employed to alert end users of important data updates from the DATCM, DATCM partners, and/or other parties providing DATCM output data.

In some embodiments, the DATCM may provide a file or data stream as output, in which values of the DATCM during component production, including but not limited to EDR finalization, may be recorded or provided. One example of a DATCM CSV output file is provided below, showing an in-flight time sequence of forecasted turbulence:

| Flight PHX-MSP dd mm yyyy Leave: 0413Z Arrive: 0645Z Turbulence Forecast (EDR * 100) | | | | | | | | | | |
|---|---|---|---|---|---|---|---|---|---|---|
| Time | Latitude | Longitude | Altitude (kft) | MWAVE | COMTURB | VVTURB | INTTURB | VVINTTURB | FINAL | Explanation |
| 415 | 33.5 | −111.8 | 50 | 0 | 0 | 0 | 0 | 1 | 1 | |
| 425 | 34.5 | −111.6 | 250 | 0 | 0 | 0 | 0 | 26 | 26 | Near-storm turbulence |
| 435 | 35.4 | −110.3 | 370 | 0 | 0 | 0 | 0 | 1 | 1 | |
| 445 | 36.2 | −109 | 370 | 0 | 0 | 1 | 25 | 1 | 25 | Mountain Wave and free gravity wave amplitudes combine |
| 455 | 36.9 | −107.7 | 370 | 0 | 0 | 0 | 0 | 0 | 0 | |
| 505 | 37.3 | −106 | 370 | 0 | 0 | 0 | 0 | 34 | 34 | Storm top turbulence |
| 515 | 38.1 | −104.7 | 370 | 0 | 0 | 1 | 35 | 1 | 35 | Mountain wave and free gravity wave amplitudes combine |
| 525 | 38.9 | −103.6 | 370 | 0 | 0 | 1 | 0 | 1 | 1 | |
| 535 | 39.9 | −102.3 | 370 | 0 | 45 | 0 | 45 | 0 | 45 | |
| 545 | 40.9 | −101 | 370 | 0 | 0 | 1 | 0 | 1 | 1 | |
| 555 | 41.8 | −99.7 | 370 | 0 | 51 | 1 | 51 | 1 | 51 | |
| 605 | 42.6 | −98.5 | 370 | 0 | 34 | 0 | 34 | 0 | 34 | |
| 615 | 43.5 | −97 | 370 | 0 | 30 | 1 | 30 | 1 | 30 | |
| 625 | 44.4 | −95.3 | 290 | 0 | 18 | 43 | 18 | 43 | 43 | |
| 635 | 44.7 | −94 | 100 | 0 | 0 | 24 | 0 | 24 | 24 | |
| 645 | 44.8 | −93.2 | 20 | 0 | 19 | 0 | 19 | 51 | 51 | Near-storm turbulence |

In some embodiments of the DATCM, a file or feed (e.g., a CSV file) output from the DATCM may be provided as input to a geometric vector data generator 2707, which may provide additional data output options. In some embodiments of the DATCM, the geometric vector data generator may output geometric vector data files to a file server 2730 which may provide the data output to an alert server 2720 which may provide the output a communications networks 2705 to such partners, third parties, software applications, end users and/or the like as described. In some embodiments of the DATCM, the geometric vector data generator may output geometric vector data files, such as shapefiles, for storage in GIS database(s) 2708. In some embodiments of the DATCM, Web Mapping Services (WMS) and/or Web Feature Services (WFS) 2709 may obtain the geometric vector data files from GIS database(s) and provide geographic service integrators 2711 with DATCM output data through various communication networks 2705 as described. In some embodiments of the DATCM, file server(s) 2708 and/or WMS may incorporate the DATCM output data into a DATCM integrated server 2740 with application, data, and/or network components. A DATCM integrated server may employ such output data from DATCM components in proprietary software tools, web services, mobile applications and/or the like. In one embodiment of the DATCM, a DATCM integrated server may employ DATCM component output for use in flight planning tools 2712, such as AviationSentry Online®.

Figure 28A:
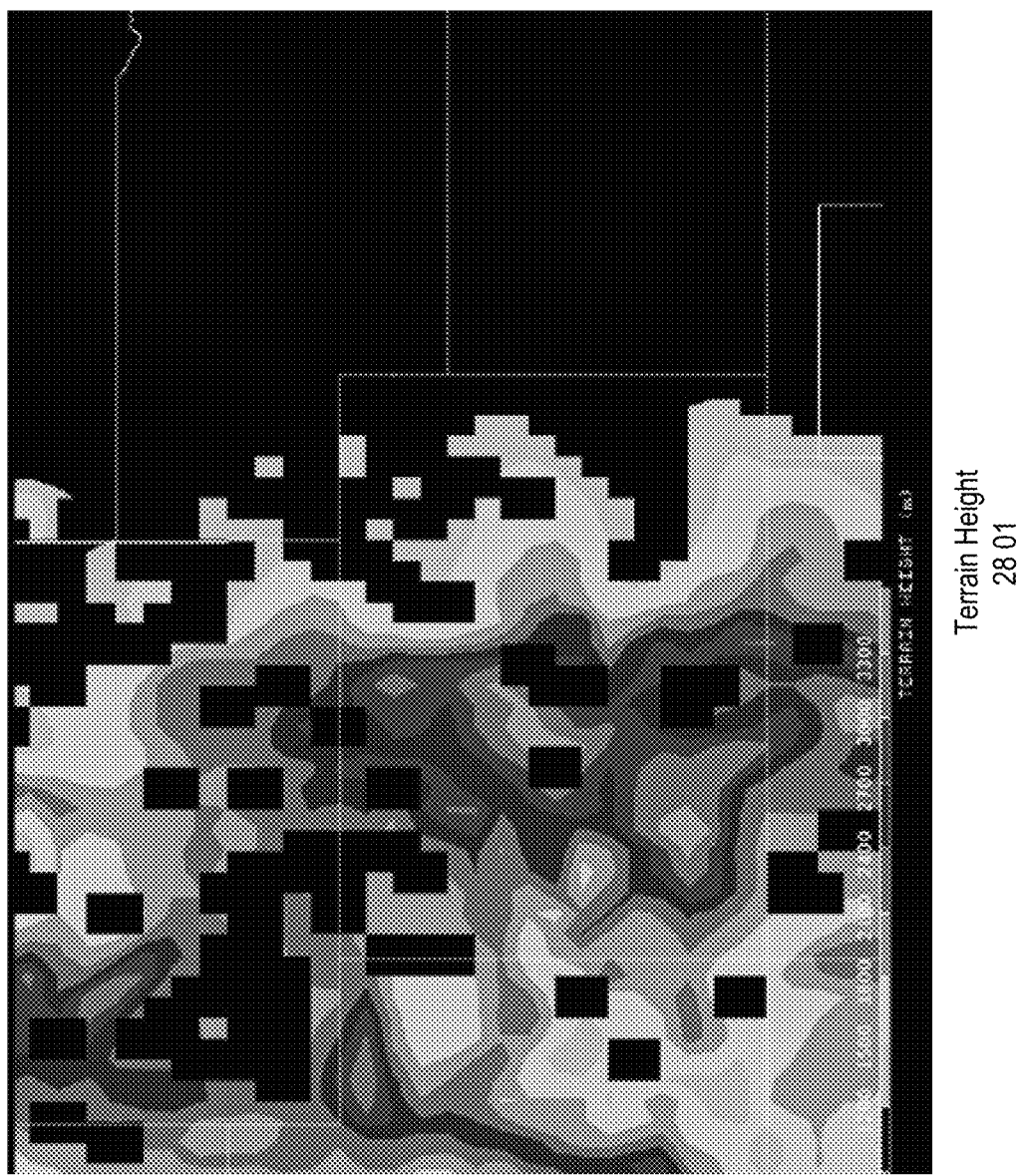

FIG. 28A shows an example terrain height map 2801 in meters over the Colorado area in the 0.25 deg latitude/longitude grid world terrain database. In this embodiment of the DATCM, black areas are regions where the terrain is relatively flat.

FIG. 28B shows two examples of asymmetry in computed terrain height as described in 28A along x and y directions. In one embodiment of the DATCM, asymmetry is computed as the negative height change in the east (x) direction 2802. In one embodiment of the DATCM, asymmetry is computed as the negative height change in the north (y) direction 2803.

Figure 29A:
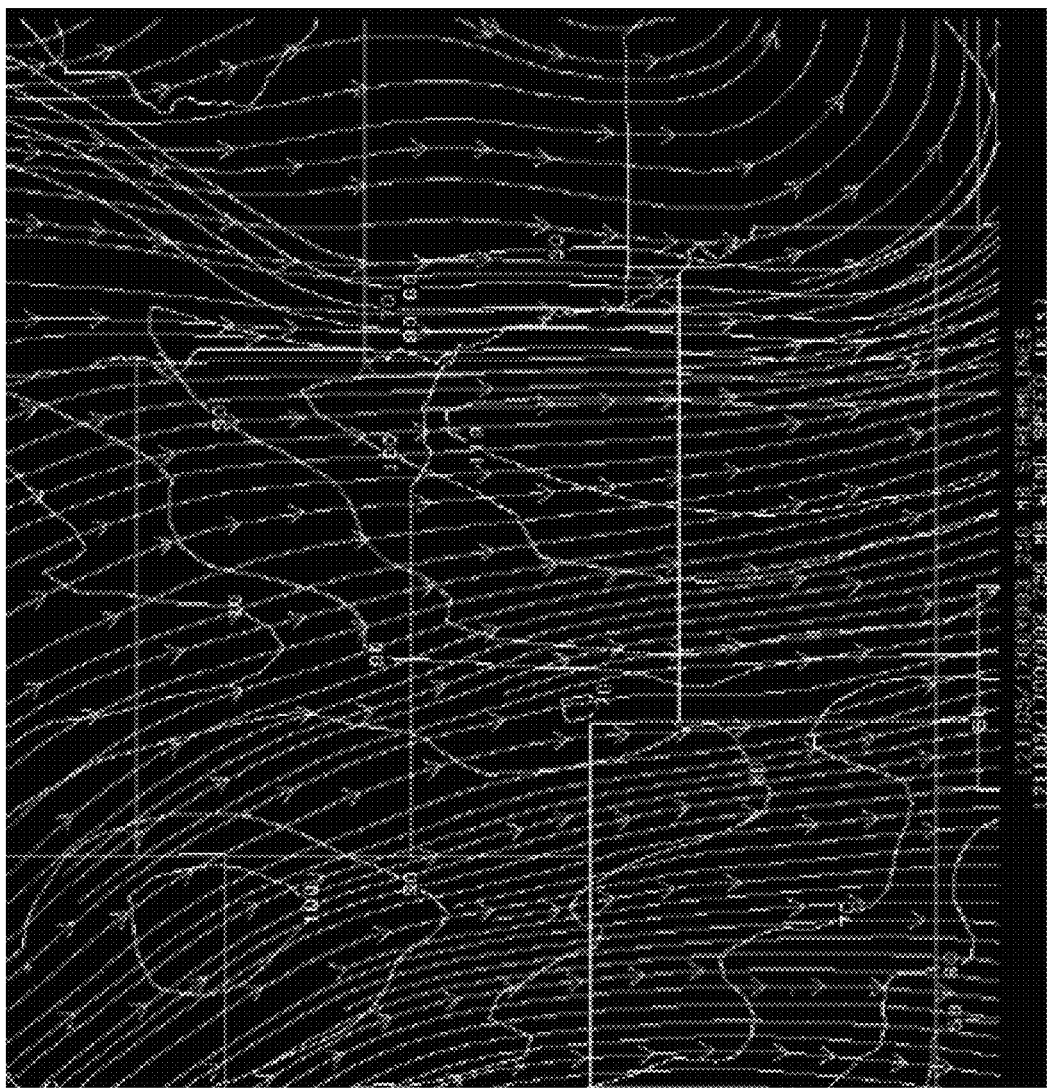

FIG. 29A shows one example of a 3-hour RAP forecast 2901 showing Streamlines and isotachs (kts) of the forecast flow at 250 mb (near FL350).

Figure 29B:
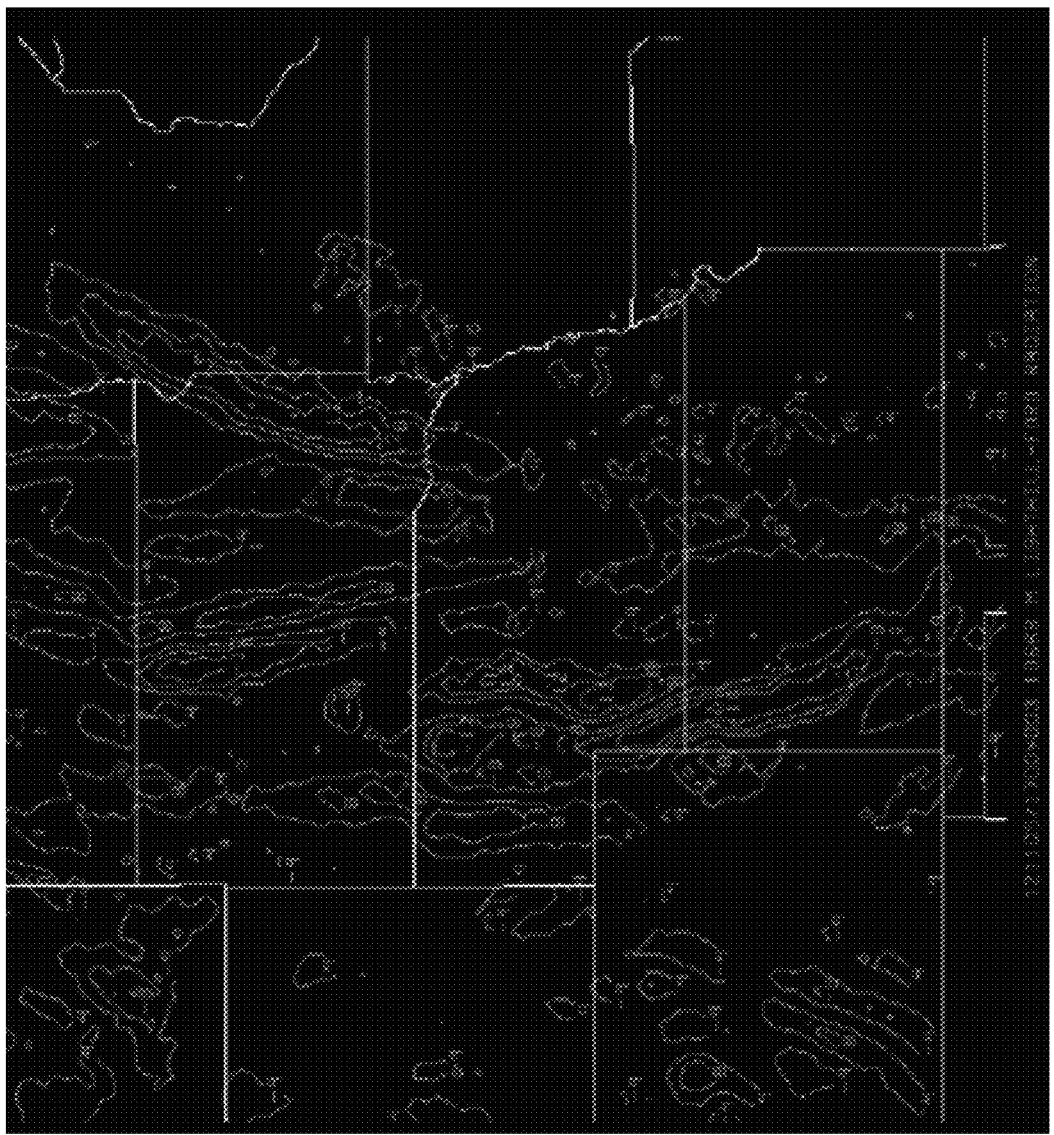

FIG. 29B shows one example of Lighthill-Ford radiation 2902 computed at 10668 m (FL350) for the forecast flow shown in FIG. 29A. Lighthill-Ford radiation is the gravity wave diagnostic in ULTURB, a computational component of the DATCM, in one embodiment of the DATCM.

Figure 29C:
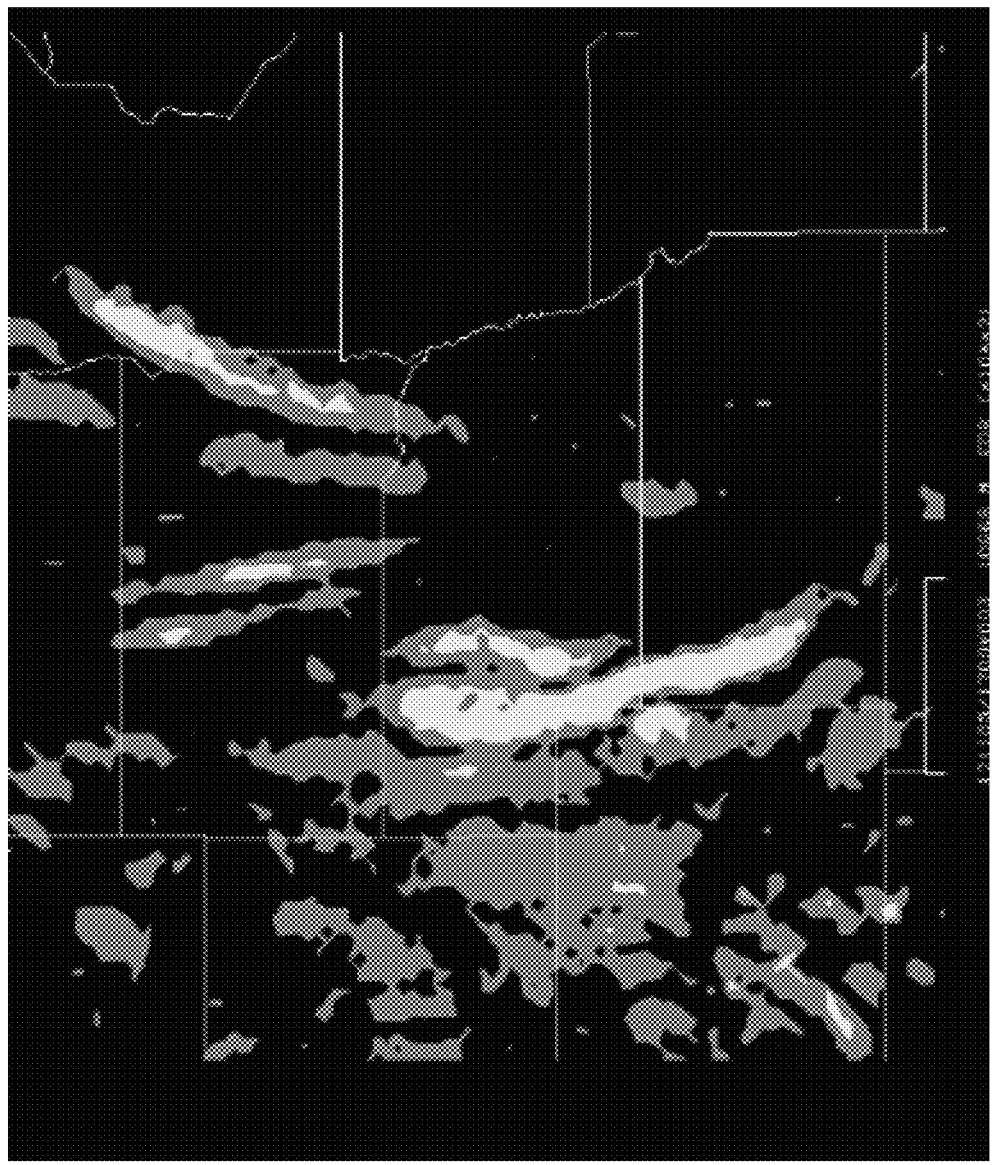

FIG. 29C shows one example of ULTURB turbulence forecast 2903 in EDR values for the forecast flow described in FIG. 29A. ULTURB, a computational component of the DATCM in one embodiment, combines the gravity wave diagnostic described in FIG. 29B, the Richardson number, and the vertical wind shear.

FIG. 29D provides an example of output generated by the DATCM, a 4D grid of EDR values, which may be made available in several forms including, by way of non-limiting example, GRIB2 format and GIS shapefiles. As discussed above, EDR value is the Eddy Dissipation Rate and is defined as the rate at which kinetic energy from turbulence is absorbed by breaking down the eddies smaller and smaller until all the energy is converted to heat by viscous forces. EDR is expressed as kinetic energy per unit mass per second in units of velocity squared per second ($m^2/s^3$). The EDR is the cube root of the turbulent kinetic energy (TKE). When adding the EDR values together from VVTURB2 and INTTURB, the values may be converted back to TKE, added together, and converted back to EDR (take the cube root of the sum).

FIG. 29D also illustrates various interface features that may be used to navigate the four-dimensional grid, such as a time slider 2910 to move through various calculated time grids, an elevation slider 2912 to view various elevations, and a detail widget, to adjust the granularity/detail of the displayed turbulence interface.

In some embodiments, the DATCM server may issue PHP/SQL commands to query a database table (such as FIG. 46, Profile 4619c) for profile data. An example profile data query, substantially in the form of PHP/SQL commands, is provided below:

```
<?PHP
header('Content-Type: text/plain');
mysql_connect("254.93.179.112",$DBserver,$password); // access
    database server
mysql_select_db("DATCM_DB.SQL"); // select database table to search
//create query
$query = "SELECT field1 field2 field3 FROM ProfileTable WHERE
    user LIKE '%' $prof";
$result = mysql_query($query); // perform the search query
mysql_close("DATCM_DB.SQL"); // close database access
?>
```

The DATCM server may store the profile data in a DATCM database. For example, the DATCM server may issue PHP/SQL commands to store the data to a database table (such as FIG. 46, Profile 4619c). An example profile data store command, substantially in the form of PHP/SQL commands, is provided below:

```
<?PHP
header('Content-Type: text/plain');
mysql_connect("254.92.185.103",$DBserver,$password); // access
    database server
mysql_select("DATCM_DB.SQL"); // select database to append
mysql_query("INSERT INTO ProfileTable (fieldname1, fieldname2,
    fieldname3)
VALUES ($fieldvar1, $fieldvar2, $fieldvar3)"); // add data to table in
    database
mysql_close("DATCM_DB.SQL"); // close connection to database
?>
```

Various embodiments of the DATCM may be used to provide real-time, pre-flight and/or in-flight turbulence reporting, planning and response. The integrated, unified turbulence system provided by the DATCM may be used in flight equipment and/or ground equipment. The DATCM may provide weather/aviation decision support (e.g., via graphical displays) and/or provide alerts/triggers. Although it is discussed in terms of re-routing in time of increased turbulence, in some embodiments, the DATCM may identify more efficient paths based on real-time updates where there is decreased turbulence over a shorter physical distance, and may update a flight plan accordingly. The DATCM identifies 4D areas for flight hazards, and a user may choose or set their profile based on particular hazards (e.g., a passenger airline would have a different hazard/turbulence profile than an air freight company, and a large airliner would have a different profile from a small plane or helicopter). Various cost calculations and risk calculations may also be used in determining alerts and/or flight paths. In some embodiments, real-time feedback may come from plane-mounted instrument sensors and provide updates to predicted turbulence. Such information may be used to refine mechanisms for turbulence determination. Although examples were discussed in the context of jet airliners, it is to be understood that the DATCM may be utilized for low-level services, such as helicopters, unmanned aerial vehicles, as well as high speed and/or military aircraft, and may even have potential ground applications, especially in mountainous terrain. The DATCM may work with air traffic control, particularly in management of routing. In some embodiments, the DATCM may input directly in avionics systems to guide planes.

Prior to the DATCM, forecasts of turbulence, if even available, were generally qualitative (e.g., light/heavy), independent of aircraft type, and did not include all sources of turbulence (e.g., they specifically exclude thunderstorms) or interactions of turbulence, thus making them unusable for most practical applications such as flight planning. The integrated turbulence forecast of the DATCM is unique because it dynamically determines the location and level at which each comprehensive turbulence determination is made, based on the meteorological conditions at that point in space and time. In some embodiments, the result is a single, integrated forecast that includes all sources of turbulence, and is produced in quantitative units, such as Eddy Dissipation Rate (EDR), thus making it suitable for practical uses, such as flight planning applications, and allows for categorical flexibility specific to an aircraft.

In some embodiments, the DATCM integrates three DATCM turbulence mechanisms, ULTURB, BLTURB, and MWAVE into one component/program called INTTURB. In some additional or alternative embodiments, the DATCM integrates VVTURB with ULTURB and BLTURB into a component/program called VVINTTURB. Output from all components may in EDR, an aircraft-independent metric of turbulence intensity. The DATCM may assign an EDR value at each grid point and at each flight level. Observations of turbulence may also be used for further tuning of the forecast where and when they are available. In some embodiments, the DATCM may utilize a VVSTORMSE component, as discussed below.

Embodiments of the DATCM may be configured to determine warnings for relatively reduced volumes/areas/sizes of airspace, substantially more granular and detailed than, for example, traditional convective SIGMETs. A Convective SIGMET is typically issued as a text message for convection over the continental United States, for example, for an area of thunderstorms affecting an area of 3,000 square miles or greater. The DATCM and/or VVSTORMSE may provide granularity by reducing the size of the analyzed area by 10%, 15%, 20%, 25%, 30%, 35%, 40%, 45%, 50%, 55%, 60%, 65%, 70%, 75%, 80%, 85%, 90%, and/or 95%. Depending on the embodiment, the area granularity may be of the following, or within a range of any of the following: 0.05 $km^2$, 0.1 $km^2$, 0.2 $km^2$, 0.3 $km^2$, 0.4 $km^2$, 0.5 $km^2$, 0.6 $km^2$, 0.7 $km^2$, 0.8 $km^2$, 0.9 $km^2$, 1 $km^2$, 2 $km^2$, 3 $km^2$, 4 $km^2$, 5 $km^2$, 6 $km^2$, 7 $km^2$, 8 $km^2$, 9 $km^2$, 10 $km^2$, 11 $km^2$, 12 $km^2$, 13 $km^2$, 14 $km^2$, 15 $km^2$, 16 $km^2$, 17 $km^2$, 18 $km^2$, 19 $km^2$, 20 $km^2$, 21 $km^2$, 22 $km^2$, 23 $km^2$, 24 $km^2$, 25 $km^2$, 26 $km^2$, 27 $km^2$, 28 $km^2$, 29 $km^2$, 30 $km^2$, 31 $km^2$, 32 $km^2$, 33 $km^2$, 34 $km^2$, 35 $km^2$, 36 $km^2$, 37 $km^2$ 38 $km^2$, 39 $km^2$, 40 $km^2$, 41 $km^2$, 42 $km^2$, 43 $km^2$, 44 $km^2$, 45 $km^2$, 46 $km^2$, 47 $km^2$, 48 $km^2$, 49 $km^2$, 50 $km^2$, 55 $km^2$, 60 $km^2$, 65 $km^2$, 70 $km^2$, 75 $km^2$, 80 $km^2$, 85 $km^2$, 90 $km^2$, 95 $km^2$, 100 $km^2$, 105 $km^2$, 110 $km^2$, 115 $km^2$, 120 $km^2$, 125 $km^2$, 130 $km^2$, 135 $km^2$, 140 $km^2$, 145 $km^2$, 150 $km^2$, 155 $km^2$, 160 $km^2$, 165 $km^2$, 170 $km^2$, 175 $km^2$, 180 $km^2$, 185 $km^2$, 190 $km^2$, 195 $km^2$, 200 $km^2$, 205 $km^2$, 210 $km^2$, 215 $km^2$, 220 $km^2$, 225 $km^2$, 230 $km^2$, 235 $km^2$, 240 $km^2$, 245 $km^2$, 250 $km^2$, 255 $km^2$, 260 $km^2$, 265 $km^2$, 270 $km^2$, 275 $km^2$, 280 $km^2$, 285 $km^2$, 290 $km^2$, 295 $km^2$, 300 $km^2$, 305 $km^2$, 310 $km^2$, 315 $km^2$, 320 $km^2$, 325 $km^2$, 330 $km^2$, 335 $km^2$, 340 $km^2$, 345 $km^2$, 350 $km^2$, 355 $km^2$, 360 $km^2$, 365 $km^2$, 370 $km^2$, 375 $km^2$, 380 $km^2$, 385 $km^2$, 390 $km^2$, 395 $km^2$, 400 $km^2$, 425 $km^2$, 450 $km^2$, 475 $km^2$, 500 $km^2$, 525 $km^2$, 550 $km^2$, 575 $km^2$, 600 $km^2$, 625 $km^2$, 650 $km^2$, 675 $km^2$, 700 $km^2$, 725 $km^2$, 750 $km^2$, 775 $km^2$, 800 $km^2$, 825 $km^2$, 850 $km^2$, 875 $km^2$, 900 $km^2$, 925 $km^2$, 950 $km^2$, 975 $km^2$, 1000 $km^2$, 1100 $km^2$, 1200 $km^2$, 1300 $km^2$, 1400 $km^2$, 1500 $km^2$, 1600 $km^2$, 1700 $km^2$, 1800 $km^2$, 1900 $km^2$, 2000 $km^2$, 2100 $km^2$, 2200 $km^2$, 2300 $km^2$, 2400 $km^2$, 2500 $km^2$, 2600 $km^2$, 2700 $km^2$, 2800 $km^2$, 2900 $km^2$, 3000 $km^2$, 3100 $km^2$, 3200 $km^2$, 3300 $km^2$, 3400 $km^2$, 3500 $km^2$, 3600 $km^2$, 3700 $km^2$, 3800 $km^2$, 3900 $km^2$, 4000 $km^2$, 4100 $km^2$, 4200 $km^2$, 4300 $km^2$, 4400 $km^2$, 4500 $km^2$, 4600 $km^2$, 4700 $km^2$, 4800 $km^2$, 4900 $km^2$, 5000 $km^2$, 5500 $km^2$, 6000 $km^2$, 6500 $km^2$, 7000 $km^2$, 7500 $km^2$. The area granularity may be in the range of any two of the previous areas, such as by way of non-limiting example, between 0.1 $km^2$ and 1000 $km^2$, 10 $km^2$ and 200 $km^2$, 100 $km^2$ and 5000 $km^2$, 800 $km^2$ and 5500 $km^2$, 900 $km^2$ and 4500 $km^2$, and/or the like. The shape of the area may be, by way of non-limiting example, square, rectangular, parallelogram, n-gon, irregular, and/or the like.

The DATCM and/or VVSTORMSE may provide granularity by reducing the size of the analyzed airspace volumes by 15%, 20%, 25%, 30%, 35%, 40%, 45%, 50%, 55%, 60%, 65%, 70%, 75%, 80%, 85%, 90%, and/or 95%. Depending on the embodiment, the volume granularity may be of the following or within a range of the any of the following: 0.1 $km^3$, 0.2 $km^3$, 0.3 $km^3$, 0.4 $km^3$, 0.5 $km^3$, 0.6 $km^3$, 0.7 $km^3$, 0.8 $km^3$, 0.9 $km^3$, 1 $km^3$, 2 $km^3$, 3 $km^3$, 4 $km^2$, 5 $km^3$, 6 $km^3$, 7 $km^3$, 8 $km^3$, 9 $km^3$, 10 $km^3$, 11 $km^3$, 12 $km^3$, 13 $km^3$, 14 $km^3$, 15 $km^3$, 16 $km^2$, 17 $km^3$, 18 $km^3$, 19 $km^3$, 20 $km^3$, 21 $km^3$, 22 $km^3$, 23 $km^3$, 24 $km^3$, 25 $km^3$, 26 $km^3$, 27 $km^3$, 28 $km^3$, 29 $km^3$, 30 $km^3$, 31 $km^3$, 32 $km^3$, 33 $km^3$, 34 $km^3$, 35 $km^3$, 36 $km^3$, 37 $km^3$, 38 $km^2$, 39 $km^3$, 40 $km^3$, 41 $km^3$, 42 $km^3$, 43 $km^3$, 44 $km^3$, 45 $km^3$, 46 $km^3$, 47 $km^3$, 48 $km^3$, 49 $km^2$, 50 $km^3$, 55 $km^3$, 60 $km^3$, 65 $km^3$, 70 $km^3$, 75 $km^3$, 80 $km^3$, 85 $km^3$, 90 $km^3$, 95 $km^3$, 100 $km^2$, 105 $km^3$, 110 $km^3$, 115 $km^3$, 120 $km^3$, 125 $km^3$, 130 $km^3$, 135 $km^3$, 140 $km^3$, 145 $km^3$, 150 $km^3$, 155 $km^3$, 160 $km^3$, 165 $km^3$, 170 $km^3$, 175 $km^3$, 180 $km^3$, 185 $km^3$, 190 $km^3$, 195 $km^3$, 200 $km^3$, 205 $km^3$, 210 $km^3$, 215 $km^3$, 220 $km^3$, 225 $km^3$, 230 $km^3$, 235 $km^3$, 240 $km^3$, 245 $km^3$, 250 $km^3$, 255 $km^3$, 260 $km^3$, 265 $km^3$, 270 $km^3$, 275 $km^3$, 280 $km^3$, 285 $km^3$, 290 $km^3$, 295 $km^3$, 300 $km^3$, 305 $km^3$, 310 $km^3$, 315 $km^3$, 320 $km^3$, 325 $km^3$, 330 $km^3$, 335 $km^3$, 340 $km^3$, 345 $km^3$, 350 $km^3$, 355 $km^3$, 360 $km^3$, 365 $km^3$, 370 $km^3$, 375 $km^3$, 380 $km^3$, 385 $km^3$, 390 $km^3$, 395 $km^3$, 400 $km^3$, 425 $km^3$, 450 $km^3$, 475 $km^3$, 500 $km^3$, 525 $km^3$, 550 $km^3$, 575 $km^3$, 600 $km^3$, 625 $km^3$, 650 $km^3$, 675 $km^3$, 700 $km^3$, 725 $km^3$, 750 $km^3$, 775 $km^3$, 800 $km^3$, 825 $km^3$, 850 $km^3$, 875 $km^3$, 900 $km^3$, 925 $km^3$, 950 $km^3$, 975 $km^3$, 1000 $km^3$, 1100 $km^3$, 1200 $km^3$, 1300 $km^3$, 1400 $km^3$, 1500 $km^3$, 1600 $km^3$, 1700 $km^3$, 1800 $km^3$, 1900 $km^3$, 2000 $km^3$, 2100 $km^3$, 2200 $km^3$, 2300 $km^3$, 2400 $km^3$, 2500 $km^3$, 2600 $km^3$, 2700 $km^3$, 2800 $km^3$, 2900 $km^3$, 3000 $km^3$, 3100 $km^3$, 3200 $km^3$, 3300 $km^3$, 3400 $km^3$, 3500 $km^3$, 3600 $km^3$, 3700 $km^3$, 3800 $km^3$, 3900 $km^3$, 4000 $km^3$, 4100 $km^3$, 4200 $km^3$, 4300 $km^3$, 4400 $km^3$, 4500 $km^3$, 4600 $km^3$, 4700 $km^3$, 4800 $km^3$, 4900 $km^3$, 5000 $km^3$, 5500 $km^3$, 6000 $km^3$, 6500 $km^3$, 7000 $km^3$, 7500 $km^3$, 8000 $km^3$, 8500 $km^3$, 9000 $km^3$, 9500 $km^3$, 10000 $km^3$. The volume granularity may be in the range of any two of the previous, such as by way of non-limiting example, between 0.1 $km^3$ and 10000 $km^3$, 10 $km^3$ and 200 $km^3$, 100 $km^3$ and 5000 $km^3$, 800 $km^3$ and 5500 $km^3$, 900 $km^3$ and 4500 $km^3$, and/or the like. The shape of the volume may be, by way of non-limiting example, cuboid, parallelepiped, polygonal, irregular, and/or the like.

With reduced airspace volumes, such implementations of the DATCM issue fewer aircraft alerts, resulting in increased compliance with and/or adherence to warnings. In some embodiments, the DATCM avoids over-forecasting of alerts, including avoidance of over-forecasting convective turbulence. Some aircraft-flight-following operations warn aircraft of impending turbulence based on text messages issued by the National Weather Service. These messages may coarsely outline the threat volume often resulting in alerting aircraft not in the direct path of the turbulence. While non-convective turbulence is determined from numerical weather forecast mechanisms, as it cannot generally be directly observed, the DATCM may accurately infer convective turbulence from observations from radar, satellite, or lightning.

For example, rather than alerting the entire atmospheric volume from the surface to very high altitudes (based on assumption that all altitudes are affected whenever, for example, radar reflectivity reaches a certain threshold or whenever lightning is observed), the DATCM can provide alerts with enhanced granularity. The DATCM can predict/identify regions of relatively lower convective turbulence (primarily correlated to storm updraft and downdraft strength) from the storm-supporting environment.

In some embodiments of the DATCM, a VVSTORMSE component may have a plurality of subcomponents. In one exemplary embodiment, illustrated in FIG. 30, the VVSTORMSE component receives 3002 and analyzes a numerical weather forecast 3004 for areas of atmospheric potential instability. It assigns a turbulence-intensity at each altitude 3006 based on the updraft or downdraft magnitude that the environment can support and assigns a turbulence intensity (see discussion of FIG. 30A below). An exemplary implementation for one embodiment is illustrated in the below code fragment:

```
C
C*      Lift most unstable parcel to find potential instability
C*          (if parcel has an LFC).
C*  Wwnd vertical velocity ('+' is up and '-' is down)
C*  Edr eddy dissipation rate
C*  Plcl pressure at the lifted condensation level (the pressure when
C*      Lifted air becomes saturated)
C*  Pbar pressure level being analyzed
C*  Thte equivalent potential temperature
C*  Thta potential temperature
C*  Pthte parcel equivalent potential temperature
C*  Pctdil percent dilution to dilute parcel with environmental air
C*  Tkns layer thickness
C*  Ff Coriolis parameter
C*  Vort absolute vorticity
C*  Avorg absolute geostrophic vorticity
C*  Pclt parcel temperature (PR_TMST is function that computes it)
C*  Tenv environmental temperature (degK)
C*  Pcldif temperature difference between parcel and environment
C*  Wsq square of vertical acceleration
C*  Vvsq square of vertical velocity
C*  Vvbase vertical velocity at layer base
C*  Wmean mean upward vertical velocity in layer
C*  Fl Flight level (m)
C*  Windex maximum downward vertical velocity (at surface)
C*  Maxvv maximum upward vertical velocity
C*  Frzmsl freezing level above sea level
C*  Frzlz freezing level above ground elevation
C*  Sfcz surface elevation
C*  Wdown downward vertical velocity at flight level
C*  Edrdown edr from wdown
C*  Edrlow edr from wmean
C
     DO i = 1, maxpts
        zsum = zsum + z(i) + tkns(i)/2.
        IF (sfcp (i) .lt. rlevel (j+1)) THEN
           wwnd (i) = RMISSD
 edr (i) = RMISSD
        ELSE
     IF ( plcl(i) .gt. pbar ) THEN
        IF ( thte(i) .eq. RMISSD ) thte(i) = thta(i)
        IF ( pthte(i) .gt. thte(i) ) THEN
           pctdil = tkns(i)/10000.0
              pthte(i) = (1.0-pctdil)*pthte(i) + pctdil*thte(i)
           END IF
        IF ( ff(i) .gt. 0.0 ) THEN
           vort = MAX ( avorg (i), ff (i) )
        ELSE
           vort = MIN ( avorg (i), ff (i) )
           END IF
        pclt = PR_TMST(pthte(i),pbar,0.0)
        tenv = t(i) + 273.16
        pcldif = pclt – tenv
        IF ( pcldif .gt. 20.0 ) THEN
           wsq = 0.0
```

```
        ELSE
           IF ( ABS(ff(i)) .lt. .00005 ) THEN
              wsq = 2.0*tkns(i)*GRAVTY*pcldif/tenv
           ELSE
              wsq = 2.0*tkns(i)*GRAVTY*pcldif/tenv +
     +              0.5*ff(i)/vort*gwshrsq(i)
              END IF
           END IF
        IF ( (wsq .gt. 0.0) .and. (.not. abvlfc(i)) ) THEN
           abvlfc (i) = .true.
              END IF
     ELSE
        wsq = 0.0
           END IF
     vvsq = vvbase(i)*vvbase(i) + wsq
     IF ( vvsq .lt. 0.0 ) THEN
        wwnd(i) = 0.0
     ELSE
        wwnd(i) = SQRT (vvsq)
           END IF
     wmean = (vvbase(i)+wwnd(i))/2.
C
C*      Compute EDR from updraft speed (wmean).
C
     IF ( wmean .gt. 10.0 ) THEN
        edr(i) = (.06 + .009*(wmean–10.0))**.333
     ELSE
        edr(i) = (.006*wmean)**.333
     END IF
C
C*      Compute downdraft velocities and downdraft edr
C
        jj = 1
     fl = 304.8
     DO WHILE ( fl .le. 6097. )
        DO i = 1, maxpts
           IF (edrlow(jj,i) .ne. RMISSD .or. windex(i) .ne.
                 RMISSD)
     +          THEN
              edrdown = 0.0
           IF ( maxvv(i) .gt. 10. ) THEN
              frzmsl = frzlz(i) + sfcz(i)
              IF ( fl .gt. sfcz(i) .and. fl .lt. frzmsl ) THEN
                 wdown = windex(i)*(frzmsl-fl)/frzlz(i)
           IF ( wdown .gt. 10.0 ) THEN
              edrdown = (.06+.009*(wdown–10.0))**.333
           ELSE IF ( wdown .gt. 0.0 ) THEN
              edrdown = (.006*wdown)**.333
           END IF
                 END IF
              END IF
           edr (i) = MAX (edrlow(jj,i), edrdown)
              ELSE
                 edr(i) = RMISSD
           END IF
        END DO
```

Then the DATCM/VVSTORMSE component (or subcomponent/program) masks the potential turbulence forecast with convective observations and/or future derived observations 3008. The following provides an example code fragment addressing this aspect for some embodiments of the DATCM/VVSTORMSE component(s)/subcomponent(s):

```
C
C*Open radar file and read echo tops.
C*   Gdrfile radar echo top filename
C*   Etop echo top (computed by DG_GRID)
C*   Gdefile edr filename
C*   El equilibrium level
C*   Edr potential edr at flight level
C
     CALL DG_NFIL ( gdrfile, '', iret )
     IF ( iret .ne. 0 ) THEN
        write (6,*) 'Unable to process radar file input'
```

-continued

```
      STOP
   END IF
   CALL DG_NDTM ( fhrdr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'QUO(NET,.003048)'
   CALL DG_GRID ( timfnd, glevel, gvcord, gfunc, pfunc, etop,
        +   igx, igy, time, level, ivcord, parm, iret )
C
C*Open edr file and read edr data.
C
   CALL DG_NFIL ( gdefile, gdout, iret )
   IF ( iret .ne. 0 ) THEN
      write (6,*) 'Unable to process edr file input'
      STOP
   END IF
   CALL DG_NDTM ( fhedr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'EQLV'
   CALL DG_GRID ( timfnd, glevel, gvcord, gfunc, pfunc, el,
        +   igx, igy, time, level, ivcord, parm, iret )
         maxpts = igx*igy
C*
   gvcord = 'HGHT'
   CALL LV_CORD ( gvcord, sparm, ivcord, iret )
C
C*Find levels.
C
   CALL DG_GLEV ( 1, time, ivcord, LLMXLV,
        +   iflev, nlev, iret )
   DO j = 1, nlev
         rlevel (j) = FLOAT ( iflev (1,j) )
   END DO
   CALL LV_SORT ( ivcord, nlev, rlevel, iret )
C
C
   DO j = 1, nlev
      CALL ST_INCH ( INT(rlevel(j)), glevel, iret )
C
C*    Read edr grid.
C
      gvcord = 'HGHT'
      gfunc = 'EDR'
      CALL DG_GRID ( timfnd, glevel, gvcord, gfunc, pfunc, edr,
           +   igx, igy, time, level, ivcord, parm, iret )
C
C*       Mask edr data with echo tops > el.
C
      DO i = 1, maxpts
         IF ( etop(i) .eq. RMISSD .or. el(i) .eq. RMISSD ) THEN
            edr(i) = RMISSD
         ELSE IF ( etop(i) .lt. el(i) ) THEN
            edr(i) = 0.0
         END IF
      END DO
```

Observations may be, by way of non-limiting example, radar, satellite, and/or lightning data and the future derived observations may be numerically predicted future projections of radar, satellite, and/or lightning; and/or the like. Observations may be received and/or imported as data files representing data such as is shown in FIGS. 30B and 30D. In the case of radar data, only those radar areas whose tops exceed the equilibrium level (EL)—the level at which storm updrafts begin to decelerate (e.g., calculated as discussed previously)—mask the VVSTORMSE potential turbulence area at each altitude. FIG. 30F illustrates determined equilibrium levels for this example. Whenever storm tops exceed the EL, the storms have reached their full potential to produce turbulence. A non-limiting example of masking is illustrated by the example code fragment below:

```
C
C*       Mask edr data with echo tops > el.
C
      DO i = 1, maxpts
         IF ( etop(i) .eq. RMISSD .or. el(i) .eq. RMISSD ) THEN
            edr(i) = RMISSD
         ELSE IF ( etop(i) .lt. el(i) ) THEN
            edr(i) = 0.0
         END IF
      END DO
```

Similarly, in some implementations, satellite derived convective cloud nowcasts may be applied to additionally or alternatively mask off convectively induced turbulence areas. Lightning density data above a specified threshold(s) or parameter(s) may also be used as a mask in some embodiments. In some embodiments of the DATCM, the VVSTORMSE is configured to discern more detail about the turbulence threat than a simple binary (yes/no) answer that a radar-only or a lightning-only decision method would make. The innovative combination of observations and forecasts enabled by DATCM and/or VVSTORMSE provide storm observations in proper context, and reducing or eliminating the need for user-interpretation.

In one implementation of the DATCM, VVSTORMSE finds a parcel based on specified parameters, such as the most unstable parcel below the 500 mb level, at each grid point. Then it lifts this parcel to find its level of free convection (LFC) if there is one. If it has an LFC, then VVSTORMSE determines the upward vertical velocity that the parcel would have. VVSTORMSE determines the turbulence potential in eddy dissipation rate (EDR) from the potential vertical velocity, the maximum vertical velocity defining the equilibrium level (EL), the level at which the parcel begins to decelerate. Then VVSTORMSE determines a potential downward vertical velocity and the potential EDR from potential downward motion. In such an implementation, VVSTORMSE determines potential EDR grids at flight levels at specified intervals, such as every 1000 ft from the surface to the numerical calculation's highest level, such as is shown in the exemplary code fragment below:

```
C
C*       Open radar file and read echo tops.
C
   CALL DG_NFIL ( gdrfile, '', iret )
   IF ( iret .ne. 0 ) THEN
      write (6,*) 'Unable to process radar file input'
      STOP
   END IF
   CALL DG_NDTM ( fhrdr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'QUO(NET,.003048)'
   CALL DG_GRID ( timfnd, glevel, gvcord, gfunc, pfunc, etop,
        +      igx, igy, time, level, ivcord, parm, iret )
C
C*       Open edr file and read edr data.
C
   CALL DG_NFIL ( gdefile, gdout, iret )
   IF ( iret .ne. 0 ) THEN
      write (6,*) 'Unable to process edr file input'
```

-continued

```
      STOP
   END IF
   CALL DG_NDTM ( fhedr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'EQLV'
   CALL DG_GRID ( timfnd, glevel, gvcord, gfunc, pfunc, el,
        +       igx, igy, time, level, ivcord, parm, iret )
         maxpts = igx*igy
C*
   gvcord = 'HGHT'
   CALL LV_CORD ( gvcord, sparm, ivcord, iret )
C
C*    Find levels.
C
   CALL DG_GLEV ( 1, time, ivcord, LLMXLV,
        +          iflev, nlev, iret )
   DO j = 1, nlev
         rlevel (j) = FLOAT ( iflev (1,j) )
   END DO
   CALL LV_SORT ( ivcord, nlev, rlevel, iret )
C
C
   DO j = 1, nlev
      CALL ST_INCH ( INT(rlevel(j)), glevel, iret )
C
C*          Read edr grid.
C
      gvcord = 'HGHT'
      gfunc = 'EDR'
      CALL DG_GRID ( timfnd, glevel, gvcord, gfunc, pfunc, edr,
           +       igx, igy, time, level, ivcord, parm, iret )
C
C*          Mask edr data with echo tops > el.
C
         DO i = 1, maxpts
             IF ( etop(i) .eq. RMISSD .or. el(i) .eq. RMISSD ) THEN
                 edr(i) = RMISSD
             ELSE IF ( etop(i) .lt. el(i) ) THEN
                 edr(i) = 0.0
             END IF
         END DO
```

For example, FIG. 30A provides an example VVSTORMSE component output of turbulence potential for one such grid at FL250 from the one-hour rapid refresh forecast verifying at 1500 UTC. The figure shows widespread potential for strong turbulence (e.g., EDR>0.55).

VVSTORMSE and/or a second VVSTORMSE component/subcomponent and/or program may then mask the potential turbulence forecast with convective observations and future-derived observations, including radar echo tops, lightning strikes, and satellite data, including but not limited to satellite overshoot detection data. Depending on the implementation, observations may be radar, satellite, lightning data, and/or the like, and the future-derived observations may be numerically predicted future projections of radar, satellite, lightning, and/or the like. In some embodiments, for radar data, only those radar areas whose tops exceed the EL mask of the VVSTORMSE potential turbulence area(s) at each altitude are utilized. In some implementations, when storm tops exceed the EL, the storms may be specified as having reached their full potential to produce turbulence.

FIG. 30B shows observed radar top data at 1500 UTC (radar echo tops in 1000s of feet). The VVSTORMSE component identifies active convective tops, i.e., tops above the equilibrium level. Note that the equilibrium level may vary from location to location, and may not be a set particular value for a region (i.e., it varies across the map), for example, as illustrated in FIG. 30F. The tops identified as active convective tops may then be used to mask the turbulence potential. The following code fragment illustrates an example embodiment of a methodology for masking:

```
C
C*       Open radar file and read echo tops.
C
   CALL DG_NFIL ( gdrfile, '', iret )
   IF ( iret .ne. 0 ) THEN
      write (6,*) 'Unable to process radar file input'
      STOP
   END IF
   CALL DG_NDTM ( fhrdr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'QUO(NET,.003048)'
   CALL DG_GRID ( timfnd, glevel, gvcord, gfunc, pfunc, etop,
        +       igx, igy, time, level, ivcord, parm, iret )
C
C*       Open edr file and read edr data.
C
   CALL DG_NFIL ( gdefile, gdout, iret )
   IF ( iret .ne. 0 ) THEN
      write (6,*) 'Unable to process edr file input'
      STOP
   END IF
   CALL DG_NDTM ( fhedr, iret )
   grdnam = ' '
   gpack = 'NONE'
   CALL DG_NTIM ( .false., .false., time, nxttm, ier )
   CALL TG_DUAL ( time, timfnd, ier )
   gvcord = 'NONE'
         glevel = '0'
   gfunc = 'EQLV'
   CALL DG_GRID ( timfnd, glevel, gvcord, gfunc, pfunc, el,
        +       igx, igy, time, level, ivcord, parm, iret )
         maxpts = igx*igy
C*
   gvcord = 'HGHT'
   CALL LV_CORD ( gvcord, sparm, ivcord, iret )
C
C*       Find levels.
C
   CALL DG_GLEV ( 1, time, ivcord, LLMXLV,
        +          iflev, nlev, iret )
   DO j = 1, nlev
         rlevel (j) = FLOAT ( iflev (1,j) )
   END DO
   CALL LV_SORT ( ivcord, nlev, rlevel, iret )
C
C
   DO j = 1, nlev
      CALL ST_INCH ( INT(rlevel(j)), glevel, iret )
C
C*          Read edr grid.
C
      gvcord = 'HGHT'
      gfunc = 'EDR'
      CALL DG_GRID ( timfnd, glevel, gvcord, gfunc, pfunc, edr,
           +       igx, igy, time, level, ivcord, parm, iret )
C
C*          Mask edr data with echo tops > el.
C
         DO i = 1, maxpts
             IF ( etop(i) .eq. RMISSD .or. el(i) .eq. RMISSD ) THEN
                 edr(i) = RMISSD
             ELSE IF ( etop(i) .lt. el(i) ) THEN
                 edr(i) = 0.0
             END IF
         END DO
```

FIG. 30C shows the subsequent mask—that is, the FL250 EDR resulting from masking the data shown in FIG. 30A with the data of FIG. 30B. The results are grids of the areas of active convective turbulence. As can be seen, there are areas of strong convection across southeastern Missouri and northern Iowa. There is some convection over northeastern Iowa, but the VVSTORMSE component identifies that that turbulence is relatively weaker. As such, the DATCM may be able to facilitate aircraft navigation over the turbulence in northeastern Iowa, even though there are radar echoes in that area.

In some embodiments, lightning flash density data within identified parameters/above a specified threshold may be used as a mask, as illustrated in FIGS. 30D and 30E. FIG. 30D illustrates lightning flash density per 100 km$^2$ in the 10 minutes prior to 1500 UTC, although other parameters, factors and/or measures may be utilized, depending on the embodiment, for example, lightning data may be determined and/or received and/or processed on a regional, national and/or global scale. In the figure, the lightning flash density appears to be highest over central Illinois. Lightning flash density information may be derived from a variety of sources, including stationary sensors, mobile sensors, satellites, and/or the like. Real-time or near real-time lightning flash or strike data may also be provided via a feed, such as SCHNEIDER ELECTRIC MXVISION WEATHERSENTRY and/or NATIONAL LIGHTNING DETECTION NETWORK data. In some embodiments, the DATCM may utilize real-time lightning detection data and/or data directed to advance warning of impending lightning, including quantifiable parameters such as the time and location of recent strikes and dynamics, such as rate of movement, direction and intensity of the associated storm. In some embodiments, lightning grid data, such as illustrated in FIG. 30D, is generated by creating an initial grid of zeros where lightning point data is placed on the grid by rounding the latitude/longitude pairs to the nearest grid point which creates a grid of lightning density, which may then be provided as input to the VVSTORMSE component. In some embodiments, lightning data is generated by creating an initial 3-Dimensional grid of zeros where lightning point data is placed on the 3D grid by rounding the latitude/longitude/altitude triples to the nearest 3D grid point which creates a three dimensional grid of lightning density, which may then be provided as input to the VVSTORMSE component.

FIG. 30E illustrates FL250 EDR derived by masking the data of FIG. 30A with the FIG. 30D lightning density data greater than zero. Note that the areas identified in FIGS. 30C and 30E are similar, but are not the same. Depending on the embodiment and/or implementation, the DATCM may utilize echo top data, lightning data, or a combination or hybrid to mask the convective turbulence and identify warning areas or zones. In some embodiments, different masking data may be weighted differently (e.g., storm top data 0.30 and lightning flash data 0.70), and in some implementations, the weighting may be configured to be adjusted dynamically, for example, based on real-time weather and/or geo-location data.

Note that not all highlighted areas in FIGS. 30C and 30E are for severe turbulence (colored red). In some embodiments, DATCM/VVSTORMSE has the ability to discern more detail about the turbulence threat than a simple binary (e.g., yes/no) answer that a radar-only or a lightning-only decision method would provide. The unique combination of observations and forecasts of DATCM/VVSTORMSE provide storm observations into proper context, without requiring user interpretation.

In some embodiments, the DATCM/VVSTORMSE finds the most unstable air parcel and assumes that the parcel has potential instability at the LFC. The DATCM determines if the parcel is moist, and if so, lifts the parcel along the moist adiabat (moist lifting line). Such implementations allow for determination of interrelated factors, for example, knowing how high the parcel is lifted (e.g., to the next level) can be used to determine the moisture content and temperature based on the interrelationship. If the parcel is not moist, the EDR may, in some implementations, be set to null, although in some embodiments, if the parcel is not moist, the parcel may be raised along the dry adiabat (or dry lifting line). The DATCM may compare lifted temperature to the environmental temperature to determine a buoyant acceleration. The DATCM may utilize the acceleration and vertical velocity at the base of the layer to identify the vertical velocity at the top of the layer, and may compute the updraft EDR based on the updraft speed.

The DATCM, in some embodiments, determines the downdraft EDR based on the maximum value of the downdraft (e.g., maximum downdraft velocity). In some implementations, the DATCM begins at the freezing level (i.e., the level in atmosphere where temp is zero degrees Celsius) and accelerates (e.g., via linear interpolation from freezing level to the surface level) until the maximum velocity at the level of the ground.

The DATCM utilizes updraft and/or downdraft parameters (i.e., velocities) to compute EDRS. In some embodiments, for example, if downdraft velocity is greater than updraft velocity at a given point, the downdraft velocity is used to determine the EDR for the point. In some embodiments of the DATCM/VVSTORMSE, if a parcel in a layer is warmer than its environment, it gets accelerated upward, and that acceleration/velocity used to compute EDR. In some implementations, the DATCM utilizes vertical temperature change in determining the EDR, while further implementations also utilize horizontal temperature changes.

FIG. 31 provides an exemplary logic flow diagram illustrating storm EDR determination and masking for an embodiment of the DATCM and/or VVSTORMSE component. For each parcel 3130 (the parameters of which may be previously specified or may dynamically configured for a particular user or implementation), a binary determination of moist is made 3132 and if not, the EDR set to null. If the parcel is moist 3132, and if the lifted condensation level pressure is greater than the current layer pressure level 3134, the parcel temperature 3136 and environmental temperature 3138 are determined. The below example code fragment illustrates parcel temperature determination at a particular level on a specified moist adiabat:

FIG. 31 provides and exemplary logic flow diagram illustrating storm EDR determination and masking for an embodiment of the DATCM and/or VVSTORMSE component. For each parcel 3130 (the parameters of which may be previously specified or may dynamically configured for a particular user or implementation), a binary determination of moist is made 3132 and if not, the EDR set to null. If the parcel is moist 3132, and if the lifted condensation level pressure is greater than the current layer pressure level 3134, the parcel temperature 3136 and environmental temperature 3138 are determined. The below example code fragment illustrates parcel temperature determination at a particular level on a specified moist adiabat:

```
C------------------------------------------------------------------
IF ( ERMISS ( thte ) .or. ERMISS ( pres )
    +         .or. ERMISS ( tguess ) .or. ( thte .le. 0. )
    +      .or. ( pres .le. 0 ) .or. ( tguess .lt. 0. ) ) THEN
   PR_TMST = RMISSD
   RETURN
END IF
```

-continued

```
C
C*        Move tguess into another variable.
C
tg = tguess
C
C*        If TGUESS is passed as 0. it is computed from an MIT
          scheme.
C
IF ( tg .eq. 0. ) tg =
    *       (thte − .5 * ( MAX ( thte−270., 0. ) ) ** 1.05 )
    *       * ( pres / 1000. ) ** .2
C
C*        Set convergence and initial guess in degrees C.
C
epsi = .01
tgnu = PR_TMKC ( tg )
C
C*        Set a limit of 100 iterations. Compute TENU, TENUP, the
C*        THTE's at, one degree above the guess temperature.
C
DO i = 1, 100
    tgnup = tgnu + 1.
    tenu = PR_THTE ( pres, tgnu, tgnu )
    tenup = PR_THTE ( pres, tgnup, tgnup )
C
C*        Check that the THTE's exist.
C
    IF ( ( ERMISS ( tenu ) ) .or. ( ERMISS ( tenup ) ) ) THEN
        PR_TMST = RMISSD
        RETURN
    END IF
C
C*        Compute the correction, DELTG; return on convergence.
C
    cor = ( thte − tenu ) / ( tenup − tenu )
    tgnu = tgnu + cor
    IF ( ( cor .lt. epsi ) .and. ( −cor .lt. epsi ) ) THEN
        PR_TMST = PR_TMCK ( tgnu )
        RETURN
    END IF
END DO
C
C*        Failed to converge - return missing.
C
PR_TMST = RMISSD
RETURN
END
```

The DATCM may determine the difference between the parcel temperature and the environment temperature 3140 and determines the vertical acceleration 3144 (e.g., based on the layer thickness, temperature difference, environmental temperature, gravitational constant, and/or the like). If the parcel is moist 3132, and if the lifted condensation level pressure is not greater than the current layer pressure level 3134, the vertical acceleration is set to zero 3135. The vertical velocity at the top of the layer is determined 3148 (e.g., based on the acceleration and the base vertical velocity) and the mean upward vertical velocity for the parcel is determined 3150 (e.g., based on the average of the base and top vertical velocities). The mean vertical velocity may then be utilized to determine the updraft EDR 3152 for that layer/parcel. The actual downward vertical velocity is determined 3154 (e.g., based on the freezing level and maximum downward vertical velocity) and the downdraft EDR determined 3158 for that layer/parcel. The DATCM determines the overall EDR 3158 from the updraft and downdraft determinations, for example, in some implementations, the larger of the updraft EDR and downdraft EDR.

The DATCM may then retrieve and/or receive masking data 3171, such as radar echo top data and/or lightning flash density data. In the radar echo top data implementation, for each layer (point), if the echo top is less than the equilibrium level 3173, the EDR is masked 3175 (e.g., set to zero). If the echo top is not less than the equilibrium level 3173, the EDR is unchanged 3177.

FIG. 32 provides an exemplary logic flow diagram illustrating aspects of a VVSTORMSE component operation for an embodiment of the DATCM. For each parcel 3230 (the parameters of which may be previously specified or may dynamically configured for a particular user or implementation), a moist determination is made 3232 and if not, the EDR set to null. If the parcel is moist 3232, and if the lifted condensation level pressure is not greater than the current layer pressure level 3234, the vertical acceleration is set to zero 3235. If the parcel is moist 3232, and if the lifted condensation level pressure is greater than the current layer pressure level 3234, the parcel temperature is determined 3236 and environmental temperature is determined 3238, along with the difference between them 3240. As a quality control, if the determined difference is not within parameters 3242, the vertical acceleration is set to zero 3235. If the determined difference is within parameters 3242, the vertical acceleration is determined 3244. If the vertical acceleration is negative 3246, the vertical velocity at the top is set to zero 3247. If the vertical acceleration is not negative 3246, the vertical velocity at the top of the layer is determined 3248 and the mean upward vertical velocity is determined 3250. The mean vertical velocity may then be utilized to determine the updraft EDR 3252. The actual downward vertical velocity is determined 3254 and the downdraft EDR is determined 3258, and the overall EDR is determined 3258. The EDR data may then be masked by echo top data, lightning flash density data, and/or storm overshoot data 3269.

FIG. 33 illustrates an embodiment of the DATCM's integration component. Beginning with weather, turbulence, lightning, radar, satellite, terrain, model, sensor, and/or like data input 3301, which may, in some implementations, provide the DATCM with four-dimensional grid points (three-dimensional space plus time), temperature, winds, humidity, topography, current turbulent conditions, lightning data, radar data, satellite data, model data, historical conditions, and/or the like, the DATCM may, in some embodiments, first process the input through a mountain wave turbulence (MWAVE) component. The non-dimensional mountain wave amplitude ($\hat{a}_{mv}$) 3302 and computes the mountain top wave drag 3303. The following code fragment shows one embodiment of a methodology for such processing:

```
C
C*  a is the non-dimensional wave amplitude (at mountain top)
C
    a (i,m,n) = stab0*h(m,n)/spd0
    h0 (m,n) = a(i,m,n)
C
C*  ddrct is the wind and mountain top wind direction difference
C
    ddrct = ABS(drct−drct0(m,n))
    IF ( (ddrct .lt. 90.0) .or. (ddrct .gt. 270.0) ) THEN
C
C*  a above the mountain top is adjusted for stability, wind,
C*  and density changes.
C
        a (i,m,n) = stab*h(m,n)/spd/COS(ddrct*DTR)*
        + SQRT(pnu0(m,n)/(pmodel*stab*spd))
    ELSE
        a (i,m,n) = 0.0
    END IF
C
C*  maximum a is 2.5
C
```

-continued

```
        IF ( a(i,m,n) .gt. 2.5 ) a(i,m,n) = 2.5
C
C* Find max 'a' below h0max.
C
        IF (ll .lt. nlyrs) THEN
            amax0 = a(ll,m,n) - (zsdg(ll,m,n)-h0max)/
   +             (zsdg(ll,m,n)-zsdg(ll+1,m,n))*
   +             (a(ll,m,n)-a(ll+1,m,n))
            lll = ll
            DO i = ll,1,-1
                IF ( ( a (i,m,n) .ne. RMISSD) and.
   +                 (a(i,m,n) .gt. amax0) ) THEN
                    lll = i-1
                    amax0 = a(i,m,n)
                END IF
            END DO
C
C* 'a' is increased at all levels below max 'a'.
C
            DO i = lll,1,-1
                IF (a (i,m,n) .ne. RMISSD) THEN
                    a (i,m,n) = amax0
                    enhc (i,m,n) = 1.0
                END IF
            END DO
        END IF
C
C* Find .75 vertical wavelength (and 1.75, 2.75, 3.75).
C
        zrefl = (nn + .75)*lambda(m,n) + elv(m,n)
        ll = 1
        DO i = 1,nlyrs
            IF ( zsdg(i,m,n) .lt. zrefl ) ll = i
        END DO
        IF (ll .lt. nlyrs) THEN
            ar = a(ll,m,n) - (zsdg(ll,m,n)-zrefl)/
   +             (zsdg(ll,m,n)-zsdg(ll+1,m,n))*
   +             (a(ll,m,n)-a(ll+1,m,n))
C
C* Find .50 vertical wavelength (and 1.50, 2.50, 3.75).
C
        zhalf = (nn + .50)*lambda(m,n) + elv(m,n)
        lll = 1
        DO i = 1,ll
            IF ( zsdg(i,m,n) .lt. zhalf ) lll = i
        END DO
        ahalf = a(lll,m,n) - (zsdg(lll,m,n)-zhalf)/
   +            (zsdg(lll,m,n)-zsdg(lll+1,m,n))*
   +            (a(lll,m,n)-a(lll+1,m,n))
C
C* 'a' is increased by reflected 'a' if layered
C* favorably.
C
        IF ( ( ahalf .lt. ar ).and.( ahalf .lt. 0.85 ) )THEN
            rcoeff = (ar-ahalf)**2/(ar+ahalf)**2
            refl = rcoeff*ar
            havrfl = .true.
            DO i = ll,1,-1
                IF ( (a(i,m,n) .ne. RMISSD) .and.
   +                 (havrfl) ) THEN
                    arfl = a(i,m,n) + refl
                    a (i,m,n) = arfl
                    IF ( a(i,m,n) .gt. 2.5 ) a(i,m,n) = 2.5
                    enhc (i,m,n) = 1.0
                END IF
            END DO
C
C* Compute mountain top wave drag
C
            drag (m,n) = PI/4.0*h(m,n)*pnu0(m,n)
```

In some embodiments of the DATCM, output obtained from the MWAVE component may then be directed into an integrated turbulence (INTTURB) component, which computes upper level non-dimensional gravity wave amplitude ($\hat{a}_{ul}$) 3304, and sum $\hat{a}_{mv}$, and $\hat{a}_{ul}$ into ($\hat{a}$) to determine buoyant turbulent kinetic energy (TKE$_{buoy}$) 3305. If a is greater than 1 3306, then TKE$_{buoy}$=TKE$_{mv}$+TKE$_{ul-buoy}$ 3307. Otherwise, TKE$_{buoy}$=0 3308. If a greater than $\hat{a}_{min}$ 3309, then TKE=TKE$_{ul-wshr}$ 3310. The boundary layer eddy dissipation rate (EDR) is computed 3311 and if EDR$_{bl}$ is greater than zero and $\hat{a}_{mv}$ is not enhanced 3312, then the EDR=EDR$_{bl}$ 3313, else the EDR is the TKE$^{1/3}$ 3314.

The following code fragment shows one embodiment of a methodology for processing of the INTTURB:

```
C* Non-dimensional L-F amplitude is square root of L-F radiation
C* divided by constant. Constant is for 20km resolution grids
C* and is proportionally scaled to resolution of current grid.
C
        ahatlf = SQRT(ABS(lfrad)/cc*gdd/20000.)
C
C
C* ahat is sum of lf and mw ahats
C
        ahat = ahatlf + ahatmw(i)
C
C* Maximum ahat = 2.5
C
        IF ( ahat .gt. 2.5 ) ahat = 2.5
        IF ( ahat .gt. 1.0 ) THEN
C
C* mountain wave tke is proportional to drag.
C
            tkemw = drag(i)*.0004
C
C* Reduce mw drag above this level
C
            IF ( nhnc(i) .eq. 0.0 )
   +           drag(i) = drag(i)*((2.5-ahat)/1.5)
            tkebuoy = kh*(ahat-1.0)*bvsq(i) + km*wshrsq(i)
   +           + tkemw
            IF (ahat .lt. 1.0) THEN tkebuoy = 0.0
            tke = km*wshrsq(i)*(1.0 + SQRT(rich)*ahat)**2
   +           -kh*bvsq(i)
C
C* Compute layer stability and wind shear
C
            thtamn = ( thta + sfcthta )/2.0
            bvsq = GRAVTY*thtadf/zdf/thtamn
            udf = u - sfcu
            vdf = v - sfcv
            wshrsq = ( udf*udf + vdf*vdf )/zdf/zdf
C
C* Compute tke with equation
C
            tke = km*wshrsq - kh*bvsq
C
C* If the < 0, we've reach top of boundary layer. Set topbl = T
C
            IF ( tke .lt. 0.0 ) THEN
                edrbl = 0.0
                topbl = .true.
            ELSE
                edrbl = tke**.333
            END IF
```

In some embodiments, output obtained from the MWAVE and INTTURB components may then be processed through a VVSTORMSE integration component. For each parcel 3330 a moist determination is made 3332 and if not, the EDR set to null. If the parcel is moist 3332, and if the lifted condensation level pressure is greater than the current layer pressure level 3334, the difference between the parcel temperature and environmental temperature 3340 and vertical acceleration 3344 are determined (e.g., based on the layer thickness, temperature difference, environmental temperature, gravitational constant, and/or the like). If the parcel is moist 3332, and if the lifted condensation level pressure is not greater than the current layer pressure level 3334, the vertical acceleration is set to zero 3335. The vertical velocity at the top of the layer is determined 3348 and the mean upward vertical velocity is determined 3350. The mean vertical velocity may then be utilized to determine the updraft EDR 3352. The actual downward vertical velocity is determined 3354 and the downdraft EDR determined 3358. The overall EDR is determined 3358 for the layer/parcel (e.g., based on updraft and downdraft determinations), and the mask/masking data applied 3359. EDRs from INTURB and VVSTORMSE components are combined/integrated and output 3360. In some embodiments, the EDRs may be summed. In some embodiments, the EDRs are converted to TKE.

FIG. 34 provides an illustrative overview of features of an implementation of the DATCM. As shown in the figure, at time=0, no convective storms have developed in the current path of the aircraft. At time=1, a cumulus tower develops enough to trigger a lightning strike and is processed by the DATCM/VVSTORMSE to identify possible threat area. At time=2, the DATCM/VVSTORMSE identifies that the storm is increasing, identifying threat areas. Based on this, the aircraft is redirected along a path with fewer identified hazards.

Embodiments of the DATCM and/or the VVSTORMSE component(s) provide a granular view of the vertical distribution of convective turbulence. In some embodiments, the DATCM is configured for flight following. Some embodiments of DATCM combine determinations of non-convective turbulence forecasts and convective turbulence into a nowcast that may be utilized in the variety of ways, including those discussed herein with respect to flight path determination and other aviation and weather-dependent activities and applications. Some implementations of the DATCM integrate forecast turbulence and storm turbulence to provide comprehensive flight planning, flight following, and/or comprehensive dynamic real-time rerouting for all altitudes. DATCM flight following implementations may provide up-to-date and/or short term forecasts for aircraft in a given area. In some implementations, alerts/updates may be provided to aircraft directly, and/or to dispatchers or other personnel. In some embodiments, the DATCM may be configured to integrate with management suite or application, such as SCHEIDER ELECTRIC AVIATIONSENTRY.

In some embodiments, the DATCM, for example utilizing a VVSTORMSE component, provides a 0-1 hour turbulence nowcast/forecast based on physical relationships rather than solely based on observational/statistical relationships. The VVSTORMSE component is configured with flexible input variables, allowing for elegant adaptation to include indicators of current convection, and for and exploitation of the same, rather than requiring a complete recalibration if a new variable is identified.

For example, in some embodiments of the DATCM, the magnitude of the united effects of a conditionally unstable lapse rate and a parcel with a LFC are elegantly combined in a diagnostic called convective available potential energy (CAPE). The DATCM/VVSTORMSE (VVSTORMSE) may determine (i.e., compute) CAPE by lifting a parcel along the appropriate dry and moist adiabats. If, by lifting, the parcel can become warmer than its environment, the parcel could reach its LFC. Then the parcel will accelerate upward by buoyant forces until it becomes cooler than its environment again—that level is called the Equilibrium Level (EL). The amount of buoyant acceleration at any level is proportional to the temperature difference between the lifted parcel and the environment. Using the determined parcel acceleration, the VVSTORMSE can determine the updraft velocity (w) at any level in a potential storm. In some embodiments, the integrated value of the buoyant potential energy between the LFC and the EL is the CAPE and is equal to the maximum updraft velocity squared over two ($(w_{max}^2)/2$), where the maximum updraft velocity ($w_{max}$) is a measure of the potential strength of a thunderstorm.

In some embodiments, a typical potentially unstable parcel has to be forcefully lifted to its LFC. The integrated amount of force similarly computed as CAPE between the original parcel level and the LFC is called the convective inhibition (CIN). CIN is a measure of the strength of the "cap," the stable layer above the parcel level that keeps the parcel at its original level. The energy of forced lifting the parcel needs to be greater than the CIN in order for the parcel to reach its LFC. This process may be referred to as "breaking" the cap. VVSTORMSE identifies zones of forced upward lifting. If parcels in those zones can be lifted to their LFC, then VVSTORMSE continues tracking the parcel until it returns to zero somewhere above the EL. The maximum upward vertical velocity is a measure of the storm's potential strength. The level where the upward velocity returns to zero is a measure of its potential top. If parcels cannot reach their LFC or if parcels have no LFC, then no thunderstorms can form. Maximum vertical speeds that result from forced lifting in current observed or numerical forecast diagnostics are only about 10 cm/s. These motions would be sufficient if CIN values were zero. However, CIN values can be 100 j/kg or more in an otherwise favorable environment. Even if CIN=0.5 j/kg, the forced vertical speed to overcome that value would be 1 m/s. As such, traditional numerical diagnostic vertical motions may be inadequately low.

In some embodiments, VVSTORMSE utilizes numerical data to determine vertical motion for lifting from three diagnostics: the dataset's own omega field, vertical motion arising from divergence of frontogenesis vectors, and vertical motion arising from Eckman pumping. The dataset's omega provides sources of vertical motion from processes such as temperature advection and terrain elevation changes. Frontogenesis vectors contain divergence, vorticity, and deformation forcing information so are a complete kinematic description of the vertical motion field. Eckman pumping describes the frictional forcing of vertical motion at the top of the boundary layer and is proportional to the vorticity.

In some embodiments, VVSTORMSE may utilize a framework for convective triggers in numerical mechanisms. In some embodiments, VVSTORMSE inflates the maximum diagnostic (w) by:

$$\omega = \omega_m * \delta x/L * (1 - z_{agl}/H)$$

where $w_m$ is the diagnostic vertical velocity, $\delta x$ is the grid resolution, L=the grid resolution need to explicitly resolve the vertical motion (e.g., 1 km), $z_{agl}$ is the height above ground, and H=is the threshold height (e.g., 4000 m). This inflated vertical velocity is the maximum possible with the given environmental conditions. The formula shows that the higher the grid resolution (lower $\delta x$), the less the inflation. Also, the inflation effect decreases the higher above ground. For example, using a 40 km resolution, a parcel 1 km above ground will have a parameterized vertical velocity 30 (40× 0.75) times that computed by a diagnostic. With this formula, a parameterized vertical velocity can be computed at any grid resolution and at every grid level. In some embodiments, at any grid point, a diagnostic vertical velocity may first be determined/computed at the lowest level above ground. If, at the inflated vertical velocity, a parcel reaches its LFC, VVSTORMSE may continue to track the parcel's vertical velocity as it rises buoyantly. If there is a more unstable parcel aloft or if the forced vertical velocity is higher aloft, then the process may begin again at the new level.

In a horizontal temperature gradient parcels have an additional instability that arises from an inertial imbalance. This instability reduces CINs and increases CAPEs. Since this additional instability is a function of the square of the temperature gradient, it may be most prominent in frontal zones where thunderstorms are likely to be forced. In some implementations, VVSTORMSE adjusts the layer stability for this effect before determining the parcel's acceleration.

In some embodiments, parcel buoyancy is reduced by an elegant bulk entrainment function in which the parcel's wet bulb potential temperature is diluted by a 1% of the environment's wet bulb potential temperature for a given rise (e.g., every 100 m rise) of the parcel.

Once thunderstorms form, they may continue to exist even without external lifting mechanisms by creating internal gust fronts that lift parcels into their updrafts. Utilizing mass conservation, the speed of the lifted parcel at the updraft base ($w_b$) is proportional to the maximum updraft speed by the ratio of the densities at the updraft maximum and at the lifted parcel level. If a forecast updraft exists and the difference between forecast times is below a set level (e.g., three hours or less), for the next forecast time VVSTORMSE predicts where that updraft base will be using a combinatorial storm motion forecasting techniques. The parcel at that new location is lifted at the $w_b$ speed. If it is able to reach its LFC, then VVSTORMSE may create a new updraft. In addition, VVSTORMSE may simulate downdraft effects by suppressing the new forecast time's forced lifting at the storm's old location and at all points between the old and new locations. Such an implementation allows VVSTORMSE to predict a storm's location in an area without any lift evident from the diagnostics.

Figure 36:
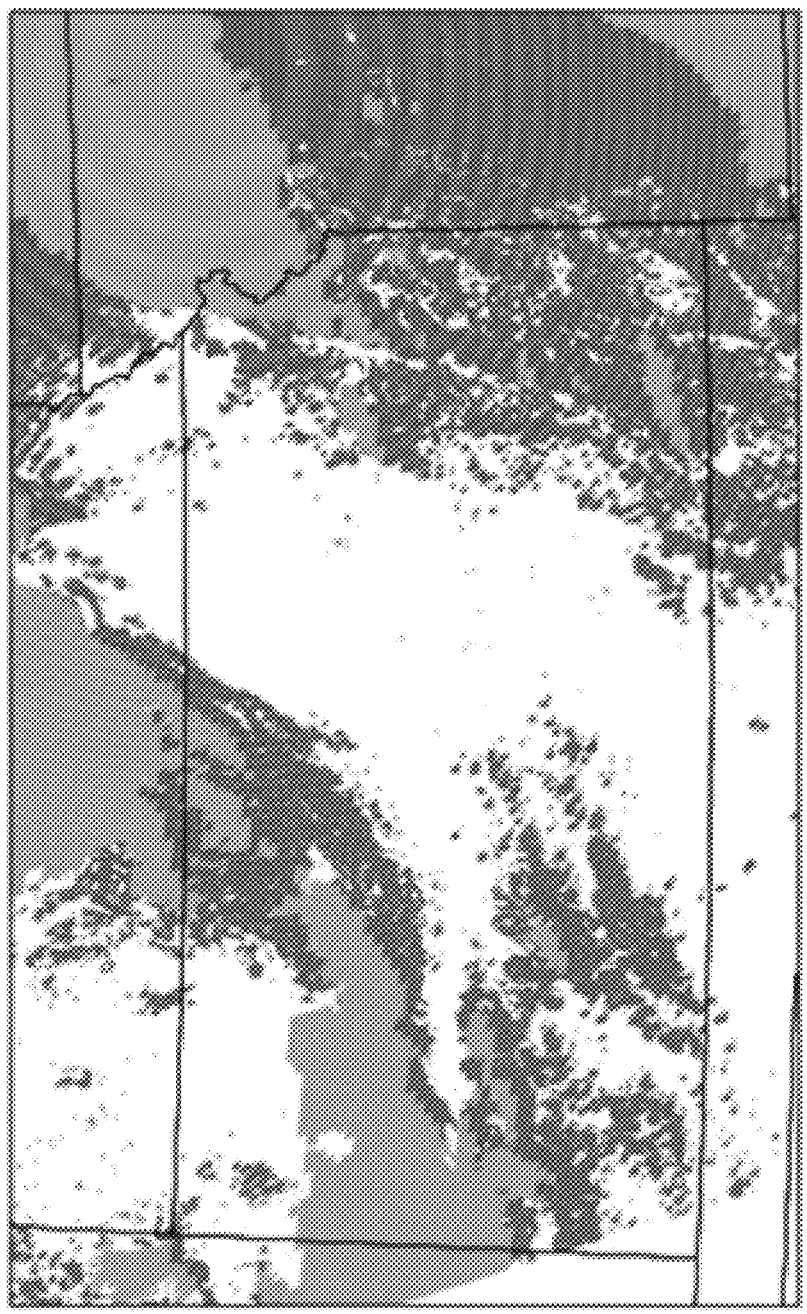
FIG. 36 illustrates an example convective cloud mask for an embodiment.

FIG. 35 illustrates geostationary operational environmental satellite convective initiation data providing a probability measure that convection will occur within the next two hours. FIG. 36 illustrates a convective cloud mask, with cloud mask values in red indicating the presence of immature cumulus and values in green indicate mature cumulus or cirrus clouds. A value of white indicates that no convective cloud is present. FIG. 37 provides output of an overshooting top mask for an embodiment. In some embodiments, VVSTORMSE outputs grids of convective vertical velocities at all levels. In addition, it may output grids of the maximum updraft, updraft tops, and updraft triggers. The maximum updraft display illustrates the location and intensity of potential convection. With the temporal resolution of a numerical mechanism, VVSTORMSE output gives guidance forecasts for thunderstorms at specific times for as far out as a numerical mechanism can forecast.

Some embodiments of the DATCM provide an integrated turbulence product for use in flight planning, and the product may integrate code/components from turbulence components including ULTURB, BLTURB, and MWAVE into one component/program called INTTURN and another integrating VVTURB with ULTURB and BLTURB called VVINTTURB. Output from a component may in some embodiments be in eddy dissipation rate (EDR), an aircraft-independent metric of turbulence intensity. The component/program may, for example, assign an EDR value at each grid point and at each flight level (FL). Observations of turbulence may also be used for further tuning of the forecast where and when they are available in the near term forecast. FIGS. 38A-38C illustrate an example of such an integration of turbulence components in a region where mountain wave and upper level turbulence coexist. FIG. 38A depicts a 3-hour ULTURB forecast for FL340 from the RUC2 calculation verifying 0900UTC, FIG. 38B depicts a 3-hour MWAVE forecast for FL340 from the RUC2 calculation verifying 0900UTC (+'y), and FIG. 38C depicts a 3-hour integrated turbulence forecast for FL340 from the RUC2 calculation verifying 0900UTC (+1y). Note that, while barely any turbulence from MWAVE, and no turbulence from ULTURB, appear in at least some portions of their respective forecasts, the integration of the two together shows severe turbulence. Also note how MWAVE turbulence over Utah is enhanced.

Figure 39A:
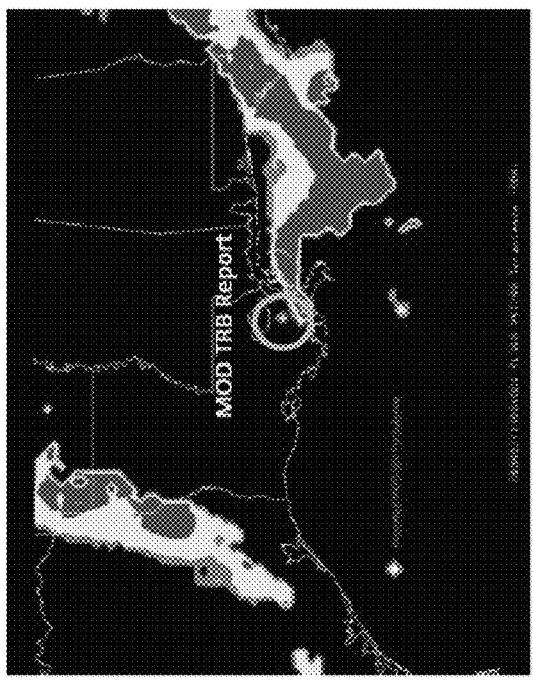
Figure 39B:
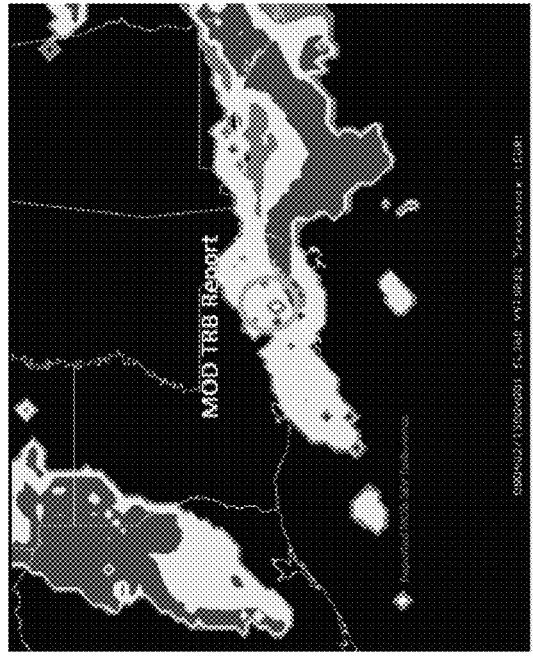
Figure 39C:
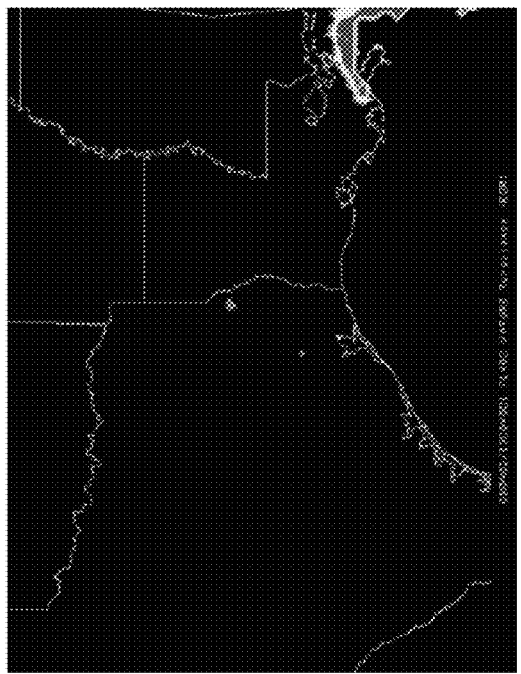
Figure 39D:
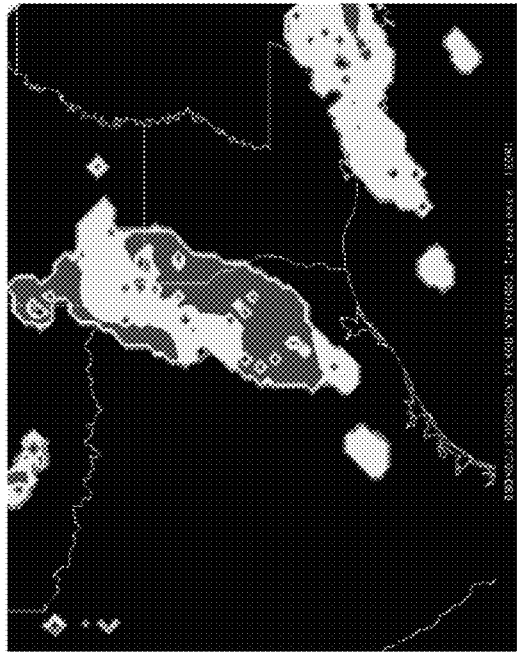

FIGS. 39A-39D show exemplary side-by-side illustrations of convective turbulence forecasts, enhanced by integrating similar components/algorithms used in INTTURB, and using thunderstorms as the source of wave genesis instead of Lighthill-Ford Radiation and mountain barriers. FIGS. 39A and 39B depict 1-hour turbulence forecasts for FL360 from the RUC2 calculation verifying 1400UTC and showing VVTURB output, without and with storm perimeter turbulence, respectively. FIGS. 39C and 39D depict 1-hour turbulence forecasts for FL400 from the RUC2 calculation verifying 1400UTC and showing VVTURB output, without and with above storm turbulence, respectively.

FIG. 40 provides an exemplary horizontal schematic at FL340 where regions of turbulence are displayed for three sources of turbulence. The shaded areas in FIG. 40 represent areas where integrated turbulence with multiple turbulence sources can occur. FIG. 41 depicts an exemplary cross-sectional view of a horizontal schematic such as that of FIG. 40, plotting from points A to B along a flight path through regions wherein different sources can cause turbulence (e.g., upper level, thunderstorm, mountains), and where combinations of multiple sources can interact with each other to potentially amplify turbulence or create turbulence because of interaction of said sources.

An example flow diagram depicting an integrated turbulence forecast process according to some embodiments is provided in FIG. 42. In this example, the data input may include temperatures, winds, humidity, heights, and/or observations such as pilot/aircraft eddy dissipation rate (EDR) values. EDR value is defined as the rate at which kinetic energy from turbulence is absorbed by breaking down the eddied smaller and smaller until all of the energy is converted to heat by viscous forces. EDR is expressed as kinetic energy per unit mass per second in units of velocity squared per second ($m^2/s^3$). Data inputs and/or terrain statistics may be incorporated into the computation of MWAVE, INTTURB, and VVTURB2, which are in turn factored into a turbulence forecast. An 'inflight' time sequence of forecasted turbulence (in units of EDR*100), as may be generated in some embodiments, is provided in tabular form in FIG. 43.

In some embodiments, the output generated by the DATCM is a 4D grid of EDR values in one or more forms, such as GRIB2 format and/or GIS shapefiles, an example of which is provided in FIG. 44. EDR is the cube root of the turbulent kinetic energy (TKE). As such, in some embodiments adding the EDR values together from VVTURB2 and INTTURB may be accomplished by first converting the values into TKE, adding them together, and then converting back to EDR (i.e., by taking the cube root of the sum). The example Shapefile output depicted in FIG. 44 is for FL300, and could be used with any GIS geospatial display system.

Figure 45A:
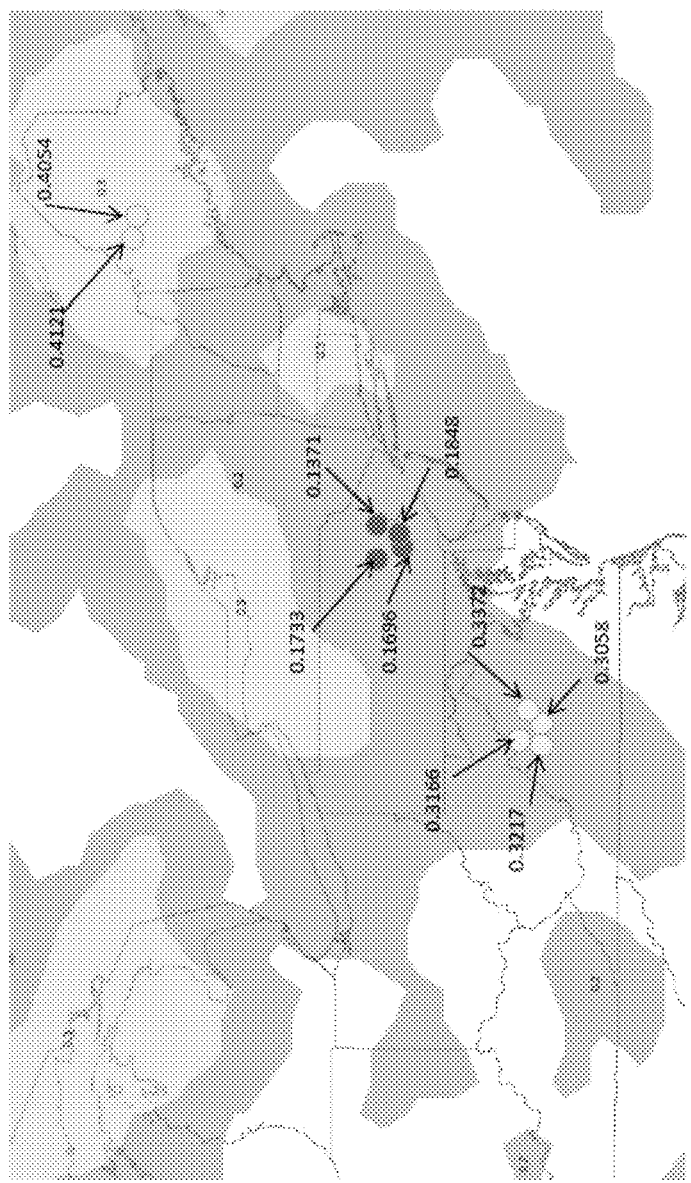

FIG. 45B, prepared using the sample dataset provided in FIG. 45A, shows a collection of observation points overlaying forecast data prior to interpolating into the forecast data with a point data analysis scheme employing a radius of influence, according to one embodiment. A selection of sample observations outside of the forecast EDR was employed in the creation of FIG. 45B.

Throughout this disclosure, 'atmospheric data' may refer to any environmental data related to the atmosphere, e.g., at some point of interest. By way of non-limiting example, the atmospheric data received and/or processed by the DATCM may include one or more of the following: temperature, moisture/water content, humidity, pressure, wind speed, wind direction, local EDR, wind shear, liquid water content, ozone concentration, pollution, and/or the like. Atmospheric data may comprise partial or full contents of forecasts (e.g., numerical weather forecast data), meteograms, atmospheric soundings, surface observations, radar pictures, meteorological charts (e.g., surface pressure charts), weather maps, numerical weather prediction maps, and/or the like. Atmospheric data may, in some embodiments, be obtained directly or indirectly from sensors (e.g., infrared radiometers, microwave radiometers, hygrometers, pitot-static systems, gyroscopes, thermometers, barometers, optical sensors, radar, lidar, sodar, ceilometers, spectrometers, weather balloons, water vapor sensors, and/or the like), as well as from pilot reports. Depending on the embodiment, instruments (e.g., sensors) for measuring the atmospheric data used by the DATCM may be positioned in/on the aircraft itself, may be located on earth (e.g., as part of a grounded weather station), and/or may be part of an extraneous system, such as a weather balloon, a satellite, or avionics on another aircraft/spacecraft, etc.

Various embodiments of the DATCM are contemplated by this disclosure, with the below exemplary, non-limiting embodiments A1-E3 provided to illustrate aspects of some implementations of embodiments of the DATCM.

A1. A dynamic DATCM platform processor-implemented flight planning method, comprising: receiving parameter data for an initial anticipated flight plan; determining airfoil type for an aircraft associated with the initial anticipated flight plan; obtaining atmospheric data based on the flight plan parameter data; determining a plurality of four-dimensional grid points based on the flight plan parameter data; determining corresponding icing data for each point of the plurality of four-dimensional grid point based on the airfoil type; determining via a processor a percent power increase for the initial anticipated flight plan; determining an at least one alternative flight plan based on the flight plan parameter data and the determined percent power increase for the initial anticipated flight plan; and providing the determined at least one alternative flight plan.

A2. The method of embodiment A1, wherein the parameter data includes aircraft data.

A3. The method of embodiment A1 or A2, wherein the parameter data includes the airfoil type.

A4. The method of any of the preceding embodiments, wherein the initial anticipated flight plan comprises a shortest route flight plan.

A5. The method of any of the preceding embodiments, wherein the at least one alternative flight plan comprises an optimized route flight plan.

A6. The method of embodiment A5, wherein the optimized route flight plan is optimized for safety.

A7. The method of embodiment A6, wherein the optimized route flight plan is optimized for safety and fuel consumption.

A8. The method of any of the preceding embodiments, wherein the flight plan parameter data includes take-off time.

A9. The method of any of the preceding embodiments, wherein the flight plan parameter data includes take-off location.

A10. The method of any of the preceding embodiments, wherein the flight plan parameter data includes destination location.

A11. A dynamic DATCM platform flight planning system, comprising: means to receive parameter data for an initial anticipated flight plan; means to determine airfoil type for an aircraft associated with the initial anticipated flight plan; means to obtain atmospheric data based on the flight plan parameter data; means to determine a plurality of four-dimensional grid points based on the flight plan parameter data; means to determine corresponding icing data for each point of the plurality of four-dimensional grid point based on the airfoil type; means to determine a percent power increase for the initial anticipated flight plan; means to determine an at least one alternative flight plan based on the flight plan parameter data and the determined percent power increase for the initial anticipated flight plan; and means to provide the determined at least one alternative flight plan.

A12. The system of embodiment A11, wherein the parameter data includes aircraft data.

A13. The system of embodiment A11 or A12, wherein the parameter data includes the airfoil type.

A14. The system of any of embodiment(s) A11, A12, or A13, wherein the initial anticipated flight plan comprises a shortest route flight plan.

A15. The system of any of embodiment(s) A11, A12, A13, or A14, wherein the at least one alternative flight plan comprises an optimized route flight plan.

A16. The system of embodiment A15, wherein the optimized route flight plan is optimized for safety.

A17. The system of embodiment A15 or A16, wherein the optimized route flight plan is optimized fuel consumption.

A18. The system of any of embodiment(s) A11, A12, A13, A14, A15, A16, or A17, wherein the flight plan parameter data includes take-off time.

A19. The system of any of embodiment(s) A11, A12, A13, A14, A15, A16, A17, or A18, wherein the flight plan parameter data includes take-off location.

A20. The system of any of embodiment(s) A11, A12, A13, A14, A15, A16, A17, A18, or A19, wherein the flight plan parameter data includes destination location.

A21. A processor-readable non-transitory medium storing processor-issuable dynamic DATCM flight plan generating instructions to: receive parameter data for an initial anticipated flight plan; determine airfoil type for an aircraft associated with the initial anticipated flight plan; obtain atmospheric data based on the flight plan parameter data; determine a plurality of four-dimensional grid points based on the flight plan parameter data; determine corresponding icing data for each point of the plurality of four-dimensional grid point based on the airfoil type; determine a percent power increase for the initial anticipated flight plan; determine an at least one alternative flight plan based on the flight plan parameter data and the determined percent power increase for the initial anticipated flight plan; and provide the determined at least one alternative flight plan.

A22. The medium of embodiment A21, wherein the parameter data includes aircraft data.

A23. The medium of embodiment A21 or A22, wherein the parameter data includes the airfoil type.

A24. The medium of any of embodiment(s) A21, A22, or A23, wherein the initial anticipated flight plan comprises a shortest route flight plan.

A25. The medium of any of embodiment(s) A21, A22, A23, or A24, wherein the at least one alternative flight plan comprises an optimized route flight plan.

A26. The medium of embodiment A25, wherein the optimized route flight plan is optimized for safety.

A27. The medium of embodiment A25 or A26, wherein the optimized route flight plan is optimized for fuel consumption.

A28. The medium of any of embodiment(s) A21, A22, A23, A24, A25, A26, or A27, wherein the flight plan parameter data includes take-off time.

A29. The medium of any of embodiment(s) A21, A22, A23, A24, A25, A26, A27, or A28, wherein the flight plan parameter data includes take-off location.

A30. The medium of any of embodiment(s) A21, A22, A23, A24, A25, A26, A27, A28, or A29, wherein the flight plan parameter data includes destination location.

A31. A dynamic airfoil icing controller/platform flight planning apparatus, comprising: a processor; and a memory disposed in communication with the processor and storing processor-issuable instructions to: receive parameter data for an initial anticipated flight plan; determine airfoil type for an aircraft associated with the initial anticipated flight plan; obtain atmospheric data based on the flight plan parameter data; determine a plurality of four-dimensional grid points based on the flight plan parameter data; determine corresponding icing data for each point of the plurality of four-dimensional grid point based on the airfoil type; determine a percent power increase for the initial anticipated flight plan; determine an at least one alternative flight plan based on the flight plan parameter data and the determined percent power increase for the initial anticipated flight plan; and provide the determined at least one alternative flight plan.

A32. The apparatus of embodiment A31, wherein the parameter data includes aircraft data.

A33. The apparatus of embodiment A31 or A32, wherein the parameter data includes the airfoil type.

A34. The apparatus of any of embodiment(s) A31, A32, or A33, wherein the initial anticipated flight plan comprises a shortest route flight plan.

A35. The apparatus of any of embodiment(s) A31, A32, A33, or A34, wherein the at least one alternative flight plan comprises an optimized route flight plan.

A36. The apparatus of embodiment A35, wherein the optimized route flight plan is optimized for safety.

A37. The apparatus of embodiment A35 or A36, wherein the optimized route flight plan is optimized fuel consumption.

A38. The apparatus of any of embodiment(s) A31, A32, A33, A34, A35, A36, or A37, wherein the flight plan parameter data includes take-off time.

A39. The apparatus of any of embodiment(s) A31, A32, A33, A34, A35, A36, A37, or A38, wherein the flight plan parameter data includes take-off location.

A40. A dynamic DATCM flight planning method, comprising: receiving a PPI flight parameter input associated with an aircraft; determining an airfoil type for the aircraft associated with the PPI flight parameter input; determining atmospheric data based on the PPI flight parameter input; providing the determined airfoil type and atmospheric data to a PPI component for the determination of a PPI icing avoidance value; receiving, from the PPI component, an indication of the determined PPI icing avoidance value; and providing the determined PPI icing avoidance value in response to the PPI flight parameter input.

A41. The method of embodiment A40, wherein the PPI flight parameter input is configured to represent the present airfoil configuration and atmospheric conditions being experienced by the aircraft.

A42. The method of embodiment A40, wherein the PPI flight parameter input is configured to represent the expected airfoil configuration and atmospheric conditions that will be experienced by the aircraft at a future point in time.

A43. The method of embodiment A40, wherein the determined atmospheric data includes a temperature.

A44. The method of embodiment A40, wherein the determined atmospheric data includes a value associated with the water content of the atmosphere about the aircraft at a point in time.

A45. The method of any of the embodiment(s) A41, A42, A43 or A44 wherein the PPI component is a hardware PPI component.

A46. The method of embodiment A45, wherein the hardware PPI component is an ASIC.

A47. The method of embodiment A45, wherein the hardware PPI component is an FPGA.

A48. The method of any of the embodiment(s) A41, A42, A43 or A44 wherein the PPI component is a PPI component containing processor executable instructions.

A49. The method of any of the embodiment(s) A41, A42, A43 or A44 wherein the PPI component is a PPI component composed of two-or-more sub-components.

A50. The method of embodiment A49, wherein the PPI component is comprised of a first sub-component in hardware for determining a first value associated with the PPI icing avoidance value and a second sub-component containing processor executable instructions for determining a second value associated with the PPI icing avoidance value.

A51. The method of embodiment A50, wherein the first and second value associated with the PPI icing avoidance value are used to determine the PPI icing avoidance value.

AA51. A dynamic DATCM flight planning apparatus, comprising a processor, and a memory disposed in communication with the processor and storing processor-issuable instructions to perform the method of any of embodiments A40-A51.

A52. A dynamic DATCM flight planning system, comprising: means to receive a PPI flight parameter input associated with an aircraft; means to determine an airfoil type for the aircraft associated with the PPI flight parameter input; means to determine atmospheric data based on the PPI flight parameter input; means to provide the determined airfoil type and atmospheric data to a PPI component for the determination of a PPI icing avoidance value; means to receive, from the PPI component, an indication of the determined PPI icing avoidance value; and means to provide the determined PPI icing avoidance value in response to the PPI flight parameter input.

A53. The system of embodiment A52, wherein the PPI flight parameter input is configured to represent the present airfoil configuration and atmospheric conditions being experienced by the aircraft.

A54. The system of embodiment A52, wherein the PPI flight parameter input is configured to represent the expected airfoil configuration and atmospheric conditions that will be experienced by the aircraft at a future point in time.

A55. The system of embodiment A52, wherein the determined atmospheric data includes a temperature.

A56. The system of embodiment A52, wherein the determined atmospheric data includes a value associated with the water content of the atmosphere about the aircraft at a point in time.

A57. The system of any of the embodiment(s) A53, A54, A55 or A56 wherein the PPI component is a hardware PPI component.

A58. The system of embodiment A57, wherein the hardware PPI component is an ASIC.

A59. The system of embodiment A57, wherein the hardware PPI component is an FPGA.

A60. The system of any of the embodiment(s) A53, A54, A55 or A56 wherein the PPI component is a PPI component containing processor executable instructions.

A61. The system of any of the embodiment(s) A53, A54, A55 or A56 wherein the PPI component is a PPI component composed of two-or-more sub-components.

A62. The system of embodiment A61, wherein the PPI component is comprised of a first sub-component in hardware for determining a first value associated with the PPI icing avoidance value and a second sub-component containing processor executable instructions for determining a second value associated with the PPI icing avoidance value.

A63. The system of embodiment A62, wherein the first and second value associated with the PPI icing avoidance value are used to determine the PPI icing avoidance value.

A64. A dynamic DATCM flight planning system, comprising: means to receive parameter data for an initial anticipated flight plan; means to determine airfoil type for an aircraft associated with the initial anticipated flight plan; means to obtain atmospheric data based on the flight plan parameter data; means to determine a plurality of grid points based on the flight plan parameter data; means to determine corresponding icing data for each grid point of the plurality of grid points based on the airfoil type and atmospheric data; and means to determine a percent power increase for the initial anticipated flight plan.

A65. The system of embodiment A64, further comprising means to output the determined percent power increase.

A66. The system of embodiment A64 or A65, further comprising means to determine an at least one alternative flight plan.

A67. The system of embodiment A66, further comprising means to determine a percent power increase for the at least one alternative flight plan.

A68. The system of embodiment A67, further comprising means to output the determined percent power increase for the at least one alternative flight plan.

A69. The system of embodiment A67, further comprising means to compare the initial anticipated flight plan and the at least one alternative flight plan.

A70. The system of embodiment A69, wherein the comparison is based on determined percent power increase.

A71. The system of embodiment A69 or A70, wherein the comparison is based on distance.

A72. The system of any of embodiments A69-A71, wherein the comparison is based on flight time.

A73. The system of any of embodiments A69-A72, wherein the comparison is based on fuel consumption.

A74. The system of any of embodiments A69-A73, wherein the comparison is based on risk.

A75. The system of any of embodiments A66-A73, further comprising means to determine at least one alternative flight plan based on the flight plan parameter data and the determined percent power increase for the initial anticipated flight plan.

A76. The system of any of embodiments A66-A75, further comprising means to provide the determined at least one alternative flight plan.

A77. The system of any of embodiments A64-A76, wherein the grid points are four-dimensional grid points.

A78. The system of any of embodiments A64-A77, wherein the parameter data includes aircraft data.

A79. The system of any of embodiments A64-A78, wherein the parameter data includes the airfoil type.

A80. The system of any of embodiments A64-A79, wherein the initial anticipated flight plan comprises a shortest route flight plan.

A81. The system of any of embodiments A66-A80, wherein the at least one alternative flight plan comprises an optimized route flight plan.

A82. The system of embodiment A81, wherein the optimized route flight plan is optimized for safety.

A83. The system of embodiment A81 or A82, wherein the optimized route flight plan is optimized fuel consumption.

A84. The system of any of embodiments A64-A83, wherein the flight plan parameter data includes take-off time.

A85. The system of any of embodiments A64-A84, wherein the flight plan parameter data includes take-off location.

A86. The system of any of embodiments A64-A85, wherein the flight plan parameter data includes destination location.

B1. A DATCM dynamic turbulence engine processor-implemented method, comprising: determining a plurality of four-dimensional grid points for a specified temporal geographic space-time area; obtaining terrain data based on the temporal geographic space-time area; obtaining atmospheric data based on the temporal geographic space-time area; for each point of the plurality of four-dimensional grid point, determining via a processor a non-dimensional mountain wave amplitude and mountain top wave drag; determining an upper level non-dimensional gravity wave amplitude; determining a buoyant turbulent kinetic energy; determining a boundary layer eddy dissipation rate; determining storm velocity and eddy dissipation rate from updrafts; determining maximum updraft speed at grid point equilibrium level; determining storm divergence while the updraft speed is above the equilibrium level and identifying storm top; determining storm overshoot and storm drag; determining Doppler speed; determining eddy dissipation rate above the storm top; determining eddy dissipation rate from downdrafts; determining at least one of the turbulent kinetic energy and the total eddy dissipation rate for each grid point; and providing a four-dimensional grid map overlay with comprehensive turbulence data for the specified temporal geographic space-time area.

B2. The method of embodiment B1, wherein the atmospheric data comprises temperature data.

B3. The method of embodiment B1 or B2, wherein the atmospheric data comprises wind data.

B4. The method of any of embodiments B1-B3, wherein the atmospheric data comprises humidity data.

B5. The method of any of embodiment B1-B4, wherein the atmospheric data comprises numerical weather forecast data.

B6. The method of any of embodiments B1-B5, wherein the atmospheric data comprises aircraft sensor data.

B7. The method of any of embodiments B1-B6, wherein the atmospheric data comprises pilot report data.

B8. The method of any of embodiments B1-B7, further comprising providing a user interface for the four-dimensional grid map overlay with comprehensive turbulence data.

B9. The method of embodiment B8, wherein the user interface is displayed on a two-dimensional display and the user interface includes an at least one widget for navigating through at least one further dimension.

B10. The method of embodiment B8, wherein the user interface includes a granularity widget that allows a user to adjust the displayed detail.

B11. A DATCM dynamic turbulence system, comprising: means to determine a plurality of four-dimensional grid points for a specified temporal geographic space-time area; means to obtain terrain data based on the temporal geographic space-time area; means to obtain atmospheric data based on the temporal geographic space-time area; for each point of the plurality of four-dimensional grid point, means to determine a non-dimensional mountain wave amplitude and mountain top wave drag; means to determine an upper level non-dimensional gravity wave amplitude; means to determine a buoyant turbulent kinetic energy; means to determine a boundary layer eddy dissipation rate; means to determine storm velocity and eddy dissipation rate from updrafts; means to determine maximum updraft speed at grid point equilibrium level; means to determine storm divergence while the updraft speed is above the equilibrium level and identifying storm top; means to determine storm overshoot and storm drag; means to determine Doppler speed; means to determine eddy dissipation rate above the storm top; means to determine eddy dissipation rate from downdrafts; means to determine at least one of the turbulent kinetic energy and the total eddy dissipation rate for each grid point; and means to provide a four-dimensional grid map overlay with comprehensive turbulence data for the specified temporal geographic space-time area.

B12. The system of embodiment B11, wherein the atmospheric data comprises temperature data.

B13. The system of embodiment B11 or B12, wherein the atmospheric data comprises wind data.

B14. The system of any of embodiments B11-B13, wherein the atmospheric data comprises humidity data.

B15. The system of any of embodiments B11-B14, wherein the atmospheric data comprises numerical weather forecast data.

B16. The system of any of embodiments B11-B15, wherein the atmospheric data comprises aircraft sensor data.

B17. The system of any of embodiments B11-B16, wherein the atmospheric data comprises pilot report data.

B18. The system of any of embodiments B11-B17, further comprising: means to provide a user interface for the four-dimensional grid map overlay with comprehensive turbulence data.

B19. The system of embodiment B18, wherein the user interface is configured for display on a two-dimensional display and the user interface includes an at least one widget for navigating through at least one further dimension.

B20. The system of embodiment B18, wherein the user interface includes a granularity widget that allows a user to adjust the displayed detail.

B21. A processor-readable tangible medium storing processor-issuable dynamic turbulence grid map overlay generating instructions to: determine a plurality of four-dimensional grid points for a specified temporal geographic space-time area; obtain terrain data based on the temporal geographic space-time area; obtain atmospheric data based on the temporal geographic space-time area; for each point of the plurality of four-dimensional grid point, determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identifying storm top; determine storm overshoot and storm drag; determine Doppler speed; determine eddy dissipation rate above the storm top; determine eddy dissipation rate from downdrafts; determine at least one of the turbulent kinetic energy and the total eddy dissipation rate for each grid point; and provide a four-dimensional grid map overlay with comprehensive turbulence data for the specified temporal geographic space-time area.

B22. The medium of embodiment B21, wherein the atmospheric data comprises temperature data.

B23. The medium of embodiment B21 or B22, wherein the atmospheric data comprises wind data.

B24. The medium of any of embodiments B21-B23, wherein the atmospheric data comprises humidity data.

B25. The medium of any of embodiments B21-B24, wherein the atmospheric data comprises numerical weather forecast data.

B26. The medium of any of embodiments B21-B25, wherein the atmospheric data comprises aircraft sensor data.

B27. The medium of any of embodiments B21-B26, wherein the atmospheric data comprises pilot report data.

B28. The medium of any of embodiments B21-B27, further comprising instructions to: provide a user interface for the four-dimensional grid map overlay with comprehensive turbulence data.

B29. The medium of embodiment B28, wherein the user interface is configured for display on a two-dimensional display and the user interface includes an at least one widget for navigating through at least one further dimension.

B30. The medium of embodiment B28, wherein the user interface includes a granularity widget that allows a user to adjust the displayed detail.

B31. A DATCM dynamic turbulence apparatus, comprising a processor and a memory disposed in communication with the processor and storing processor-issuable instructions to: determine a plurality of four-dimensional grid points for a specified temporal geographic space-time area; obtain terrain data based on the temporal geographic space-time area; obtain atmospheric data based on the temporal geographic space-time area; for each point of the plurality of four-dimensional grid point, determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identifying storm top; determine storm overshoot and storm drag; determine Doppler speed; determine eddy dissipation rate above the storm top; determine eddy dissipation rate from downdrafts; determine at least one of the turbulent kinetic energy and the total eddy dissipation rate for each grid point; and provide a four-dimensional grid map overlay with comprehensive turbulence data for the specified temporal geographic space-time area.

B32. The system of embodiment B31, wherein the atmospheric data comprises temperature data.

B33. The apparatus of embodiment B31 or B32, wherein the atmospheric data comprises wind data.

B34. The apparatus of any of embodiments B31-B33, wherein the atmospheric data comprises humidity data.

B35. The apparatus of any of embodiment B31-B34, wherein the atmospheric data comprises numerical weather forecast data.

B36. The apparatus of any of embodiments B31-B35, wherein the atmospheric data comprises aircraft sensor data.

B37. The apparatus of any of embodiments B31-B36, wherein the atmospheric data comprises pilot report data.

B38. The apparatus of any of embodiments B31-B37, further comprising instructions to: provide a user interface for the four-dimensional grid map overlay with comprehensive turbulence data.

B39. The apparatus of embodiment B38, wherein the user interface is displayed on a two-dimensional display and the user interface includes an at least one widget for navigating through at least one further dimension.

B40. The apparatus of embodiment B38, wherein the user interface includes a granularity widget that allows a user to adjust the displayed detail.

B41. A DATCM dynamic turbulence system, comprising: means to determine a plurality of grid points for an area; means to determine at least one of the turbulent kinetic energy and the total eddy dissipation rate for each grid point; and means to provide a grid map overlay with comprehensive turbulence data for the area.

B42. The system of embodiment B41, wherein the grid points are four-dimensional grid points.

B43. The system of embodiment B41 or B42, wherein the area is specified.

B44. The system of any of embodiments B41-B43, wherein the area is a space-time area.

B45. The system of any of embodiments B41-B44, wherein the area is a temporal geographic area.

B46. The system of any of embodiments B41-B43, wherein the area is a temporal geographic space-time area B47. The system of any of embodiments B41-B46, wherein the grid map overlay is a four-dimensional grid map overlay B48. The system of any of embodiments B41-B47, comprising: means to obtain area terrain data.

B49. The system of any of embodiments B41-B48, comprising: means to obtain area atmospheric data.

B50. The system of any of embodiments B41-B49, comprising: means to determine non-dimensional mountain wave amplitude.

B51. The system of any of embodiments B41-B50, comprising: means to determine mountain top wave drag.

B52. The system of any of embodiments B41-B51, comprising: means to determine upper level non-dimensional gravity wave amplitude.

B53. The system of any of embodiments B41-B52, comprising: means to determine buoyant turbulent kinetic energy.

B54. The system of any of embodiments B41-B53, comprising: means to determine boundary layer eddy dissipation rate.

B55. The system of any of embodiments B41-B54, comprising: means to determine storm velocity.

B56. The system of any of embodiments B41-B55, comprising: means to determine eddy dissipation rate from updrafts.

B57. The system of any of embodiments B41-B56, comprising: means to determine maximum updraft speed at equilibrium level.

B58. The system of any of embodiments B41-B57, comprising: means to determine storm divergence.

B59. The system of any of embodiments B41-B57, comprising: means to determine storm divergence while the updraft speed is above the equilibrium level.

B60. The system of any of embodiments B41-B59, comprising: means to identify storm top.

B61. The system of any of embodiments B41-B60, comprising: means to determine storm overshoot.

B62. The system of any of embodiments B41-B61, comprising: means to determine storm drag.

B63. The system of any of embodiments B41-B62, comprising: means to determine Doppler speed.

B64. The system of any of embodiments B41-B63, comprising: means to determine eddy dissipation rate above the storm top.

B65. The system of any of embodiments B41-B64, comprising: means to determine eddy dissipation rate from downdrafts.

B66. The system of any of embodiments B41-B65, comprising: means to determine grid point non-dimensional mountain wave amplitude.

B67. The system of any of embodiments B41-B66, comprising: means to determine grid point mountain top wave drag.

B68. The system of any of embodiments B41-B67, comprising: means to determine grid point upper level non-dimensional gravity wave amplitude.

B69. The system of any of embodiments B41-B68, comprising: means to determine grid point buoyant turbulent kinetic energy.

B70. The system of any of embodiments B41-B69, comprising: means to determine grid point boundary layer eddy dissipation rate.

B71. The system of any of embodiments B41-B70, comprising: means to determine grid point storm velocity.

B72. The system of any of embodiments B41-B71, comprising: means to determine grid point eddy dissipation rate from updrafts.

B73. The system of any of embodiments B41-B72, comprising: means to determine maximum updraft speed at grid point equilibrium level.

B74. The system of any of embodiments B41-B73, comprising: means to determine grid point storm divergence.

B75. The system of any of embodiments B41-B74, comprising: means to determine grid point storm divergence while the updraft speed is above the equilibrium level.

B76. The system of any of embodiments B41-B75, comprising: means to identify grid point storm top.

B77. The system of any of embodiments B41-B76, comprising: means to determine grid point storm overshoot.

B78. The system of any of embodiments B41-B77, comprising: means to determine grid point storm drag.

B79. The system of any of embodiments B41-B78, comprising: means to determine grid point Doppler speed.

B80. The system of any of embodiments B41-B79, comprising: means to determine grid point eddy dissipation rate above the storm top.

B81. The system of any of embodiments B41-B80, comprising: means to determine grid point eddy dissipation rate from downdrafts.

B82. The system of any of embodiments B41-B81, wherein the atmospheric data comprises temperature data.

B83. The system of any of embodiments B41-B82, wherein the atmospheric data comprises wind data.

B84. The system of any of embodiments B41-B83, wherein the atmospheric data comprises humidity data.

B85. The system of any of embodiments B41-B84, wherein the atmospheric data comprises numerical weather forecast data.

B86. The system of any of embodiments B41-B85, wherein the atmospheric data comprises aircraft sensor data.

B87. The system of any of embodiments B41-B86, wherein the atmospheric data comprises pilot report data.

B88. The system of any of embodiments B41-B87, further comprising: means to provide a user interface for a four-dimensional grid map overlay with comprehensive turbulence data.

B89. The system of embodiment B88, wherein the user interface is configured for display on a two-dimensional display and the user interface includes an at least one widget for navigating through at least one further dimension.

B90. The system of embodiment B88, wherein the user interface includes a granularity widget that allows a user to adjust the displayed detail.

C1. A DATCM manager real-time flight plan modification processor-implemented method, comprising: receiving a flight profile for an aircraft, the flight profile including an at least one initial route; identifying an initial predicted comprehensive turbulence for the at least one initial route; determining a real-time comprehensive turbulence for the the at least one initial route; determining turbulence threshold compliance based on the real-time comprehensive turbulence and at least one of the flight profile and the initial predicted comprehensive turbulence; and generating a turbulence exception if the real-time comprehensive turbulence exceeds threshold turbulence parameters.

C2. The method of embodiment C1, wherein the turbulence exception comprises an alert for the aircraft.

C3. The method of embodiment C1, wherein the turbulence exception comprises determining an at least one adjusted route.

C4. The method of embodiment C3, wherein the determination of the at least one adjusted route is based on flight profile data.

C5. The method of embodiment C4, wherein the flight profile data comprises at least one of flight service type, aircraft airframe, and available fuel reserves.

C6. The method of embodiment C4, wherein the flight profile data comprises flight destination location.

C7. The method of embodiment C1, wherein comprehensive turbulence determination comprises: determining a plurality of four-dimensional grid points for a specified temporal geographic space-time area; obtaining terrain data based on the temporal geographic space-time area; obtaining atmospheric data based on the temporal geographic space-time area; for each point of the plurality of four-dimensional grid point, determining via a processor a non-dimensional mountain wave amplitude and mountain top wave drag; determining an upper level non-dimensional gravity wave amplitude; determining a buoyant turbulent kinetic energy; determining a boundary layer eddy dissipation rate; determining storm velocity and eddy dissipation rate from updrafts; determining maximum updraft speed at grid point equilibrium level; determining storm divergence while the updraft speed is above the equilibrium level and identifying storm top; determining storm overshoot and storm drag; determining Doppler speed; determining eddy dissipation rate above the storm top; determining eddy dissipation rate from downdrafts; and determining at least one of the turbulent kinetic energy and the total eddy dissipation rate for each grid point.

C8. The method of embodiment C7, wherein the atmospheric data comprises at least one of temperature data, wind data, and humidity data.

C9. The method of embodiment C7, wherein the atmospheric data comprises numerical weather forecast data.

C10. The method of embodiment C7, wherein the atmospheric data comprises aircraft sensor data.

C11. A DATCM dynamic turbulence real-time flight plan modification apparatus, comprising a processor and a memory disposed in communication with the processor and storing processor-issuable instructions to: receive a flight profile for an aircraft, the flight profile including an at least one initial route; identify an initial predicted comprehensive turbulence for the at least one initial route; determine a real-time comprehensive turbulence for the the at least one initial route; determine turbulence threshold compliance based on the real-time comprehensive turbulence and at least one of the flight profile and the initial predicted comprehensive turbulence; and generate a turbulence exception if the real-time comprehensive turbulence exceeds threshold turbulence parameters.

C12. The apparatus of embodiment C11, wherein the turbulence exception comprises an alert for the aircraft.

C13. The apparatus of embodiment C11, wherein the turbulence exception comprises determining an at least one adjusted route.

C14. The apparatus of embodiment C13, wherein the determination of the at least one adjusted route is based on flight profile data.

C15. The apparatus of embodiment C14, wherein the flight profile data comprises at least one of flight service type, aircraft airframe, and available fuel reserves.

C16. The apparatus of embodiment C14, wherein the flight profile data comprises flight destination location.

C17. The apparatus of embodiment C11, wherein comprehensive turbulence determination comprises instructions to: determine a plurality of four-dimensional grid points for a specified temporal geographic space-time area; obtain terrain data based on the temporal geographic space-time area; obtain atmospheric data based on the temporal geographic space-time area; for each point of the plurality of four-dimensional grid point: determine a non-dimensional mountain wave amplitude and mountain top wave drag, determine an upper level non-dimensional gravity wave amplitude, determine a buoyant turbulent kinetic energy, determine a boundary layer eddy dissipation rate, determine storm velocity and eddy dissipation rate from updrafts, determine maximum updraft speed at grid point equilibrium level, determine storm divergence while the updraft speed is above the equilibrium level and identifying storm top, determine storm overshoot and storm drag, determine Doppler speed, determine eddy dissipation rate above the storm top, determine eddy dissipation rate from downdrafts; and determine at least one of the turbulent kinetic energy and the total eddy dissipation rate for each grid point.

C18. The apparatus of embodiment C17, wherein the atmospheric data comprises at least one of temperature data, wind data, and humidity data.

C19. The apparatus of embodiment C17, wherein the atmospheric data comprises numerical weather forecast data.

C20. The apparatus of embodiment C17, wherein the atmospheric data comprises aircraft sensor data.

C21. A processor-readable tangible medium storing processor-issuable dynamic turbulence manager real-time flight plan modification instructions to: receive a flight profile for an aircraft, the flight profile including an at least one initial route; identify an initial predicted comprehensive turbulence for the at least one initial route; determine a real-time comprehensive turbulence for the the at least one initial route; determine turbulence threshold compliance based on the real-time comprehensive turbulence and at least one of the flight profile and the initial predicted comprehensive turbulence; and generate a turbulence exception if the real-time comprehensive turbulence exceeds threshold turbulence parameters.

C22. The medium of embodiment C21, wherein the turbulence exception comprises an alert for the aircraft.

C23. The medium of embodiment C21, wherein the turbulence exception comprises determining an at least one adjusted route.

C24. The medium of embodiment C23, wherein the determination of the at least one adjusted route is based on flight profile data.

C25. The medium of embodiment C24, wherein the flight profile data comprises at least one of flight service type, aircraft airframe, and available fuel reserves.

C26. The medium of embodiment C24, wherein the flight profile data comprises flight destination location.

C27. The medium of embodiment C21, wherein comprehensive turbulence determination comprises instructions to: determine a plurality of four-dimensional grid points for a specified temporal geographic space-time area; obtain terrain data based on the temporal geographic space-time area; obtain atmospheric data based on the temporal geographic space-time area; for each point of the plurality of four-dimensional grid point, determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identifying storm top; determine storm overshoot and storm drag; determine Doppler speed; determine eddy dissipation rate above the storm top; determine eddy dissipation rate from downdrafts; and determine at least one of the turbulent kinetic energy and the total eddy dissipation rate for each grid point.

C28. The medium of embodiment C27, wherein the atmospheric data comprises at least one of temperature data, wind data, and humidity data.

C29. The medium of embodiment C27, wherein the atmospheric data comprises numerical weather forecast data.

C30. The medium of embodiment C27, wherein the atmospheric data comprises aircraft sensor data.

C31. A DATCM dynamic turbulence manager real-time flight plan modification system, comprising: means to receive a flight profile for an aircraft, the flight profile including an at least one initial route; means to identify an initial predicted comprehensive turbulence for the at least one initial route; means to determine a real-time comprehensive turbulence for the the at least one initial route; means to determine turbulence threshold compliance based on the real-time comprehensive turbulence and at least one of the flight profile and the initial predicted comprehensive turbulence; and means to generate a turbulence exception if the real-time comprehensive turbulence exceeds threshold turbulence parameters.

C32. The system of embodiment C31, wherein the turbulence exception comprises an alert for the aircraft.

C33. The system of embodiment C31 or C32, wherein the turbulence exception comprises determining an at least one adjusted route.

C34. The system of embodiment C33, wherein the determination of the at least one adjusted route is based on flight profile data.

C35. The system of embodiment C34, wherein the flight profile data comprises at least one of flight service type, aircraft airframe, and available fuel reserves.

C36. The system of embodiment C34 or C35, wherein the flight profile data comprises flight destination location.

C37. The system of any of embodiments C31-C36, comprising: means to determine a plurality of four-dimensional grid points for a specified temporal geographic space-time area.

C38. The system of any of embodiments C31-C37, comprising: means to obtain terrain data.

C39. The system of any of embodiments C31-C38, comprising: means to obtain atmospheric data.

C40. The system of any of embodiments C31-C39, comprising: means to determine a non-dimensional mountain wave amplitude.

C41. The system of any of embodiments C31-C40, comprising: means to determine mountain top wave drag.

C42. The system of any of embodiments C31-C41, comprising: means to determine an upper level non-dimensional gravity wave amplitude.

C43. The system of any of embodiments C31-C42, comprising: means to determine a buoyant turbulent kinetic energy.

C44. The system of any of embodiments C31-C43, comprising: means to determine a boundary layer eddy dissipation rate.

C45. The system of any of embodiments C31-C44, comprising: means to determine storm velocity.

C46. The system of any of embodiments C31-C45, comprising: means to determine eddy dissipation rate from updrafts.

C47. The system of any of embodiments C31-C46, comprising: means to determine storm velocity and eddy dissipation rate from updrafts.

C48. The system of any of embodiments C31-C47, comprising: means to determine maximum updraft speed.

C49. The system of any of embodiments C31-C48, comprising: means to determine maximum updraft speed at equilibrium level.

C50. The system of any of embodiments C31-C49, comprising: means to determine storm divergence.

C51. The system of any of embodiments C31-C50, comprising: means to determine storm divergence while the updraft speed is above the equilibrium level.

C52. The system of any of embodiments C31-C51, comprising: means to identify storm top.

C53. The system of any of embodiments C31-C52, comprising: means to determine storm divergence while the updraft speed is above the equilibrium level and identify storm top.

C54. The system of any of embodiments C31-C53, comprising: means to determine storm overshoot.

C55. The system of any of embodiments C31-C54, comprising: means to determine storm drag.

C56. The system of any of embodiments C31-C55, comprising: means to determine Doppler speed.

C57. The system of any of embodiments C31-C56, comprising: means to determine eddy dissipation rate above storm top.

C58. The system of any of embodiments C31-C57, comprising: means to determine eddy dissipation rate from downdrafts.

C59. The system of any of embodiments C31-C58, comprising at least one of: means to determine turbulent kinetic energy; and means to determine total eddy dissipation rate.

C60. The system of any of embodiments C31-C59, comprising: means to determine grid point non-dimensional mountain wave amplitude.

C61. The system of any of embodiments C31-C60, comprising: means to determine grid point mountain top wave drag.

C62. The system of any of embodiments C31-C61, comprising: means to determine grid point upper level non-dimensional gravity wave amplitude.

C63. The system of any of embodiments C31-C62, comprising: means to determine grid point buoyant turbulent kinetic energy.

C64. The system of any of embodiments C31-C63, comprising: means to determine grid point boundary layer eddy dissipation rate.

C65. The system of any of embodiments C31-C64, comprising: means to determine grid point storm velocity.

C66. The system of any of embodiments C31-C65, comprising: means to determine grid point eddy dissipation rate from updrafts.

C67. The system of any of embodiments C31-C66, comprising: means to determine grid point storm velocity and eddy dissipation rate from updrafts.

C68. The system of any of embodiments C31-C67, comprising: means to determine grid point maximum updraft speed.

C69. The system of any of embodiments C31-C68, comprising: means to determine grid point maximum updraft speed at grid point equilibrium level.

C70. The system of any of embodiments C31-C69, comprising: means to determine grid point storm divergence.

C71. The system of any of embodiments C31-C70, comprising: means to determine grid point storm divergence while the updraft speed is above the equilibrium level.

C72. The system of any of embodiments C31-C71, comprising: means to identify grid point storm top.

C73. The system of any of embodiments C31-C72, comprising: means to determine grid point storm divergence while the updraft speed is above the equilibrium level and identify storm top.

C74. The system of any of embodiments C31-C73, comprising: means to determine grid point storm overshoot.

C75. The system of any of embodiments C31-C74, comprising: means to determine grid point storm drag.

C76. The system of any of embodiments C31-C75, comprising: means to determine grid point Doppler speed.

C77. The system of any of embodiments C31-C76, comprising: means to determine grid point eddy dissipation rate above storm top.

C78. The system of any of embodiments C31-C77, comprising: means to determine grid point eddy dissipation rate from downdrafts.

C79. The system of any of embodiments C31-C78, comprising: means to determine grid point turbulent kinetic energy.

C80. The system of any of embodiments C31-C79, comprising: means to determine grid point total eddy dissipation rate.

C81. The system of any of embodiments C31-C80, comprising, for each point of the plurality of four-dimensional grid point, means to: determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identifying storm top; determine storm overshoot and storm drag; determine Doppler speed; determine eddy dissipation rate above the storm top; determine eddy dissipation rate from downdrafts; and determine at least one of the turbulent kinetic energy and the total eddy dissipation rate for each grid point.

C82. The system of any of embodiments C31-C81, wherein the atmospheric data comprises at least one of temperature data, wind data, and humidity data.

C83. The system of any of embodiments C31-C82, wherein the atmospheric data comprises numerical weather forecast data.

C84. The system of any of embodiments C31-C83, wherein the atmospheric data comprises aircraft sensor data.

D1. A DATCM dynamic turbulence controller processor-implemented flight planning method, comprising: receiving anticipated flight plan parameter data; obtaining terrain data based on the flight plan parameter data; obtaining atmospheric data based on the flight plan parameter data; determining a plurality of four-dimensional grid points based on the flight plan parameter data; for each point of the plurality of four-dimensional grid point: determining via a processor a non-dimensional mountain wave amplitude and mountain top wave drag, determining an upper level non-dimensional gravity wave amplitude, determining a buoyant turbulent kinetic energy, determining a boundary layer eddy dissipation rate, determining storm velocity and eddy dissipation rate from updrafts, determining maximum updraft speed at grid point equilibrium level, determining storm divergence while the updraft speed is above the equilibrium level and identifying storm top, determining storm overshoot and storm drag, determining Doppler speed, determining eddy dissipation rate above the storm top, and determining eddy dissipation rate from downdrafts; determining the turbulent kinetic energy for each grid point; identifying an at least one flight plan based on the flight plan parameter data and the determined turbulent kinetic energy; and providing the identified at least one flight plan.

D2. The method of embodiment D1, wherein the flight plan parameter data includes aircraft data.

D3. The method of embodiment D2, wherein the aircraft data includes airframe information.

D4. The method of embodiment D2 or D3, wherein the aircraft data includes airfoil information.

D5. The method of any of embodiments D1-D4, wherein the flight plan parameter data includes take-off time.

D6. The method of any of embodiments D1-D5, wherein the flight plan parameter data includes take-off location.

D7. The method of any of embodiments D1-D6 wherein the flight plan parameter data includes destination location.

D8. The method of any of embodiments D1-D7, wherein the flight plan parameter data includes cargo information.

D9. The method of any of embodiments D1-D8, wherein the flight plan parameter data indicates the flight is a passenger flight.

D10. The method of any of embodiments D1-D9, wherein the flight plan parameter data indicates the flight is a cargo flight.

D11. A DATCM platform flight planning apparatus, comprising a processor and a memory disposed in communication with the processor and storing processor-issuable instructions to: receive anticipated flight plan parameter data; obtain terrain data based on the flight plan parameter data; obtain atmospheric data based on the flight plan parameter data; determine a plurality of four-dimensional grid points based on the flight plan parameter data; determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identify storm top; determine storm overshoot and storm drag; determine Doppler speed; determine eddy dissipation rate above the storm top; determine eddy dissipation rate from downdrafts; determine the turbulent kinetic energy for each grid point; identify an at least one flight plan based on the flight plan parameter data and the determined turbulent kinetic energy; and provide the identified at least one flight plan.

D12. The apparatus of embodiment D11, wherein the flight plan parameter data includes aircraft data.

D13. The apparatus of embodiment D12, wherein the aircraft data includes airframe information.

D14. The apparatus of embodiment D12 or D13, wherein the aircraft data includes airfoil information.

D15. The apparatus of any of embodiments D11-D14, wherein the flight plan parameter data includes take-off time.

D16. The apparatus of any of embodiments D11-D15, wherein the flight plan parameter data includes take-off location.

D17. The apparatus of any of embodiments D11-D16, wherein the flight plan parameter data includes destination location.

D18. The apparatus of any of embodiments D11-D17, wherein the flight plan parameter data includes cargo information.

D19. The apparatus of any of embodiments D11-D18, wherein the flight plan parameter data indicates the flight is a passenger flight.

D20. The apparatus of any of embodiment D11-D19, wherein the flight plan parameter data indicates the flight is a cargo flight.

D21. A processor-readable tangible medium storing processor-issuable DATCM flight plan generating instructions to: receive anticipated flight plan parameter data; obtain terrain data based on the flight plan parameter data; obtain atmospheric data based on the flight plan parameter data; determine a plurality of four-dimensional grid points based on the flight plan parameter data; determine a non-dimensional mountain wave amplitude and mountain top wave drag; determine an upper level non-dimensional gravity wave amplitude; determine a buoyant turbulent kinetic energy; determine a boundary layer eddy dissipation rate; determine storm velocity and eddy dissipation rate from updrafts; determine maximum updraft speed at grid point equilibrium level; determine storm divergence while the updraft speed is above the equilibrium level and identify storm top; determine storm overshoot and storm drag; determine Doppler speed; determine eddy dissipation rate above the storm top; determine eddy dissipation rate from downdrafts; determine the turbulent kinetic energy for each grid point; and identify an at least one flight plan based on the flight plan parameter data and the determined turbulent kinetic energy.

D22. The medium of embodiment D21, wherein the flight plan parameter data includes aircraft data.

D23. The medium of embodiment D22, wherein the aircraft data includes airframe information.

D24. The medium of embodiment D22 or D23, wherein the aircraft data includes airfoil information.

D25. The medium of any of embodiments D21-D24, wherein the flight plan parameter data includes take-off time.

D26. The medium of any of embodiments D21-D25, wherein the flight plan parameter data includes take-off location.

D27. The medium of any of embodiments D21-D26, wherein the flight plan parameter data includes destination location.

D28. The medium of any of embodiments D21-D27, wherein the flight plan parameter data includes cargo information.

D29. The medium of any of embodiments D21-D28, wherein the flight plan parameter data indicates the flight is a passenger flight.

D30. The medium of any of embodiments D21-D29, wherein the flight plan parameter data indicates the flight is a cargo flight.

D31. A dynamic turbulence platform flight planning system, comprising: means to receive anticipated flight plan parameter data; means to obtain terrain data based on the flight plan parameter data; means to obtain atmospheric data based on the flight plan parameter data; means to determine a plurality of four-dimensional grid points based on the flight plan parameter data; means to determine a non-dimensional mountain wave amplitude and mountain top wave drag; means to determine an upper level non-dimensional gravity wave amplitude; means to determine a buoyant turbulent kinetic energy; means to determine a boundary layer eddy dissipation rate; means to determine storm velocity and eddy dissipation rate from updrafts; means to determine maximum updraft speed at grid point equilibrium level; means to determine storm divergence while the updraft speed is above the equilibrium level and identify storm top; means to determine storm overshoot and storm drag; means to determine Doppler speed; means to determine eddy dissipation rate above the storm top; means to determine eddy dissipation rate from downdrafts; means to determine the turbulent kinetic energy for each grid point; means to identify an at least one flight plan based on the flight plan parameter data and the determined turbulent kinetic energy; and means to provide the identified at least one flight plan.

D32. The system of embodiment D31, wherein the flight plan parameter data includes aircraft data.

D33. The system of embodiment D32, wherein the aircraft data includes airframe information.

D34. The system of embodiment D32, wherein the aircraft data includes airfoil information.

D35. The system of any of embodiments D31-D34, wherein the flight plan parameter data includes take-off time.

D36. The system of any of embodiments D31-D35, wherein the flight plan parameter data includes take-off location.

D37. The system of any of embodiments D31-D36, wherein the flight plan parameter data includes destination location.

D38. The system of any of embodiments D31-D37, wherein the flight plan parameter data includes cargo information.

D39. The system of any of embodiments D31-D38, wherein the flight plan parameter data indicates the flight is a passenger flight.

D40. The system of any of embodiments D31-D39, wherein the flight plan parameter data indicates the flight is a cargo flight.

D41. A DATCM platform flight planning system, comprising: means to receive anticipated flight plan data; means to obtain atmospheric data based on the flight plan data; means to determine a plurality of grid points based on the flight plan data; means to determine turbulent kinetic energy for each grid point; means to identify an at least one flight plan based on the flight plan data and the determined turbulent kinetic energy; and means to provide the identified at least one flight plan.

D42. The system of embodiment D41, comprising: means to determine a non-dimensional mountain wave amplitude and mountain top wave drag.

D43. The system of embodiment D41 or D42, comprising: means to determine an upper level non-dimensional gravity wave amplitude.

D44. The system of any of embodiments D41-D43, comprising: means to determine a buoyant turbulent kinetic energy.

D45. The system of any of embodiments D41-D44, comprising: means to determine a boundary layer eddy dissipation rate.

D46. The system of any of embodiments D41-D45, comprising: means to determine storm velocity.

D47. The system of any of embodiments D41-D46, comprising: means to determine eddy dissipation rate from updrafts.

D48. The system of any of embodiments D41-D47, comprising: means to determine maximum updraft speed.

D49. The system of any of embodiments D41-D47, comprising: means to determine maximum updraft speed at grid point equilibrium level.

D50. The system of any of embodiments D41-D49, comprising: means to determine storm divergence.

D51. The system of any of embodiments D41-D49, comprising: means to determine storm divergence while the updraft speed is above the equilibrium level.

D52. The system of any of embodiments D41-D51, comprising: means to identify storm top.

D53. The system of any of embodiments D41-D49, comprising: means to determine storm divergence while the updraft speed is above the equilibrium level and identify storm top.

D54. The system of any of embodiments D41-D53, comprising: means to determine storm overshoot and storm drag.

D55. The system of any of embodiments D41-D54, comprising: means to determine Doppler speed.

D56. The system of any of embodiments D41-D55, comprising: means to determine eddy dissipation rate above the storm top.

D57. The system of any of embodiments D41-D56, comprising: means to determine eddy dissipation rate from downdrafts.

D58. The system of any of embodiments D41-D57, wherein the flight plan data includes aircraft data.

D59. The system of embodiment D58, wherein the aircraft data includes at least one of airframe information and airfoil information.

D60. The system of any of embodiments D41-D59, wherein the flight plan data includes take-off time.

D61. The system of any of embodiments D41-D60, wherein the flight plan data includes take-off location.

D62. The system of any of embodiments D41-D61, wherein the flight plan data includes destination location.

D63. The system of any of embodiments D41-D62, wherein the flight plan data includes cargo information.

D64. The system of any of embodiments D41-D63, wherein the flight plan parameter data indicates the flight is a passenger flight.

D65. The system of any of embodiments D41-D63, wherein the flight plan parameter data indicates the flight is a cargo flight.

E1. A DATCM system for providing integrated flight hazard/threat identification and resolution comprising a combination of any of the preceding embodiments (A, B, C, D) such that turbulence and icing hazards are addressed.

E2. A DATCM flight planning system, comprising: means to receive parameter data for a flight; means to determine airfoil type for an aircraft associated with the flight; means to obtain atmospheric data based on the flight parameter data; means to determine a plurality of grid points based on the flight data; means to determine turbulent kinetic energy for each grid point; means to determine corresponding icing data for each grid point of the plurality of grid points based on the airfoil type and atmospheric data; means to identify an at least one flight plan based on the flight data and the determined turbulent kinetic energy and icing data; and means to provide the identified at least one flight plan.

E3. The flight planning system of embodiment E2, comprising: means to determine a percent power increase for the at least one flight plan.

DATCM Controller

Figure 46:
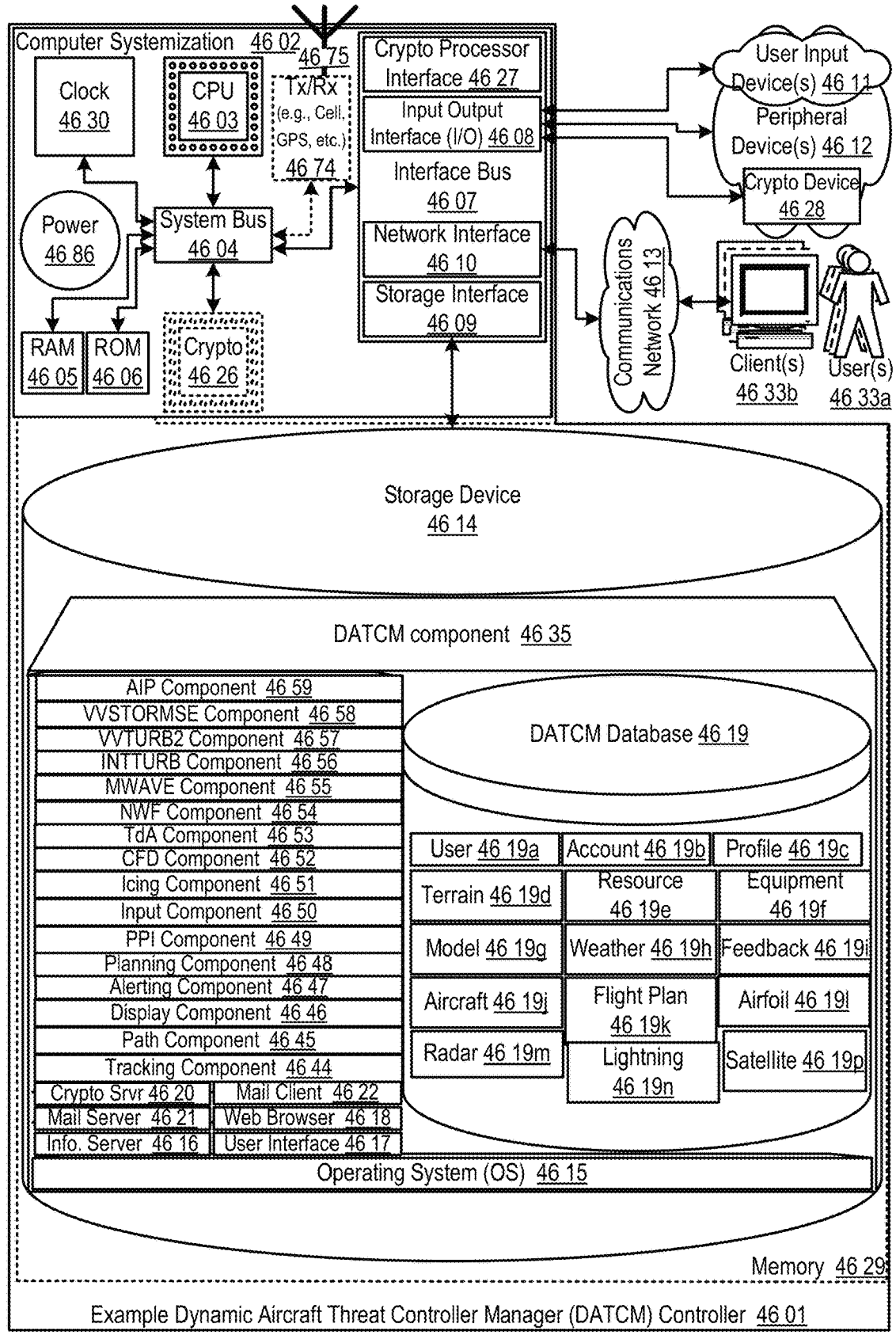
FIG. 46 shows a block diagram illustrating embodiments of a DATCM controller.

FIG. 46 shows a block diagram illustrating embodiments of DATCM controller 4601. In this embodiment, the DATCM controller 4601 may serve to aggregate, process, store, search, serve, identify, instruct, generate, match, and/or facilitate interactions with a computer through various technologies, and/or other related data.

Typically, users, e.g., 4633a, which may be people and/or other systems, may engage information technology systems (e.g., computers) to facilitate information processing. In turn, computers employ processors to process information; such processors 4603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 4629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DATCM controller 4601 may be connected to and/or communicate with entities such as, but not limited to: one or more users from user input devices 4611; peripheral devices 4612; an optional cryptographic processor device 4628; and/or a communications network 4613. For example, the DATCM controller 4601 may be connected to and/or communicate with users, e.g., 4633*a*, operating client device(s), e.g., 4633*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DATCM controller 4601 may be based on computer systems that may comprise, but are not limited to, components such as: a computer systemization 4602 connected to memory 4629.

Computer Systemization

A computer systemization 4602 may comprise a clock 4630, central processing unit ("CPU(s)" and/or "processor(s)" (these terms are used interchangeably throughout the disclosure unless noted to the contrary)) 4603, a memory 4629 (e.g., a read only memory (ROM) 4606, a random access memory (RAM) 4605, etc.), and/or an interface bus 4607, and most frequently, although not necessarily, are all interconnected and/or communicating through a system bus 4604 on one or more (mother)board(s) 4602 having conductive and/or otherwise transportive circuit pathways through which instructions (e.g., binary encoded signals) may travel to effectuate communications, operations, storage, etc. The computer systemization may be connected to a power source 4686; e.g., optionally the power source may be internal. Optionally, a cryptographic processor 4626 and/or transceivers (e.g., ICs) 4674 may be connected to the system bus. In another embodiment, the cryptographic processor and/or transceivers may be connected as either internal and/or external peripheral devices 4612 via the interface bus I/O. In turn, the transceivers may be connected to antenna(s) 4675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DATCM controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DATCM controller and beyond through various interfaces. Should processing requirements dictate a greater amount speed and/or capacity, distributed processors (e.g., Distributed DATCM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DATCM may be achieved by implementing a microcontroller such as CAST's R8051XC2 microcontroller; Intel's MCS 51 (i.e., 8051 microcontroller); and/or the like. Also, to implement certain features of the DATCM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DATCM component collection (distributed or otherwise) and/or features may be implemented via the microprocessor and/or via embedded components; e.g., via ASIC, coprocessor, DSP, FPGA, and/or the like. Alternately, some implementations of the DATCM may be implemented with embedded components that are configured and used to achieve a variety of features or signal processing. An example DATCM component (e.g., PPI Component 4649) substantially in the form of a field-programmable gate array configured as an integrated circuit for performing the features of the PPI component may be found with respect to FIGS. 18A-F. It should be appreciated that the example PPI hardware component disclosed is provided to enhance the reader's understanding of the instant disclosure and is but one embodiment of the DATCM disclosed herein. Furthermore, as substantially all integrated circuits may be represented as one or more alternative integrated circuits, hardware description language statements (e.g., VHDL, Verilog, and/or the like), programming language commands, and/or the like, embodiments of the disclosed PPI hardware component represented as alternative hardware designs and/or software or software/hardware combinations are possible based on this disclosure.

Depending on the particular implementation, the embedded components may include software solutions, hardware solutions, and/or some combination of both hardware/software solutions. For example, DATCM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DATCM features. A hierarchy of programmable interconnects allow logic blocks to be interconnected as needed by the DATCM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the DATCM may be developed on regular FPGAs and then migrated into a fixed version that more resembles ASIC implementations. Alternate or coordinating implementations may migrate DATCM controller features to a final ASIC instead of or in addition to FPGAs. Depending on the implementation all of the aforementioned embedded components and microprocessors may be considered the "CPU" and/or "processor" for the DATCM.

Power Source

The power source 4686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4686 is connected to at least one of the interconnected subsequent components of the DATCM thereby providing an electric current to all subsequent components. In one example, the power source 4686 is connected to the system bus component 4604. In an alternative embodiment, an outside power source 4686 is provided through a connection across the I/O 4608 interface. For example, a USB and/or IEEE 1394 connection carries both data and power across the connection and is therefore a suitable source of power.

Interface Adapters

Interface bus(ses) 4607 may accept, connect, and/or communicate to a number of interface adapters, conventionally although not necessarily in the form of adapter cards, such as but not limited to: input output interfaces (I/O) 4608, storage interfaces 4609, network interfaces 4610, and/or the like. Optionally, cryptographic processor interfaces 4627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4609 may accept, communicate, and/or connect to a number of storage devices such as, but not limited to: storage devices 4614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4610 may accept, communicate, and/ or connect to a communications network 4613. Through a communications network 4613, the DATCM controller is accessible through remote clients 4633b (e.g., computers with web browsers) by users 4633a. Network interfaces may employ connection protocols such as, but not limited to: direct connect, Ethernet (thick, thin, twisted pair 10/100/ 1000 Base T, and/or the like), Token Ring, wireless connection such as IEEE 802.11a-x, and/or the like. Should processing requirements dictate a greater amount speed and/or capacity, distributed network controllers (e.g., Distributed DATCM), architectures may similarly be employed to pool, load balance, and/or otherwise increase the communicative bandwidth required by the DATCM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 4610 may be used to engage with various communications network types 4613. For example, multiple network interfaces may be employed to allow for the communication over broadcast, multicast, and/or unicast networks.

Input Output interfaces (I/O) 4608 may accept, communicate, and/or connect to user input devices 4611, peripheral devices 4612, cryptographic processor devices 4628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 4611 often are a type of peripheral device 4612 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 4612 may be connected and/or communicate to I/O and/or other facilities of the like such as network interfaces, storage interfaces, directly to the interface bus, system bus, the CPU, and/or the like. Peripheral devices may be external, internal and/or part of the DATCM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 4628), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DATCM controller may be embodied as an embedded, dedicated, and/or monitor-less (i.e., headless) device, wherein access would be provided over a network interface connection.

Cryptographic units such as, but not limited to, microcontrollers, processors 4626, interfaces 4627, and/or devices 4628 may be attached, and/or communicate with the DATCM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 4629. However, memory is a fungible technology and resource, thus, any number of memory embodiments may be employed in lieu of or in concert with one another. It is to be understood that the DATCM controller and/or a computer systemization may employ various forms of memory 4629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 4629 will include ROM 4606, RAM 4605, and a storage device 4614. A storage device 4614 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 4629 may contain a collection of program and/or database components and/or data such as, but not limited to: operating system component(s) 4615 (operating system); information server component(s) 4616 (information server); user interface component(s) 4617 (user interface); Web browser component(s) 4618 (Web browser); database(s) 4619; mail server component(s) 4621; mail client component(s) 4622; cryptographic server component(s) 4620 (cryptographic server); the DATCM component(s) 4635; and/or the like (i.e., collectively a component collection). These components may be stored and accessed from the storage devices and/or from storage devices accessible through an interface bus. Although non-conventional program components such as those in the component collection, typically, are stored in a local storage device 4614, they may also be loaded and/or stored in memory such as: peripheral devices, RAM, remote storage facilities through a communications network, ROM, various forms of memory, and/or the like.

Operating System

The operating system component 4615 is an executable program component facilitating the operation of the DATCM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DATCM controller to communicate with other entities through a communications network 4613. Various communication protocols may be used by the DATCM controller as a subcarrier transport mechanism for interaction, such as, but not limited to: multicast, TCP/IP, UDP, unicast, and/or the like.

Information Server

An information server component 4616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DATCM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DATCM database 4619, operating systems, other program components, user interfaces, Web browsers, and/or the like.

Access to the DATCM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DATCM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DATCM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 4617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4618 is a stored program component that is executed by a CPU. The Web browser may be a conventional hypertext viewing application such as Microsoft Internet Explorer or Netscape Navigator. Secure Web browsing may be supplied with bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DATCM enabled nodes. The combined application may be nugatory on systems employing standard Web browsers.

Mail Server

A mail server component 4621 is a stored program component that is executed by a CPU 4603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DATCM.

Access to the DATCM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4622 is a stored program component that is executed by a CPU 4603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4620 is a stored program component that is executed by a CPU 4603, cryptographic processor 4626, cryptographic processor interface 4627, cryptographic processor device 4628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DATCM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the DATCM component to engage in secure transactions if so desired. The cryptographic component facilitates the secure accessing of resources on the DATCM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DATCM Database

The DATCM database component 4619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DATCM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DATCM database is implemented as a data-structure, the use of the DATCM database 4619 may be integrated into another component such as the DATCM component 4635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 4619 includes several tables 4619a-p. A User table 4619a may include fields such as, but not limited to: user_id, ssn, dob, first_name, last_name, age, state, address_firstline, address_secondline, zipcode, devices_list, contact_info, contact_type, alt_contact_info, alt_contact_type, user_equipment, user_plane, user_profile, and/or the like. An Account table 4619b may include fields such as, but not limited to: acct_id, acct_user, acct_history, acct_access, acct_status, acct_subscription, acct_profile, and/or the like.

A Profile table 4619c may include fields such as, but not limited to: prof_id, prof_assets, prof_history, prof_details, profile_aircraft, and/or the like. A Terrain table 4619d may include fields such as, but not limited to: terrain_id, terrain_details, terrain_parameters, terrain_var, and/or the like. A Resource table 4619e may include fields such as, but not limited to: resource_id, resource_location, resource_acct, and/or the like. An Equipment table 4619f may include fields such as, but not limited to: equip_id, equip_location, equip_acct, equip_contact, equip_type, and/or the like. A Model table 4619g may include fields such as, but not limited to: model_id, model_assc, model_PPI, model_feedback, model_param, model_var, and/or the like. A Weather data table 4619h may include fields such as, but not limited to: weather_data_id, weather_source, weather_location, weather_data_type, weather_acct, weather_icing, weather_var, and/or the like. In one embodiment, the weather data table is populated through one or more weather data feeds. A Feedback table 4619i may include fields such as, but not limited to: feedback_id, feedback_source, source_location, feedback_time, feedback_acct, and/or the like.

An Aircraft table 4619j may include fields such as, but not limited to: aircraft_id, aircraft_type, aircraft_profile, aircraft_fuel_capacity, aircraft_route, aircraft_use, aircraft_owner, aircraft_location, aircraft_acct, aircraft_flightplan, aircraft_parameters, aircraft_airfoil, aircraft_alerts, and/or the like. A Flight Plan table 4619k may include fields such as, but not limited to: flightplan_id, flightplan_source, flightplan_start_location, flightplan_start_time, flightplan_end_location, flightplan_end_time, flightplan_acct, flightplan_aircraft, flightplan_profile, flightplan_type, flightplan_alerts, flightplan_parameters, flightplan_airfoil, flightplan_PPI and/or the like. An Airfoil table 46191 may include fields such as, but not limited to: airfoil_id, airfoil_source, airfoil_aircraft, airfoil_icing_profile, airfoil_icing_determination, airfoil_profile, airfoil_type, airfoil_pi, airfoil_alerts, airfoil_parameters, airfoil_PPI, and/or the like.

A Radar table 4619m may include fields such as, but not limited to: radar_id, radar_source, radar_profile, radar_data, radar_type, radar_feed, radar_alerts, radar_parameters, and/or the like.

A Lightning data table 4619*n* may include fields such as, but not limited to: lightning_data_id, lightning_data_source, lightning_source_profile, lightning_location, lightning_type, lightning_feed, lighning_alerts, lightning_data_parameters, and/or the like.

A Satellite table 4619*p* may include fields such as, but not limited to: satellite_id, satellite_source, satellite_profile, satellite_type, satellite_feed, satellite_parameters, and/or the like.

In one embodiment, the DATCM database may interact with other database systems. For example, employing a distributed database system, queries and data access by search DATCM component may treat the combination of the DATCM database, an integrated data security layer database as a single database entity.

In one embodiment, user programs may contain various user interface primitives, which may serve to update the DATCM. Also, various accounts may require custom database tables depending upon the environments and the types of clients the DATCM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 4619*a-p*. The DATCM may be configured to keep track of various settings, inputs, and parameters via database controllers.

The DATCM database may communicate to and/or with other components in a component collection, including itself, and/or facilities of the like. Most frequently, the DATCM database communicates with the DATCM component, other program components, and/or the like. The database may contain, retain, and provide information regarding other nodes and data.

The DATCMs

The DATCM component 4635 is a stored program component that is executed by a CPU. In one embodiment, the DATCM component incorporates any and/or all combinations of the aspects of the DATCM discussed in the previous figures. As such, the DATCM affects accessing, obtaining and the provision of information, services, transactions, and/or the like across various communications networks. The features and embodiments of the DATCM discussed herein increase network efficiency by reducing data transfer requirements by the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DATCM's features and facilities, and in many cases reduce the costs, energy consumption/requirements, and extend the life of DATCM's underlying infrastructure; this has the added benefit of making the DATCM more reliable. Similarly, many of the features and mechanisms are designed to be easier for users to use and access, thereby broadening the audience that may enjoy/employ and exploit the feature sets of the DATCM; such ease of use also helps to increase the reliability of the DATCM. In addition, the feature sets include heightened security as noted via the Cryptographic components 4620, 4626, 4628 and throughout, making access to the features and data more reliable and secure. Additionally, the DATCM enables more efficient and safe flight planning and routing, including real-time dynamic responsiveness to changing weather conditions.

The DATCM component may transform weather data input via DATCM components into real-time and/or predictive icing feeds and displays, and/or the like and use of the DATCM. In one embodiment, the DATCM component 4635 takes inputs (e.g., weather forecast data, atmospheric data, models, sensor data, and/or the like) etc., and transforms the inputs via various components (a Tracking component 4644; a Path component 4645; a Display component 4646; an Alerting component 4647; a Planning component 4648; a PPI component 4649; an input component 4650; an icing component 4651; a CFD component 4652; a TdA component 4653; an NWF component 4654; an MWAVE component 4655; an INTTURB component 4656; a VVTURB2 component 4657; a VVSTORMSE component 4658; an AIP component 4659, and/or the like), into outputs (e.g., predictive flight path icing, percent power increase needed, real-time airfoil-specific icing data, flight path modifications/optimizations, icing alerts, and/or the like).

The DATCM component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DATCM server employs a cryptographic server to encrypt and decrypt communications. The DATCM component may communicate to and/or with other components in a component collection, including itself, and/or facilities of the like. Most frequently, the DATCM component communicates with the DATCM database, operating systems, other program components, and/or the like. The DATCM may contain, communicate, generate, obtain, and/or provide program component, system, user, and/or data communications, requests, and/or responses.

Distributed DATCMs

The structure and/or operation of any of the DATCM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DATCM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DATCM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
    index.jsp?topic=/com.ibm.IBMDI.doc/
    referenceguide295.htm
and other parser implementations:
http://publib.boulder.ibm.com/infocenter/tivihelp/v2r1/
    index.jsp?topic=/com.ibm.IBMDI.doc/
    referenceguide259.htm all of which are hereby expressly incorporated by reference herein.

In order to address various issues and advance the art, the entirety of this application for DYNAMIC AIRCRAFT THREAT CONTROLLER MANAGER APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DATCM individual and/or enterprise user, database configuration and/or relational model, data type, data transmission and/or network framework, syntax structure, and/or the like, various embodiments of the DATCM may be implemented that enable a great deal of flexibility and customization. For example, aspects of the DATCM may be adapted for integration with flight planning and route optimization. While various embodiments and discussions of the DATCM have been directed to predictive icing, however, it is to be understood that the embodiments described herein may be readily configured and/or customized for a wide variety of other applications and/or implementations.

What is claimed is:

1. A processor-implemented method for comprehensive flight hazard identification, the method comprising:
    receiving flight plan data into an electronic dynamic aircraft threat controller manager (DATCM);
    determining aircraft airfoil data for an aircraft associated with the flight plan data wherein the airfoil data includes one or more datum of airfoil size, airfoil shape, airfoil type, airfoil configuration, and airfoil geometry;
    determining a plurality of four-dimensional grid points for a temporal geographic space-time area associated with the flight plan data;
    receiving atmospheric data for the temporal geographic space-time area from any one or more of the aircraft, a second aircraft, a weather station, and a satellite, wherein the atmospheric data includes any one or more of a numerical weather forecast data, a meteogram, atmospheric soundings, a surface observation, a radar picture, a meteorological chart, a surface pressure chart, a weather map, and a numerical weather prediction map;
    determining, via a processor associated with the DATCM, corresponding comprehensive hazard data for each grid point of the plurality of four-dimensional grid points based on the aircraft airfoil data and the atmospheric data, the comprehensive hazard data including comprehensive turbulence data and airfoil-specific icing data;
    displaying hazards for the region based on the determined comprehensive hazard data; and
    flying the aircraft associated with the flight plan data along a flight plan that avoids a hazard above a threshold established for the aircraft associated with the flight plan data based upon the aircraft airfoil data.

2. The processor-implemented method of claim 1, further comprising: determining an at least one flight plan alert based on the flight plan data and the determined comprehensive hazard data; and providing the determined at least one flight plan alert.

3. The processor-implemented method of claim 1, further comprising: determining at least one flight path based on the flight plan data and the determined comprehensive hazard data; and providing the determined at least one flight path.

4. The processor-implemented method of claim 1, wherein the comprehensive turbulence data includes comprehensive turbulence forecast data.

5. The processor-implemented method of claim 4, wherein the comprehensive turbulence forecast data includes an eddy dissipation rate for each grid point of the plurality of four-dimensional grid points.

6. The processor-implemented method of claim 4, wherein the comprehensive turbulence forecast data is based on mountain wave turbulence, boundary layer turbulence, upper level unbalanced flow turbulence, and vertical velocity turbulence.

7. The processor-implemented method of claim 1, wherein the airfoil-specific icing data includes predictive icing data specific to the aircraft airfoil data.

8. The processor-implemented method of claim 1, wherein the flight plan data includes at least one of: (1) a flight take-off time, (2) a flight take-off location, and/or (3) a flight destination location.

9. A comprehensive flight hazard identification apparatus, comprising:
    an aircraft having a specific airfoil design;
    a map display;
    a weather sensor associated with any one or more of the aircraft, a second aircraft, a weather station, a weather balloon, and a satellite;
    a processor; and
    a memory disposed in communication with the processor and storing processor-issuable instructions to:
        receive flight plan data for the aircraft;
        determine airfoil data associated with the airfoil design for the aircraft;

determine a plurality of grid points for a region associated with the flight plan;

receive atmospheric data from the weather sensor for the region;

determine comprehensive hazard data for each point of the plurality of grid points based on the airfoil data and the atmospheric data, the comprehensive hazard data including comprehensive turbulence data and airfoil-specific icing data; and display hazards for the region based on the determined comprehensive hazard data, wherein the atmospheric data includes any one or more of a numerical weather forecast data, a meteogram, atmospheric soundings, a surface observation, a radar picture, a meteorological chart, a surface pressure chart, a weather map, and a numerical weather prediction map, wherein the airfoil data includes any one or more of percent power increase (PPI) values, airfoil size, airfoil shape, and airfoil geometry including height and angle of curvature, and wherein the weather sensor is selected from the group consisting of an infrared radiometer, a microwave radiometer, a hygrometer, a pitot-static system, a gyroscope, a thermometer, a barometer, an optical sensor, radar, lidar, sodar, a ceilometer, a spectrometer, and a water vapor sensor.

10. The apparatus of claim 9, further comprising processor-issuable instructions to: determine an at least one flight plan alert based on the flight plan data and the determined comprehensive hazard data; and provide the determined at least one flight plan alert.

11. The apparatus of claim 9, further comprising processor-issuable instructions to: determine at least one flight path based on the flight plan data and the comprehensive hazard data.

12. The apparatus of claim 9, wherein the comprehensive turbulence data includes comprehensive turbulence forecast data.

13. The apparatus of claim 12, wherein the comprehensive turbulence forecast data includes an eddy dissipation rate for each point of the plurality of grid points.

14. The apparatus of claim 12, wherein the comprehensive turbulence forecast data is based on mountain wave turbulence, boundary layer turbulence, upper level unbalanced flow turbulence, and vertical velocity turbulence.

15. The apparatus of claim 9, wherein the airfoil-specific icing data includes predictive icing data.

16. The apparatus of claim 9, wherein the flight plan data includes at least one of (1) a flight take-off time, (2) a flight take-off location, and/or (3) a flight destination location.

17. A processor-readable non-transitory medium storing processor-issuable comprehensive flight hazard identification instructions to:

receive flight data;

determine aircraft airfoil data for at least one aircraft associated with the flight data;

determine a plurality of grid points for a region associated with the flight data;

receive atmospheric data for the region;

determine comprehensive hazard data for each point of the plurality of grid points based on the aircraft airfoil data and the atmospheric data, the comprehensive hazard data including comprehensive turbulence data and airfoil icing data; and display hazards for the region onto a map display based on the determined comprehensive hazard data, wherein the aircraft airfoil data includes any one or more of percent power increase (PPI) values, airfoil size, airfoil shape, and airfoil geometry including height and angle of curvatures.

18. The processor-readable tangible medium of claim 17, further comprising processor-issuable comprehensive flight hazard identification instructions to: determine an at least one alert based on the flight data and the determined comprehensive hazard data; and provide the determined at least alert.

19. The processor-readable tangible medium of claim 17, wherein the airfoil-specific icing data includes predictive icing data.

20. The processor-readable tangible medium of claim 17, wherein the comprehensive turbulence data includes comprehensive turbulence forecast data based on mountain wave turbulence, boundary layer turbulence, upper level unbalanced flow turbulence, and vertical velocity turbulence.

* * * * *